(12) United States Patent
Yates, Jr. et al.

(10) Patent No.: US 7,941,647 B2
(45) Date of Patent: May 10, 2011

(54) COMPUTER FOR EXECUTING TWO INSTRUCTION SETS AND ADDS A MACROINSTRUCTION END MARKER FOR PERFORMING ITERATIONS AFTER LOOP TERMINATION

(75) Inventors: John S. Yates, Jr., Needham, MA (US); David L. Reese, Westborough, MA (US); Korbin S. Van Dyke, Sunol, CA (US); T. R. Ramesh, Mountain View, CA (US); Paul H. Hohensee, Nashua, NH (US)

(73) Assignee: ATI Technologies ULC, Markham, Ontario (CA)

( * ) Notice: Subject to any disclaimer, the term of this patent is extended or adjusted under 35 U.S.C. 154(b) by 667 days.

(21) Appl. No.: 11/982,419

(22) Filed: Oct. 31, 2007

(65) Prior Publication Data
US 2009/0204785 A1 Aug. 13, 2009

Related U.S. Application Data

(63) Continuation-in-part of application No. 09/385,394, filed on Aug. 30, 1999, which is a continuation-in-part of application No. 09/322,443, filed on May 28, 1999, now Pat. No. 6,941,545, which is a continuation-in-part of application No. 09/298,536, filed on Apr. 23, 1999, now abandoned, which is a continuation-in-part of application No. 09/239,194, filed on Jan. 28, 1999, now Pat. No. 7,275,246, application No. 11/982,419, which is a continuation-in-part of application No. 09/672,424, filed on Sep. 28, 2000, now abandoned, which is a continuation of application No. 09/626,325, filed on Jul. 26, 2000, now Pat. No. 7,065,633, which is a continuation-in-part of application No. PCT/US00/02239, filed on Jan. 28, 2000.

(60) Provisional application No. 60/176,610, filed on Jan. 18, 2000.

(51) Int. Cl.
*G06F 9/22* (2006.01)

(52) U.S. Cl. ...................................................... 712/220

(58) Field of Classification Search ........................ None
See application file for complete search history.

(56) References Cited

U.S. PATENT DOCUMENTS 3,544,969 A 12/1970 Rakoczi et al.
(Continued)

FOREIGN PATENT DOCUMENTS

EP 0 324 308 7/1989
(Continued)

OTHER PUBLICATIONS

Ammons, Ball and Larus: Exploiting Hardware Performance Counters with Flow and Context Sensitive Profiling, Proceedings of the ACM SIGPLAN 1997 Conference on Programming Language Design and Implementation, pp. 85-96 (1997).
(Continued)

*Primary Examiner* — Eric Coleman
(74) *Attorney, Agent, or Firm* — Volpe and Koenig, P.C.

(57) ABSTRACT

A computer. A processor pipeline alternately executes instructions coded for first and second different computer architectures or coded to implement first and second different processing conventions. A memory stores instructions for execution by the processor pipeline, the memory being divided into pages for management by a virtual memory manager, a single address space of the memory having first and second pages. A memory unit fetches instructions from the memory for execution by the pipeline, and fetches stored indicator elements associated with respective memory pages of the single address space from which the instructions are to be fetched. Each indicator element is designed to store an indication of which of two different computer architectures and/or execution conventions under which instruction data of the associated page are to be executed by the processor pipeline. The memory unit and/or processor pipeline recognizes an execution flow from the first page, whose associated indicator element indicates the first architecture or execution convention, to the second page, whose associated indicator element indicates the first architecture or execution convention. In response to the recognizing, a processing mode of the processor pipeline or a storage content of the memory adapts to effect execution of instructions in the architecture and/or under the convention indicated by the indicator element corresponding to the instruction's page.

54 Claims, 48 Drawing Sheets

U.S. PATENT DOCUMENTS

| | | | |
|---|---|---|---|
| 3,781,823 A | 12/1973 | Senese | |
| 4,077,058 A | 2/1978 | Appell et al. | |
| 4,084,235 A | 4/1978 | Hirtle et al. | |
| 4,275,441 A | 6/1981 | Takeuchi | |
| 4,412,303 A * | 10/1983 | Barnes et al. | 712/16 |
| 4,455,602 A | 6/1984 | Baxter, III et al. | |
| 4,514,803 A | 4/1985 | Agnew et al. | |
| 4,575,797 A | 3/1986 | Gruner et al. | |
| 4,636,940 A | 1/1987 | Goodwin, Jr. | |
| 4,722,050 A | 1/1988 | Lee et al. | |
| 4,750,112 A | 6/1988 | Jones et al. | |
| 4,779,187 A | 10/1988 | Letwin | |
| 4,812,975 A | 3/1989 | Adachi et al. | |
| 4,831,515 A | 5/1989 | Kamada et al. | |
| 5,043,878 A | 8/1991 | Ooi | |
| 5,115,500 A | 5/1992 | Larsen | |
| 5,121,472 A | 6/1992 | Danish et al. | |
| 5,127,092 A * | 6/1992 | Gupta et al. | 712/234 |
| 5,155,835 A | 10/1992 | Belsan | |
| 5,168,557 A | 12/1992 | Shibuya | |
| 5,241,638 A | 8/1993 | Mork et al. | |
| 5,241,664 A | 8/1993 | Ohba et al. | |
| 5,276,825 A | 1/1994 | Blomgren et al. | |
| 5,301,287 A | 4/1994 | Herrell et al. | |
| 5,307,504 A | 4/1994 | Robinson et al. | |
| 5,335,331 A | 8/1994 | Murao et al. | |
| 5,339,422 A | 8/1994 | Brender et al. | |
| 5,355,487 A | 10/1994 | Keller et al. | |
| 5,361,340 A | 11/1994 | Kelly et al. | |
| 5,371,894 A | 12/1994 | DiBrino | |
| 5,377,309 A | 12/1994 | Sonobe et al. | |
| 5,386,563 A | 1/1995 | Thomas | |
| 5,404,473 A * | 4/1995 | Papworth et al. | 712/241 |
| 5,404,476 A | 4/1995 | Kadaira | |
| 5,432,795 A | 7/1995 | Robinson | |
| 5,454,117 A | 9/1995 | Puziol et al. | |
| 5,479,616 A | 12/1995 | Garibay, Jr. et al. | |
| 5,481,684 A | 1/1996 | Richter et al. | |
| 5,481,693 A | 1/1996 | Blomgren et al. | |
| 5,483,647 A | 1/1996 | Yu et al. | |
| 5,487,156 A | 1/1996 | Popescu et al. | |
| 5,491,827 A | 2/1996 | Holtey | |
| 5,507,028 A | 4/1996 | Liu | |
| 5,515,518 A | 5/1996 | Stiles et al. | |
| 5,542,059 A | 7/1996 | Blomgren | |
| 5,542,109 A | 7/1996 | Blomgren et al. | |
| 5,560,013 A | 9/1996 | Scalzi et al. | |
| 5,568,646 A | 10/1996 | Jaggar | |
| 5,574,927 A | 11/1996 | Scantlin | |
| 5,574,929 A | 11/1996 | Pieterse et al. | |
| 5,590,309 A | 12/1996 | Chencinski et al. | |
| 5,598,546 A | 1/1997 | Blomgren | |
| 5,608,886 A | 3/1997 | Blomgren et al. | |
| 5,613,114 A | 3/1997 | Anderson et al. | |
| 5,613,118 A | 3/1997 | Heisch et al. | |
| 5,619,665 A | 4/1997 | Emma | |
| 5,619,666 A | 4/1997 | Coon et al. | |
| 5,625,835 A | 4/1997 | Ebcioglu et al. | |
| 5,628,016 A | 5/1997 | Kukol | |
| 5,636,366 A | 6/1997 | Robinson et al. | |
| 5,638,525 A * | 6/1997 | Hammond et al. | 712/209 |
| 5,652,869 A | 7/1997 | Herdeg et al. | |
| 5,657,474 A | 8/1997 | Taine et al. | |
| 5,659,679 A | 8/1997 | Alpert et al. | |
| 5,659,782 A | 8/1997 | Senter et al. | |
| 5,664,159 A | 9/1997 | Richter et al. | |
| 5,673,407 A | 9/1997 | Poland et al. | |
| 5,675,332 A | 10/1997 | Limberg | |
| 5,678,032 A | 10/1997 | Woods et al. | |
| 5,685,009 A | 11/1997 | Blomgren et al. | |
| 5,715,421 A | 2/1998 | Akiyama et al. | |
| 5,721,855 A * | 2/1998 | Hinton et al. | 712/218 |
| 5,721,927 A | 2/1998 | Baraz et al. | |
| 5,729,728 A * | 3/1998 | Colwell et al. | 712/234 |
| 5,732,238 A | 3/1998 | Sarkozy | |
| 5,742,780 A | 4/1998 | Caulk, Jr. | |
| 5,751,982 A | 5/1998 | Morley | |
| 5,754,878 A | 5/1998 | Asghar et al. | |
| 5,764,947 A | 6/1998 | Murphy et al. | |
| 5,768,500 A | 6/1998 | Agrawal et al. | |
| 5,774,287 A | 6/1998 | Leonhardt et al. | |
| 5,774,686 A | 6/1998 | Hammond et al. | |
| 5,781,750 A | 7/1998 | Blomgren et al. | |
| 5,781,758 A | 7/1998 | Morley | |
| 5,781,792 A | 7/1998 | Asghar et al. | |
| 5,784,640 A | 7/1998 | Asghar et al. | |
| 5,790,824 A | 8/1998 | Asghar et al. | |
| 5,790,844 A | 8/1998 | Webb et al. | |
| 5,794,068 A | 8/1998 | Asghar et al. | |
| 5,796,939 A | 8/1998 | Berc et al. | |
| 5,802,272 A | 9/1998 | Sites et al. | |
| 5,802,337 A | 9/1998 | Fielden | |
| 5,802,373 A | 9/1998 | Yates et al. | |
| 5,805,877 A | 9/1998 | Black et al. | |
| 5,812,864 A | 9/1998 | McCoy et al. | |
| 5,815,720 A | 9/1998 | Buzbee | |
| 5,819,064 A | 10/1998 | Razdan et al. | |
| 5,822,578 A | 10/1998 | Frank et al. | |
| 5,826,073 A | 10/1998 | Ben-Meir et al. | |
| 5,832,205 A | 11/1998 | Kelly et al. | |
| 5,838,962 A | 11/1998 | Larson | |
| 5,838,978 A | 11/1998 | Buzbee | |
| 5,842,017 A | 11/1998 | Hookway et al. | |
| 5,847,955 A | 12/1998 | Mitchell et al. | |
| 5,854,913 A | 12/1998 | Goetz et al. | |
| 5,864,697 A * | 1/1999 | Shiell | 712/240 |
| 5,870,763 A | 2/1999 | Lomet | |
| 5,884,057 A | 3/1999 | Blomgren et al. | |
| 5,901,308 A | 5/1999 | Cohn et al. | |
| 5,903,750 A * | 5/1999 | Yeh et al. | 712/236 |
| 5,903,751 A | 5/1999 | Hoyt et al. | |
| 5,903,760 A | 5/1999 | Farber et al. | |
| 5,905,855 A | 5/1999 | Klaiber et al. | |
| 5,911,073 A | 6/1999 | Mattson, Jr. et al. | |
| 5,918,251 A | 6/1999 | Yamada et al. | |
| 5,920,721 A | 7/1999 | Hunter et al. | |
| 5,926,484 A | 7/1999 | Takusagawa | |
| 5,930,509 A | 7/1999 | Yates et al. | |
| 5,935,220 A | 8/1999 | Lumpkin et al. | |
| 5,949,415 A | 9/1999 | Lin et al. | |
| 5,958,047 A | 9/1999 | Panwar et al. | |
| 5,958,061 A | 9/1999 | Kelly et al. | |
| 5,960,198 A | 9/1999 | Roediger et al. | |
| 5,966,537 A | 10/1999 | Ravichandran | |
| 5,968,162 A | 10/1999 | Yard | |
| 5,983,335 A * | 11/1999 | Dwyer, III | 712/23 |
| 5,999,736 A | 12/1999 | Gupta et al. | |
| 6,000,028 A | 12/1999 | Chernoff et al. | |
| 6,002,872 A | 12/1999 | Alexander, III et al. | |
| 6,003,038 A | 12/1999 | Chen | |
| 6,005,551 A | 12/1999 | Osborne et al. | |
| 6,006,029 A | 12/1999 | Bianchi et al. | |
| 6,006,033 A | 12/1999 | Heisch | |
| 6,006,277 A | 12/1999 | Talati et al. | |
| 6,011,908 A | 1/2000 | Wing et al. | |
| 6,014,735 A | 1/2000 | Chennupaty et al. | |
| 6,021,265 A | 2/2000 | Nevill | |
| 6,021,484 A | 2/2000 | Park | |
| 6,021,489 A | 2/2000 | Poplingher | |
| 6,026,478 A | 2/2000 | Dowling | |
| 6,029,004 A | 2/2000 | Bortnikov et al. | |
| 6,029,222 A * | 2/2000 | Kamiya | 710/262 |
| 6,031,992 A | 2/2000 | Cmelik et al. | |
| 6,032,247 A | 2/2000 | Asghar et al. | |
| 6,035,120 A | 3/2000 | Ravichandran | |
| 6,035,393 A | 3/2000 | Glew et al. | |
| 6,044,220 A | 3/2000 | Breternitz, Jr. | |
| 6,044,221 A | 3/2000 | Gupta et al. | |
| 6,047,363 A | 4/2000 | Lewchuk | |
| 6,047,390 A | 4/2000 | Butt et al. | |
| 6,052,771 A | 4/2000 | Heller, Jr. et al. | |
| 6,061,711 A | 5/2000 | Song et al. | |
| 6,065,103 A | 5/2000 | Tran et al. | |
| 6,070,009 A | 5/2000 | Dean et al. | |
| 6,071,317 A | 6/2000 | Nagel | |
| 6,076,144 A | 6/2000 | Peled et al. | |
| 6,081,665 A | 6/2000 | Nilsen et al. | |

| | | |
|---|---|---|
| 6,081,890 A | 6/2000 | Datta |
| RE36,766 E | 7/2000 | Krauskopf |
| 6,088,793 A * | 7/2000 | Liu et al. ............... 712/239 |
| 6,091,897 A | 7/2000 | Yates et al. |
| 6,092,188 A | 7/2000 | Corwin et al. |
| 6,115,809 A | 9/2000 | Mattson, Jr. et al. |
| 6,119,204 A | 9/2000 | Chang et al. |
| 6,119,218 A | 9/2000 | Arora et al. |
| 6,128,641 A | 10/2000 | Fleck et al. |
| 6,141,683 A | 10/2000 | Kraml et al. |
| 6,154,857 A | 11/2000 | Mann |
| 6,157,970 A | 12/2000 | Gafken et al. |
| 6,157,993 A | 12/2000 | Lewchuk |
| 6,163,764 A | 12/2000 | Dulong et al. |
| 6,175,957 B1 | 1/2001 | Ju et al. |
| 6,195,748 B1 | 2/2001 | Chrysos et al. |
| 6,199,095 B1 | 3/2001 | Robinson |
| 6,202,205 B1 | 3/2001 | Saboff et al. |
| 6,205,545 B1 | 3/2001 | Shah et al. |
| 6,212,493 B1 | 4/2001 | Huggins et al. |
| 6,219,774 B1 | 4/2001 | Hammond et al. |
| 6,226,789 B1 | 5/2001 | Tye et al. |
| 6,233,678 B1 | 5/2001 | Bala |
| 6,237,073 B1 | 5/2001 | Dean et al. |
| 6,237,074 B1 | 5/2001 | Phillips et al. |
| 6,240,526 B1 | 5/2001 | Petivan et al. |
| 6,243,804 B1 | 6/2001 | Cheng |
| 6,249,862 B1 | 6/2001 | Chinnakonda et al. |
| 6,253,215 B1 | 6/2001 | Agesen et al. |
| 6,256,728 B1 | 7/2001 | Witt et al. |
| 6,256,775 B1 | 7/2001 | Flynn |
| 6,260,191 B1 | 7/2001 | Santhanam |
| 6,289,445 B2 | 9/2001 | Ekner |
| 6,295,644 B1 | 9/2001 | Hsu et al. |
| 6,298,477 B1 | 10/2001 | Kessler |
| 6,304,948 B1 | 10/2001 | Motoyama et al. |
| 6,308,318 B2 | 10/2001 | Krishnaswamy |
| 6,308,321 B1 | 10/2001 | Schooler |
| 6,336,135 B1 | 1/2002 | Niblett et al. |
| 6,351,646 B1 | 2/2002 | Jellema et al. |
| 6,351,784 B1 | 2/2002 | Neal et al. |
| 6,351,844 B1 | 2/2002 | Bala |
| 6,353,924 B1 | 3/2002 | Ayers et al. |
| 6,363,336 B1 | 3/2002 | Banning et al. |
| 6,374,367 B1 | 4/2002 | Dean et al. |
| 6,374,369 B1 | 4/2002 | O'Donnell |
| 6,381,628 B1 | 4/2002 | Hunt |
| 6,381,735 B1 | 4/2002 | Hunt |
| 6,397,379 B1 | 5/2002 | Yates, Jr. et al. |
| 6,405,327 B1 | 6/2002 | Sipple et al. |
| 6,415,379 B1 | 7/2002 | Keppel et al. |
| 6,418,460 B1 | 7/2002 | Bitar et al. |
| 6,453,292 B2 | 9/2002 | Ramaswamy et al. |
| 6,463,582 B1 | 10/2002 | Lethin et al. |
| 6,470,442 B1 | 10/2002 | Arimilli et al. |
| 6,470,492 B2 | 10/2002 | Bala et al. |
| 6,473,846 B1 | 10/2002 | Melchior et al. |
| 6,477,683 B1 | 11/2002 | Killian et al. |
| 6,480,862 B1 | 11/2002 | Gall |
| 6,481,007 B1 | 11/2002 | Iyer et al. |
| 6,496,922 B1 | 12/2002 | Borrill |
| 6,496,923 B1 * | 12/2002 | Gruner et al. ............... 712/213 |
| 6,535,903 B2 | 3/2003 | Yates et al. |
| 6,549,930 B1 | 4/2003 | Chrysos et al. |
| 6,549,959 B1 | 4/2003 | Yates et al. |
| 6,553,431 B1 | 4/2003 | Yamamoto et al. |
| 6,557,094 B2 | 4/2003 | Pechanek et al. |
| 6,560,693 B1 | 5/2003 | Puzak et al. |
| 6,564,339 B1 | 5/2003 | Swoboda et al. |
| 6,571,331 B2 * | 5/2003 | Henry et al. ............... 712/239 |
| 6,591,340 B2 | 7/2003 | Chopra et al. |
| 6,591,414 B2 | 7/2003 | Hibi et al. |
| 6,631,514 B1 | 10/2003 | Le |
| 6,631,518 B1 | 10/2003 | Bortnikov et al. |
| 6,678,820 B1 * | 1/2004 | Kahle et al. ............... 712/239 |
| 6,685,090 B2 | 2/2004 | Nishigaya et al. |
| 6,694,457 B2 | 2/2004 | McKee |
| 6,708,173 B1 | 3/2004 | Behr et al. |
| 6,721,941 B1 | 4/2004 | Morshed et al. |
| 6,763,452 B1 | 7/2004 | Hohensee et al. |
| 6,779,107 B1 | 8/2004 | Yates |
| 6,789,181 B1 | 9/2004 | Yates et al. |
| 6,789,263 B1 | 9/2004 | Shimada et al. |
| 6,820,051 B1 | 11/2004 | Swoboda |
| 6,820,190 B1 * | 11/2004 | Knebel et al. ............... 712/215 |
| 6,826,748 B1 | 11/2004 | Hohensee et al. |
| 6,934,832 B1 | 8/2005 | Van Dyke et al. |
| 6,941,545 B1 | 9/2005 | Reese et al. |
| 6,954,923 B1 | 10/2005 | Yates, Jr. et al. |
| 6,978,462 B1 | 12/2005 | Adler et al. |
| 7,013,456 B1 | 3/2006 | Van Dyke et al. |
| 7,047,394 B1 | 5/2006 | Van Dyke et al. |
| 7,065,633 B1 | 6/2006 | Yates, Jr. et al. |
| 7,069,421 B1 | 6/2006 | Yates, Jr. et al. |
| 7,111,290 B1 | 9/2006 | Yates, Jr. et al. |

FOREIGN PATENT DOCUMENTS

| | | |
|---|---|---|
| WO | 96/24895 | 8/1996 |
| WO | 97/50031 | 12/1997 |
| WO | 98/13740 | 4/1998 |
| WO | 98/28689 | 7/1998 |
| WO | 98/38575 | 9/1998 |
| WO | 98/59292 | 12/1998 |
| WO | 99/03037 | 1/1999 |
| WO | 99/08188 | 2/1999 |
| WO | 99/08191 | 2/1999 |

OTHER PUBLICATIONS

Burroughs, Preliminary Edition, B 1700 Systems Reference Manual, Burroughs Corporation (1972).

Burroughs, B 1700 Systems Micro Implementation Language (MIL) Reference Manual, Burroughs Corporation (1973).

Brad Calder, Peter Feller, Alan Eustace, Value Profiling, Proceedings of the 30$^{th}$ International Symposium on Microarchitecture (Micro-30), IEEE, pp. 259-269 (Dec. 1-3, 1997).

Anton Chernoff, et al., FX!32, A Profile-Directed Binary Translator, IEEE Micro, vol. 18, No. 2, pp. 56-64 (Mar./Apr., 1998).

Compaq Computer Corp., Compiler Writer's Guide for the Alpha 21264 (1999) //ftp.digital.com/pub/Digital/info/semiconductor/literature/comwrgd.pdf.

T.M. Conte, et al., "Accurate and practical profile-driven compilation using the profile buffer," Proceedings of the 29$^{th}$ Annual International Symposium on Microarchitecture, Paris, France, pp. 36-45 (Dec. 1996).

T.M. Conte, et al., "Hardware based profiling: an effective technique for profile-driven optimization," International Journal of Parallel Programming, vol. 24, No. 2 (Feb. 1996).

T.M. Conte, et al., "Using branch handling hardware to support profile-driven optimization," Proceedings of the 27$^{th}$ Annual International Symposium on Microarchitecture, San Jose, CA (Dec. 1994).

J.S. Cox et al., "Commercializing profile-driven optimization," Proceedings of the 28$^{th}$ Hawaii International Conference on System Sciences, vol. 1, Maui, HI, pp. 221-228 (Jan. 1995).

Dean, ProfileMe: Hardware Support for Instruction-Level Profiling on Out-of-Order Processors, Proceedings of 30$^{th}$ Annual Intl. IEEE/ACM Symp. on Microarchitecture, pp. 292-302 (Dec. 1997).

Digital Equipment Corp., White Paper: How Digital FX!32 Works (Sep. 1997) http://www.digital.com/semiconductor/amt/fx32/fx-white.htm.

Ebcioglu and Altman, IBM Research Report, DAISY: Dynamic Compilation for 100% Architectural Compatibility, IBM Research Division (1996).

FOLDOC Definition for term "RISC," www.foldoc.org, Jun. 3, 1997, 1 page.

Linda Geppert et al., Transmeta's Magic Show, IEEE Spectrum, vol. 37, No. 5, pp. 26-33 (May 2000).

Ronald M. Guffin, Microdiagnositcs for the Standard Computer MLP-900 Processor, IEEE Transactions on Computers, vol. C-20, No. 7, pp. 803-808 (Jul. 1971).

Linley Gwennap, MDR Technical Library Special Report, Intel's Merced and IA-64 Technology and Market Forecast, IA-64 Software Model—Chapter 3 excerpt Microprocessor Report, MicroDesign Resources (Jul. 20, 1998).

Linley Gwennap, MDR Technical Library Special Report, Intel's Merced and IA-64: Technology and Market Forecast, Executive Summary, Microprocessor Report, MicroDesign Resources (Jul. 20, 1998).

Linley Gwennap, First Merced Patent Surfaces, Intel Document Reveals Processors With Dual Instruction Sets, Microprocessor Report, MicroDesign Resources (Jul. 20, 1998).

R.E. Hank, et al., "Region-Based Compilation: an Introduction and Motivation," Proceedings of the $28^{th}$ Annual International Symposium on Microarchitecture, pp. 158-168 (Dec. 1995).

Hollingsworth, Critical Path Profiling of Message Passing and Shared-Memory Programs, IEEE Transactions on Parallel and Distributed Systems vol. 9, No. 10, pp. 1029-1040 (Oct. 1998).

Reiner W. Hartenstein, Jürgen Becker: Performance Analysis in CoDe-X Partitioning for Structural Programmable Accelerators; Proc. of $5^{th}$ Int'l Workshop on Hardware/Software Co-Design CODES/CASHE '97, Braunschweig, Germany, p. 141 (Mar. 1997).

Raymond J. Hookway, Mark A. Herdeg, Digital FX!32: Combining Emulation and Binary Translation (Aug. 28, 1997), http://www.digital.com/info/DTJP01HM.HTM.

Intel Corporation, Intel Architecture Software Developer's Manual, vol. 1: Basic Architecture, pp. 3-10 to 3-13, 7-1 to 7-3, 7-20 to 7-25; vol. 2: Instruction Set Reference, pp. 3-60 to 3-63, 3-240 to 3-251; vol. 3: System Programming Guide, pp. 11-1 to 11-3, 11-10 to 11-13, 14-1 to 14-3, 14-10 to 4-15 (1997).

Intel Corporation, Pentium Processor Family Developer's Manual (1997), pp. 1-1 to 1-6, 2-1 to 2-20.

Intel Corporation, Pentium Processor Family Developer's Manual (1997), vol. 3: Architecture and Programming Manual, pp. 3-1 to 3-3, 3-10 to 3-13, 12-1 to 12-27, 14-1 to 14-30.

Jones, Puzzling with Microcode, ACM SIGARCH Computer Architecture News, vol. 11, No. 5, pp. 8-12 (1983).

Kavi et al., A Performability Model for Soft Real-Time Systems, IEEE Proceedings of the $27^{th}$ Annual Hawaii International Conference on System Sciences, pp. 571-579 (1994).

Kim and Tyson: Analyzing the Working Set Characteristics of Branch Execution, Proceedings of the $31^{st}$ Annual ACM/IEEE International Symposium on Microarchitecture, pp. 49-58 (Dec. 1998).

Monica S. Lam, Robert P. Wilson, Limits of Control Flow on Parallelism, Proceedings of the $19^{th}$ Annual International Symposium on Computer Architecture, p. 46-57 (May 1992).

Larus and Schnarr: EEL: Machine-Independent Executable Editing, EEL: Machine-indepedent executable editing. In Proceedings of the ACM SIGPLAN Conference on Programming Language Design and Implementation (PLDI), 1995.

Harold W. Lawson, Jr., et al., Functional Characteristics of a Multilingual Processor, IEEE Transactions on Computers, vol. C-20, No. 7, pp. 732-742 (Jul. 1971).

M. Lipasti and J. Shen, Exceeding the Data-Flow Limit Via Value Prediction, $29^{th}$ International Symposium on Microarchitecture, pp. 226-237, IEEE (Dec. 1996).

Magnusson and Werner, Efficient Memory Simulation in SimICS, Proceedings of the $28^{th}$ Annual Simulation Symposium, IEEE, pp. 62-73 (1995).

K.N.P. Menezes, "Hardware-based profiling for program optimization," Ph.D. thesis, Department of Electrical and Computer Engineering, North Carolina State University, Raleigh, North Carolina (1997).

Mueller, Rustagi and Baker: MiThOS—A Real-Time Micro-Kernel Threads Operating System, IEEE Real-Time Systems Symposium 1995: pp. 49-55 (1995).

Nanodata Corporation, QM-1 Hardware level User's Manual (1975).

Nanodata Corporation, QM-2 Processor (1976).

Park et al., Evaluation of Scheduling Techniques on a SPARC-Based VLIW Testbed, Proceedings of the $30^{th}$ Annual ACM/IEEE international symposium on Microarchitecture, pp. 104-113 (1997).

Parkinson and Parameswaran, Profiling in the ASP Codesign Environment, Proceedings of the $8^{th}$ International Symposium on System Synthesis, Cannes, France, pp. 128-133 (Sep. 1995).

Peterson, "The Profile Naming Service," ACM Transactions on Computer Systems (TOCS), v. 6, N. 4, pp. 341-364 (Nov. 1988).

Rizvi et al., Execution-Driven Simulation of a Superscalar Processor, IEEE Proceedings of the $27^{th}$ Annual Hawaii International Conference on System Sciences, pp. 185-194 (1994).

Robert F. Rosin, Contemporary Concepts of Microprogramming and Emulation, ACM Computing Surveys, vol. 1, No. 4, pp. 197-212 (Dec. 1969).

Robert F. Rosin, An Environment for Research in Microprogramming and Emulation, Communications of the ACM, vol. 15, No. 8, pp. 748-760 (Aug. 1972).

Standard Computer Corp., IC-9000 Central Processing Unit—Principles of Operation (undated-possibly 1969).

Veen: Dataflow Machine Architecture, ACM Computer Surveys vol. 18, No. 4, pp. 365-396 (Dec. 1986).

W.T. Wilner, Design of the Burroughs B1700, Fall Joint Computer Conference, pp. 489-497 (1972).

W.T. Wilner, Burroughs B1700 Memory Utilization, Fall Joint Computer Conference, pp. 579-586 (1972).

Webster's Ninth New Collegiate Dictionary, Merriam Webster, p. 674 (1990).

Yahoo! Education, definition of "large," retrieved from http://education.yahoo.com/reference/dictionary/entry/large;_ylt=Arl132LTvoYOZZqTSfspfhLCsgMMF. (2010).

* cited by examiner

| I-TLB PROPERTY BITS | DECODED PROPERTY VALUES | | PROTECTED | INSTRUCTIONS SENT TO: | COLLECT PROFILE TRACE-PACKETS? | PROBE FOR TRANSLATED CODE | I/O MEMORY REFERENCE EXCEPTIONS |
|---|---|---|---|---|---|---|---|
| | ISA 194 | CC 200 | INTERPRETATION | | | | |
| 00 | TAP | TAP | NO | NATIVE CODE OBSERVING NATIVE RISCy CALLING CONVENTIONS | NATIVE DECODER | NO | NO | FAULT IF SEG.tio |
| 01 | TAP | x86 | NO | NATIVE CODE OBSERVING x86 CALLING CONVENTIONS | NATIVE DECODER | NO | NO | FAULT IF SEG.tio |
| 10 | x86 | x86 | NO | x86 CODE, UNPROTECTED - TAX! PROFILE COLLECTION ONLY | x86 HW CONVERTER | IF ENABLED | NO | TRAP IF PROFILING |
| 11 | x86 | x86 | YES | x86 CODE, PROTECTED - TAX! CODE MAY BE AVAILABLE | x86 HW CONVERTER | IF ENABLED | BASED ON I-TLB PROBE ATTRIBUTES | TRAP IF PROFILING |

| TRANSITION (SOURCE => DEST) ISA & CC PROPERTY VALUES | HANDLER ACTION |
|---|---|
| 00 => 00 | NO TRANSITION EXCEPTION |
| 00 => 01 | VECT_xxx_X86_CC EXCEPTION - HANDLER CONVERTS FROM NATIVE TO x86 CONVENTIONS |
| 00 => 1x | VECT_xxx_X86_CC EXCEPTION - HANDLER CONVERTS FROM NATIVE x86 CONVENTIONS, SETS UP EXPECTED EMULATOR AND PROFILING STATE |
| 01 => 00 | VECT_xxx_TAP_CC EXCEPTION - HANDLER CONVERTS FROM x86 TO NATIVE CONVENTIONS |
| 01 => 01 | NO TRANSITION EXCEPTION |
| 01 => 1x | VECT_X86_ISA EXCEPTION [CONDITIONAL BASED ON PCW.X86_ISA_ENABLE FLAG] - SETS UP EXPECTED EMULATOR AND PROFILING STATE |
| 1x => 00 | VECT_xxx_TAP_CC EXCEPTION - HANDLER CONVERTS FROM x86 TO NATIVE CONVENTIONS |
| 1x => 01 | VECT_TAP_ISA EXCEPTION [CONDITIONAL BASED PCW.TAP_ISA_ENABLE FLAG] - NO CONVENTION CONVERSION NECESSARY |
| 1x => 10 | NO TRANSITION EXCEPTION - [PROFILE COMPLETE POSSIBLE, PROBE POSSIBLE] |
| 1x => 11 | NO TRANSITION EXCEPTION - [PROFILE COMPLETE POSSIBLE, PROBE NOT POSSIBLE] |

FIG. 2B

| NAME | DESCRIPTION | TYPE |
|---|---|---|
| VECT_call_X86_CC | PUSH ARGS, RETURN ADDRESS, SET UP x86 STATE | FAULT ON TARGET INSTRUCTION |
| VECT_jump_X86_CC | SET UP x86 STATE | FAULT ON TARGET INSTRUCTION |
| VECT_ret_no_fp_X86_CC | RETURN VALUE TO EAX:EDX, SET UP x86 STATE | FAULT ON TARGET INSTRUCTION |
| VECT_ret_fp_X86_CC | RETURN VALUE TO x86 FP STACK, SET UP x86 STATE | FAULT ON TARGET INSTRUCTION |
| VECT_call_TAP_CC | x86 STACK ARGS, RETURN ADDRESS TO REGISTERS | FAULT ON TARGET INSTRUCTION |
| VECT_jump_TAP_CC | x86 STACK ARGS TO REGISTERS | FAULT ON TARGET INSTRUCTION |
| VECT_ret_no_fp_TAP_CC | RETURN VALUE TO RV0 | FAULT ON TARGET INSTRUCTION |
| VECT_ret_any_TAP_CC | RETURN TYPE UNKNOWN, SETUP RV0 AND RVDP | FAULT ON TARGET INSTRUCTION |

FIG. 2C

X86-to Tapestry transition exception handler           320

// This handler is entered under the following conditions:
// 1. An x86 caller invokes a native function
// 2. An x86 function returns to a native caller
// 3. x86 software returns to or resumes an interrupted native function following
//    an external asynchronous interrupt, a processor exception, or a context switch

```
                                   ┌─321
dispatch on the two least-significant bits of the destination address   {
   case"00"      // calling a native subprogram
      // copy linkage and stack frame information and call parameters from the memory
      // stack to the analogous Tapestry registers
      LR ← [SP++]        // set up linkage register ─323
      AP ← SP            // address of first argument ─324
      SP ← SP - 8        // allocate return transfer argument area ─326
      SP ← SP & (-32)    // round the stack pointer down to a 0 mod 32 boundary ─327
      XD ← 0             // inform callee that caller uses X86 calling conventions ─328          }322
   case "01"     // resuming an X86 thread suspended during execution of a native routine
      if the redundant copies of the save slot number in EAX and EDX do not match or if  }371
          the redundant copies of the timestamp in EBX:ECX and ESI:EDI do not match {
          // some form of bug or thread corruption has been detected
          goto TAPESTRY_CRASH_SYSTEM( thread-corruption-error-code ) ─372
      }
      save the EBX:ECX timestamp in a 64-bit exception handler temporary register }373
          (this will not be overwritten during restoration of the full native context)
      use save slot number in EAX to locate actual save slot storage ─374
      restore full entire native context (includes new values for all x86 registers) ─375
      if save slot's timestamp does not match the saved timestamp { ─376
          // save slot has been reallocated; save slot exhaustion has been detected
          goto TAPESTRY_CRASH_SYSTEM( save-slot-overwritten-error-code ) ─377
      }
      free the save slot  ─378                                                              }370
   case"10"      // returning from X86 callee to native caller, result already in registers
      RV0<63:32> ← edx<31:00>        // in case result is 64 bits ─333
      convert the FP top-of-stack value from 80 bit X86 form to 64-bit form in RVDP ─334   }332
      SP ← ESI                       // restore SP from time of call ─337
   case"11"      // returning from X86 callee to native caller, load large result from memory
      RV0..RV3 ← load 32 bytes from [ESI-32] // (guaranteed naturally aligned) ─330         }329
      SP ← ESI                       // restore SP from time of call ─337
}
EPC ← EPC & -4     // reset the two low-order bits to zero ─336
RFE ─338
```

FIG. 3H

```
Tapestry-to-X86 transition exception handler
  // This handler is entered under the following conditions:
  // 1. a native caller invokes an x86 function
  // 2. a native function returns to an x86 caller
  switch on XD<3:0> {    ⎯341

XD_RET_FP:                    // result type is floating point
      F0/F1 ← FINFLATE.de( RVDP)  // X86 FP results are 80 bits
      SP ← from RXA save          // discard RXA, pad, args
      FPCW ← image after FINIT & push // FP stack has 1 entry
      goto EXIT XD_RET_WRITEBACK:             // store result to @RVA, leave RVA in eax
      RVA ← from RXA save         // address of result area
      copy decode(XD<8:4>) bytes from RV0..RV3 to [RVA]
      eax ← RVA                   // X86 expects RVA in eax        }342
      SP ← from RXA save          // discard RXA, pad, args
      FPCW ← image after FINIT    // FP stack is empty
      goto EXIT XD_RET_SCALAR:                // result in eax:eda
      edx<31:00> ← eax<63:32>     // in case result is 64 bits
      SP ← from RXA save          // discard RXA, pad, args
      FPCW ← image after FINIT    // FP stack is empty
      goto EXIT XD_CALL_HIDDEN_TEMP:  // allocate 32 byte aligned hidden temp ⎯343
      esi ← SP                    // stack cut back on return
      SP ← SP - 32                // allocate max size temp    }344
      RVA ← SP                    // RVA consumed later by RR
      LR<1:0> ← "11"              // flag address for return & reload ⎯345
      goto CALL_COMMON default:                      // remaining XD_CALL_xxx encodings
      esi ← SP                    // stack cut back on return ⎯343
      LR<1:0> ← "10"              // flag address for return ⎯346
  CALL_COMMON:                                      ⎯347
      interpret XD to push and/or reposition args
      [-SP] ← LR                  // push LR as return address  }
  EXIT:                                                          }348
      setup emulator context and profiling ring buffer pointer
  }
  RFE ⎯349                        // to original target
}
```

FIG. 31

```
interrupt/exception handler of Tapestry operating system:                                    350
    // Control vectors here when a synchronous exception or asynchronous interrupt is to be
    // exported to / manifested in an x86 machine.

// The interrupt is directed to something within the virtual X86, and thus there is a possibility
// that the X86 operating system will context switch. So we need to distinguish two cases:
//   either the running process has only X86 state that is relevant to save, or
//   there is extended state that must be saved and associated with the current machine context
//      (e.g., extended state in a Tapestry library call in behalf of a process managed by X86 OS)
if execution was interrupted in the converter – EPC.ISA == X86 {
        // no dependence on extended/native state possible, hence no need to save any    }-351
        goto EM86_Deliver_Interrupt( interrupt-byte )
} else if EPC.Taxi_Active {
        // A Taxi translated version of some X86 code was running. Taxi will rollback to an
        // x86 instruction boundary. Then, if the rollback was induced by an asynchronous external
        // interrupt, Taxi will deliver the appropriate x86 interrupt. Else, the rollback was induced  }-353
        // by a synchronous event so Taxi will resume execution in the converter, retriggering the
        // exception but this time with EPC.ISA == X86
        goto TAXi_Rollback( asynchronous-flag, interrupt-byte )
} else if EPC.EM86 {
        // The emulator has been interrupted. The emulator is coded to allow for such
        // conditions and permits re-entry during long running routines (e.g. far call through a gate)  }-354
        // to deliver external interrupts
        goto EM86_Deliver_Interrupt( interrupt-byte )
} else {
        // This is the most difficult case - the machine was executing native Tapestry code on
        // behalf of an X86 thread. The X86 operating system may context switch. We must save
        // all native state and be able to locate it again when the x86 thread is resumed.
            ┌-361
        allocate a free save slot; if unavailable free the save slot with oldest timestamp and try again
        save the entire native state (both the X86 and the extended state)      }-362
        save the X86 EIP in the save slot                                            ┌-363         }-360
        overwrite the two low-order bits of EPC with "01" (will become X86 interrupt EIP)
        store the 64-bit timestamp in the save slot, in the X86 EBX:ECX register pair (and,  }-364
             for further security, store a redundant copy in the X86 ESI:EDI register pair)
        store the a number of the allocated save slot in the X86 EAX register (and, again for }-365
             further security, store a redundant copy in the X86 EDX register)
        goto EM86_Deliver_Interrupt( interrupt-byte )
}                                                        └-369
```

FIG. 3J

```
typedef struct {
    save_slot_t *      newer,       // pointer to next-most-recently-allocated save slot ⎫
    save_slot_t *      older;       // pointer to next-older save slot                   ⎬ 379c
    unsigned int64     epc;         // saved exception PC/IP                             ⎫
    unsigned int64     pcw;         // saved exception PCW (program control word)        ⎬ 356  ⎫
    unsigned int64     registers[63]; // save the 63 writeable general registers         ⎭      ⎬ 355
    ...                             // other words of Tapestry context
    timestamp_t        timestamp;   // timestamp to detect buffer overrun  ⟵358
    int                save_slot_ID; // ID number of the save slot  ⟵357
    boolean            save_slot_is_full; // full / empty flag  ⟵359
} save_slot_t;

save_slot_t *      save_slot_head;   // pointer to the head of the queue  ⟵379a
save_slot_t *      save_slot_tail;   // pointer to the tail of the queue  ⟵379b system initialization
    reserve several pages of unpaged memory for save slots
```

FIG. 3K

| SOURCE | CODE 402 | EVENT | PROFILEABLE EVENT 414 / REUSE EVENT CODE | 416 | INITIATE PACKET 418 | PROBEABLE EVENT 610 | 612 PROBE EVENT BIT- ITLB PROBE ATTRIBUTE OR EMULATOR PROBE |
|---|---|---|---|---|---|---|---|
| 410 RFE (CONTEXT AT POINT ENTRY) { 412 { | 0.0000 | DEFAULT (x86 TRANSPARENT) EVENT, REUSE ALL CONVERTER VALUES | YES | | NO | | REUSE EVENT CODE |
| | 0.0001 | SIMPLE x86 INSTRUCTION COMPLETION (REUSE EVENT CODE) | YES | | NO | | REUSE EVENT CODE |
| | 0.0010 | PROBE EXCEPTION FAILED | YES | | NO | | REUSE EVENT CODE |
| | 0.0011 | PROBE EXCEPTION FAILED, RELOAD PROBE TIMER | YES | | NO | | REUSE EVENT CODE |
| | 0.0100 | FLUSH EVENT | NO | NO | NO | NO | - |
| | 0.0101 | SEQUENTIAL; EXECUTION ENVIRONMENT CHANGED - FORCE EVENT | NO | YES | NO | NO | - |
| | 0.0110 | FAR RET | NO | YES | YES | NO | - |
| | 0.0111 | IRET | NO | YES | NO | NO | - |
| | 0.1000 | FAR CALL | NO | YES | YES | YES | FAR CALL |
| | 0.1001 | FAR JMP | NO | YES | YES | NO | - |
| | 0.1010 | SPECIAL; EMULATOR EXECUTION, SUPPLY EXTRA INSTRUCTION DATA$^a$ | NO | YES | NO | NO | - |
| | 0.1011 | ABORT PROFILE COLLECTION | NO | NO | NO | NO | - |
| | 0.1100 | x86 SYNCHRONOUS/ASYNCHRONOUS INTERRUPT W/PROBE (GRP 0) | NO | YES | YES | YES | EMULATOR PROBE |
| | 0.1101 | x86 SYNCHRONOUS/ASYNCHRONOUS INTERRUPT (GRP 0) | NO | YES | YES | NO | - |
| | 0.1110 | x86 SYNCHRONOUS/ASYNCHRONOUS INTERRUPT W/PROBE (GRP 1) | NO | YES | YES | YES | EMULATOR PROBE |
| | 0.1111 | x86 SYNCHRONOUS/ASYNCHRONOUS INTERRUPT (GRP 1) | NO | YES | YES | NO | - |
| 404 CONVERTER (NEAR EDGE ENTRY) { | 1.0000 | IP-RELATIVE JNZ FORWARD (OPCODE: 75, 0F 85) | NO | YES | YES | NO | - |
| | 1.0001 | IP-RELATIVE JNZ BACKWARD (OPCODE: 75, 0F 85) | NO | YES | YES | YES | JNZ |
| | 1.0010 | IP-RELATIVE CONDITIONAL JUMP FORWARD - (JCC, JCXZ, LOOP) | NO | YES | YES | NO | - |
| | 1.0011 | IP-RELATIVE CONDITIONAL JUMP BACKWARD - (JCC, JCXZ, LOOP) | NO | YES | YES | YES | COND JUMP |
| | 1.0100 | IP-RELATIVE, NEAR JMP FORWARD (OPCODE: E9, EB) | NO | YES | YES | NO | - |
| | 1.0101 | IP-RELATIVE, NEAR JMP BACKWARD (OPCODE: E9, EB) | NO | YES | YES | YES | NEAR JUMP |
| | 1.0110 | RET/RET IMM16 (OPCODE C3, C2 /W) | NO | YES | YES | NO | - |
| | 1.0111 | IP-RELATIVE, NEAR CALL (OPCODE: E8) | NO | YES | YES | YES | NEAR CALL |
| | 1.1000 | REPE/REPNE CMPS/SCAS (OPCODE: A6, A7, AE, AF) | NO | YES | NO | NO | - |
| | 1.1001 | REP MOVS/STOS/LDOS (OPCODE: A4, A5, AA, AB, AC, AD) | NO | YES | NO | NO | - |
| | 1.1010 | INDIRECT NEAR JMP (OPCODE: FF /4) | NO | YES | YES | NO | - |
| | 1.1011 | INDIRECT NEAR CALL (OPCODE: FF /2) | NO | YES | YES | YES | NEAR CALL |
| | 1.1100 | LOAD FROM I/O MEMORY (TLB.ASI !=0) (NOT USED IN T1) | NO | YES | NO | NO | - |
| | 1.1101 | AVAILABLE FOR EXPANSION | NO | NO | NO | NO | - |
| | 1.1110 | DEFAULT CONVERTER EVENT; SEQUENTIAL 406 | NO | YES | NO | NO | - |
| | 1.1111 | NEW PAGE (INSTRUCTION ENDS ON LAST BYTE OF A PAGE FRAME OR STRADDLES ACROSS A PAGE FRAME BOUNDARY) 408 | NO | YES | NO | NO | - |

FIG. 4B

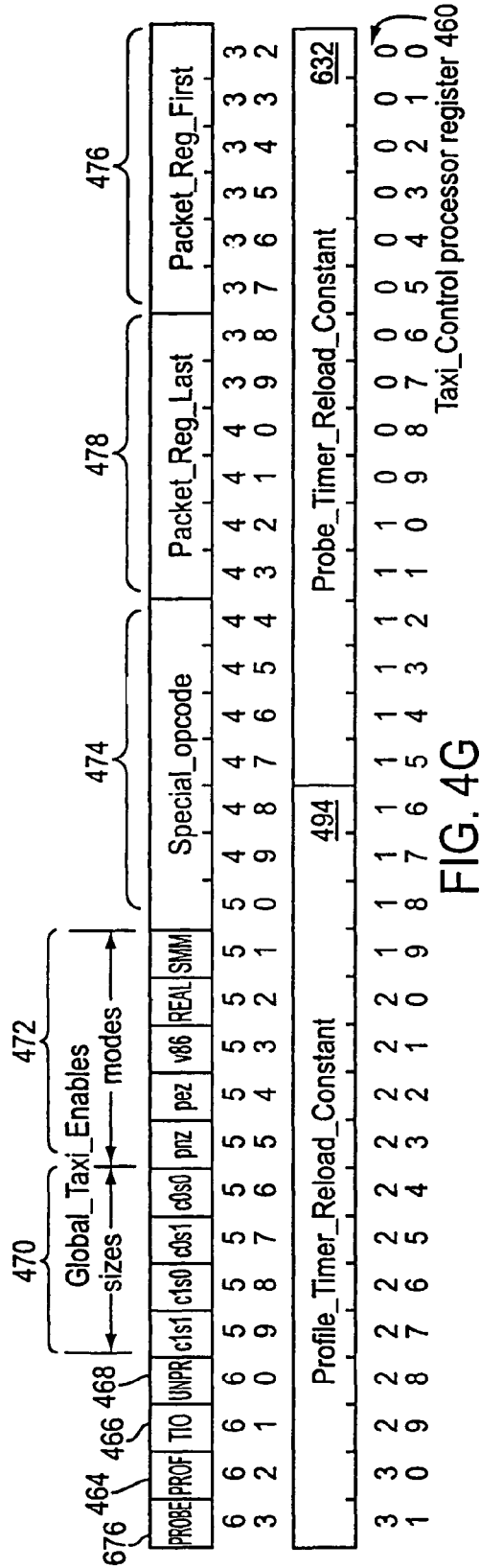
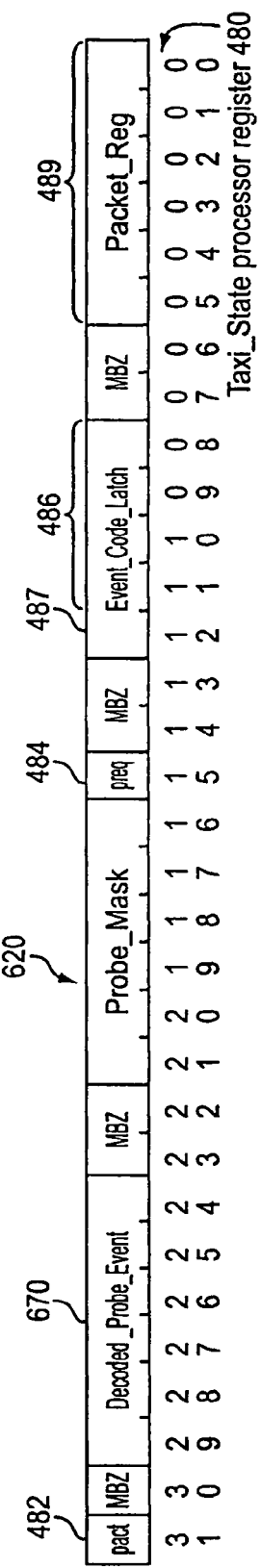
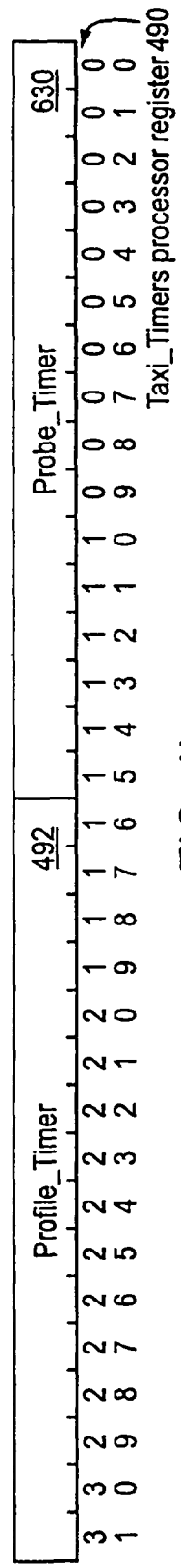
FIG. 4G
FIG. 4H
FIG. 4I

Sector match logic

SMR Allocation logic

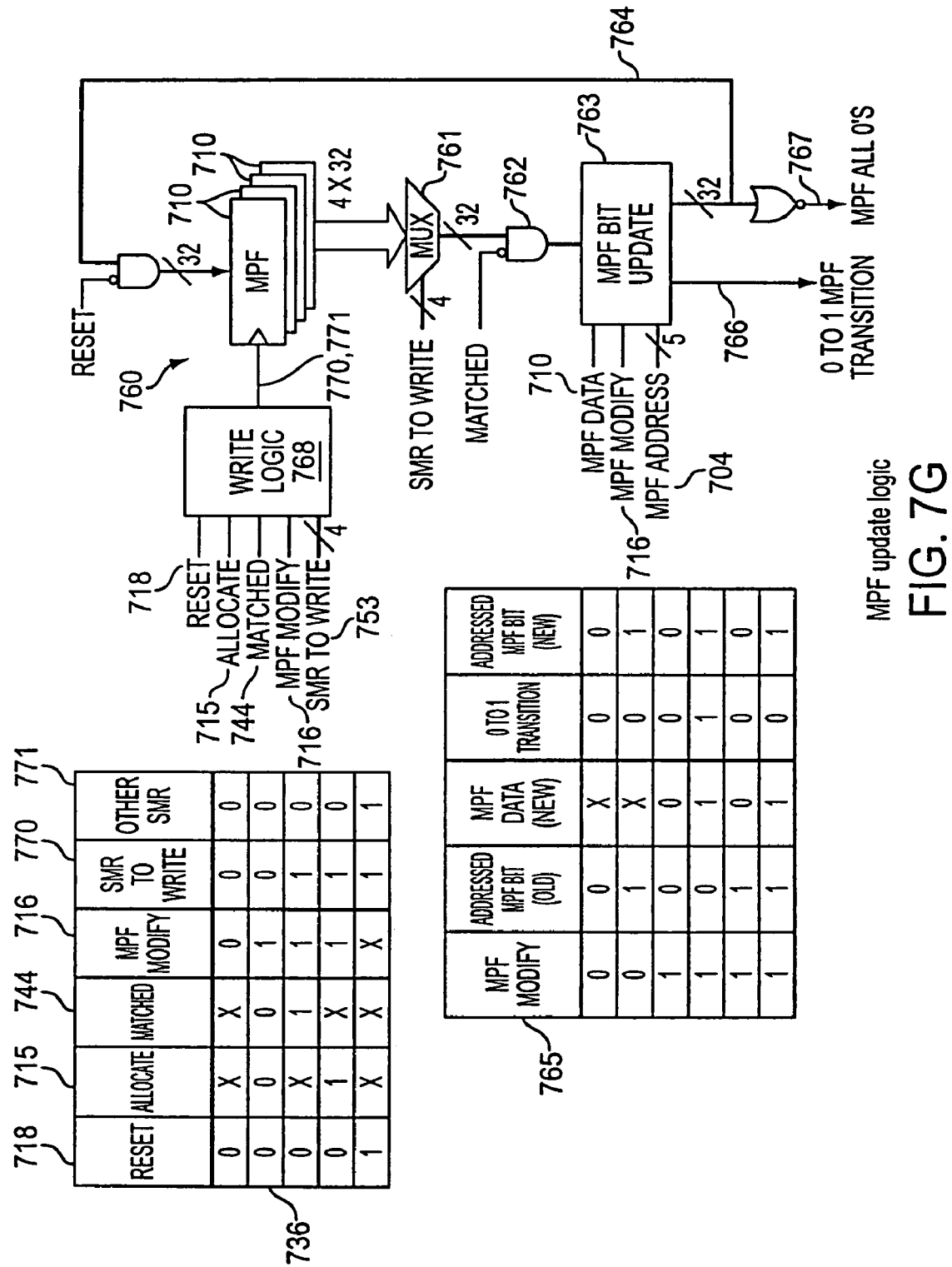
FIG. 7G MPF update logic

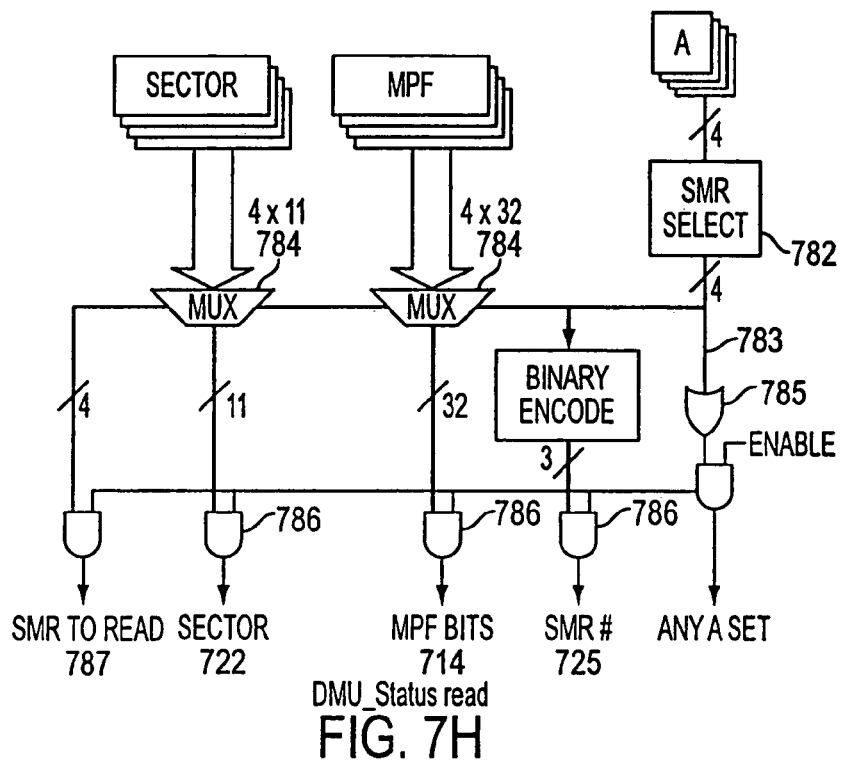

FIG. 7H

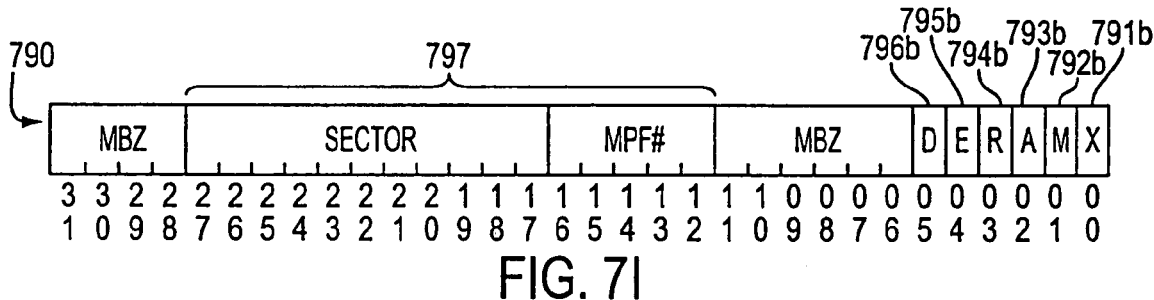

FIG. 7I

| COMMAND BIT | BIT POSITION | MEANING |
|---|---|---|
| D | 5 | DISABLE MONITORING OF DMA WRITES BY CLEARING THE DMU ENABLE FLAG |
| E | 4 | ENABLE MONITORING OF DMA WRITES BY SETTING THE DMU ENABLE FLAG |
| R | 3 | RESET ALL SMRS: CLEAR ALL A AND MPF BITS AND CLEAR THE DMU OVERRUN FLAG |
| A | 2 | ALLOCATE AN INACTIVE SMR ON A FAILED SEARCH |
| M | 1 | ALLOW MPF MODIFICATIONS |
| X | 0 | NEW MPF BIT VALUE TO RECORD ON SUCCESSFUL SEARCH (OR ALLOCATION) |

| M | X | ACTION |
|---|---|---|
| 0 | - | INHIBIT MODIFICATION OF THE MPF BIT |
| 1 | 0 | CLEAR THE CORRESPONDING MPF BIT |
| 1 | 1 | SET THE CORRESPONDING MPF BIT |

FIG. 7J

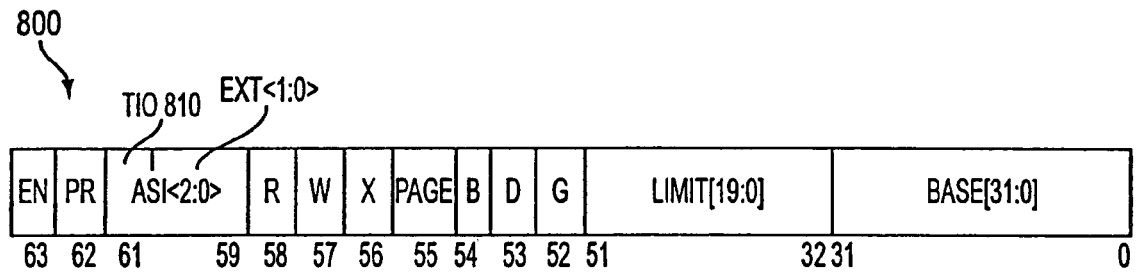

| SIZE | BIT(S) | NAME | FUNCTION |
|---|---|---|---|
| 1 | 63 | SEG.EN | ENABLES SEGMENT LIMIT/PROTECTION CHECKING |
| 1 | 62 | SEG.PR | CHOOSES WHICH PROTECTION BITS TO USE FOR PAGE TABLE PROTECTION - ( 0 MEANS PSW.UK OR 1 MEANS MISC.UK) |
| 3 | 61:59 | SEG.AS | ADDRESS SPACE (ONLY USED WHEN SEG.PAGE IS 0) |
|  |  | SEG.TIO, SEG.EXT | ADDRESS SPACE EXTENSION (ONLY USED WHEN SEG.PAGE IS 1) |
| 3 | 58:56 | SEG.RWX | READ/WRITE/EXECUTE '1' MEANS ENABLED - ALL 000 MEANS IT'S AN INVALID SEGMENT |
| 1 | 55 | SEG.PAGE | ENABLES THE PAGING SYSTEM -- (TRANSLATION AND CHECKING) |
| 1 | 54 | SEG.B | SEGMENT SIZE (1 MEANS 32-BIT, 0 MEANS 16-BIT) |
| 1 | 53 | SEG.D | SEGMENT DIRECTION (0 MEANS EXPAND UP) |
| 1 | 52 | SEG.G | SIZE OF LIMIT (1 MEANS IT'S IN 4k PAGES) |
| 20 | 51:32 | SEG.LIMIT | SEGMENT LIMIT |
| 32 | 31:0 | SEG.BASE | SEGMENT BASE |

FIG. 8A

AT CODE GENERATION TIME:
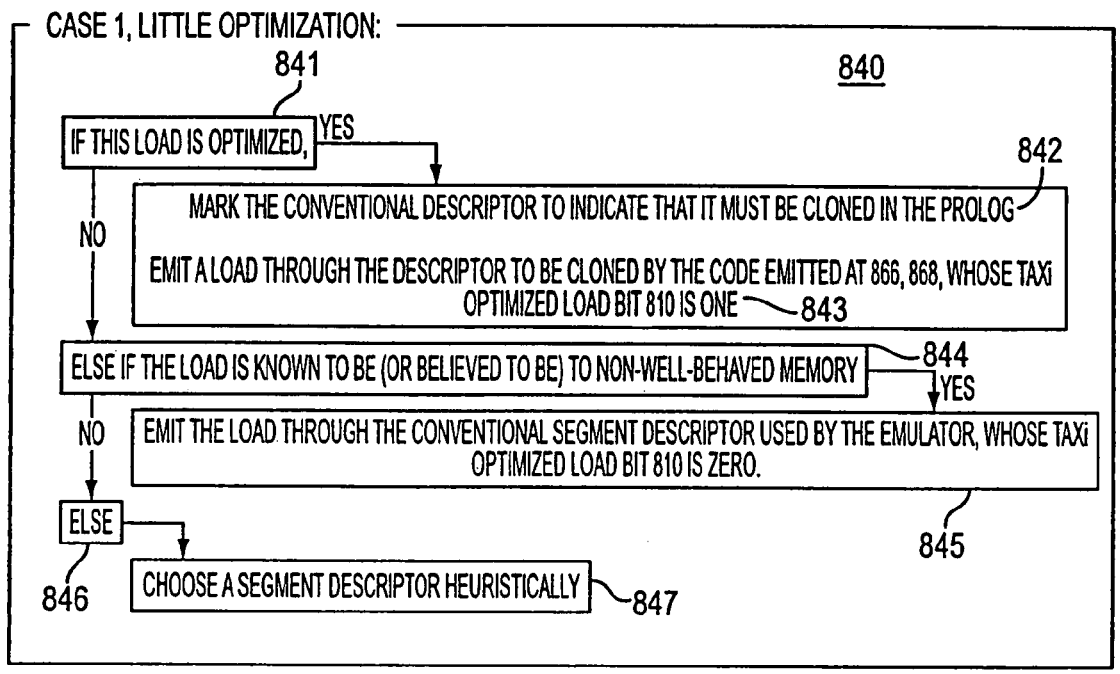
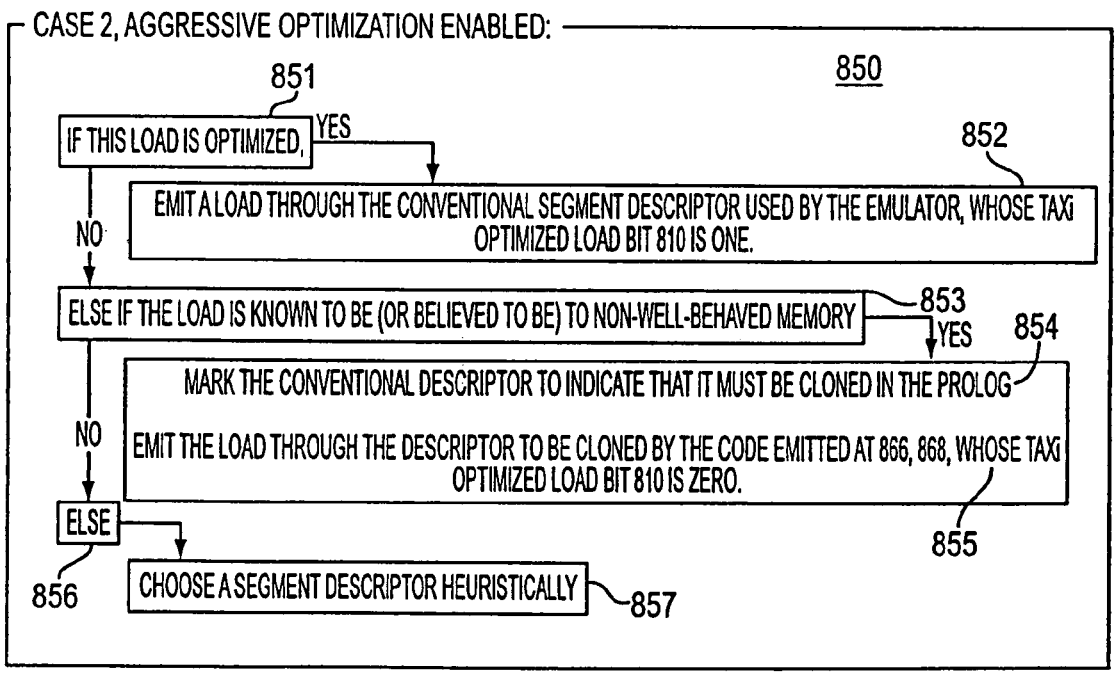
FIG. 8B

| MNEMONIC | TYPE | DESCRIPTION OF SIDE-BAND INFORMATION |
|---|---|---|
| INSTRUCTIONS WITH Imm6 FIELD | | THE CONVERTER MAY SUPPLY A FULL 32-BIT IMMEDIATE. |
| BRANCHES WITH DISPLACEMENT | | THE CONVERTER MAY SUPPLY A FULL 32-BIT DISPLACEMENT. |
| LDA / STA | INTEGER | A FULL 32-BIT DISPLACEMENT IS SENT ON THE IMMEDIATE BUS; THIS IS ADDED TO SRC1 TO COMPUTE THE OFFSET FOR SOME ADDRESSING MODES. |
| CJcond | INTEGER | THE CONVERTER MAY SPECIFY A 16 OR 32-BIT ADDRESS SIZE IN PARALLEL WITH THIS INSTRUCTION (A 32-BIT DISPLACEMENT MAY ALSO BE PROVIDED). |
| CJcond | INTEGER | THE CONVERTER MAY SPECIFY A 16 OR 32-BIT ADDRESS SIZE IN PARALLEL WITH THIS INSTRUCTION. A 32-BIT DISPLACEMENT MAY ALSO BE PROVIDED. |
| FROMPR | INTEGER | 3-BITS OF TOS (TOP-OF-STACK) ARE SENT ON THE IMMEDIATE BUS IN PARALLEL WITH THIS INSTRUCTION FOR USE BY THE FNSTSW INSTRUCTION CONVERTER SEQUENCE. |
| LEA | INTEGER | A 6-BIT INDEX REGISTER SPECIFIER, A 32-BIT DISPLACEMENT, AND A 2-BIT SCALE FACTOR ARE PASSED FROM THE CONVERTER AS ADDITIONAL INPUT TO THE HARDWARE IN ORDER TO FORM A COMPLETE x86 ADDRESSING MODE. |
| LDAI | INTEGER | A 6-BIT INDEX REGISTER SPECIFIER, A 32-BIT DISPLACEMENT, AND A 2-BIT SCALE FACTOR ARE PASSED FROM THE CONVERTER AS ADDITIONAL INPUT TO THE HARDWARE IN ORDER TO FORM A COMPLETE x86 ADDRESSING MODE. ADDITIONALLY, A SECOND DESTINATION REGISTER IS PASSED AS THE DESTINATION OF THE ADDRESS AUTOINCREMENT MODE. |
| LOOP, LOOPZ, LOOPNZ | INTEGER | THE CONVERTER MAY SPECIFY A 16 OR 32-BIT ADDRESS SIZE IN PARALLEL WITH THIS INSTRUCTION. A 32-BIT DISPLACEMENT MAY ALSO BE PROVIDED. |
| STAI | INTEGER | A 6-BIT INDEX REGISTER SPECIFIER, A 32-BIT DISPLACEMENT, AND A 2-BIT SCALE FACTOR ARE PASSED FROM THE CONVERTER AS ADDITIONAL INPUT TO THE HARDWARE IN ORDER TO FORM A COMPLETE x86 ADDRESSING MODE. ADDITIONALLY, A SECOND DESTINATION REGISTER IS PASSED AS THE DESTINATION OF THE ADDRESS AUTOINCREMENT MODE. |
| PSHUPW | MMX | ONLY 6 BITS OF THE Imm8 ARE STORED IN THE INSTRUCTION. THE REMAINING TWO BITS ARE CREATED BY THE HW CONVERTER. |
| FLDA | FP EP | A 6-BIT INDEX REGISTER SPECIFIER AND A 32-BIT DISPLACEMENT, AND A 2-BIT SCALE FACTOR ARE PASSED FROM THE CONVERTER AS ADDITIONAL INPUT TO THE HARDWARE IN ORDER TO FORM A COMPLETE x86 ADDRESSING MODE. |
| FTST | FP EP | 1-BIT OF ST0_VALID IS SENT ON THE IMMEDIATE BUS IN PARALLEL WITH THIS INSTRUCTION. |
| FSTA | FP EP | A 6-BIT INDEX REGISTER SPECIFIER AND A 2-BIT SCALE FACTOR ARE PASSED FROM THE CONVERTER AS ADDITIONAL INPUT TO THE HARDWARE IN ORDER TO FORM A COMPLETE x86 ADDRESSING MODE. |
| FXAM | FP EP | 1 BIT ST0_VALID IS PASSED ON THE IMMEDIATE BUS. |
| INSTRUCTION CONTROL | | INSTRUCTION BOUNDARY INFORMATION:<br>- START OF INSTRUCTION OR STRING ITERATION<br>- LAST OF SEQUENCE<br>- FP_DP/... INTERNMENT CONTROL<br>- FP_TAG_MAP INTERNMENT CONTROL |

FIG. 9D

X86 instruction PUSHAD
Temp := (ESP)
Push(EAX)
Push(ECX)
Push(EDX)
Push(EBX)
Push(Temp)
Push(EBP)
Push(ESI)
Push(EDI)

Native Instruction Recipe 950

954 — MOV.64      tmp_d, ESP    /* copy working SP to temp */
951 — STOREDEC.X  EAX,SS,tmp_d
       STOREDEC.X  ECX,SS,tmp_d   953
       STOREDEC.X  EDX,SS,tmp_d
       STOREDEC.X  EBX,SS,tmp_d
       STOREDEC.X  ESP,SS,tmp_d
       STOREDEC.X  EBP,SS,tmp_d
       STOREDEC.X  ESI,SS,tmp_d
955 — MOV.64       EDI,SS,tmp_d
952 —              ESP,tmp_d     /* commit new SP */

FIG. 9E

| IDIOM | USAGE |
|---|---|
| LOAD / OP [/STORE] | LOAD DATA |
| COMPLEX ADDRESS CALCULATION | COMPUTED OFFSET |
| MOV mem, [DEFGS]S / PUSH [DEFGS]S (SELECTOR PUSH/STORE) | SELECTOR (PROCESSOR REGISTER NOT DIRECTLY ACCESSIBLE BY STORE INSTRUCTIONS) |
| PUSHA (PUSH ALL) | INTERMEDIATE STACK POINTER; COMMIT AT END |
| POPA (POP ALL) | INTERMEDIATE STACK POINTER; COMMIT AT END |
| MOV mem, Imm / PUSH Imm | INTERMEDIATE (NOT AVAILABLE AS AN OPERAND TO STORE INSTRUCTION) |
| MULTIPLY | INTERMEDIARY TO CONNECT CONTIGUOUS NATIVE REGISTER PAIR TO X86 REGISTER PAIR |
| DIVIDE | |
| XCHG | THE CLASSIC USE OF A TEMPORARY! |
| POP mem | STACK POINTER UNTIL MEMORY OPERATIONS ARE FINISHED |
|  |  |
|  |  |

FIG. 9F 960                              961

X86 instruction ADD r/m8,r8      Native Instruction Recipe
DEST := DEST + SRC;
                          962 — LDA.b.write_intent tmp_d,Seg.Base,Base
                          963 — ADD.b              tmp_d,tmp_d,reg
                          964 — STA.b              tmp_d,Seg.Base,Base

X86 instruction CALL r/mX /* near absolute call */
  IF target instruction pointer is not within code segment limit
    THEN #GP(0); FI;    ╰968
  IF stack not large enough for a 4-byte return address
    THEN #SS(0); FI;    ╰969
  Push(EIP);
  EIP := EIP + DEST;

970

Native Instruction Recipe
  LOAD.limit_check r0,CS:reg_d
    ╰971
    972
  STOREDEC.X  IP,SS,ESP
  JR        reg_d
    ╰973

X86 instruction CALL re1X /* near IP-relative call */
  IF target instruction pointer is not within code segment limit
    THEN #GP(0); FI;
  IF stack not large enough for a 4-byte return address
    THEN #SS(0); FI;
  Push(EIP);
  EIP := EIP + DEST;

Native Instruction Recipe

977

STOREDEC.X  IP,SS,ESP
JR        reg_d
    ╰978

X86 instruction LOOP imm8
  Count := ECX;
  Count := Count - 1;
  IF (Count == 0)
    THEN BranchCond := 1;
    ELSE BranchCond : = 0;
  FI;

IF (BranchCond == 1)
THEN
  NextEIP := NextEIP + SignExtend(DEST);
  IF target instruction pointer is not with code segment limit
  THEN
    #GP(0); /* ECX not modified */
  ELSE
    ECX := COUNT;
    EIP := NextEIP;
  FI;
ELSE
  ECX := Count;
  Terminate loop and continue program execution at EIP;
FI;

981

Native Instruction Recipe

DEC.X      ECX,ECX
    ╲
    982

CJNE      ECX,r0,imm8
    ╰983

FIG. 9J

```
                                         986                                     987
                                          ↙                                       ↙
X86 REPNZ MOVS                              ⎧ LDA.b              tmp_d, src++
WHILE ECX ≠ 0                          988 ⎨ STOREINC            dest++,tmp_d
  DO                                        ⎩ JNZ                predicted not taken
                                       989
    service pending interrupts (if any);        ⎧ LDA.b           tmp_d, src++
    execute associated MOV instruction;    991 ⎨ STOREINC         dest++,tmp_d
    ECX := ECX - 1;                             ⎩ JNZ             predicted not taken
                                       989
    IF ECX = 0                                    LDA.b           tmp_d, src++
      THEN exit WHILE loop;                       STOREINC        dest++,tmp_d
    IF ZF = 1                                     JNZ             predicted not taken
                                       989
      THEN exit WHILE loop;                       . . .
    FI;
  OD;
```

FIG. 9K

COMPUTER FOR EXECUTING TWO INSTRUCTION SETS AND ADDS A MACROINSTRUCTION END MARKER FOR PERFORMING ITERATIONS AFTER LOOP TERMINATION

This application is a continuation-in-part of U.S. application Ser. No. 09/385,394 filed Aug. 30, 1999, which is a continuation-in-part of U.S. application Ser. No. 09/322,443 filed May 28, 1999 now U.S. Pat. No. 6,941,545, which is a continuation-in-part of U.S. application Ser. No. 09/298,536 filed Apr. 23, 1999 now abandoned, which is a continuation-in-part of U.S. application Ser. No. 09/239,194, filed Jan. 28, 1999 now U.S. Pat. No. 7,275,246, which are incorporated herein by reference in their entirety. This application is a continuation-in-part of U.S. application Ser. No. 09/672,424, filed Sep. 28, 2000 now abandoned, which is a continuation of U.S. application Ser. No. 09/626,325, filed Jul. 26, 2000 now U.S. Pat. No. 7,065,633, which is a continuation-in-part of PCT/US00/02239, filed Jan. 28, 2000 which claims benefit of provisional application 60/176,610 filed Jan. 18, 2000, which are incorporated herein by reference in their entirety.

BACKGROUND

The invention relates to implementation of a computer central processor.

Each instruction for execution by a computer is represented as a binary number stored in the computer's memory. Each different architecture of computer represents instructions differently. For instance, when a given instruction, a given binary number, is executed by an IBM System/360 computer, an IBM System/38, an IBM AS/400, an IBM PC, and an IBM PowerPC, the five computers will typically perform five completely different operations, even though all five are manufactured by the same company. This correspondence between the binary representation of a computer's instructions and the actions taken by the computer in response is the Instruction Set Architecture (ISA).

A program coded in the binary ISA for a particular computer family is often called simply "a binary." Commercial software is typically distributed in binary form. The incompatibility noted in the previous paragraph means that programs distributed in binary form for one architecture generally do not run on computers of another. Accordingly, computer users are extremely reluctant to change from one architecture to another, and computer manufacturers are narrowly constrained in modifying their computer architectures.

A computer most naturally executes programs coded in its native ISA, the ISA of the architectural family for which the computer is a member. Several methods are known for executing binaries originally coded for computers of another, non-native, ISA. In hardware emulation, the computer has hardware specifically directed to executing the non-native instructions. Emulation is typically controlled by a mode bit, an electronic switch: when a non-native binary is to be executed, a special instruction in the emulating computer sets the mode bit and transfers control to the non-native binary. When the non-native program exits, the mode bit is reset to specify that subsequent instructions are to be interpreted by the native ISA. Typically, in an emulator, native and non-native instructions are stored in different address spaces. A second alternative uses a simulator (also sometimes known as an "interpreter"), a program running on the computer that models a computer of the non-native architecture. A simulator sequentially fetches instructions of the non-native binary, determines the meaning of each instruction in turn, and simulates its effect in a software model of the non-native computer. Again, a simulator typically stores native and non-native instructions in distinct address spaces. (The terms "emulation" and "simulation" are not as uniformly applied throughout the industry as might be suggested by the definitions implied here). In a third alternative, binary translation, a translator program takes the non-native binary (either a whole program or a program fragment) as input, and processes it to produce as output a corresponding binary in the native instruction set (a "native binary") that runs directly on the computer.

Typically, an emulator is found in a newer computer for emulation of an older computer architecture from the same manufacturer, as a transition aid to customers. Simulators are provided for the same purpose, and also by independent software vendors for use by customers who simply want access to software that is only available in binary form for a machine that the customer does not own. By whatever technique, non-native execution is slower than native execution, and a non-native program has access to only a portion of the resources available to a native program.

Known methods of profiling the behavior of a computer or of a computer program include the following. In one known profiling method, the address range occupied by a program is divided into a number of ranges, and a timer goes off from time to time. A software profile analyzer figures out the address at which the program was executing, and increments a counter corresponding to the range that embraces the address. After a time, the counters will indicate that some ranges are executed a great deal, and some are barely executed at all. In another known profiling method, counters are generated into the binary text of a program by the compiler. These compiler-generated counters may count the number of times a given region is executed, or may count the number of times a given execution point is passed or a given branch is taken.

SUMMARY

In general, in a first aspect, the invention features a computer with an instruction processor designed to execute instructions of first and second instruction sets, a memory for storage of a program, a table of entries corresponding to the pages, a switch, a transition handler, and a history record. The memory is divided into pages for management by a virtual memory manager. The program is coded in instructions of the first and second instruction sets and uses first and second data storage conventions. The switch is responsive to a first flag value stored in each table entry, and controls the instruction processor to interpret instructions under, alternately, the first or second instruction set as directed by the first flag value of the table entry corresponding to an instruction's memory page. The transition handler is designed to recognize when program execution has transferred from a page of instructions using the first data storage convention to a page of instructions using the second data storage convention, as indicated by second flag values stored in table entries corresponding to the respective pages, and in response to the recognition, to adjust a data storage configuration of the computer from the first storage convention to the second data storage convention. The history record is designed to provide to the transition handler a record of a classification of a recently-executed instruction.

In a second aspect, the invention features a method, and a computer for performance of the method. Instruction data are fetched from first and second regions of a single address space of the memory of a computer. The instructions of the first and second regions are coded for execution by computer of first and second architectures or following first and second data storage conventions, respectively. The memory regions have associated first and second indicator elements, the indicator elements each having a value indicating the architecture or data storage convention under which instructions from the associated region are to be executed. When execution of the instruction data flows from the first region to the second, the computer is adapted for execution in the second architecture or convention.

In a third aspect, the invention features a method, and a computer for performance of the method. Instructions are stored in pages of a computer memory managed by a virtual memory manager. The instruction data of the pages are coded for execution by, respectively, computers of two different architectures and/or under two different execution conventions. In association with pages of the memory are stored corresponding indicator elements indicating the architecture or convention in which the instructions of the pages are to be executed. Instructions from the pages are executed in a common processor, the processor designed, responsive to the page indicator elements, to execute instructions in the architecture or under the convention indicated by the indicator element corresponding to the instruction's page.

In a fourth aspect, the invention features a microprocessor chip. An instruction unit of the chip is configured to fetch instructions from a memory managed by the virtual memory manager, and configured to execute instructions coded for first and second different computer architectures or coded to implement first and second different data storage conventions. The microprocessor chip is designed (a) to retrieve indicator elements stored in association with respective pages of the memory, each indicator element indicating the architecture or convention in which the instructions of the page are to be executed, and (b) to recognize when instruction execution has flowed from a page of the first architecture or convention to a page of the second, as indicted by the respective associated indicator elements, and (c) to alter a processing mode of the instruction unit or a storage content of the memory to effect execution of instructions in accord with the indicator element associated with the page of the second architecture or convention.

In a fifth aspect, the invention features a method, and a microprocessor capable of performing the method. A section of computer object code is executed twice, without modification of the code section between the two executions. The code section materializes a destination address into a register and is architecturally defined to directly transfer control indirectly through the register to the destination address. The two executions materialize two different destination addresses, and the code at the two destinations is coded in two different instruction sets.

In a sixth aspect, the invention features a method and a computer for the performance of the method. Control-flow instructions of the computer's instruction set are classified into a plurality of classes. During execution of a program on the computer, as part of the execution of instructions of the instruction set, a record is updated to record the class of the classified control-flow instruction most recently executed.

In a seventh aspect, the invention features a method and a computer for the performance of the method. A control-transfer instruction is executed that transfers control from a source execution context to a destination instruction for execution in a destination execution context. Before executing the destination instruction, the storage context of the computer is adjusted to reestablish under the destination execution context the logical context of the computer as interpreted under the source execution context. The reconfiguring is determined, at least in part, by a classification of the control-transfer instruction.

In general, in an eighth aspect, the invention features a method of operating a computer. Concurrent execution threads are scheduled by a pre-existing thread scheduler of a computer. Each thread has an associated context, the association between a thread and a set of computer resources of the context being maintained by the thread scheduler. Without modifying the thread scheduler, an association is maintained between one of the threads and an extended context of the thread through a context change induced by the thread scheduler, the extended context including resources of the computer beyond those resources whose association with the thread is maintained by the thread scheduler.

In a ninth aspect, the invention features a method of operating a computer. An entry exception is established, to be raised on each entry to an operating system of a computer at a specified entry point or on a specified condition. A resumption exception is established, to be raised on each resumption from the operating system following on a specified entry. On detecting a specified entry to the operating system from an interrupted process of the computer, the entry exception is raised and serviced. The resumption exception is raised and serviced, and control is returned to the interrupted process.

In a tenth aspect, the invention features a method of operating a computer. Without modifying an operating system of the computer, an entry handler is established for execution at a specified entry point or on a specified entry condition to the operating system. The entry handler is programmed to save a context of an interrupted thread and to modify the thread context before delivering the modified context to the operating system. Without modifying the operating system, an exit handler is established for execution on resumption from the operating system following an entry through the entry handler. The exit handler is programmed to restore the context saved by a corresponding execution of the entry handler.

In an eleventh aspect, the invention features a method of operating a computer. During invocation of a service routine of a computer, a linkage return address passed, the return address being deliberately chosen so that an attempt to execute an instruction from the return address on return from the service routine will cause an exception to program execution. On return from the service routine, the chosen exception is raised. After servicing the exception, control is returned to a caller of the service routine.

Particular embodiments of the invention may include one or more of the following features. The regions may be pages managed by a virtual memory manager. The indications may be stored in a virtual address translation entry, in a table whose entries are associated with corresponding virtual pages, in a table whose entries are associated with corresponding physical page frames, in entries of a translation look-aside buffer, or in lines of an instruction cache. The code at the first destination may receive floating-point arguments and return floating-point return values using a register-based calling convention, while the code at the second destination receives floating-point arguments using a memory-based stack calling convention, and returns floating-point values using a register indicated by a top-of-stack pointer.

The two architectures may be two instruction set architectures, and the instruction execution hardware of the computer may be controlled to interpret the instructions according to the two instruction set architectures according to the indications. A mode of execution of the instructions may be changed without further intervention when execution flows from the first region to the second, or the mode may be changed by an exception handler when the computer takes an exception when execution flows from the first region to the second. One of the regions may store an off-the-shelf operating system binary coded in an instruction set non-native to the computer.

The two conventions may be first and second calling conventions, and the computer may recognize when program execution has transferred from a region using the first calling convention to a region using the second calling convention, and in response to the recognition, the data storage configuration of the computer will be adjusted from the first calling convention to the second. One of the two calling conventions may be a register-based calling convention, and the other calling convention may be a memory stack-based calling convention. There may be a defined mapping between resources of the first architecture and resources of the second, the mapping assigning corresponding resources of the two architectures to a common physical resource of a computer when the resources serve analogous functions in the calling conventions of the two architectures. The configuration adjustment may include altering a bit representation of a datum from a first representation to a second representation, the alteration of representation being chosen to preserve the meaning of the datum across the change in execution convention. A rule for copying data from the first location to the second may be determined, at least in part, by a classification of the instruction that transferred execution to the second region, and/or by examining a descriptor associated with the location of execution before the recognized execution transfer.

A first class of instructions may include instructions to transfer control between subprograms associated with arguments passed according to a calling convention, and a second class of instructions may include branch instructions whose arguments, if any, are not passed according to the calling convention. One of the execution contexts may be a register-based calling convention, and the other execution context may be a memory stack-based calling convention. The rearrangement may reflect analogous execution contexts under the two data storage conventions, the rearranging process being determined, at least in part, by the instruction classification record. In some of the control-flow instructions, the classification may be encoded in an immediate field of instructions, the immediate field having no effect on the execution of the instruction in which it is encoded, except to update the class record. In some of the control-flow instructions, the classification may be statically determined by the opcode of the instructions. In some of the control-flow instructions, the classification may be dynamically determined with reference to a state of processor registers and/or general registers of the computer. In some of the control-flow instructions, the classification may be dynamically determined based on a full/empty status of a register indicated by a top-of-stack pointer, the register holding a function result value. The rearranging may be performed by an exception handler, the handler being selected by an exception vector based at least in part on the source data storage convention, the destination data storage convention, and the instruction classification record. Instructions of the instruction set may be classified as members of a don't-care class, so that when an instruction of the don't-care class is executed, the record is left undisturbed to indicate the class of the classified instruction most recently executed. The destination instruction may be an entry point to an off-the-shelf binary for an operating system coded in an instruction set non-native to the computer.

The operating system may be an operating system for a computer architecture other than the architecture native to the computer. The computer may additionally execute an operating system native to the computer, and each exception may be classified for handling by one of the two operating systems. A linkage return address for resumption of the thread may be modified to include information used to maintain the association. At least some of the modified registers may be overwritten by a timestamp. The entry exception handler may alter at least half of the data registers of the portion of a process context maintained in association with the process by the operating system before delivering the process to the operating system, a validation stamp being redundantly stored in at least one of the registers, and wherein at least some of the modified registers are overwritten by a value indicating the storage location in which at least the portion of the thread context is saved before the modifying. The operating system and the interrupted thread may execute in different instruction set architectures of the computer. During servicing the entry exception, a portion of the context of the computer may be saved, and the context of an interrupted thread may be altered before delivering the interrupted thread and its corresponding context to the operating system. When the thread scheduler and the thread execute in different execution modes of the computer, the steps to maintain the association between the thread and the context may be automatically invoked on a transition from the thread execution mode to the thread scheduler execution mode. The thread context may be saved in a storage location allocated from a pool of storage locations managed by a queuing discipline in which empty storage locations in which a context is to be saved are allocated from the head of the queue, recently-emptied storage locations for reuse are enqueued at the head of the queue, and full storage locations to be saved are queued at the tail of the queue. A calling convention for the thread execution mode may require the setting of a register to a value that specifies actions to be taken to convert operands from one form to another to conform to the thread scheduler execution mode. Delivery of an interrupt may be deferred by a time sufficient to allow the thread to reach a checkpoint, or execution of the thread may be rolled back to a checkpoint, the checkpoints being points in the execution of the thread where the amount of extended context, being the resources of the thread beyond those whose resource association with the thread is maintained by the thread scheduler, is reduced. The linkage return address may be selected to point to a memory page having a memory attribute that raises the chosen exception on at attempt to execute an instruction from the page. The service routine may be an interrupt service routine of an operating system for a computer architecture other than the architecture native to the computer, the service routine may be invoked by an asynchronous interrupt, and the caller may be coded in the instruction set native to the architecture.

In general, in a twelfth aspect, the invention features a method and a computer. A computer program executes in a logical address space of a computer, with an address translation circuit translating address references generated by the program from the program's logical address space to the computer's physical address space. Profile information is recorded that records physical memory addresses referenced during an execution interval of the program.

In general, in a thirteenth aspect, a program is executed on a computer, the program referring to memory by virtual address. Concurrently with the execution of the program, profile information is recorded describing memory references made by the program, the profile information recording physical addresses of the profiled memory references.

In general, in a fourteenth aspect, the invention features a computer with an instruction pipeline, a memory access unit, an address translation circuit, and profile circuitry. The instruction pipeline and memory access unit are configured to execute instructions in a logical address space of a memory of the computer. The address translation circuit for translating address references is generated by the program from the program's logical address space to the computer's physical address space. The profile circuitry is cooperatively interconnected with the instruction pipeline and is configured to detect, without compiler assistance for execution profiling, occurrence of profileable events occurring in the instruction pipeline, and cooperatively interconnected with the memory access unit to record profile information describing physical memory addresses referenced during an execution interval of the program.

Embodiments of the invention may include one or more of the following features. The recorded physical memory references may include addresses of binary instructions referenced by an instruction pointer, and at least one of the recorded instruction references may record the event of a sequential execution flow across a page boundary in the address space. The recorded execution flow across a page boundary may occur within a single instruction. The recorded execution flow across a page boundary may occur between two instructions that are sequentially adjacent in the logical address space. At least one of the recorded instruction references may be a divergence of control flow consequent to an external interrupt. At least one of the recorded instruction references may indicate the address of the last byte of an instruction executed by the computer during the profiled execution interval. The recorded profile information may record a processor mode that determines the meaning of binary instructions of the computer. The recorded profile information may record a data-dependent change to a full/empty mask for registers of the computer. The instruction pipeline may be configured to execute instructions of two instruction sets, a native instruction set providing access to substantially all of the resources of the computer, and a non-native instruction set providing access to a subset of the resources of the computer. The instruction pipeline and profile circuitry may be further configured to effect recording of profile information describing an interval of the execution of an operating system coded in the non-native instruction set.

In general, in a fifteenth aspect, the invention features a method. A program is executed on a computer. Profile information is recorded concerning the execution of the program, the profile information recording of the address of the last byte of at least one instruction executed by the computer during a profiled interval of the execution.

In general, in a sixteenth aspect, the invention features a method. A program is executed on a computer, without the program having been compiled for profiled execution, the program being coded in an instruction set in which an interpretation of an instruction depends on a processor mode not expressed in the binary representation of the instruction. Profile information is recorded describing an interval of the program's execution and processor mode during the profiled interval of the program, the profile information being efficiently tailored to annotate the profiled binary code with sufficient processor mode information to resolve mode-dependency in the binary coding.

In general, in an seventeenth aspect, the invention features a computer with an instruction pipeline and profile circuitry. The instruction pipeline is configured to execute instructions of the computer. The profile circuitry is configured to detect and record, without compiler assistance for execution profiling, profile information describing a sequence of events occurring in the instruction pipeline, the sequence including every event occurring during a profiled execution interval that matches time-independent selection criteria of events to be profiled, the recording continuing until a predetermined stop condition is reached, and is configured to detect the occurrence of a predetermined condition to commence the profiled execution interval after a non-profiled interval of execution.

In general, in a eighteenth aspect, the invention features a method and a computer with circuitry configured for performance of the method. During a profiled interval of an execution of a program on a computer, profile information is recorded describing the execution, without the program having been compiled for profiled execution, the program being coded in an instruction set in which an interpretation of an instruction depends on a processor mode not expressed in the binary representation of the instruction, the recorded profile information describing at least all events occurring during the profiled execution interval of the two classes: (1) a divergence of execution from sequential execution; and (2) a processor mode change that is not inferable from the opcode of the instruction that induces the processor mode change taken together with a processor mode before the mode change instruction. The profile information further identifies each distinct physical page of instruction text executed during the execution interval.

Embodiments of the invention may include one or more of the following features. The profiled execution interval is commenced at the expiration of a timer, the recorded profile describing a sequence of events including every event that matches time-independent selection criteria of events to be profiled, the recording continuing until a predetermined stop condition is reached. A profile entry is recorded for later analysis noting the source and destination of a control flow event in which control flow of the program execution diverges from sequential execution. The recorded profile information is efficiently tailored to identify all bytes of object code executed during the profiled execution interval, without reference to the binary code of the program. A profile entry describing a single profileable event explicitly describes a page offset of the location of the event, and inherits a page number of the location of the event from the immediately preceding profile entry. Profile information records a sequence of events of the program, the sequence including every event during the profiled execution interval that matches time-independent criteria of profileable events to be profiled. The recorded profile information indicates ranges of instruction binary text executed by the computer during a profiled interval of the execution, the ranges of executed text being recorded as low and high boundaries of the respective ranges. The recorded high boundaries record the last byte, or the first byte of the last instruction, of the range. The captured profile information comprises subunits of two kinds, a first subunit kind describing an instruction interpretation mode at an instruction boundary, and a second subunit kind describing a transition between processor modes. During a non-profiled interval of the program execution, no profile information is recorded in response to the occurrence of profileable events matching predefined selection criteria for profileable events. The profile circuitry is designed to record a timestamp describing a time of the recorded events. The profile circuitry is designed to record an event code describing the class of each profileable event recorded. A number of bits used to record the event code is less than $\log_2$ of the number of distinguished event classes.

In general, in a nineteenth aspect, the invention features a method. While executing a program on a computer, the occurrence of profileable events occurring in the instruction pipeline is detected, and the instruction pipeline is directed to record profile information describing the profileable events essentially concurrently with the occurrence of the profileable events, the detecting and recording occurring under control of hardware of the computer without software intervention.

In general, in a twentieth aspect, the invention features a computer that includes an instruction pipeline and profile circuitry. The instruction pipeline includes an arithmetic unit and is configured to execute instructions received from a memory of the computer and the profile circuitry. The profile circuitry is common hardware control with the instruction pipeline. The profile circuitry and instruction pipeline are cooperatively interconnected to detect the occurrence of profileable events occurring in the instruction pipeline, the profile circuitry operable without software intervention to effect recording of profile information describing the profileable events essentially concurrently with the occurrence of the profileable events.

In general, in a twenty-first aspect, the invention features first and second CPU's. The first CPU is configured to execute a program and generate profile data describing the execution of the program. The second CPU is configured to analyze the generated profile data, while the execution and profile data generation continue on the first CPU, and to control the execution of the program on the first CPU based at least in part on the analysis of the collected profile data.

In general, in a twenty-second aspect, the invention features a method. While executing a program on a computer, the computer using registers of a general register file for storage of instruction results, the occurrence of profileable events occurring in the instruction pipeline is detected. Profile information is recorded describing the profileable events into the general register file as the profileable events occur, without first capturing the information into a main memory of the computer.

In general, in a twenty-third aspect, the invention features a computer that includes a general register file of registers, an instruction pipeline and profile circuitry. The instruction pipeline includes an arithmetic unit and is configured to execute instructions fetched from a memory cache of the computer, and is in data communication with the registers for the general register file for storage of instruction results. The profile circuitry is operatively interconnected with the instruction pipeline and is configured to detect the occurrence of profileable events occurring in the instruction pipeline, and to capture information describing the profileable events into the general register file as the profileable events occur, without first capturing the information into a main memory of the computer.

In general, in a twenty-fourth aspect, the invention features a computer. The instruction pipeline is configured to execute instructions of the computer. The profile circuitry is implemented in the computer hardware, and is configured to detect, without compiler assistance for execution profiling, the occurrence of profileable events occurring in the instruction pipeline, and to direct recording of profile information describing the profileable events occurring during an execution interval of the program. Profile control bits implemented in the computer hardware have values that control a resolution of the operation of the profile circuitry. A binary translator is configured to translate programs coded in a first instruction set architecture into instructions of a second instruction set architecture. A profile analyzer is configured to analyze the recorded profile information, and to set the profile control bits to values to improve the operation of the binary translator.

Embodiments of the invention may include one or more of the following features. At least a portion of the recording is performed by instructions speculatively introduced into the instruction pipeline. The profile circuitry is interconnected with the instruction pipeline to direct the recording by injection of an instruction into the pipeline, the instruction controlling the pipeline to cause the profileable event to be materialized in an architecturally-visible storage register of the computer. An instruction of the computer, having a primary effect on the execution the computer not related to profiling, has an immediate field for an event code encoding the nature of a profiled event and to be recorded in the profile information, the immediate field having no effect on computer execution other than to determine the event code of the profiled event. Instances of the instruction have an event code that leaves intact an event code previously determined by other event monitoring circuitry of the computer. The profiled information includes descriptions of events whose event codes were classified by instruction execution hardware, without any explicit immediate value being recorded in software. The instruction pipeline and profile circuitry are operatively interconnected to effect injection of multiple instructions into the instruction pipeline by the profile circuitry on the occurrence of a single profileable event. The instruction pipeline and profile circuitry are operatively interconnected to effect speculative injection of the instruction into the instruction pipeline by the profile circuitry. A register pointer of the computer indicates a general register into which to record the profile information, and an incrementer is configured to increment the value of the register pointer to indicate a next general register into which to record next profile information, the incrementing occurring without software intervention. A limit detector is operatively interconnected with the register pointer to detect when a range of registers available for collecting profile information is exhausted, and a store unit is operatively interconnected with the limit detector of effect storing the profile information from the general registers to the main memory of the computer when exhaustion is detected. The profile circuitry comprises a plurality of storage registers arranged in a plurality of pipeline stages, information recorded in a given pipeline stage being subject to modification as a corresponding machine instruction progresses through the instruction pipeline. When an instruction fetch of an instruction causes a miss in a translation look aside buffer (TLB), the fetch of the instruction triggering a profileable event, the TLB miss is serviced, and the corrected state of the TLB is reflected in the profile information recorded for the profileable instruction. The profile control bits include a timer interval value specifying a frequency at which the profile circuitry is to monitor the instruction pipeline for profileable events. The profile circuitry comprises a plurality of storage registers arranged in a plurality of pipeline stages, information recorded in a given pipeline stage is subject to modification as a corresponding machine instruction progresses through the instruction pipeline.

In general, in a twenty-fifth aspect, the invention features a computer with instruction pipeline circuitry designed to effect interpretation of computer instructions under two instruction set architectures alternately. Pipeline control circuitry is cooperatively designed with the instruction pipeline circuitry to initiate, without software intervention, when about to execute a program region coded in a lower-performance one of the instruction set architectures, a query whether a program region coded in a higher-performance one of the instruction set architectures exists, the higher-performance region being logically equivalent to the lower-performance program region. Circuitry and/or software is designed to transfer execution control to the higher-performance region, without a transfer-of-control instruction to the higher-performance region being coded in the lower-performance instruction set.

In general, in a twenty-sixth aspect, the invention features a method and a computer for performance of the method. At least a selected portion of a computer program is translated from a first binary representation to a second binary representation. During execution of the first binary representation of the program on a computer, it is recognized that execution has entered the selected portion, the recognizing being initiated by basic instruction execution of the computer, with neither a query nor a transfer of control to the second binary representation being coded into the first binary representation. In response to the recognition, control is transferred to the translation in the second representation.

In general, in a twenty-seventh aspect, the invention features a method and a computer for performance of the method. As part of executing an instruction on a computer, it is recognized that an alternate coding of the instruction exists, the recognizing being initiated without executing a transfer of control to the alternate coding or query instruction to trigger the recognizing. When an alternate coding exists, the execution of the instruction is aborted, and control is transferred to the alternate coding.

In general, in a twenty-eighth aspect, the invention features a method and a computer for performance of the method. During execution of a program on instruction pipeline circuitry of a computer, a determination is initiated of whether to transfer control from a first instruction stream in execution by the instruction pipeline circuitry to a second instruction stream, without a query or transfer of control to the second instruction stream being coded into the first instruction stream. Execution of the first instruction stream is established after execution of the second instruction stream, execution of the first instruction stream being reestablished at a point downstream from the point at which control was seized, in a context logically equivalent to that which would have prevailed had the code of the first instruction stream been allowed to proceed.

In general, in a twenty-ninth aspect, the invention features a method and a computer for performance of the method. Execution of a computer program is initiated, using a first binary image of the program. During the execution of the first image, control is transferred to a second image coding the same program in a different instruction set.

In general, in a thirtieth aspect, the invention features a method and a computer for performance of the method. As part of executing an instruction on a computer, a heuristic, approximately-correct recognition that an alternate coding of the instruction exists is evaluated, the process for recognizing being statistically triggered. If the alternate coding exists, execution of the instruction is aborted, and control is transferred to the alternate coding.

In general, in a thirty-first aspect, the invention features a method and a computer for performance of the method. A microprocessor chip has instruction pipeline circuitry, lookup circuitry, a mask, and pipeline control circuitry. The lookup circuitry is designed to fetch an entry from a lookup structure as part of the basic instruction processing cycle of the microprocessor, each entry of the lookup structure being associated with a corresponding address range of a memory of the computer. The mask has a value set at least in part by a timer. The pipeline control circuitry is designed to control processing of instructions by the instruction pipeline circuitry as part of the basic instruction processing cycle of the microprocessor, depending, at least in part, on the value of the entry corresponding to the address range in which lies an instruction processed by the instruction pipeline circuitry, and the current value of the mask.

In general, in a thirty-second aspect, the invention features a method and a microprocessor chip for performance of the method. The microprocessor chip has instruction pipeline circuitry; instruction classification circuitry responsive to execution of instructions executed by the instruction pipeline circuitry to classify the executed instructions into a small number of classes and record a classification code value; lookup circuitry designed to fetch an entry from a lookup structure as part of the basic instruction processing cycle of the microprocessor, each entry of the lookup structure being associated with a corresponding address range of a memory of the computer; and pipeline control circuitry designed to control processing of instructions by the instruction pipeline circuitry as part of the basic instruction processing cycle of the microprocessor, depending, at least in part, on the value of the entry corresponding to the address range in which the instruction address lies, and the recorded classification code.

In general, in a thirty-third aspect, the invention features a method and a microprocessor chip for performance of the method. The microprocessor chip includes instruction pipeline circuitry; an on-chip table, each entry of the on-chip table corresponding to a respective class of event occurring the in the computer, and designed to hold an approximate evaluation of a portion of the computer machine state for control of the circuitry; and pipeline control circuitry cooperatively designed with the instruction pipeline circuitry to control processing of instructions by the instruction pipeline circuitry as part of the basic instruction processing cycle of the microprocessor, based on consultation of the on-chip table.

In general, in a thirty-fourth aspect, the invention features a method and a microprocessor chip for performance of the method. The microprocessor chip includes instruction pipeline circuitry; an on-chip table, each entry of the on-chip table corresponding to a class of event occurring the in the computer and designed to control consultation of an off-chip table in a memory of the computer when an event of the class occurs; pipeline control circuitry cooperatively designed with the instruction pipeline circuitry to consult the on-chip table as part of the basic instruction processing cycle of the microprocessor, as the classified events occur; and control circuitry and/or software designed to cooperate with the instruction pipeline circuitry and pipeline control circuitry to affect a manipulation of data or transfer of control defined for the event in the instruction pipeline circuitry based on consultation of the off-chip table after a favorable value is obtained from the on-chip table.

Embodiments of the invention may include one or more of the following features. The transfer of execution control to the higher-performance region may be effected by an architecturally-visible alteration of a program counter. The region about to be executed may be entered by a transfer of control instruction. The first image may be coded in an instruction set non-native to the computer, for hardware emulation in the computer. Instructions of the second binary representation may be coded in a different instruction set architecture than instructions of the first binary representation. The second image may have been generated from the first image by a binary translator. The binary translator may have optimized the second image for increased execution speed, while accepting some risk of execution differing from the execution of the non-native program on its native instruction set architecture. A decision on whether to transfer control from the first image to the second may be based on control variables of the computer. The classes of events may be memory references to corresponding respective address ranges of a memory of the computer. The address ranges may correspond to entries in an interrupt vector table. The recognition may be initiated by consulting a content-addressable memory addressed by a program counter address of the instruction to be executed. The content-addressable memory may be a translation lookaside buffer. The off-chip table may be organized as a side table to an address translation page table. The on-chip table may contain a condensed approximation of the off-chip table, loaded from the off-chip table. The lookup structure may be a bit vector. Bits of the entry corresponding to the address range in which the instruction address lies may be AND'ed with corresponding bits of a mask associated with the instruction pipeline circuitry. Error in the approximation of the on-chip table may be induced by a slight time lag relative to the portion of the computer's machine state whose evaluation is stored therein. The pipeline control circuitry may be designed to control processing of instructions by the instruction pipeline circuitry by evaluating the value of the entry corresponding to the address range in which the instruction address lies and the recorded classification code, and triggering a software evaluation of a content of the memory addressed by the microprocessor chip. The control of instruction processing may include branch destination processing.

In general, in a thirty-fifth aspect, the invention features a method and a microprocessor chip for performance of the method. Instructions are executed on a computer, instruction pipeline circuitry of the computer having first and second modes for processing at least some of the instructions. Execution of two-mode instructions is attempted in the first mode for successive two-mode instructions while the first execution mode is successful. When an unsuccessful execution of a two-mode instruction under the first mode is detected, following two-mode instructions are executed in the second mode.

In general, in a thirty-sixth aspect, the invention features a method and a microprocessor chip for performance of the method. Computer instructions are executed in instruction pipeline circuitry having first and second modes for processing at least some instructions. On expiration of a timer, the instruction pipeline circuitry switches from the first mode to the second, the mode switch persisting for instructions subsequently executed on behalf of a program that was in execution immediately before the timer expiry.

In general, in a thirty-seventh aspect, the invention features a method and a microprocessor chip for performance of the method. Events of a computer are assigned into event classes. As part of the basic execution cycle of a computer instruction pipeline, without software intervention, a record of responses to events of the class is maintained. As each classified event comes up for execution in the instruction pipeline circuitry, the record is queried to determine the response to the previous attempt of an event of the same class. The response is attempted if and only if the record indicates that the previous attempt succeeded.

Embodiments of the invention may include one or more of the following features. The first and second modes may be alternative cache policies, or alternative modes for performing floating-point arithmetic. Unsuccessful execution may includes correct completion of an instruction at a high cost. The cost metric may be execution time. The cost of an instruction in the first mode may be only ascertainable after completion of the instruction. The instruction pipeline circuitry may be switched back from the second mode to the first, the switch persisting until the next timer expiry. All of the records may be periodically set to indicate that previous attempts of the corresponding events succeeded.

In general, in a thirty-eighth aspect, the invention features a method and a microprocessor chip for performance of the method. As part of the basic instruction cycle of executing an instruction of a non-supervisor mode program executing on a computer, a table is consulted, the table being addressed by the address of instructions executed, for attributes of the instructions. An architecturally-visible data manipulation behavior or control transfer behavior of the instruction is controlled based on the contents of a table entry associated with the instruction.

Embodiments of the invention may include one or more of the following features. The different instruction may be coded in an instruction set architecture (ISA) different than the ISA of the executed instruction. The control of architecturally-visible data manipulation behavior may include changing an instruction set architecture under which instructions are interpreted by the computer. Each entry of the table may correspond to a page managed by a virtual memory manager, circuitry for locating a table entry being integrated with virtual memory address translation circuitry of the computer. An interrupt may be triggered on execution of an instruction of a process, synchronously based at least in part on a memory state of the computer and the address of the instruction, the architectural definition of the instruction not calling for an interrupt. Interrupt handler software may be provided to service the interrupt and to return control to an instruction flow of the process other than the instruction flow triggering the interrupt, the returned-to instruction flow for carrying on non-error handling normal processing of the process.

In general, in a thirty-ninth aspect, the invention features a method and a microprocessor chip for performance of the method. A microprocessor chip has instruction pipeline circuitry, address translation circuitry; and a lookup structure. The lookup structure has an entry associated with each corresponding address range translated by the address translation circuitry, the entry describing a likelihood of the existence of an alternate coding of instructions located in the respective corresponding address range.

Embodiments of the invention may include one or more of the following features. The entry may be an entry of a translation look-aside buffer. The alternate coding may be coded in an instruction set architecture (ISA) different than the ISA of the instruction located in the address range.

In general, in a fortieth aspect, the invention features a method and a microprocessor chip for performance of the method. A microprocessor chip has instruction pipeline circuitry and interrupt circuitry. The interrupt circuitry is cooperatively designed with the instruction pipeline circuitry to trigger an interrupt on execution of an instruction of a process, synchronously based at least in part on a memory state of the computer and the address of the instruction, the architectural definition of the instruction not calling for an interrupt.

Embodiments of the invention may include one or more of the following features. Interrupt handler software may be designed to service the interrupt and to return control to an instruction flow of the process other than the instruction flow triggering the interrupt, the returned-to instruction flow for carrying on non-error handling normal processing of the process. The interrupt handler software may be programmed to change an instruction set architecture under which instructions are interpreted by the computer. The instruction text beginning at the returned-to instruction may be logically equivalent to the instruction text beginning at the interrupted instruction.

In general, in a forty-first aspect, the invention features a method and a microprocessor chip for performance of the method. As part of executing a stream of instructions, a series of memory loads is issued from a computer CPU to a bus, some directed to well-behaved memory and some directed to non-well-behaved devices in I/O space. A storage of the computer records addresses of instructions of the stream that issued memory loads to the non-well-behaved memory, the storage form of the recording allowing determination of whether the memory load was to well-behaved memory or not-well-behaved memory without resolution of any memory address stored in the recording.

In general, in a forty-second aspect, the invention features a method and a computer for performance of the method. A successful memory reference is issued from a computer CPU to a bus. A storage of the computer records whether a device accessed over the bus by the memory reference is well-behaved memory or not-well-behaved memory. Alternatively, the memory may store a record of a memory read instruction that references a device other than well-behaved memory.

Embodiments of the invention may include one or more of the following features. The recording may be a portion of a profile primarily recording program control flow. The recording may be read by a binary translation program, wherein the binary translation program translates the memory load using more conservative assumptions when the recording indicates that the memory load is directed to non-well-behaved memory. References to I/O space may be recorded as being references to non-well-behaved memory. The recording may be slightly in error, the error being induced by a conservative estimate in determining when the memory reference accesses well-behaved memory. The form of the recording may allow determination of whether the memory reference was to well-behaved memory or not-well-behaved memory without resolution of any memory address stored in the recording. The form of the recording may indicates an address of an instruction that issued the memory reference. The memory reference may be a load. The profile monitoring circuitry may be interwoven with the computer CPU. A TLB (translation lookaside buffer) may be designed to hold a determination of whether memory mapped by entries of the TLB is well-behaved or non-well-behaved memory. The profile monitoring circuitry may generate the record into a general purpose register of the computer. The profile monitoring circuitry may be designed to induce a pipeline flush of the computer CPU.

In general, in a forty-third aspect, the invention features a method and computer circuitry for performance of the method. DMA (direct memory access) memory write transactions of a computer are monitored, and an indication of a memory location written by a DMA memory write transaction is recorded, by circuitry operating without being informed of the memory write transaction by the CPU beforehand. The indication is read by the CPU.

In general, in a forty-fourth aspect, the invention features a method and computer for performance of the method. A first process of a computer generates a second representation in a computer memory of information stored in the memory in a first representation. Overwriting of the first representation by a DMA memory write transaction initiated by a second process is detected by the first process, without the second process informing the first process of the DMA memory write transaction, the detecting guaranteed to occur no later than the next access of the second representation following the DMA memory write transaction.

In general, in a forty-fifth aspect, the invention features a method and computer for performance of the method. A computer's main memory is divided into pages for management by a virtual memory manager. The manager manages the pages using a table stored in the memory. Circuitry records indications of modification to pages of the main memory into a plurality of registers outside the address space of the main memory. The virtual memory management tables do not provide backing store for the modification indications stored in the registers.

In general, in a forty-sixth aspect, the invention features a method and computer circuitry for performance of the method. Modifications to the contents of a main memory of a computer are monitored, and on detection of a modification, an approximation of the address of the modification is written into an address tag of one of a plurality of registers, and a fine indication of the address of the modification is written into a memory cell of a plurality of cells of the register. The fine indication of the address of the modification is provided to a CPU of the computer through a read request from the CPU.

Embodiments of the invention may include one or more of the following features. The recorded indication may record only the memory location, and not the datum written to the location. Based at least in part by the value read by the CPU, a cached datum may be erased. Two DMA memory writes near each other in address and time may generate only a single record of a write. The recorded indication of a location in the main memory may indicate a physical address in the memory. A value of each bit of a bit vector may indicate whether a corresponding region in the main memory has been recently modified. Matching circuitry may be provided to match an address of a memory modification to an address of a previously-stored indication of a previous nearby memory modification. The recorded indication of a location in the main memory may be initially recorded in an architecturally-visible location outside the main memory and outside a general register file of the computer. The recorded indication of a location in the main memory may be recorded, at least in part, based on a subdivision of the main memory into regions each consisting of a naturally-aligned block of pages of the memory. The DMA monitoring circuitry being designed to monitor transactions on I/O gateway circuitry between the CPU and the DMA devices. The DMA monitoring circuitry may dismiss a content of the DMA monitoring circuitry as a side-effect of being read. The address of the modification stored in the address tag may be a physical memory address. The vector of memory cells may include a bit vector, a value of each bit of the bit vector designed to indicate whether a corresponding region in the main memory has been recently modified. The address tag may include a content-addressable memory. A one of the plurality of registers may be associated with an address range by writing an address into the address tag of the one register. Later, the one register may be associated with a different address range by writing a different address into the address tag of the one register. A value of each bit of a bit vector may indicate whether a corresponding region in the main memory has been recently modified.

In general, in a forty-seventh aspect, the invention features a method and computer for performance of the method. As a program is executed in a computer, writes to a protected region of a main memory of the computer are detected, the reporting being performed by monitoring circuitry of the computer. On receiving the report of the detection, a data structure of content corresponding to the content of the protected region to which the write was detected is deleted from the memory.

In general, in a forty-eighth aspect, the invention features a method and computer for performance of the method. Memory read references are generated in a CPU of a computer, the memory references referring to logical addresses. Circuitry and/or software evaluates whether main memory pages of the references are in a protected state. Pages that are unprotected are put into a protected state.

In general, in a forty-ninth aspect, the invention features a method and computer for performance of the method. Memory references are generated by a CPU of a computer, the memory references referring to logical addresses. The translation of logical addresses into a physical addresses evaluates whether the page of the reference is protected against the access. Pages that are protected have their protection modified, without modifying the contents of the page.

Embodiments of the invention may include one or more of the following features. The monitoring and detection circuitry may be responsive to memory writes generated by store operations initiated by instructions executed by pipeline circuitry of the computer. The evaluation circuitry may be incorporated into address translation circuitry designed to translate logical addresses, generated as part of memory read accesses by a CPU of the computer, into physical addresses. The protection of memory regions may be recorded in a table of entries, each entry corresponding to a page of the main memory. The table entries may be organized in correspondence to physical pages of the main memory. The table entries may constitute a table in main memory distinct from a page table used by a virtual memory manager of the computer. The table of entries may be a translation lookaside buffer. A profiling or monitoring function of the computer may be enabled or disabled for regions of the memory of the computer, based on whether the respective regions are protected or unprotected. An arithmetic result or branch destination of an instruction may be controlled based on whether a region containing the instruction is protection or unprotected. The data structure may be formed by translating a computer program stored in the protected region in a first instruction set architecture into a second instruction set architecture. On receiving the report of the detection, an interrupt may be raised to invoke software, the invoked software affecting the contents of the memory without reference to the contents of the protected region. The memory read reference may be an instruction fetch.

In general, in a fiftieth aspect, the invention features a method and computer for performance of the method. Memory references generated as part of executing a stream of instructions on a computer are evaluated to determined whether an individual memory reference of an instruction references a device having a valid memory address but that cannot be guaranteed to be well-behaved.

In general, in a fifty-first aspect, the invention features a method and computer for performance of the method. While translating at least a segment of a binary representation of a program from a first instruction set architecture to a second representation in a second instruction set architecture, individual memory loads that are believed to be directed to well-behaved memory are distinguished from memory loads that are believed to be directed to non-well-behaved memory device(s). While executing the second representation, a load is identified that was believed at translation time to be directed to well-behaved memory but that at execution is found to be directed to non-well-behaved memory. The identified memory load is aborted. Based at least in part on the identifying, at least a portion of the translated segment of the program is re-executed in the first instruction set.

In general, in a fifty-second aspect, the invention features a method and computer for performance of the method. A binary translator translates at least segment of a program from a first representation in a first instruction set architecture to a second representation in a second instruction set architecture, a sequence of side-effects in the second representation differing from a sequence of side-effects in the translated segment of the first representation. Instruction execution circuitry and/or software identifies cases during execution of the second representation in which the difference in sequence of side-effects may have a material effect on the execution of the program. A program state, equivalent to a state that would have occurred in the execution of the first representation, is established. Execution resumes from the established state in an execution mode that reflects the side-effect sequence of the first representation.

Embodiments of the invention may include one or more of the following features. If the reference cannot be guaranteed to be well-behaved, the instruction may be re-executed in an alternative execution mode, or program state may be restored to a prior state. The second representation may be annotated with an indication of the distinction between individual memory loads that are believed to be directed to well-behaved memory from memory loads that are believed to be directed to non-well-behaved memory. The device having a valid memory address may have an address in an I/O space of the computer. Code in a preamble of a program unit embracing the memory-reference instruction may establish a state of the instruction execution circuitry, the instruction execution circuitry designed to raise an exception based on an evaluation of both the state and the evaluation of the reference to the device. An annotation embedded in the instruction may be evaluated to determine whether the reference to the non-well-behaved device is to raise an exception. An evaluation of whether the instruction of the individual side-effect is to raise an exception may occur in circuitry embedded in an address translation circuitry of the computer. An exception may be raised, based on an evaluation of both a segment descriptor and the evaluation of the side-effect. An annotation encoded in a segment descriptor may be evaluated to determine whether the reference to the non-well-behaved device is to raise an exception. The segment descriptor may be formed by copying another segment descriptor, and altering the annotation. The formed segment descriptor may copy a variable indicating an assumed sensitivity of the translation to alteration of the sequence of side-effects. The difference of ordering of side-effects may include a reordering of two side-effects relative to each other, an elimination of a side-effect by the translating, or combining two side-effects in the binary translator. The restoring step may be initiated when an exception occurs in the object program. Execution may resume from the restored state, the resumed execution executing a precise side-effect emulation of the reference implementation. A descriptor generated during the translation may be used to restore state to the pre-exception reference state.

In general, in a fifty-third aspect, the invention features a method and computer for performance of the method. A first interpreter executes a program coded in an instruction set, the first interpreter being less than fully correct. A second, fully-correct interpreter, primarily in hardware, executes instructions of the instruction set. A monitor detects any deviation from fully-correct interpretation by the first interpreter, before any side-effect of the incorrect interpretation is irreversibly committed. When the monitor detects the deviation, execution is rolled back by at least a full instruction to a safe point in the program, and execution is re-initiated in the second interpreter.

In general, in a fifty-forth aspect, the invention features a method and computer for performance of the method. A binary translator translates a source program into an object program, the translated object program having a different execution behavior than the source program. An interrupt handler responds to an interrupt occurring during execution of the object program by establishing a state of the program corresponding to a state that would have occurred during an execution of the source program, and from which execution can continue, and initiates execution of the source program from the established state.

Embodiments of the invention may include one or more of the following features. The first interpreter may include a software emulator, and/or a software binary translator. The second interpreter may interpret instructions in an instruction set not native to the computer. The software binary translator may operate concurrently with execution of the program to translate a segment less than the whole of the program. Continuing execution may include rolling back execution of the first interpreter by at least two full instructions. Continuing execution may include rolling back execution of the first interpreter from a state in which a number of distinct suboperations of several instructions have been intermixed by the first interpreter. Continuing execution may include rolling back execution to a checkpoint, or allowing execution to progress forward to a checkpoint in the first interpreter. The detected deviation from fully-correct interpretation may includes detection of the invalidity of a program transformation introduced by the binary translator, or detection of a synchronous execution exception.

In general, in a fifty-fifth aspect, the invention features a method and computer for performance of the method. Instructions of a user-state program coded in a RISC instruction set are decoded in a hardware instruction decoder. Instructions of a user-state program coded in a CISC instruction set are decoded in a CISC instruction decoder. Instructions decoded by the CISC decoder and RISC decoder are executed in a common execution pipeline.

In general, in a fifty-sixth aspect, the invention features a method and computer for performance of the method. A program is executed in a computer having a hardware instruction decoder implementing less than an entire architectural definition of an instruction set. A remainder of the instruction set is implemented in a software emulator.

In general, in a fifty-seventh aspect, the invention features a method and computer for performance of the method. A program coded in an instruction set is executed on a computer having a file of general registers. The instruction set provides accessibility to only a subset of the general register file. Intermediate results of instructions of the instruction set are stored in registers of the general register file that are inaccessible in the instruction set.

Preferred embodiments of the invention may include one or more of the following features. An exception handler for initiation by an exception occurring at an intermediate point during execution of a CISC instruction set may be coded in the RISC instruction set, which may have accessibility to the registers inaccessible in the CISC instruction set. Any saving of the intermediate results of the CISC instruction as part of a save of machine state may use mechanisms used for saving general registers. The CISC instruction decoder may generate instructions in the RISC instruction set for execution by the instruction execution pipeline. A last of the RISC instructions generated for each CISC instruction may carry a marker indicating that it is the last RISC instruction for the CISC instruction. A plurality of the RISC instructions generated for a single CISC instruction may carry a marker indicating that the computer may accept an exception at the marked RISC instruction. The CISC instruction decoder may be designed to generate multiple RISC instructions for parallel execution. Multiple exceptions may be raised by the RISC instructions generated for a single CISC instruction, and collected for presentation to a CISC processing environment. The CISC instruction decoder and instruction execution pipeline may be designed, with at most limited exceptions, to independently complete the RISC instructions generated for CISC instructions once the CISC instructions are issued to the instruction execution pipeline. The instruction execution pipeline, with at most limited exceptions, may be designed to process the RISC instructions independently of whether the RISC instructions were decoded by the RISC instruction decoder or generated by the CISC instruction decoder. The instruction execution pipeline, with at most limited exceptions, may be designed to process the RISC instructions independently a point within a recipe of a CISC instruction at which the RISC instruction was generated. The RISC and CISC instruction decoders may be designed to emit RISC instructions to the instruction execution pipeline in a unified format with identical operational codings, differing at most by a source designator. The RISC instruction set may have a condition-code based compare and branch repertoire. The RISC instruction set may include designators into a unified register file designed to contain integer and floating-point data, and the CISC instruction set may include designators into distinct integer and floating-point register files. Intermediate results of multiple-side-effect instructions in the CISC instruction set may be held in temporary registers of the computer that are not explicitly designated in the representations of the CISC instructions themselves. Instructions of the RISC instruction set may include designators into a register file, the RISC register designators including designators to the temporary registers used in the CISC instruction set. A memory management unit may manage the instructions of the RISC and CISC instruction sets between a main memory of the computer and one or more cache levels. Some instructions of the CISC program may be executed entirely in the software emulator, and some instructions may be partially implemented in the hardware instruction decoder and partially implemented in the software emulator. An exception handler may be coded in the RISC instruction set, which may have accessibility to the general registers inaccessible to the CISC instruction set. The emulator may be coded in an instruction set other than the instruction set decoded by the CISC instruction decoder. Entry to the software emulator is by exception inserted into the execution unit by the instruction decoder. Exceptions to enter the software emulator may use the same pipeline and architectural infrastructure as other exceptions raised by the instruction decoder or instruction execution unit. The instruction decoder may be designed, when decoding an instruction to write multiple operands to memory, to keep intermediate state of the instruction in the inaccessible registers. The instruction decoder may be designed to store a single datum in parts in two or more of the registers. The instruction decoder is designed to generate instructions to store a single datum in parts in a plurality of the inaccessible registers, and to validate the single datum. The instruction decoder may be designed to generate an instruction to compute a condition value into a one of the inaccessible registers during execution of a single instruction of the instruction set. The instruction decoder may be further designed to generate an instruction to branch based on the condition value, and to leave the condition value dead before completion of the single instruction. The instruction decoder, general register file, and instruction execution pipeline of the computer may be cooperatively designed, such that execution of at least some single instructions results in computing multiple intermediate results being stored in a single inaccessible register. All operations of the instructions in the instruction set that may generate exceptions may be processed before any side effects of the instruction are committed to resources accessible in the first instruction set.

In general, in a fifty-eighth aspect, the invention features a method and computer for performance of the method.

Instructions of a complex instruction set are decoded and executed. Information describing the decoding of the complex instructions is stored into architecturally-visible processor registers of the computer.

In general, in a fifty-ninth aspect, the invention features a method and computer for performance of the method. A program is executed in user state of a computer, the program coded in an instruction set having many instructions with multiple side-effects and the potential to raise multiple exceptions. In response to recognizing an exception occurring in an instruction after a first side-effect of the instruction has been architecturally committed, control is transferred to a software exception handler for the first exception. After completion of the exception handler, execution of the excepted instruction is resumed, processor registers of the computer being designed to architecturally expose sufficient information about the intermediate state of the excepted instruction that the transfer and resume are effected without saving intermediate results of the excepted instruction on a memory stack.

In general, in a sixtieth aspect, the invention features a method and computer for performance of the method. While decoding a sequence of computer instructions for execution in a multi-stage execution pipeline and before commencing substantial execution of each decoded instruction of the sequence, information descriptive of the instruction is generated, and, depending on a determination of whether the instruction will complete in the pipeline, stored or not stored into a non-pipelined register of the computer.

In general, in a sixty-first aspect, the invention features a method and computer for performance of the method. 27.46. While executing a program coded in an instruction set exposed for execution by programs stored in a main memory of the computer, an exception occurring in a program is recognized, and in response, information is architecturally exposed in processor registers of the computer describing a processor state of the computer. Execution is transferred to an exception handler. After completion of the exception handler, execution of the excepted program resumes based on the information in the processor registers. The processor registers and general purpose registers of the computer architecturally expose sufficient processor state and provide sufficient working storage for execution of the exception handler and resumption of the program, without storing processor state to the main memory.

In general, in a sixty-second aspect, the invention features a method and computer for performance of the method. Instructions are fetched in a first external instruction set from a memory, and, for at least some instructions of the first instruction set, two or more instructions in a second form are issued into an execution pipeline. An intra-instruction program counter value is architecturally exposed when an instruction of the first instruction set raises an exception at an intermediate point.

Embodiments may include one or more of the following features. The processor register circuitry may be designed to abstain from storing information into the processor registers during execution of at least some of the software exception handlers. The decoding information may present information about the instructions of the complex instruction set in a form uniform across most of the complex instruction set. In a mask register of bits, each bit corresponding to a class of instructions of the instruction set, a value of each bit may designate whether to raise an exception on execution of an instruction of the corresponding class. The architecturally-visible processor registers may not be architecturally-visible in the complex instruction set, but only in an alternative instruction set of the computer, the alternative instruction set being architecturally available to user-state programs. The decoding information may include a designation of any prefix to the current instruction, or a designation of an operand effective address, or a sign-extended value of an immediate value, or a designation of a length of the currently-executing instruction, or a designation of a current instruction pointer and an instruction pointer to a next instruction, or an intra-instruction fractional instruction pointer of the complex instructions, or a protection mode of the computer, or a designation of a base register and offset of an operand effective address, or a designation of a repeat prefix to the current instruction. The operation of the exception handler may be controlled at least in part by the contents of the processor registers. Intermediate results of the multiple side-effect instructions may be stored in general purpose registers of the computer, and those registers may not be architecturally addressable in the instruction set decoded by the instruction decoder. The execution pipeline and instruction decoder may be designed to retire instructions individually and independently, with at most a few interactions between instructions to affect retirement. A software exception handler may be coded to determine a location of an operand of the instruction based on the intra-instruction program counter value. The intra-instruction program counter value may be a serial count of instructions issued by the instruction decoder in response to decoding an instruction of the CISC instruction set. The intra-instruction program counter value may have a reserved value to indicate that the instruction decoder is currently in a mode to fetch instructions in the second form from a memory of the computer.

In general, in a sixty-third aspect, the invention features a method and computer for performance of the method. On a single computer, a first operating system coded in a RISC instruction set and a second operating system coded in a CISC instruction set are executed concurrently, the CISC operating system being unmodified for execution on the computer of the RISC instruction set. An exception occurring during execution of a program coded in the RISC instruction set is accepted, and routed for handling in the CISC operating system.

In general, in a sixty-fourth aspect, the invention features a method and computer for performance of the method. In response to an exception raised while executing a program coded in instructions of a first instruction set architecture, an execution thread is initiated under an operating system coded in instructions of a second instruction set architecture. The exception is delivered to the initiated thread for handling by the operating system.

Embodiments of the invention may include one or more of the following features. An exception occurring during execution of a program coded in the CISC instruction set may be routed for handling in the RISC operating system, or vice-versa. The RISC operating system may include a collection of interrupt service routines programmed to emulate instructions in the CISC instruction set. Acceptance of the exception occurring at an intermediate point of execution of a CISC instruction may be delayed until an CISC instruction boundary. An exception handler coded in the RISC instruction set may save a portion of the context of the computer, and alter the context of the excepted program before delivering the exception to the CISC operating system. The RISC operating system may build an exception frame on a memory stack before tending execution to the CISC operating system. The exception may be a synchronous fault generated by a RISC instruction. The exception may be a trap requesting a file access service from the CISC operating system on behalf of the program. Some exceptions may be handled in part in each of the CISC and RISC operating systems.

In general, in a sixty-fifth aspect, the invention features a method and computer for performance of the method. During execution of an instruction on a computer, in response to an operation of the instruction calling for an architecturally-visible side-effect in an architecturally-visible storage location, a value representative of an architecturally-visible representation of the side-effect is stored, a format of the representative value being different than an architecturally-visible representation of the side-effect. Execution resumes without generating the architecturally-visible side-effect. Later, the architecturally-visible representation corresponding to the representative value is written into the architecturally-visible storage location.

In general, in a sixty-sixth aspect, the invention features a method and computer for performance of the method. A context of a first process is stored, and a context of a second process is loaded to place the second process into execution, each context comprising a set of resources to be reloaded whenever a process associated with the context is reloaded for execution. At least some instructions executed in a multi-stage execution pipeline of the computer maintain results in storage resources outside the context resource set. Instructions for execution by the pipeline are marked to indicate whether or not a context switch may be performed at a boundary of the marked instruction.

In general, in a sixty-seventh aspect the invention features a method and computer for performance of the method. During hardware execution of an instruction stream, a condition is recognized that is a superset of a condition whose occurrence is desired to be detected. A first exception is raised as a result of recognizing the superset condition. Software filters the superset condition to determine whether the desired condition has occurred. If the desired condition is determined to have occurred, a second exception is established to be raised after execution of further instructions of the instruction stream.

In general, in a sixty-eighth aspect, the invention features a method and computer for performance of the method. During execution of a program on a computer, a condition is recognized in which an instruction is to affect the execution of a second instruction. In response, the processor is set into single-step mode. A single-step exception is taken after executing the second instruction. The processor is set out of single-step mode.

Embodiments of the invention may include one or more of the following features. The later writing may be triggered by a read of the architecturally-visible storage location, or completion of the execution of the instruction The architecturally-visible storage location may include a floating-point instruction pointer, a floating-point data pointer, and/or a floating-point opcode. The representative value may be held in a temporary register until several other side-effects are also ready to be committed to the architecturally-visible storage location simultaneously. The representative value may be held in a non-addressable storage registers and a process of the instruction may only cede control on an instruction boundary, so that the non-addressable information is not lost. The storage location may be a location in main memory or a cache memory, or a general purpose register of the computer having no address in an address space of the computer. The context switch may be triggered in response to an action of a non-final one of the instructions generated by decoding. The instructions may be marked by a marker on an intermediate one of the instructions generated by decoding an external-form instruction fetched from memory, the marker indicating an iteration boundary of an external-form instruction specifying repeated execution of an operation. The desired condition may be a memory reference to a narrow range of addresses, and the superset condition may be a memory reference to a broader range of addresses. The broader range of addresses may be a cache line. The monitored condition may be a memory reference to an address of a reference class, and the superset condition may be a memory reference to the address, without respect to reference class. The filtering software may record the nature of the monitored condition that has occurred, and may record multiple occurrences of desired conditions before the second exception is raised. The second exception may vector to a debug entry point of an operating system. The condition may be an exception recognized on one of a plurality of instructions generated by a single instruction fetched from a memory, and the second exception may be deferred until an instruction boundary of the instruction fetched from memory. The first instruction may write a stack segment register. Servicing a single-step exception may includes querying a debug touch record. The first instruction may be one that writes an interrupt enable flag of the computer.

In general, in a sixty-ninth aspect, the invention features a method and computer for performance of the method. An instruction opcode calls for a memory reference to effect a movement of data. A memory protection check performed by the instruction is effective to check for permission to effect a movement of data other than the data movement called for by the instruction opcode.

Embodiments of the invention may include one or more of the following features. The instruction may additionally perform the memory protection check associated with the data movement called for by the instruction opcode, or may perform the data movement called for by the instruction opcode, or may omit the data movement called for by the instruction opcode. The instruction opcode may call for a load from memory. The instruction may perform a memory protection check associated with a store to memory, or with an instruction fetch.

In general, in a seventieth aspect, the invention features a method and computer for performance of the method. A younger instruction is partially executed in a portion of an instruction pipeline above an issue buffer of a compute. Based on that partial execution, completion of an instruction older than the younger instruction is prevented.

In general, in a seventy-first aspect, the invention features a method and computer for performance of the method. A younger one of two instructions received at an earlier one of two pipeline stages of a computer is analyzed to determine whether the younger instruction will fault in execution later in the pipeline. If the analysis determines that the younger instruction will fault, both the younger instruction and an older of the two instructions are nullified before either instruction irreversibly commits an architecturally-visible side-effect. If the analysis determines that the younger instruction will not fault, both instructions are allowed to be executed by the pipeline, with no further interlocking to ensure that neither instruction will prevent completion of the other.

In general, in a seventy-second aspect, the invention features a method and computer for performance of the method. Two instructions are issued to an execution pipeline of a computer. A memory protection check is performed on an effective address referenced by a younger of the two instructions. Based on the memory protection check of the younger instruction, any effect of the older of the two instructions may be cancelled.

In general, in a seventy-third aspect, the invention features a method and computer for performance of the method. During execution of a control transfer instruction in an execution pipeline of a computer, a memory segment offset of a destination address of the control transfer is checked against an offset limit of a segment descriptor, using the same segment limit checking hardware used by the execution pipeline to check a memory segment offset of memory load and store operations.

Embodiments of the invention may include one or more of the following features. The younger instruction may be a control transfer instruction. The older instruction may be a write to a memory location. The control transfer may be a routine call and the datum written to the memory may be a return address. The effective address checked may be the destination of the control transfer. The control transfer may be effected in a pipeline stage above an issue buffer of the pipeline. The control transfer may be generated in response to decoding an instruction calling for a decrement of a value and a control transfer based on a comparison between the value and zero. The earlier pipeline stage may be an instruction fetch and/or decode stage early in the pipeline. The analysis may determine whether the destination of the jump is valid for execution. The nullification may prevent any architecturally-visible change to machine state. The nullification may include reversing a committed side-effect of the older instruction.

In general, in a seventy-fourth aspect, the invention features a method and computer for performance of the method. A macroinstruction of a computer is decoded to generate a number of iterations of (a) a pattern of microinstructions implementing a basic operation, and (b) a branch instruction predicted not taken.

In general, in a seventy-fifth aspect, the invention features a method and computer for performance of the method. A macroinstruction is decoded to call for a number of iterations of a sequence of one or more microinstructions. On detecting that an iteration completes operation of the macroinstruction, a marker indicating the end of the macroinstruction is added to a microinstruction in the pipeline downstream of the instruction decoder.

In general, in a seventy-sixth aspect, the invention features a method and computer for performance of the method. After g a termination condition of a loop of a first microinstruction stream is reached, a partial loop iteration beyond the termination is executed, the partial execution committing at least one side-effect to an architecturally-visible resource of the computer. An exception is raised to transfer control to a second microinstruction stream. In the second microinstruction stream, the side-effects committed by the post-termination iteration are unwound.

Embodiments of the invention may include one or more of the following features. The microinstruction set may be architecturally exposed to programs fetched from a memory of the computer. Instructions of the microinstruction set may be managed by a memory management unit between a main memory of the computer and one or more cache levels. The instruction decoder may be designed to cease generating iterations when a termination condition of the macroinstruction is detected in the instruction pipeline. The termination condition may include detection of a branch mispredict. The mispredicted branch microinstruction may be a branch instruction available to a program fetched from a memory of the computer. The branch microinstruction may be generated carrying a marker indicating that the branch microinstruction defines a boundary between two successive iterations.

In general, in a seventy-seventh aspect, the invention features a method and computer for performance of the method. A computer executes instructions in first and second instruction sets. A first instruction coded in the first instruction set stores into a memory location a value of a second instruction coded in the second instruction set. In response to the storing, a memory system and execution pipeline are cleared of the former content of the memory location. The second instruction is executed in the execution pipeline.

Embodiments of the invention may include one or more of the following features. An instruction decoder for the second instruction set may be designed to generate instructions in the first instruction set for execution in the execution pipeline. The instructions in the execution pipeline may not be tagged with an indication of an instruction set of origin. The monitoring may be based on comparing addresses in a physical address space.

In general, in a seventy-eighth aspect, the invention features a method and computer for performance of the method. Execution of an instruction includes the steps of waiting to allow a pipeline to drain, and setting bits of a floating-point control word to values denoted in an explicit immediate field of the instruction.

Embodiments of the invention may include one or more of the following features. Instruction fetch and execution circuitry of the computer may be designed to fetch and execute a macroinstruction set and a microinstruction set from memory. The instruction may be generated to implement a macroinstruction whose execution is dependent on a full/empty state of a floating-point top-of-stack. The instruction may specify individual bits of the floating-point control word to be written, in addition to values to be written to those bits. The computer may also provide an instruction calling for waiting to allow a pipeline to drain and to raise an exception based on a test of bits of a floating-point control word.

Embodiments of the invention may offer one or more of the following advantages.

A program produced for a computer of an old architecture can be executed on a computer of a new architecture. The old binary can be executed without any modification. Old binaries can be mixed with new—for instance, a program coded for an old architecture can call library routines coded in the new instruction set, or vice-versa. Old libraries and new libraries may be freely mixed. New and old binaries may share the same address space, which improves the ability of new and old binaries to share common data. Alternatively, an old binary can be run in a protected separate address space on a new computer, without sharing any data with any new binary. A caller need not be aware of the ISA in which the callee is coded, avoiding the burden of explicitly saving and restoring context. The invention reduces software complexity: software need not make explicit provision for all possible entries and exits from all possible modes and mixtures of binaries. The pipelines for processing old instructions and new instructions can share pieces of the implementation, reducing the cost of supporting two instruction sets. A new computer can fully model an older computer, with no reliance on any software convention that may be imposed by any particular software product, allowing the new computer to run any program for the old computer, including varying off-the-shelf operating systems. Because translated target code is tracked in association with the physical pages of the source code, even if the physical pages are mapped at different points in the virtual address spaces, a single translation will be reused for all processes. This is particularly advantageous in the case of shared libraries.

The profile data may be used in a "hot spot" detector, that identifies portions of the program as frequently executed. Those frequently-executed portions can then be altered, either by a programmer or by software, to run more quickly. The profile data may be used by a binary translator to resolve ambiguities in the binary coding of instructions. The information generated by the profiler is complete enough that the hot spot detector can be driven off the profile, with no need to refer to the instruction text itself. This reduces cache pollution. Ambiguities in the X86 instruction text (the meaning of a given set of instructions that cannot be inferred from the instruction text, for instance the operand size information from the segment descriptors) are resolved by reference to the profile information. The information collected by the profiler compactly represents the information needed by the hot spot detector and the binary translator, with relatively little overhead, thereby reducing cache pollution. The profiler is integrated into the hardware implementation of the computer, allowing it to run fast, with little delay on a program—the overhead of profiling is only a few percent of execution speed.

Control may be transferred from an unoptimized instruction stream to an optimized instruction stream, without any change to the unoptimized instruction stream. In these cases, the unoptimized instruction stream remains available as a reference for correct execution. The instruction stream may be annotated with information to control a variety of execution conditions.

A profile may be used to determine which program transformation optimizations are safe and correct, and which present a risk of error. Rather than foregoing all opportunities unsafe optimizations or speed-ups, the optimization or speed-up may be attempted, and monitored for actual success or failure. The slower, unoptimized mode of execution can be invoked if the optimization in fact turns out to be unsafe.

A single instruction coding can be used both as a RISC instruction set, exposed to programmers and compilers, and as a microcode instruction set. This improves design testability, and reduces the amount of design. Programs are able to exploit the full performance and flexibility of the microarchitecture. The native microinstructions are simple. Individual microinstructions execute almost entirely independent of their context—a given instruction always performs the same operation, without reference to previous or following instructions. The amount of interlocking between consecutive instructions is reduced. Much of the complexity of implementing a complex instruction set, such as the X86 instruction set, is removed from the hardware, and moved into a software emulator, where errors are easier to avoid, detect, and correct.

Individual instructions execute and retire with very little contextual reference to earlier or later instructions. The execution behavior of a native instruction is determined by the opcode bits of the instruction, and the contents of the registers named as explicit operands, and only rarely on machine mode, instruction sequence, or other context. The instructions require very little annotation beyond the information that is normally and naturally contained in simple load/store/operate types of instructions. For instance, native Tapestry instructions perform the same functions whether received from a native Tapestry binary, or generated by the converter from an X86 instruction. Instructions generated by the converter perform the same functions whether they are the first instruction in a recipe for an X86 instruction, the last instruction of a recipe, or an instruction in the middle of a recipe.

Instructions retire individually. That is, once the side-effects (results written to architecturally-visible registers or to memory, transfers of control, exceptions, etc.) of an instruction are committed, they need not be further tracked for backing-out by a later instruction. The native instructions that constitute a recipe for an X86 instruction can be retired individually, without the need to collect the side-effects for all native instructions of the recipe. Individual retirement allows simplification of the hardware, and reduces some critical paths. The "accounting" is simplified if side-effects are committed as individual instructions are retired, rather than collected among multiple instructions to be committed as a group.

Individual mechanisms are designed to be generally applicable, to be shared among many needs. For instance, the exception interface is designed to support both traditional exceptions, and intra-instruction exceptions transferring execution to the software emulator. Returning from the emulator is very much like returning from any other exception in a traditional machine. The general register file is designed for traditional use as a register file, and to hold intra-instruction intermediate results while execution proceeds within the converter. The processor register mechanism is broadly applicable to both traditional machine control functions and to control of the interface between X86 execution in hardware, X86 execution in software, and emulation of complex X86 functionality such as single-stepping, debug, and the like.

The hardware is kept relatively simple by moving much of the complex behavior of the X86 into a software emulator. The emulator is invoked by the mechanism used for other machine exceptions. The complex X86 functions that are used in nearly every instruction, such as the complex X86 segmentation and paging behavior, is implemented in hardware, to improve performance. For instance, the inhibition of interrupts between certain pairs of X86 instructions is implemented in software rather than hardware.

The above advantages and features are of representative embodiments only, and are presented only to assist in understanding the invention. Additional features and advantages of the invention will become apparent in the following description, from the drawings, and from the claims.

DESCRIPTION OF THE DRAWING

FIG. 2a is a table relating the meaning of several bits of the PSW of FIG. 1e.

FIGS. 2b and 2c are tables relating the actions of exception handlers.

FIGS. 3g, 3h, 3i, 3j, 6c, 7d, 8b, and 8c are flow diagrams.

FIGS. 3k, 4c, 4d, and 7j show data declarations or data structures.

FIG. 4b is a table of profiling event codes and their meanings.

FIGS. 4g, 4h, 4i, 7c, 7i, 8a and 9b show processor registers of the computer.

FIGS. 5b, 6b, 7a, 7b, 7e, 7f, 7g, and 7h are circuit block diagrams.

FIG. 9d is a table showing information connected with instructions of the computer.

FIG. 9f is a table showing use of temporary registers by the converter.

FIGS. 9e, 9g, 9h, 9i, 9j and 9k show pseudocode of X86 instructions and corresponding native Tapestry instructions.

DESCRIPTION

Figure 1A:
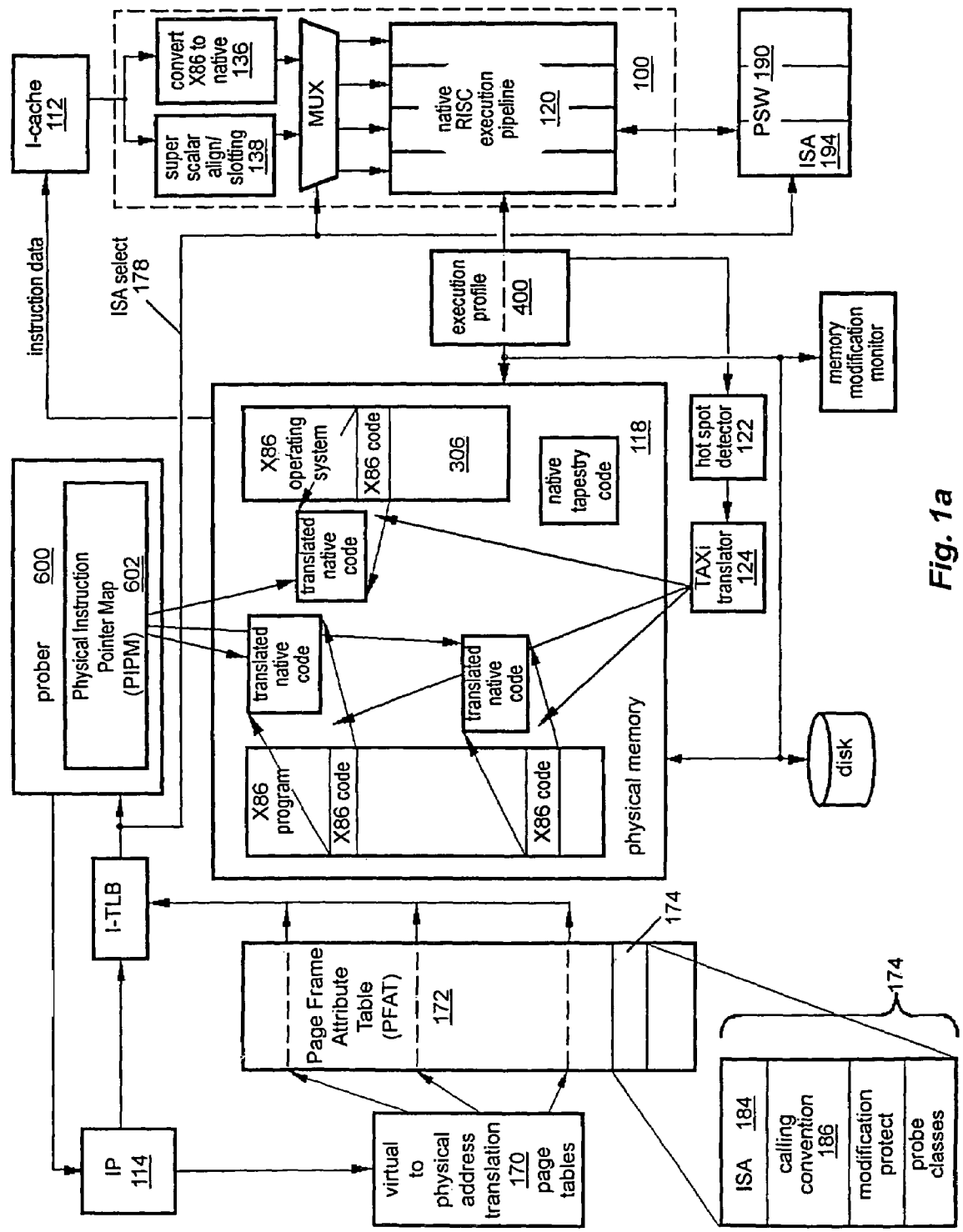
FIGS. 1a, 1b, 1c, 1d, 3a and 9a are block diagrams of a computer system.
Figure 1B:
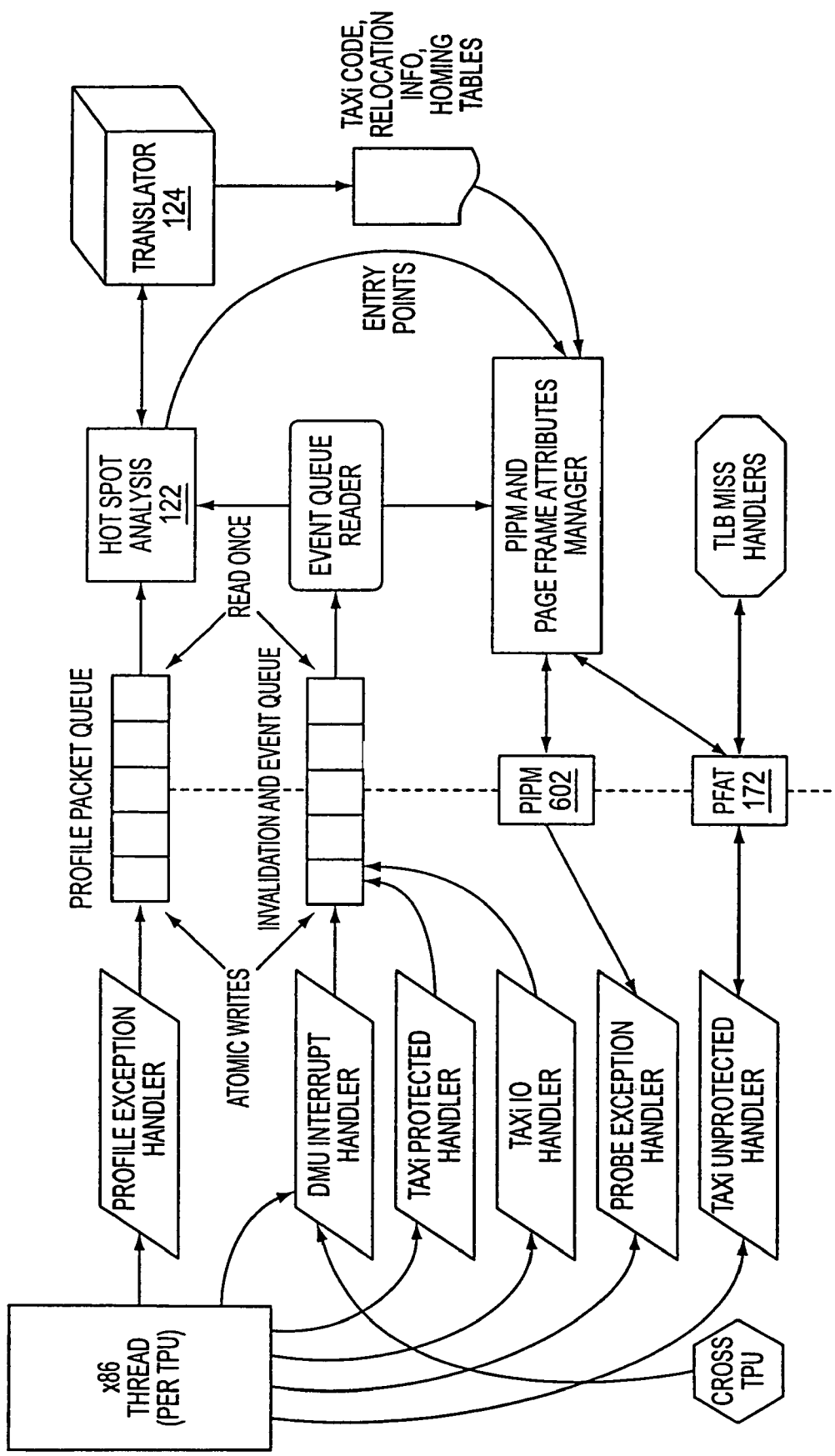
Figure 1C:
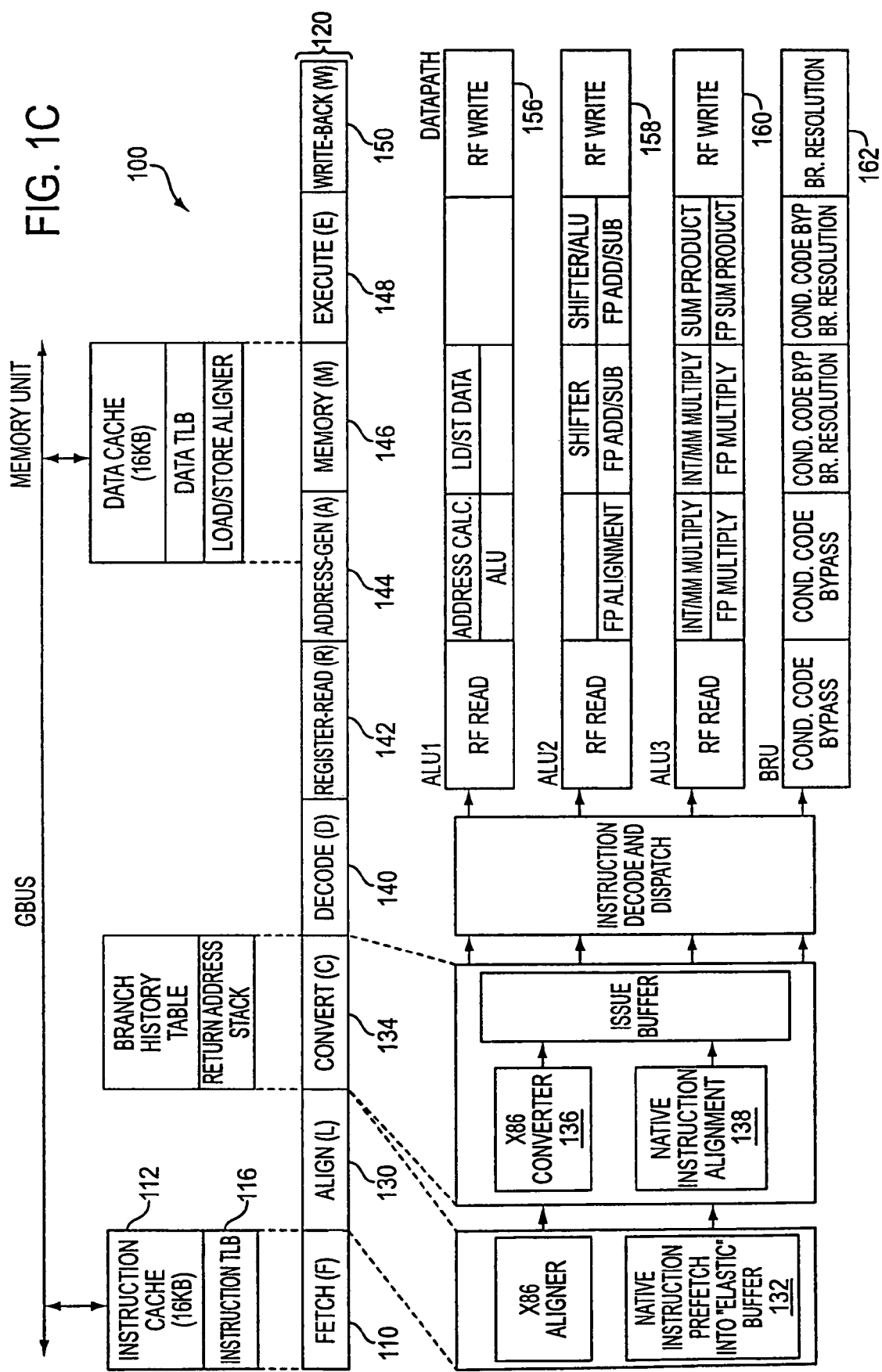

The description is organized as follows.
I. Overview of the Tapestry system, and features of general use in several aspects of the invention
  A. System overview
  B. The Tapestry instruction pipeline
  C. Address translation as a control point for system features
  D. Overview of binary translation, TAXi and the converter safety net
  E. System-wide controls
  F. The XP bit and the unprotected exception
II. Indicating the instruction set architecture (ISA) for program text
III. Saving Tapestry processor context in association with an X86 thread
  A. Overview
  B. Subprogram Prologs
  C. X86-to-Tapestry transition handler
  D. Tapestry-to-X86 transition handler
  E. Handling ISA crossings on interrupts or exceptions in the Tapestry operating system
  F. Resuming Tapestry execution from the X86 operating system
  G. An example
  H. Alternative embodiments
IV. An alternative method for managing transitions from one ISA to the other
  A. Indicating the calling convention (CC) for program text
  B. Recording Transfer of Control Semantics and Reconciling Calling Conventions
V. Profiling to determine hot spots for translation
  A. Overview of profiling
  B. Profileable events and event codes
  C. Storage form for profiled events
  D. Profile information collected for a specific example event—a page straddle
  E. Control registers controlling the profiler
  F. The profiler state machine and operation of the profiler
  G. Determining the five-bit event code from a four-bit stored form
  H. Interaction of the profiler, exceptions, and the XP protected/unprotected page property
  I. Alternative embodiments
VI. Probing to find a translation
  A. Overview of probing
  B. Overview of statistical probing
  C. Hardware and software structures for statistical probing
  D. Operation of statistical probing
  E. Additional features of probing
  F. Completing execution of TAXi code and returning to the X86 code
  G. The interaction of probing and profiling
  H. Alternative uses of adaptive opportunistic statistical techniques
VII. Validating and invalidating translated instructions
  A. A simplified DMU model
  B. Overview of a design that uses less memory
  C. Sector Monitoring Registers
  D. Interface and Status Register
  E. Operation
  F. Circuitry
  G. DMU_Status register
  H. DMU_Command register
VIII. Managing out-of-order effects
  A. Ensuring in-order handling of events reordered by optimized translation
  B. Profiling references to non-well-behaved memory
  C. Reconstructing canonical machine state to arrive at a precise boundary
  D. Safety net execution
IX. The converter
  A. Overview
    1. Pipeline structure, and translation recipes
    2. The emulator
    3. Side-band information: frac bits, instruction boundaries, interruptible points, etc.
    4. Interrupts, traps, and exceptions
    5. The frac bits, and continuing a recipe
    6. Expansion from external form to internal formatted form
  B. Individual retirement of instructions
    1. Recipe use of temporary registers
    2. Memory reference instructions that trigger protection checks suited for a different reference class
    3. Target limit check instruction
      a. LOAD/STORE and branch limit checks
      b. Target limit check for near register-relative CALL
    4. Special grouping of instructions to ensure co-atomic execution.
    5. Far calls
    6. Unwind in the emulator of LOOP instruction
    7. Repeated string instructions
  C. Collecting results of multiple native instructions to emulate multiple side-effects of a single X86 instruction
    1. Load/store address debug comparison result gathering and filtering
    2. FP-DP/IP/OP postponement
    3. STIS (store into instruction stream) flush boundary to next instruction
  D. An externally-exposed RISC ISA as microinstruction set—implementing a second instruction set conversion and implementation with a user-accessible first instruction set
    1. External microcode
    2. Miscellaneous features
  E. Restartable complex instructions
    1. Atomic MOV/POP stack segment pair via native single-step
    2. IF bit change inhibition via native single-step
  F. The FWAIT instruction
X. Interrupt priority I. Overview of the Tapestry System, and Features of General Use in Several Aspects of the Invention A. System Overview Referring to FIGS. 1a, 1b and 1c, the invention is embodied in the Tapestry product of Chromatic Research, Inc. of Sunnyvale, Calif. Tapestry is fast RISC processor 100, with hardware and software features that provide a correct implementation of an Intel X86-family processor. ("X86" refers to the family including the 8086, 80186, ... 80486, Pentium, and Pentium Pro. The family is described in INTEL ARCHITECTURE SOFTWARE DEVELOPER'S MANUAL, VOL. 1-3, Intel Corp. (1997)) Tapestry fully implements the X86 architecture, in particular, a full Pentium with MMX extensions, including memory management, with no reliance on any software convention imposed, for instance, by a Microsoft or IBM operating system. A Tapestry system will typically be populated by two to four processors (only one of which is shown in FIGS. 1a, 1b and 1c), interconnected as symmetric shared memory multiprocessors.

Tapestry processor 100 fetches (stage 110) instructions from instruction cache (I-cache) 112, or from memory 118, from a location specified by IP (instruction pointer, generally known as the PC or program counter in other machines) 114, with virtual-to-physical address translation provided by I-TLB (instruction translation look-aside buffer) 116. The instructions fetched from I-cache 112 are executed by a RISC execution pipeline 120. In addition to the services provided by a conventional I-TLB, I-TLB 116 stores several bits 182, 186 that choose an instruction environment in which to interpret the fetched instruction bytes. One bit 182 selects an instruction set architecture (ISA) for the instructions on a memory page. Thus, the Tapestry hardware can readily execute either native instructions or the instructions of the Intel X86 ISA. This feature is discussed in more detail in section II, infra.

The execution of a program encoded in the X86 ISA is typically slower than execution of the same program that has been compiled into the native Tapestry ISA. Profiler 400 records details of the execution flow of the X86 program. Profiling is discussed in greater detail in section V, infra. Hot spot detector 122 analyzes the profile to find "hot spots," portions of the program that are frequently executed. When a hot spot is detected, a binary translator 124 translates the X86 instructions of the hot spot into optimized native Tapestry code, called "TAXi code." During emulation of the X86 program, prober 600 monitors the program flow for execution of X86 instructions that have been translated into native code. When prober 600 detects that translated native Tapestry code exists corresponding to the X86 code about to be executed, and some additional correctness predicates are satisfied, prober 600 redirects the IP to fetch instructions from the translated native code instead of from the X86 code. Probing is discussed in greater detail in section VI, infra. The correspondence between X86 code and translated native Tapestry code is maintained in PIPM (Physical Instruction Pointer Map) 602.

Because the X86 program text may be modified while under execution, the system monitors itself to detect operations that may invalidate a previous translation of X86 program text. Such invalidating operations include self-modifying code, and direct memory access (DMA) transfers. When such an operation is detected, the system invalidates any native Tapestry translation that may exist corresponding to the potentially-modified X86 text. Similarly, any other captured or cached data associated with the modified X86 data is invalidated, for instance profile data. These validity-management mechanisms are discussed in greater detail in sections I.F, VII and VIII, infra.

The system does not translate instructions stored in non-DRAM memory, for instance ROM BIOS for I/O devices, memory-mapped control registers, etc.

Storage for translated native Tapestry code can also be released and reclaimed under a replacement policy, for instance least-recently-used (LRU) or first-in-first-out (FIFO).

A portion of the X86 program may be translated into native Tapestry code multiple times during a single execution of the program. Typically, the translation is performed on one processor of the Tapestry multiprocessor while the execution is in progress on another.

For several years, Intel and others have implemented the X86 instruction set using a RISC execution core, though the RISC instruction set has not been exposed for use by programs. The Tapestry computer takes three new approaches. First, the Tapestry machine exposes both the native RISC instruction set and the X86 instruction set, so that a single program can be coded in both, with freedom to call back and forth between the two. This approach is enabled by ISA bit 180, 182 control on converter 136, and context saving in the exception handler (see sections II and III, infra), or in an alternative embodiment, by ISA bit 180, 182, calling convention bit 200, semantic context record 206, and the corresponding exception handlers (see section IV, infra). Second, an X86 program may be translated into native RISC code, so that X86 programs can exploit many more of the speed opportunities available in a RISC instruction set. This second approach is enabled by profiler 400, prober 600, binary translator, and certain features of the memory manager (see sections V through VIII, infra). Third, these two approaches cooperate to provide an additional level of benefit.

Most of the features discussed in this disclosure are under a global control, a single bit in a processor control register named "PP_enable" (page properties enabled). When this bit is zero, ISA bit 180, 182 is ignored and instructions are interpreted in Tapestry native mode, profiling is disabled, and probing is disabled.

B. The Tapestry Instruction Pipeline

Figure 9A:
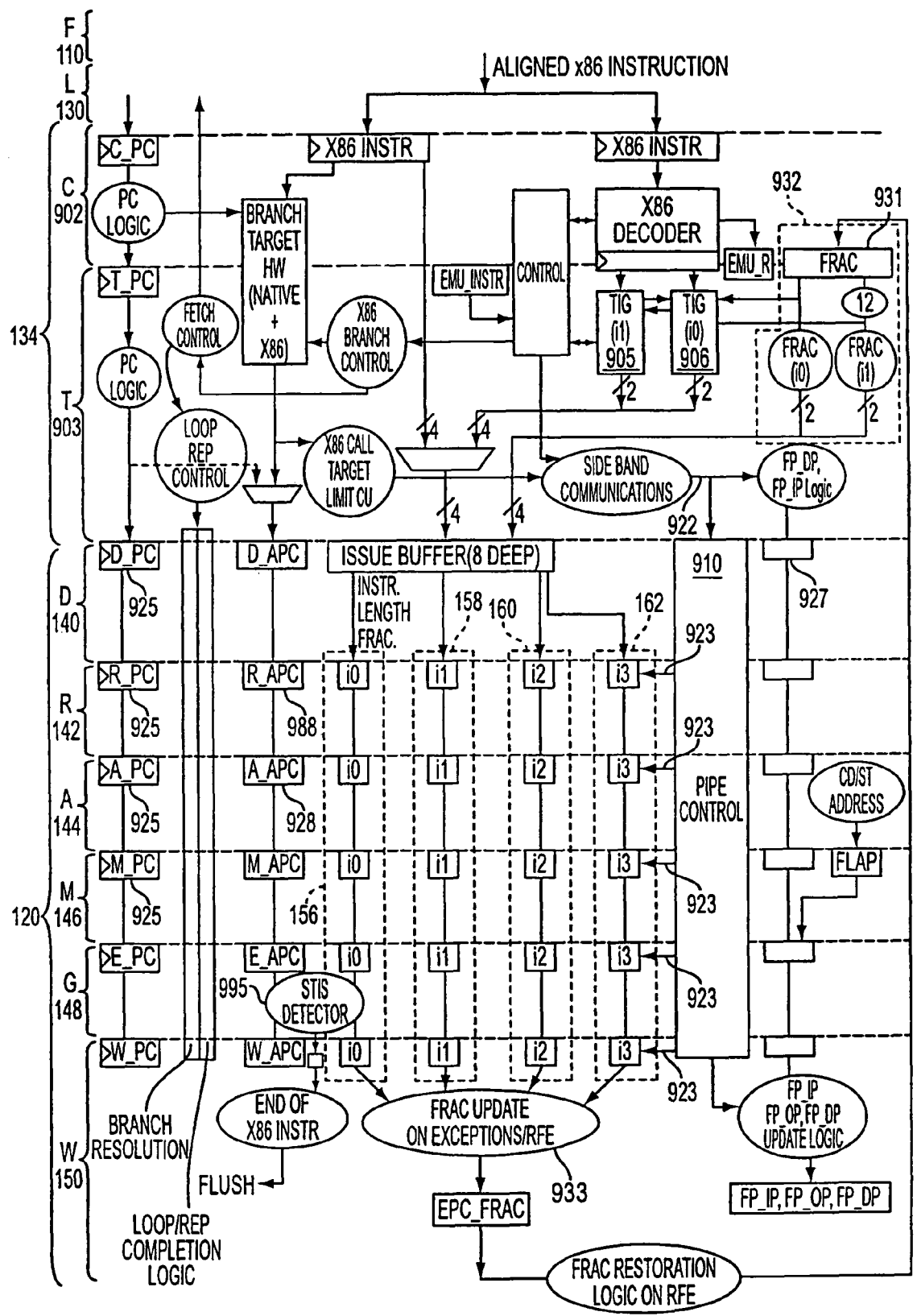

Referring to FIGS. 1c and 9a, a Tapestry processor 100 implements an 8- or 9-stage pipeline. Stage 1 (stage 110) fetches a line from I-cache 112. Stages 2 (Align stage 130) and 3 (Convert stage 134, 136, 138) operate differently in X86 and native Tapestry modes. In native mode, Align stage 130 runs asynchronously from the rest of the pipeline, prefetching data from I-cache 112 into elastic prefetch buffer 132. In X86 mode, Align stage 130 partially decodes the instruction stream in order to determine boundaries between the variable length X86 instructions, and presents integral X86 instructions to Convert stage 134. During X86 emulation, stage 3, Convert stage 134, 136 decodes each X86 instruction and converts 136 it into a sequence of native Tapestry instructions. In decomposing an X86 instruction into native instructions, converter 136 can issue one or two Tapestry instructions per cycle. Each Tapestry processor 100 has four parallel pipelined functional units 156, 158, 160, 162 to implement four-way superscalar issue of the last five stages of the pipeline. In native mode, convert stage 134, 138 determines up to four independent instructions that can be executed concurrently, and issues them downstream to the four superscalar execution pipelines. (In other machine descriptions, this is sometimes called "slotting," deciding whether sufficient resources and functional units are available, and which instruction is to be issued to which functional unit). The Decode stage 140 (or "D-stage"), Register-read stage 142 (or "R-stage"), Address-Generate stage 144 (or "A-stage"), Memory stage 146 (or "M-stage"), Execute stage 148 (or "E-stage"), and Writeback stage 150 (or "W-stage") may be considered to be conventional RISC pipeline stages, at least for purposes of the inventions disclosed in sections I-VIII. The pipeline will be further elaborated in the discussion of FIGS. 9a-9c, in section IX.

Converter 136 decodes each X86 instruction and decomposes it into one or more simple Tapestry instructions. The simple instructions are called the "recipe" for the X86 instruction.

Referring to Table 1, when X86 converter 136 is active, there is a fixed mapping between X86 resources and Tapestry resources. For instance, the EAX, EBX, ECX, EDX, ESP and EBP registers of the X86 architecture are mapped by converter hardware 136 to registers R48, R49, R50, R51, R52 and R53, respectively, of the Tapestry physical machine. The eight floating-point registers of the X86, split into a 16-bit sign and exponent, and a 64-bit fraction, are mapped to registers R32-47. The X86 memory is mapped to the Tapestry memory, as discussed in section I.C, infra.

The use of the registers, including the mapping to X86 registers, is summarized in Table 1. The "CALL" column describes how the registers are used to pass arguments in the native Tapestry calling convention. (Calling conventions are discussed in detail in sections III.A, III.B, and IV, infra). The "P/H/D" column describes another aspect of the Tapestry calling convention, what registers are preserved across calls (if the callee subprogram modifies a register, it must save the register on entry and restore it on exit), which are half-preserved (the low-order 32 bits are preserved across calls, but the upper 32 bits may be modified), and which are destroyable. The "X86 p/d" column shows whether the low-order 32 bits of the register, corresponding to a 32-bit X86 register, is preserved or destroyed by a call. The "Converter," "Emulator" and "TAXi" columns show the mapping between Tapestry registers and X86 registers under three different contexts. For registers r32-r47, "hi" in the X86 columns indicates that the register holds a 16-bit sign and exponent portion of an X86 extended-precision floating-point value, and "lo" indicates the 64-bit fraction.

TABLE 1

| | Tap CALL | Tap P/H/D | Description | X86 p/d | X86 Converter | X86 Emulator | TAXi |
|---|---|---|---|---|---|---|---|
| r63 | | P | — | | — | — | — |
| r62 | | P | — | | — | — | — |
| r61 | | P | — | | — | — | — |
| r60 | | P | — | | — | — | — |
| r59 | | P | — | | — | — | — |
| r58 | | P | — | | — | — | — |
| r57 | | P | — | | — | — | — |
| r56 | | P | — | | — | — | — |
| r55 | | H | X86 code will preserve only low 32 bits | p | edi | edi | edi |
| r54 | | H | X86 code will preserve only low 32 bits | p | esi | esi | esi |
| r53 | [FP] | H | must be Frame-Pointer if stack frame has variable size. | p | ebp | ebp | ebp |
| r52 | SP | H | stack pointer | p | esp | esp | esp |
| r51 | RV3 | D | if (192 bits < size <= 256 bits) fourth 64 bits of function result | d | ebx | ebx | ebx |
| r50 | RV2 | D | X86__fastcall 2nd arg; if (128 bits < size <= 256 bits) third 64 bits of function result | d | edx | edx | edx |
| r49 | THIS RV1 | D | X86__fastcall 1st arg; "thiscall" object address (unadorned C++ non-static method); if (64 bits < size <= 256 bits) second 64 bits of function result | d | ecx | ecx | ecx |
| r48 | RV0 | D | X86 function result first 64 bits of function result (unless it is DP floating-point) | d | eax | eax | eax |
| r47 | P15 | D | parameter register 15 | | f7-hi | f7-hi | f7-hi |
| r46 | P14 | D | parameter register 14 | | f7-lo | f7-lo | f7-lo |
| r45 | P13 | D | parameter register 13 | | f6-hi | f6-hi | f6-hi |
| r44 | P12 | D | parameter register 12 | | f6-lo | f6-lo | f6-lo |
| r43 | P11 | D | parameter register 11 | | f5-hi | f5-hi | f5-hi |
| r42 | P10 | D | parameter register 10 | | f5-lo | f5-lo | f5-lo |
| r41 | P9 | D | parameter register 9 | | f4-hi | f4-hi | f4-hi |
| r40 | P8 | D | parameter register 8 | | f4-lo | f4-lo | f4-lo |
| r39 | P7 | D | parameter register 7 | | f3-hi | f3-hi | f3-hi |
| r38 | P6 | D | parameter register 6 | | f3-lo | f3-lo | f3-lo |
| r37 | P5 | D | parameter register 5 | | f2-hi | f2-hi | f2-hi |
| r36 | P4 | D | parameter register 4 | | f2-lo | f2-lo | f2-lo |
| r35 | P3 | D | parameter register 3 | | f1-hi | f1-hi | f1-hi |
| r34 | P2 | D | parameter register 2 | | f1-lo | f1-lo | f1-lo |
| r33 | P1 | D | parameter register 1 | | f0-hi | f0-hi | f0-hi |
| r32 | P0 | D | parameter register 0 | | f0-lo | f0-lo | f0-lo |
| r31 | RVA, RVDP | D | address of function result memory temporary (if any); DP floating-point function result | | Prof15 | Prof15 | |
| r30 | | D | | | Prof14 | Prof14 | |
| r29 | | D | | | Prof13 | Prof13 | |
| r28 | | D | | | Prof12 | Prof12 | |
| r27 | | D | | | Prof11 | Prof11 | |
| r26 | | D | | | Prof10 | Prof10 | |
| r25 | | D | | | Prof9 | Prof9 | |
| r24 | | D | | | Prof8 | Prof8 | |
| r23 | | D | | | Prof7 | Prof7 | |
| r22 | | D | | | Prof6 | Prof6 | |
| r21 | | D | | | Prof5 | Prof5 | |
| r20 | | D | | | Prof4 | Prof4 | |
| r19 | | D | | | Prof3 | Prof3 | |
| r18 | | D | | | Prof2 | Prof2 | |
| r17 | | D | | | Prof1 | Prof1 | |
| r16 | | D | | | Prof0 | Prof0 | |
| r15 | XD | D | Cross-ISA transfer descriptor (both call and return) | | RingBuf | RingBuf | |
| r14 | | D | | | | | CT10 |
| r13 | | D | | | | | CT9 |
| r12 | | D | | | | | CT8 |
| r11 | | D | | | | | CT7 |
| r10 | | D | | | | | CT6 |
| r9 | | D | | | | | CT5 |
| r8 | | D | | | | | CT4 |

TABLE 1-continued

| Tap CALL | Tap P/H/D | Description | X86 p/d | X86 Converter | X86 Emulator | TAXi |
|---|---|---|---|---|---|---|
| r7 GP | D | pointer to global static environment (per-image) | | CT3 | CT3 | |
| r6 LR | D | linkage register | | CT2 | CT2 | |
| r5 AP | D | argument list pointer (overflow arguments in memory) | | CT1 | CT1 | |
| r4 AT | D | | | | AT | |
| r3 | vol | volatile, may only be used in exception handlers | vol | vol | vol | vol |
| r2 | vol | volatile, may only be used in exception handlers | vol | vol | vol | vol |
| r1 | vol | volatile, may only be used in exception handlers | vol | vol | vol | vol |
| r0 | n/a | always zero | n/a | n/a | n/a | n/a |

R0 is read-only always zero. During X86 emulation, R1-R3 are reserved for exception handlers. R4 is an assembler temporary for use by the assembler to materialize values that cannot be represented as immediates. During X86 emulation, R15-R31 are assigned to use by profiler 400, as discussed in section V, infra, and R5-R14, designated as "CT1" through "CT10," are reserved for use as "converter temporaries," as discussed in section IX.B.1.

Figure 1D:
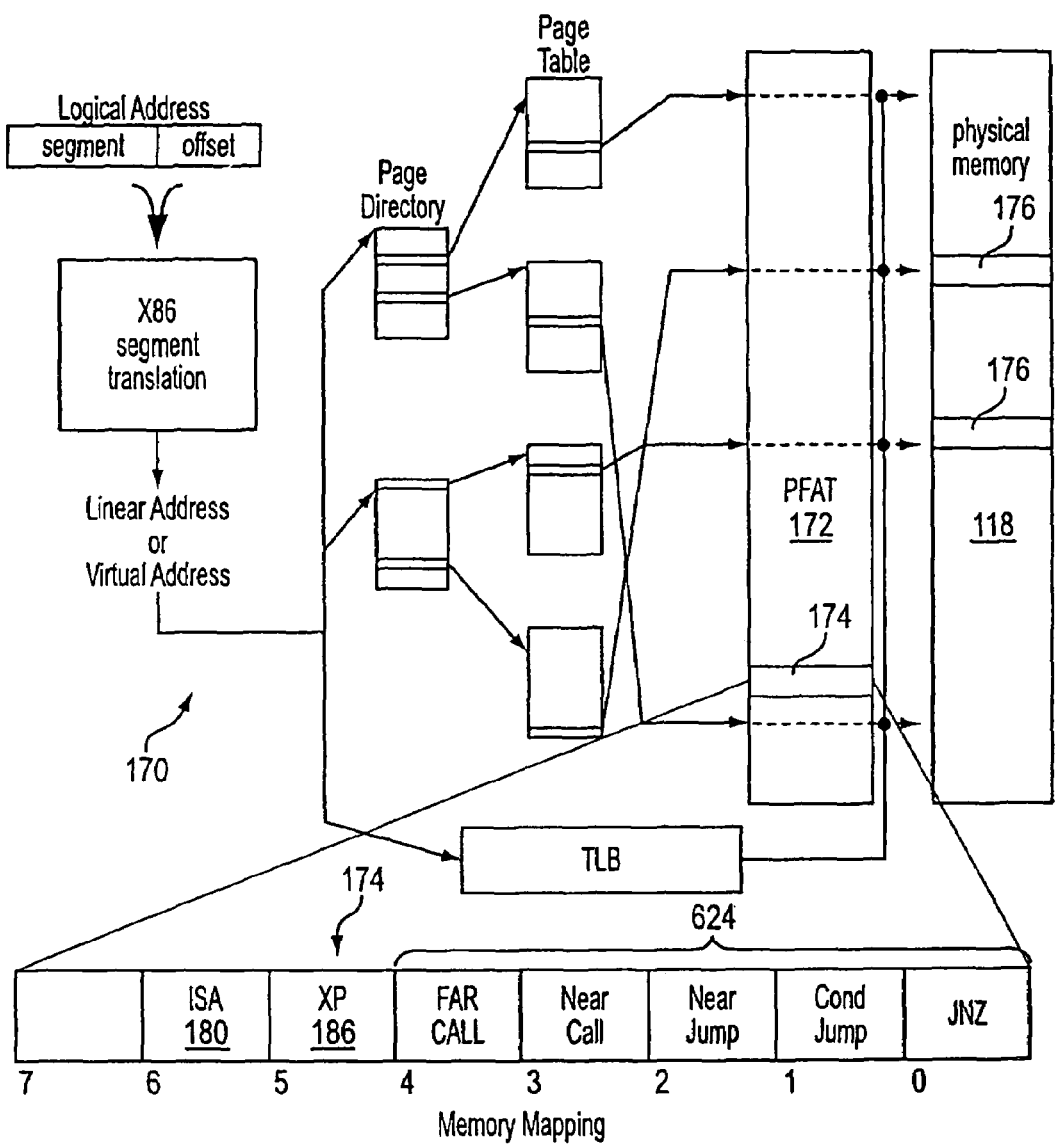

Tapestry supersets many features of the X86. For instance, the Tapestry page table format is identical to the X86 page table format; additional information about page frames is stored in a Tapestry-private table, the PFAT (page frame attribute table) 172, as shown in FIG. 1*d*. As will be shown in FIG. 1*e*, the Tapestry PSW (Program Status Word) 190 embeds the X86 PSW 192, and adds several bits.

The Tapestry hardware does not implement the entire X86 architecture. Some of the more baroque and less-used features are implemented in a software emulator (316 of FIG. 3*a*). The combination of hardware converter 136 and software emulator 316, however, yields a full and faithful implementation of the X86 architecture.

One of the features of emulator 316 is elaborated in section III, infra. The interaction between hardware converter 136 and software emulator 316 is elaborated in section IX in general, and more particularly in sections IX.A.2, IX.B.6, IX.C, and IX.E, infra.

C. Address Translation as a Control Point for System Features

Referring to FIG. 1*d*, X86 address translation is implemented by Tapestry's native address translation. During X86 emulation, native virtual address translation 170 is always turned on. Even when the X86 is being emulated in a mode where X86 address translation is turned off, Tapestry address translation is turned on, to implement an identity mapping. By forcing every memory reference through the Tapestry address translation hardware, address translation becomes a convenient place for intercepting much of the activity of X86 converter 136, and controlling the converter's execution. Further, control information for many features of the invention is conveniently stored in tables associated with, or tables analogous to those conventionally used for, address translation and virtual memory management. These "hooks" into address translation allow the Tapestry processor and software to intervene to emulate portions of the X86 that have "strange" behavior, like VGA graphics hardware, control registers, memory mapped device controls, and parts of the X86 address space that are given special treatment by traditional Intel chip sets.

To avoid changing the meaning of any portion of storage that X86 programs might be using, even if that use is unconventional, the Tapestry processor does not store any of its information in the X86 address translation tables. Tapestry-specific information about pages is stored in structures created specifically for Tapestry emulation of the X86. These structures are not defined in the X86 architecture, and are invisible to the emulated X86 or any program executing on the X86. Among these structures are PFAT (page frame attribute table) 172. PFAT 172 is a table whose entries correspond to physical page frames and hold data for processing and managing those page frames, somewhat analogous to the PFN (page frame number) database of the VAX/VMS virtual memory manager (see, e.g., LAWRENCE KENAH AND SIMON BATE, VAX/VMS INTERNALS AND DATA STRUCTURES, Digital Press, 1984, incorporated herein by reference). PFAT 172 has one 1-byte entry 174 corresponding to each physical page frame.

As will be discussed in sections II, IV, and V and VI, infra, PFAT entries 174 also include bits that control which ISA is used to decode the instructions of the corresponding page, which calling convention is used on the corresponding page, and to control probing.

D. Overview of Binary Translation, TAXi and the Converter Safety Net

Referring again to FIGS. 1*a* and 1*b*, TAXi ("Tapestry accelerated execution," pronounced "TAXi") is a binary translation system. TAXi marries two modes of execution, hardware converter 136 (with software assistance in the runtime system) that faithfully implements a gold standard implementation of the full X86 architecture, and a software binary translator 124 that translates X86 binaries to Tapestry native binaries, but optimizes the translated code by making certain optimistic assumptions that may violate correctness.

As a pre-existing X86 binary is executed in converter 136, hot spots (frequently-executed portions) in the X86 binary are recognized 122, and translated 124 on-the-fly into native Tapestry instructions. The hardware converter 136 (coupled with a software X86 emulator 316 for especially complex instructions) is necessarily slower than the translated code, because the X86 instructions must be executed in strict sequence. By translating complete hot spots of an X86 binary, as opposed to "translating" single instructions in converter 136, more optimization opportunities are exposed: X86 instructions can be decomposed into small data-independent Tapestry instructions, which in turn can be executed out of order, pipelined, or executed in parallel in the four superscalar pipelines (156, 158, 160, 162 of FIG. 1*c*).

Execution of X86 code is profiled. This profiling information is used to identify 122 the "hot spots" in the X86 program, the most-executed parts of the program, and thus the parts that can most benefit from translation into native Tapestry code. The hot spots in the X86 code are translated by translator 124 into native Tapestry code (TAXi code). As execution of the X86 program proceeds, execution is monitored to determine whether a translated equivalent exists for the X86 code about to be executed. If so, execution is transferred to the translated native Tapestry code.

TAXi translator 124 adopts a somewhat simplified view of the machine behavior; for instance, some X86 instructions are not translated. Translator 124 also takes an optimistic view.

For instance, translator 124 assumes that there will be no floating-point exceptions or page faults, so that operations can be reordered or speculatively rescheduled without changing program behavior. Translator 124 also assumes that all memory references are to well-behaved memory. ("Well-behaved memory" is a memory from which a load will receive the data last stored at the memory location. Non-well-behaved memory is typified by memory-mapped device controllers, also called "I/O space," where a read causes the memory to change state, or where a read does not necessarily return the value most-recently written, or two successive reads return distinct data). For instance, binary translator 124 assumes that memory reads can be reordered. Translated native Tapestry code runs faster than converter 136, and is used when translation can be guaranteed to be correct, or when any divergence can be caught and corrected.

The execution of the TAXi code is monitored to detect violations of the optimistic assumptions, so that any deviation from correct emulation of the X86 can be detected. Either a pre-check can detect that execution is about to enter a region of translated code that can not be trusted to execute correctly, or hardware delivers an exception after the fact when the optimistic assumptions are violated. In either case, when correctness cannot be guaranteed, or for code that translator 124 does not know how to translate execution of the translated native Tapestry code is aborted or rolled back to a safe check point, and execution is resumed in the hardware converter 136. The hardware converter 136 adopts the most conservative assumptions, guaranteeing in-order, gold standard correctness, and serves as a safety net for the less risk-averse binary translator 124.

This safety net paradigm allows binary translator 124 to be more aggressive, and makes development easier, because developers can focus on performance issues and leave correctness issues to be caught in the safety net. Additional details of the safety net paradigm are discussed in section VIII.

Tapestry and TAXi implement a full X86 architecture. No concession is required from X86 software; indeed, any X86 operating system can run on Tapestry, including off-the-shelf operating systems not specially adapted for Tapestry. Tapestry and TAXi make no assumptions about operating system entities, such as processes, threads, virtual address spaces, address mappings. Thus, Tapestry and TAXi operate in terms of the physical memory of the virtual X86, not the X86 virtual or linear addresses. (The distinction between Intel's "virtual" addresses and "linear" addresses seldom arises in the context of this disclosure; thus, unless a fine distinction between the two is required, this disclosure uses the term "virtual address" to embrace both concepts). For instance, library code that is shared between different processes at the operating system level, by using physical addresses, is automatically shared by TAXi processes because the physical memory is shared on the Tapestry implementation. Code shared by the operating system is shared even if it is mapped at different addresses in different processes. If the processes are actually sharing the same physical page, then TAXi will share the same translated code.

Buffers of translated code are recycled in a first-in-first-out (FIFO) order. Once a translated code buffer is marked for reclamation, it is not immediately discarded; rather it is marked available for reuse. If execution re-enters an available-for-reuse buffer before the contents are destroyed, the buffer is recycled to the head of the FIFO queue. In an alternative embodiment, whenever the buffer is entered, it is moved to the head of the FIFO queue; this approximates a least-recently-used (LRU) replacement policy.

A number of features of the TAXi system are tied to profiling. For instance, a region of code that is not profiled can never be identified as a hot spot, and thus will never be translated. Similarly, probing (see section VI, infra) is disabled for any region that is not profiled, because without a translation, a probe can never succeed. This invariant simplifies a number of design details, as will be discussed at various points infra.

E. System-Wide Controls

The PSW 190 has a TAXi_Active bit 198 that enables user-mode access to functionality that is otherwise disallowed in user mode. PSW.TAXi_Active 198 will be set true while a native Tapestry translation of an X86 program is being executed. When PSW.TAXi_Active 198 is true, a user-mode program may access the LDA/STA lock functionality of the X86, it has read and write access to all Tapestry processor registers, and it may access extended TRAP instruction vectors (specifically, to enable calling emulator functions). Further, X86-compatible semantics for extended precision floating-point operations is enabled.

A successful probe will set PSW.TAXi_Active 198 before it RFE's to the TAXi-translated code. When the TAXi-translated code completes execution, the process of returning to untranslated X86 code will clear PSW.TAXi_Active 198 before RFE'ing back to converter 136. If an exception occurs in the TAXi-translated code, then emulator 316 will be called to surface the exception back to the X86, virtual machine. Emulator 316 will check EPC.TAXi_Active 198 and return control to TAXi to restore the X86 machine context and RFE back to converter 136 to re-execute the X86 instruction.

F. The XP Bit and the Unprotected Exception

Referring again to FIGS. 1a, 1b and 2a, TAXi translator 124 produces a translation of an X86 binary. The TAXi system as a whole represents a very complex cache, where the X86 code represents the slower memory level and the translated TAXi code represents the faster memory level. TAXi begins caching information at the time of profiling, because profiling records knowledge about what events occurred at what addresses, where the instruction boundaries were, etc. Further caching occurs when binary translator 124 translates X86 code into semantically equivalent Tapestry native code. In order not to violate the X86 architectural model, TAXi protects against execution of translated Tapestry native code that corresponds to stale X86 code, X86 code that has either disappeared or been modified. If the underlying primary datum (the X86 instruction text) is modified, whether by a memory write from the CPU, or by a DMA write from a device, the cached data (the profile describing the X86 code and the TAXi code generated from it) is invalidated, so that it will not be executed. Execution will revert to the X86 text, in its modified form. If the modified X86 text becomes a hot spot, it may be recognized 122 and retranslated 124.

Like an ordinary cache, the TAXi cache has a valid bit—the XP bit (184 in PIPM entry 640, 186 in the I-TLB, see FIGS. 1a, 1b). X86 code, and the validity of the "cached" translated native Tapestry code, is protected against modification by CPU writes by XP write-protect bit 184, 186, and exception handlers that manage the protection of pages. Together, the flags and exceptions maintain a coherent translated Tapestry binary as a "cached" copy of the X86 program, while allowing the X86 program (whether encoded in its original X86 form or in translated native Tapestry form) to write to memory, even if that write implements self-modifying code. In either mode, the machine (either X86 converter 136 or the TAXi system) will faithfully execute the program's semantics. The protected and unprotected exceptions do not terminate processing in the manner of a conventional write-protect exception, but merely signal to the TAXi system that it must intervene to manage the validity of any TAXi code.

When a page of X86 code is protected, that is, when its XP protected bit 184, 186 is One, there are two classes of events that invalidate the TAXi code associated with the X86 code. First, a Tapestry processor could do a store into one of the X86 pages. This could arise if the program uses self-modifying code, or if the program creates code in writeable storage (stack or heap) on the fly. Second, a DMA device could write onto the page, for instance, when a page of program text is paged in on a page fault following a program load or activation. In either case, Tapestry generates an interrupt, and a handler for the interrupt resets the XP "valid" bit to indicate that any TAXi code corresponding to the X86 page cannot be reached by a probe (recall from section VI.D that probing is only enabled on X86 pages whose XP bit 184, 186 is One).

The write-protect bit is named "XP," originally an acronym for "extended property." Thus, when ISA bit (180 in PFAT 172, 182 in I-TLB) for a page indicates X86 ISA, the XP bit (184 in PIPM entry 640, 186 in the I-TLB) is interpreted to encode the modify-protect property for the page. XP bit 184, 186 controls the protection mechanism on a page-by-page granularity. The protection system for the machine as a whole is enabled and disabled by the TAXi_Control.unpr bit (bit <60> of the TAXi_Control register, 468 of FIG. 4*g*, see section V.E, infra).

Physical pages are divided for management between Tapestry operating system (312 of FIG. 3*a*) and X86 operating system 306, and PFAT.ISA bit 180 for the page (which is cached in the I-TLB.ISA bit 182) is set accordingly, Zero for Tapestry, One for X86. For all X86 pages, the XP bit (184 in PFAT 172, 186 in I-TLB 116) is cleared to Zero to indicate "unprotected." XP bit 184, 186 has no effect on Tapestry pages.

XP bit 184, 186 behaves somewhat analogously to a MESI (Modified, Exclusive, Shared, Invalid) cache protocol. The XP "unprotected" state is roughly equivalent to the MESI "Exclusive" state, and means that no information from this page may be cached while the page remains unprotected. The "protected" XP state is roughly equivalent to the MESI "Shared" state, and means that information from the page may be cached, but cached information must be purged before the page can be written. Four points of the analogy are explained in Table 2.

handler marks the page unprotected by setting the page's XP bit 184, 186 to Zero. Any TAXi code associated with the page is discarded, and PIPM database 602 that tracks the TAXi code is cleaned up to reflect that discarding. Then the store is retried—it will now succeed, because the page's XP bit 184, 186 has been cleared to Zero (unprotected). If TAXi code writes onto the X86 page of which this TAXi code is the translation, then the general mechanism still works—the exception handler invalidates the TAXi code that was running, and will return to the converter and original X86 text instead of the TAXi code that executed the store.

A write to a "Exclusive" cache line, or to an XP-unprotected 184, 186 page, induces no state change. If XP bit 184, 186 is Zero (unprotected), then stores are allowed to complete. These two states are labeled "3" in Table 2.

A read from a MESI "Shared" cache line proceeds without further delay, because the data in the cache are current. Analogously, converter 136 execution of an instruction from an XP-protected 184, 186 page proceeds without delay, because if any translated TAXi code has been generated from the instructions on the page, the TAXi code is current, and the profiling and probing mechanisms (400, 600, see sections V and VI, infra) will behave correctly. These analogous responses are labeled "4" in Table 2.

A read from a cache line, where that cache line is held in another processor in "Exclusive" state, forces the cache line to be stored to memory from that other processor, and then the line is read into the cache of the reading processor in "Shared" state. Analogously, when converter 136 executes code from XP-unprotected 184, 186 page (ISA is One, representing X86 code, and XP bit 184, 186 is Zero, indicating unprotected), and is about to write a profile trace-packet entry, with certain additional conditions, the machine takes an "unprotected" exception and vectors to the corresponding handler. The handler makes the page protected and synchronizes that page with other processors. These analogous actions are labeled "action 2" in Table 2. An unprotected exception is raised when an instruction is fetched from an unprotected X86 page (the page's I-TLB.ISA bit 182 is One, see section II, infra, and I-TLB.XP 186 bit is Zero), and TAXi_Control.unpr 468 is One and either of the following:

(1) a profile capture instruction is issued to start a new profile packet (TAXi_State.Profile_Active (482 of FIG. 4*h*) is Zero, TAXi_State.Profile_Request 484 is One,

TABLE 2

| | MESI | | | TAXi XP protection | | |
|---|---|---|---|---|---|---|
| | | fetch for sharing | write | | fetch for sharing | write |
| Shared | cached | | action 1 | Protected | | action 1 |
| Exclusive | uncached/ exclusive | action 2 | 3 | Unprotected | uncached/ exclusive | action 2 | 3 | action 1: discard all cached copies of the data, transition to the uncached/exclusive state
action 2: fetch a shared/duplicate copy, and transition to the cached/shared state.

A write to a MESI "Shared" cache line forces all other processors to purge the cache line, and the line is set to "Exclusive." Analogously, a write to an XP-protected 184, 186 page causes the page to be set to unprotected. These two analogous actions are designated "action 1" in Table 2. If ISA bit 180, 182 is One and XP bit 184, 186 is One, then this is an X86 instruction page that is protected. Any store to an X86 ISA page whose XP bit 184, 186 is One (protected), whether the current code is X86 native code or TAXi code, is aborted and control is passed to the protected exception handler. The and TAXi_State.Event_Code_Latch 486, 487 contains an event code for which "initiate packet" 418 is True in FIG. 4*b*), or (2) when the first instruction in a converter recipe is issued and TAXi_State.Profile_Active 482 is One.

The TAXi_State terms of this equation are explained in sections V.E and V.F and FIGS. 4*g*, 4*h*, 5*a* and 5*b*.

The unprotected exception handler looks up the physical page address of the fetched instruction from the EPC.EIP (the EPC is the native exception word (instruction pointer and PSW) pushed onto the stack by the exception, and EPC.EIP is the instruction pointer value), or from a TLB fault address processor register. The interrupt service routine sets the PFAT.XP bit 184 and I-TLB.XP bit 186 for the page to One, indicating that the page is protected. This information is propagated to the other Tapestry processors and DMU (DMA monitoring unit) 700, in a manner similar to a "TLB shootdown" in a shared-memory multiprocessor cache system. The exception handler may either abort the current profile packet (see section V.F, infra), or may put the machine in a context from which the profile packet can be continued. Then the exception handler returns to converter 136 to resume execution.

When TAXi_Control.unpr (468 of FIG. 4g) is clear, then the value of the XP bit 184, 186 is ignored: no exception is generated and TAXi software is responsible for validating the profile packet and setting the "Protected" page attribute.

In an alternative embodiment, the unprotected exception handler aborts the current profile packet, and enqueues the identity of the page. Later, a lazy agent, analogous to a page purifier in a virtual memory system, manipulates the PFAT.XP bit 184, I-TLB.XP bit 186, and DMU (DMA monitoring unit) to protect the page. When execution next enters the page, the page will be protected, and profiling proceeds in the normal course.

Attempts to write to a protected page (for instance, by self-modifying code, or a write to a mixed text-and-data page) will be trapped, and the page will be set unprotected again.

Profiling is effectively disabled for unprotected pages, because an attempt to profile on an unprotected page, while TAXi_Control.unpr 468 is One, raises an unprotected exception, and the unprotected exception handler either makes the page protected, or aborts the profile packet. Turning off profiling for unprotected pages ensures that an unprotected page will not be recognized as a hot spot, and thus not translated. Conversely, if a page cannot be protected (for instance, the page is not the well-behaved memory of address space zero, but rather is mapped to an I/O bus), then any profile packet currently being collected is aborted. The implementation of this rule, and some limited exceptions, are discussed in section V.H, infra.

Further details of the XP protection mechanism are discussed in VIII, infra. A second protection mechanism, for protecting pages against writes by DMA devices, is described in section VII, infra.

II. Indicating the Instruction Set Architecture (ISA) for Program Text

Referring to FIGS. 1a, 1b, 1c and 1d, a program is divided into regions 176, and each region has a corresponding flag 180. Flag 180 asserts 178 an ISA under which instruction decode unit 134, 136, 140 is to decode instructions from the corresponding region. For instance, the address space is divided into pages 176 (the same pages used for virtual memory paging), and ISA bit 180 in a page table entry (PTE) asserts the ISA to be used for the instructions of the page. When instructions are fetched from a page 176 whose ISA bit 180, 182 is a Zero, the instructions are interpreted as Tapestry native instructions and fed 138 by ISA select 178 directly to pipeline 120. When instructions are fetched from a page 176 whose ISA bit 180, 182 is a One, the instructions are fed under control of ISA select 178 to Convert stage 134, 136 of the pipeline, which interprets instructions as Intel X86 instructions. The regions need not be contiguous, either in virtual memory or in physical memory—regions of X86 text can be intermingled with regions of native Tapestry text, on a page-by-page basis.

A program written for one ISA can call library routines coded in either ISA. For instance, a particular program may use both a database management system and multimedia features. The multimedia services might be provided by libraries in optimized Tapestry native code. The database manager may be an off-the-shelf database system for the X86. The calling program, whether compiled for the X86 or for Tapestry, can readily call both libraries, and the combination will seamlessly cooperate.

In one embodiment, ISA bit is instantiated in two places, a master copy 180 and a cached copy 182 for fast access. The master copy is a single bit 180 in each entry 174 in PFAT 172. There is one PFAT entry 174 corresponding to each physical page of the memory 118, and the value of the value of ISA bit 180 in a given PFAT entry 174 controls whether Tapestry processor 100 will interpret instructions fetched from the corresponding page under the native instruction set architecture or as X86 instructions. On an I-TLB miss, the PTE from the Intel-format page tables is loaded into the I-TLB, as cached copy 182. The physical page frame number from the page table entry is used to index into PFAT 172, to find the corresponding PFAT entry 174, and information from the PFAT entry 174 is used to supplement the Intel-format I-TLB entry. Thus, by the time the bit is to be queried during an instruction fetch 110, the ISA bit 180 bit is in its natural location for such a query, I-TLB 116. Similarly, if the processor uses a unified instruction and data TLB, the page table and PFAT information are loaded into the appropriate entry in the unified TLB.

In alternative embodiments, ISA bit 180 may be located in the address translation tables, whether forward-mapped or reverse-mapped. This embodiment may be more desirable in embodiments that are less constrained to implement a pre-existing fixed virtual memory architecture, where the designers of the computer have more control over the multiple architectures to be implemented. In another alternative, ISA bit 180, 182 may be copied as a datum in I-cache 112.

When execution flows from a page of one ISA 180, 182 to a page of another (e.g., when the source of a control flow transfer is in one ISA and the destination is in the other), Tapestry detects the change, and takes a exception, called a "transition exception." The exception vectors the processor to one of two exception handlers, a Tapestry-to-X86 handler (340 of FIG. 3i) or an X86-to-Tapestry handler (320 of FIG. 3h), where certain state housekeeping is performed. In particular, the exception handler changes the ISA bit 194 in the EPC (the copy of the PSW that snapshots the state of the interrupted X86 process), so that the RFE (return from exception instruction) at the end of the transition exception handler 320, 340 will load the altered EPC.ISA bit 194 into the PSW. The content of the PSW.ISA bit 194 is the state variable that controls the actual execution of the processor 100, so that the changed ISA selection 178 takes effect when execution resumes. The PFAT.ISA copy 180 and I-TLB.ISA copy 182 are mere triggers for the exceptions. The exception mechanism allows the instructions in the old ISA to drain from the pipeline, reducing the amount of control circuitry required to effect the change to the new ISA mode of execution.

Because the Tapestry and X86 architectures share a common data representation (both little endian, 32-bit addresses, IEEE-754 floating-point, structure member alignment rules, etc.), the process can resume execution in the new ISA with no change required to the data storage state of the machine.

In an alternative embodiment, the execution of the machine is controlled by the I-TLB.ISA copy of the bit ISA bit 194, and the PSW.ISA copy 190 is a history bit rather than a control bit. When execution flows onto a page whose ISA bit 180, 182 does not match the ISA 180, 182 of the previous page, at the choice of the implementer, the machine may either take a transition exception, or "change gears" without taking a transition exception.

There is a "page properties enable" bit in one of the processor control registers. On system power-on, this bit is Zero, disabling the page properties. In this state, the PSW.ISA bit is manipulated by software to turn converter 136 on and off, and transition and probe exceptions are disabled. As system initialization completes, the bit is set to One, and the PFAT and TLB copies of the ISA bit control system behavior as described supra.

III. Saving Tapestry Processor Context in Association with an X86 Thread

A. Overview

Figure 3A:
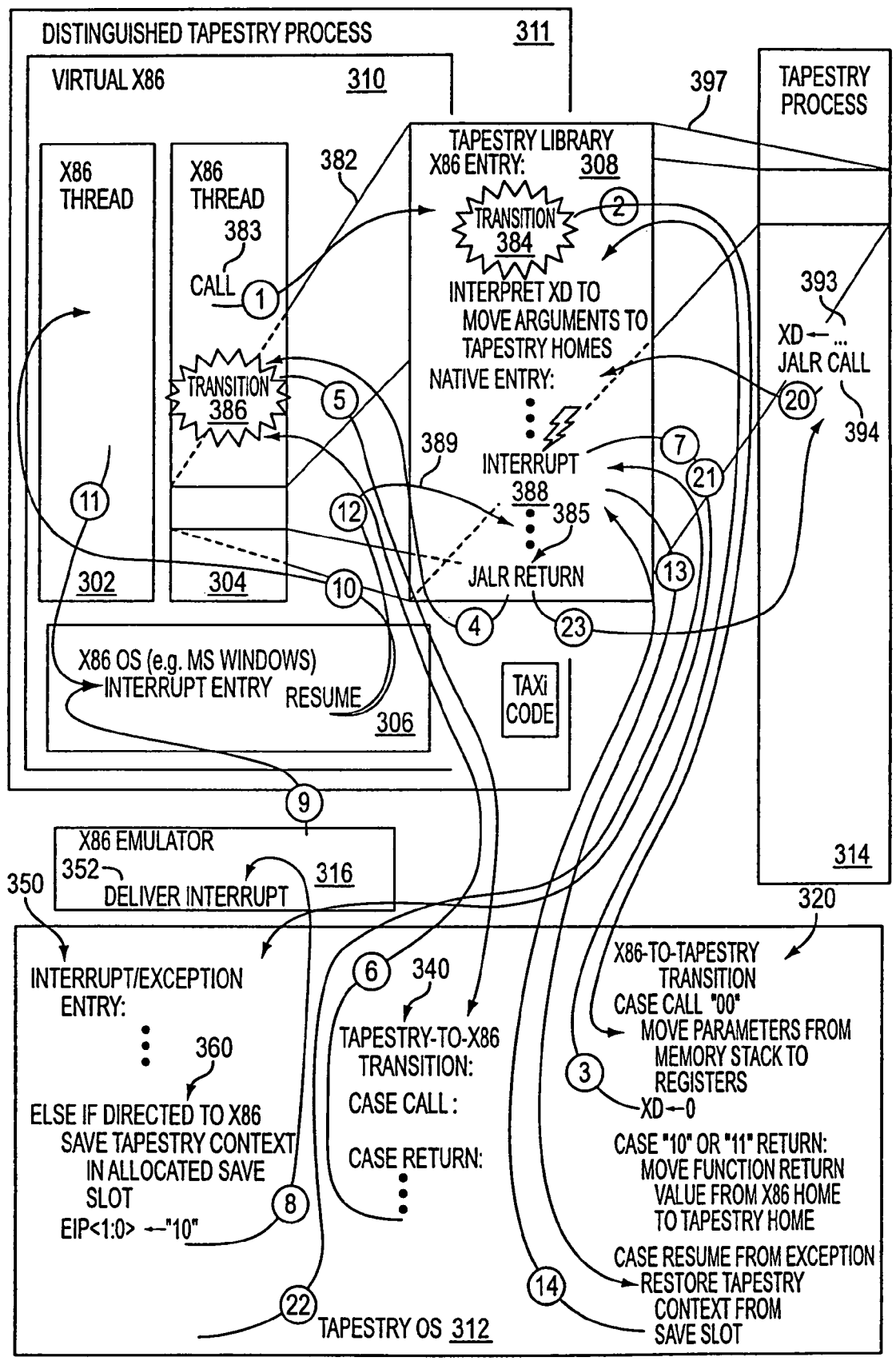
Figure 3B:
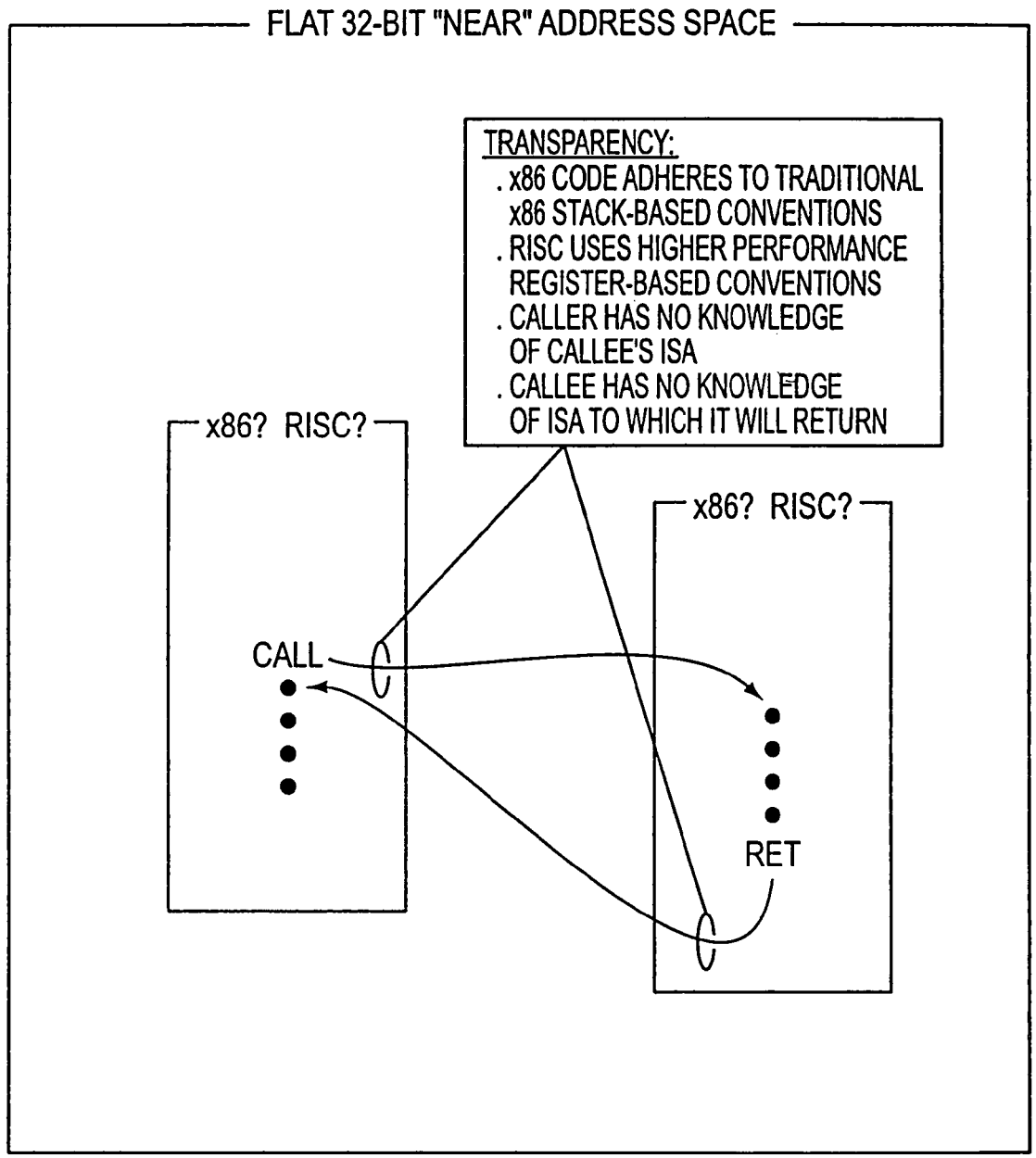
FIGS. 3b, 3c, 3d, 3e, 3f, 3l, 3m, 3n and 3o are block diagrams showing program flow through memory.
Figure 3C:
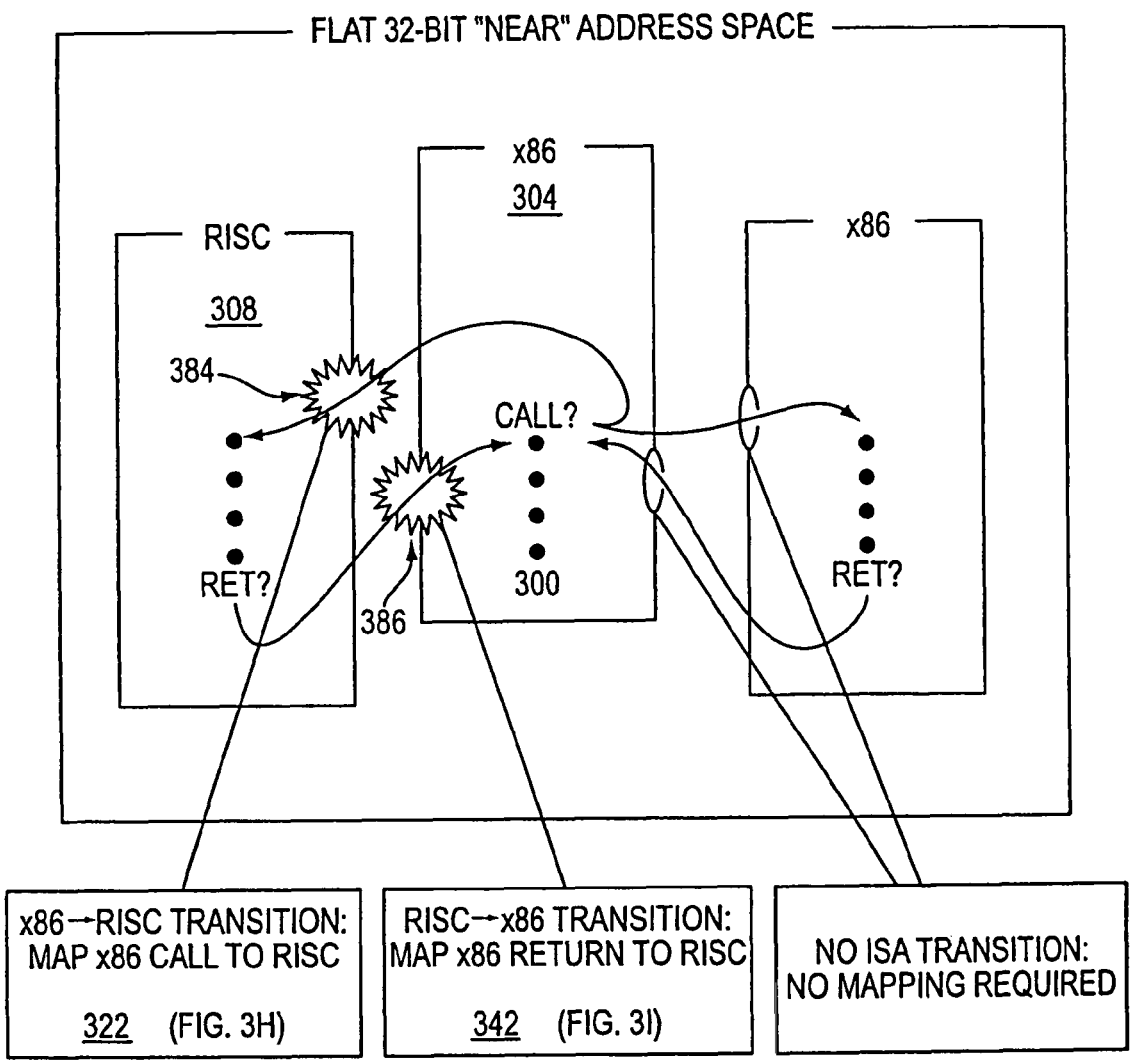
Figure 3D:
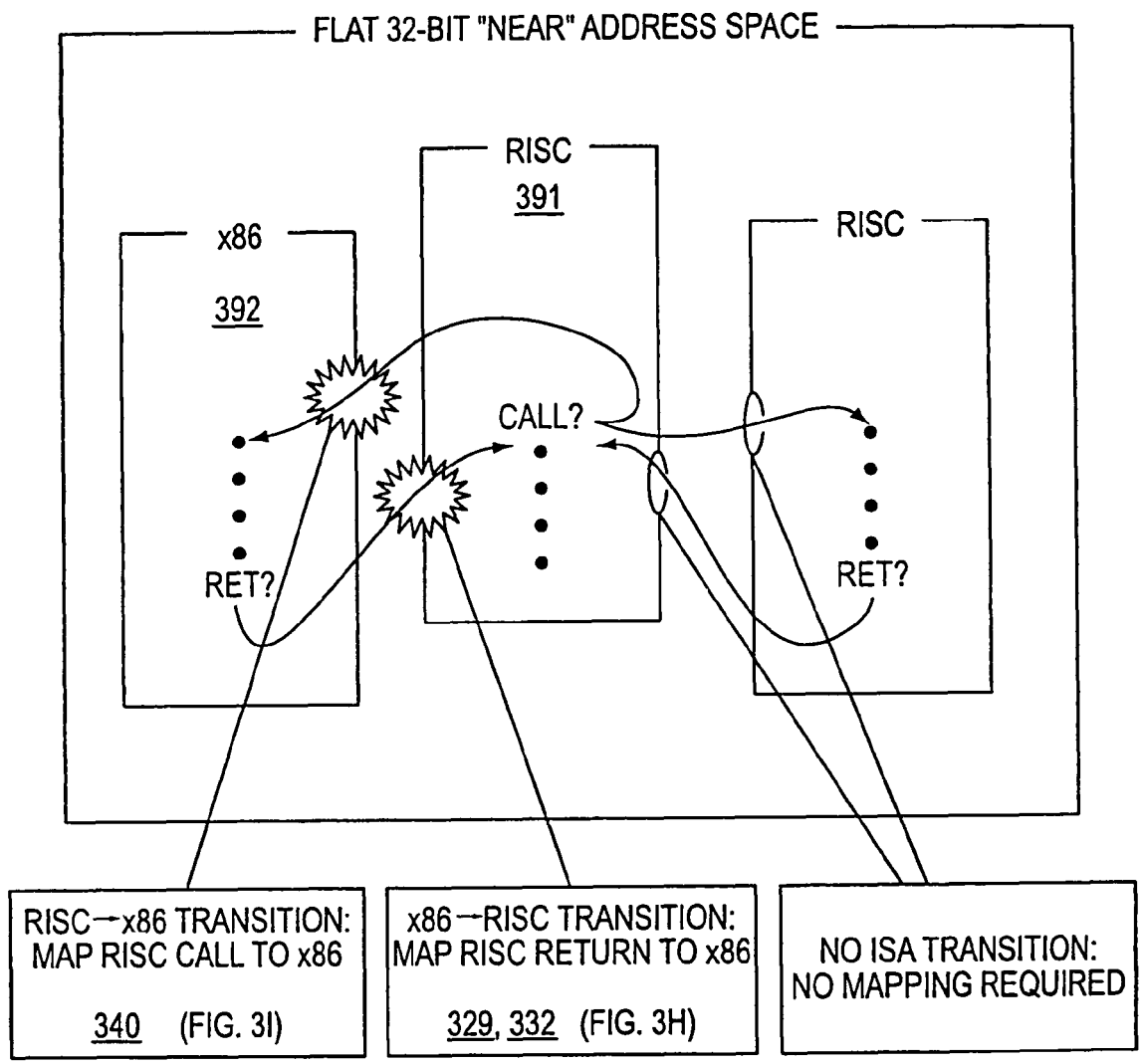
Figure 3E:
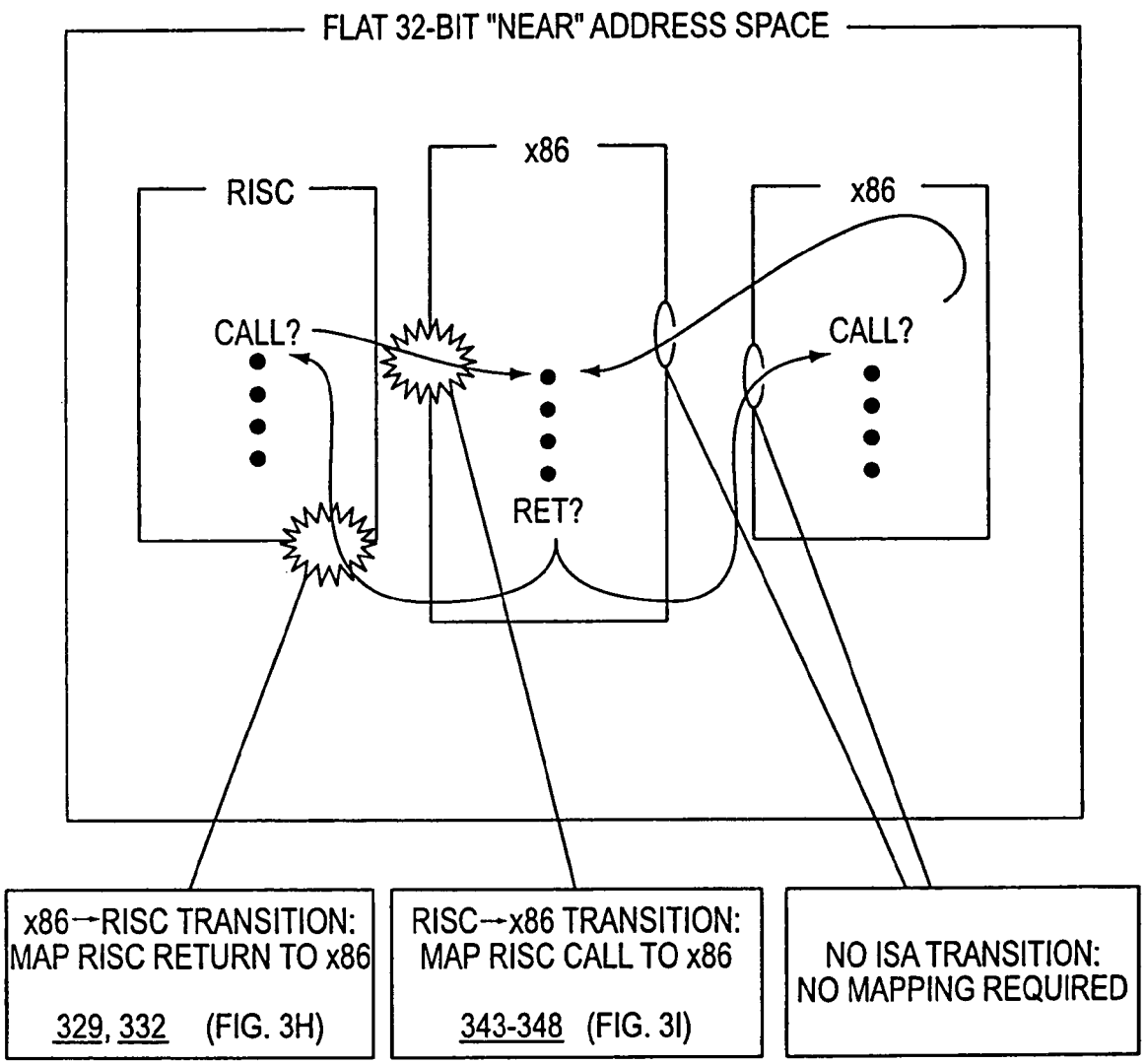
Figure 3F:
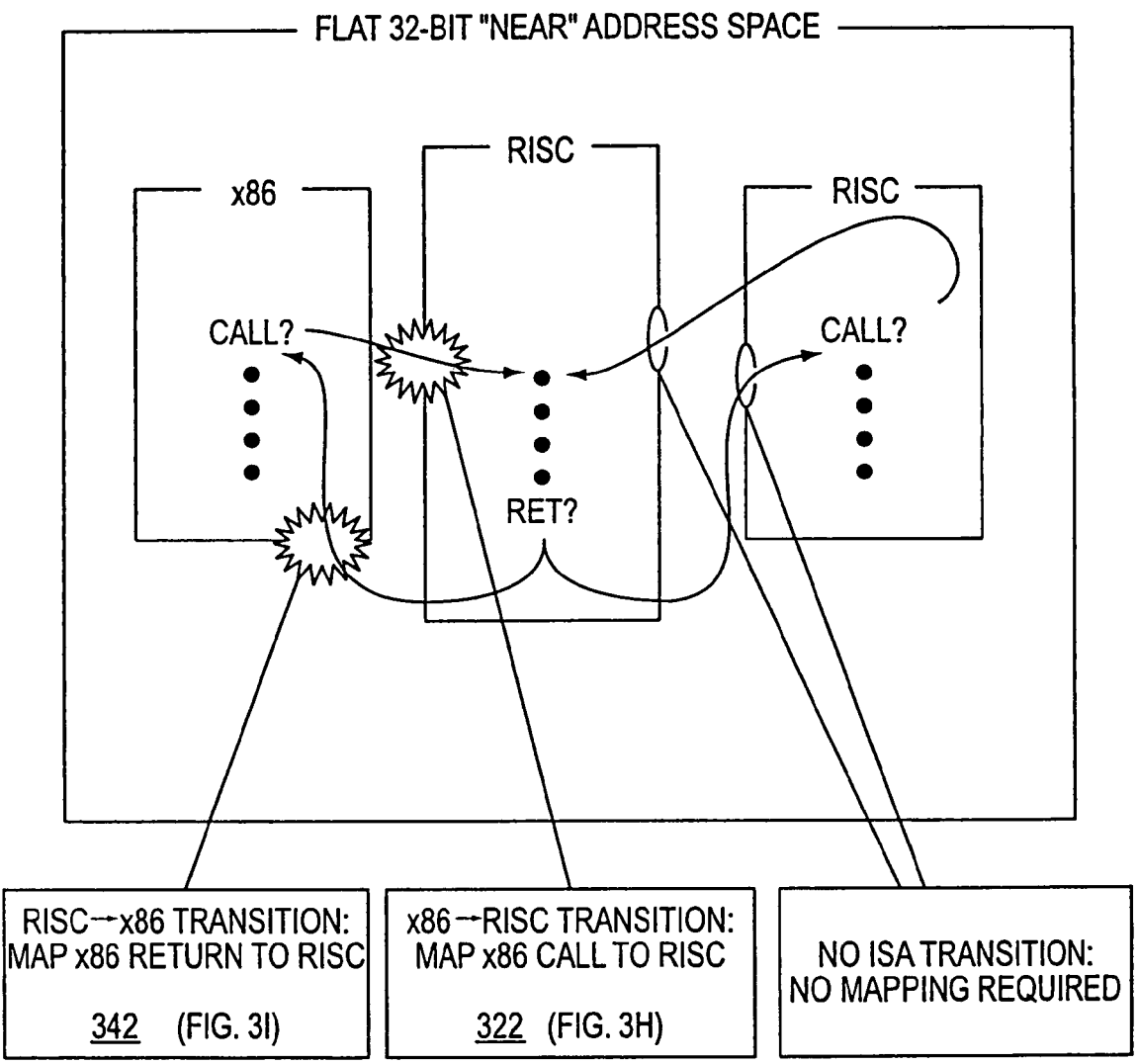

Referring to FIGS. 3a-3f, the ability to run programs in either of two instruction sets opens the possibility that a single program might be coded in both instruction sets. As shown in FIG. 3b, the Tapestry system provides transparent calls from caller to callee, without either knowing the ISA of the other, without either caller or callee being specially coded to work with the other. As shown in FIG. 3c, an X86 caller 304 might make a call to a callee subprogram, without being constrained to work with only callees coded in the X86 instruction set or the native Tapestry RISC instruction set 308. If the callee is coded in the X86 instruction set, the call will execute as a normal call. If the callee 308 is coded in the native Tapestry instruction set, then Tapestry processor 100 will take a transition exception 384 on entry to the callee 308, and another transition exception 386 on returning from the Tapestry callee 308 to the X86 caller 304. These transition exceptions 384, 386 and their handlers (320 of FIGS. 3h and 340 of FIG. 3i) convert the machine state from the context established by the X86 caller to the context expected by the Tapestry callee 308.

Referring to FIGS. 3c-3f, analogous transition exceptions 384, 386 and handlers 320, 340 provide the connection between an X86 caller and its callees (FIG. 3c), a native Tapestry caller and its callees (FIG. 3d), between an X86 callee and its callers (FIG. 3e), and between a native Tapestry callee its callers (FIG. 3f), and provides independence between the ISA of each caller-callee pair.

Figure 3G:
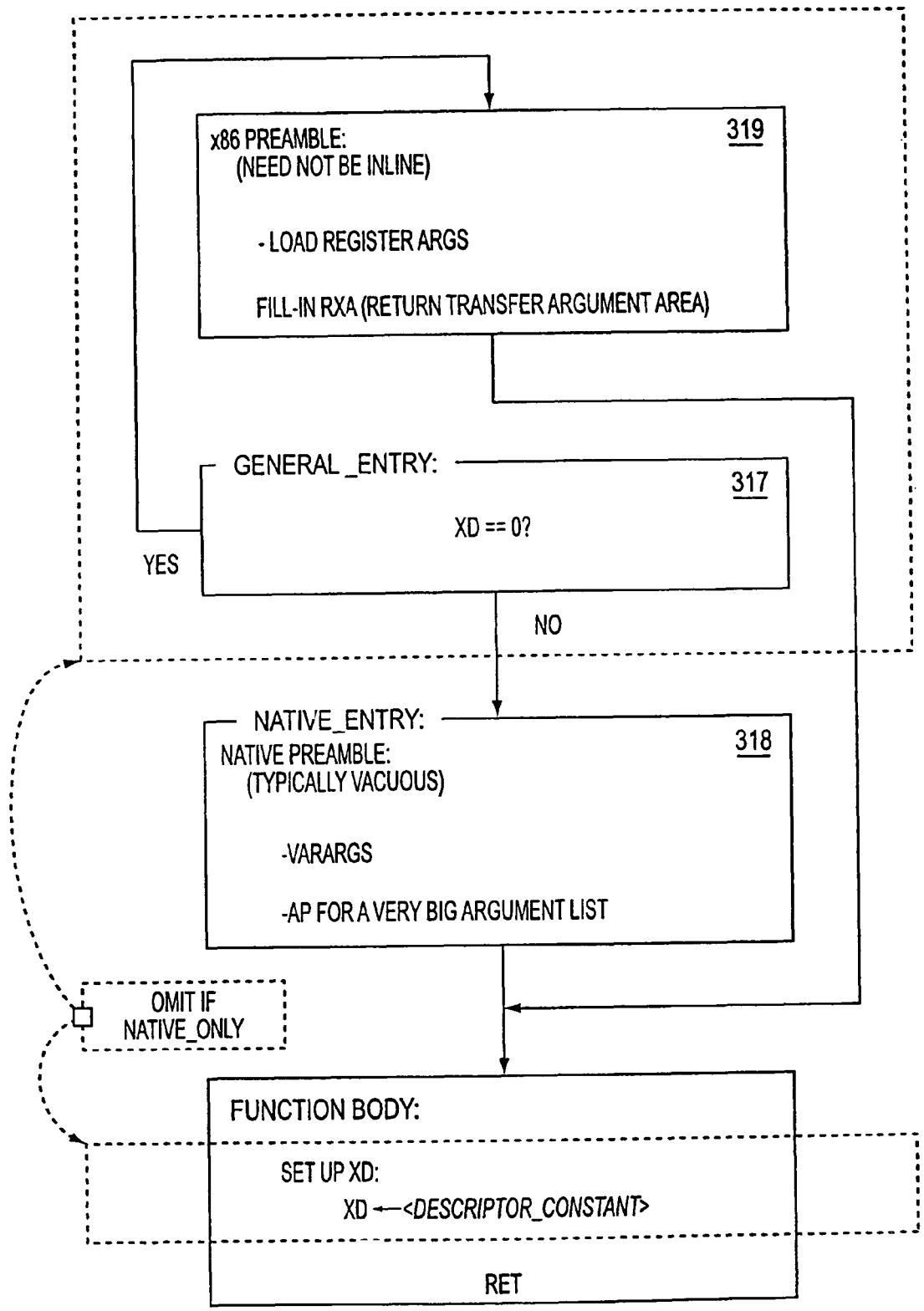
Figure 3L:
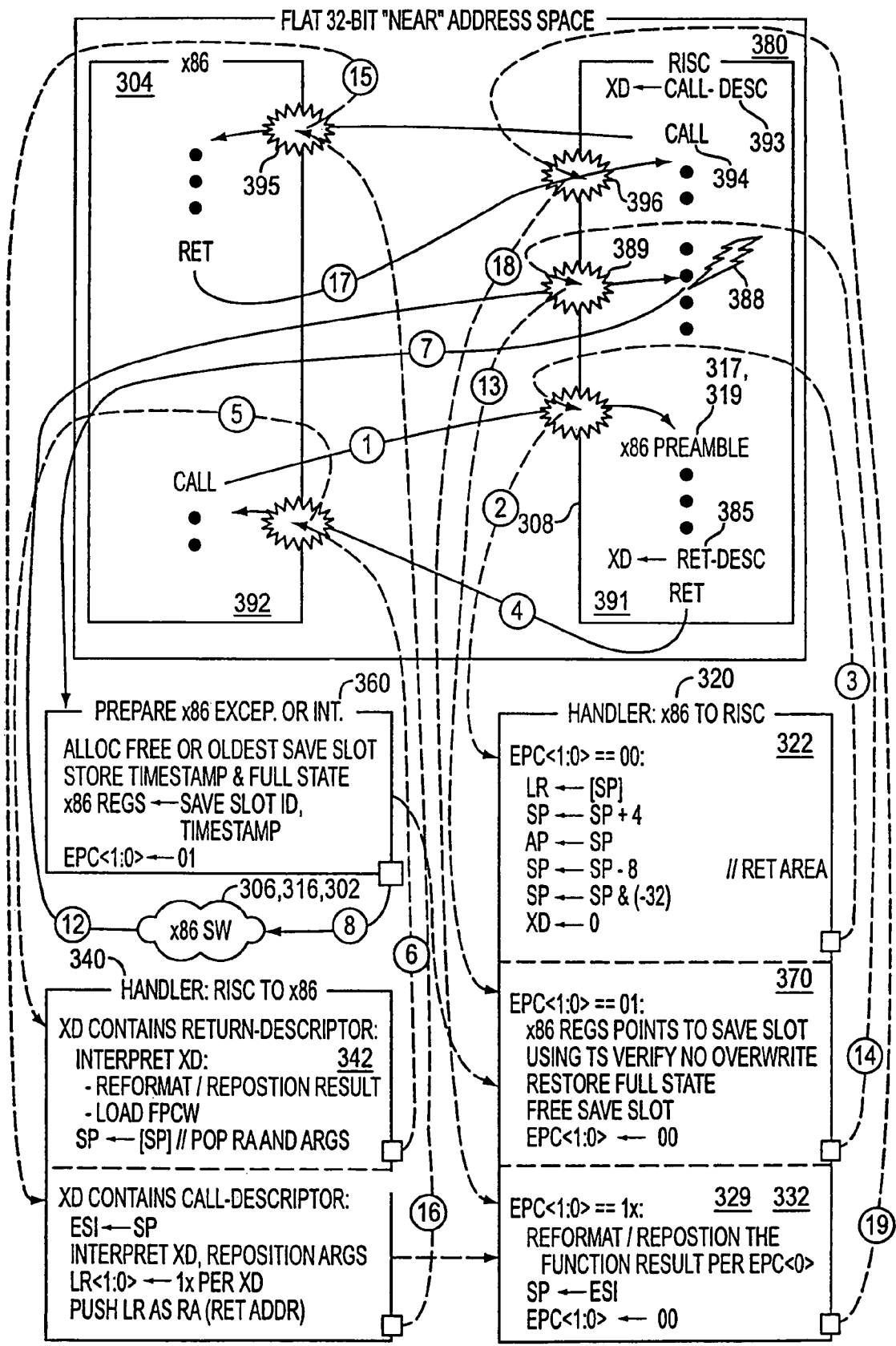

Referring to FIGS. 3a and 3l and to Table 1, X86 threads (e.g., 302, 304) managed by X86 operating system 306, carry the normal X86 context, including the X86 registers, as represented in the low-order halves of r32-r55, the EFLAGS bits that affect execution of X86 instructions, the current segment registers, etc. In addition, if an X86 thread 302, 304 calls native Tapestry libraries 308, X86 thread 302, 304 may embody a good deal of extended context, the portion of the Tapestry processor context beyond the content of the X86 architecture. A thread's extended context may include the various Tapestry processor registers, general registers r1-r31 and r56-r63, and the high-order halves of r32-r55 (see Table 1), the current value of ISA bit 194 (and in the embodiment of section IV, infra, the current value of XP/calling convention bit 196 and semantic context field 206).

The Tapestry system manages an entire virtual X86 310, with all of its processes and threads, e.g., 302, 304, as a single Tapestry process 311. Tapestry operating system 312 can use conventional techniques for saving and restoring processor context, including ISA bit 194 of PSW 190, on context switches between Tapestry processes 311, 314. However, for threads 302, 304 managed by an off-the-shelf X86 operating system 306 (such as Microsoft Windows or IBM OS/2) within virtual X86 process 311, the Tapestry system performs some additional housekeeping on entry and exit to virtual X86 310, in order to save and restore the extended context, and to maintain the association between extended context information and threads 302, 304 managed by X86 operating system 306. (Recall that Tapestry emulation manager 316 runs beneath X86 operating system 306, and is therefore unaware of entities managed by X86 operating system 306, such as processes and threads 302, 304).

Figure 3M:
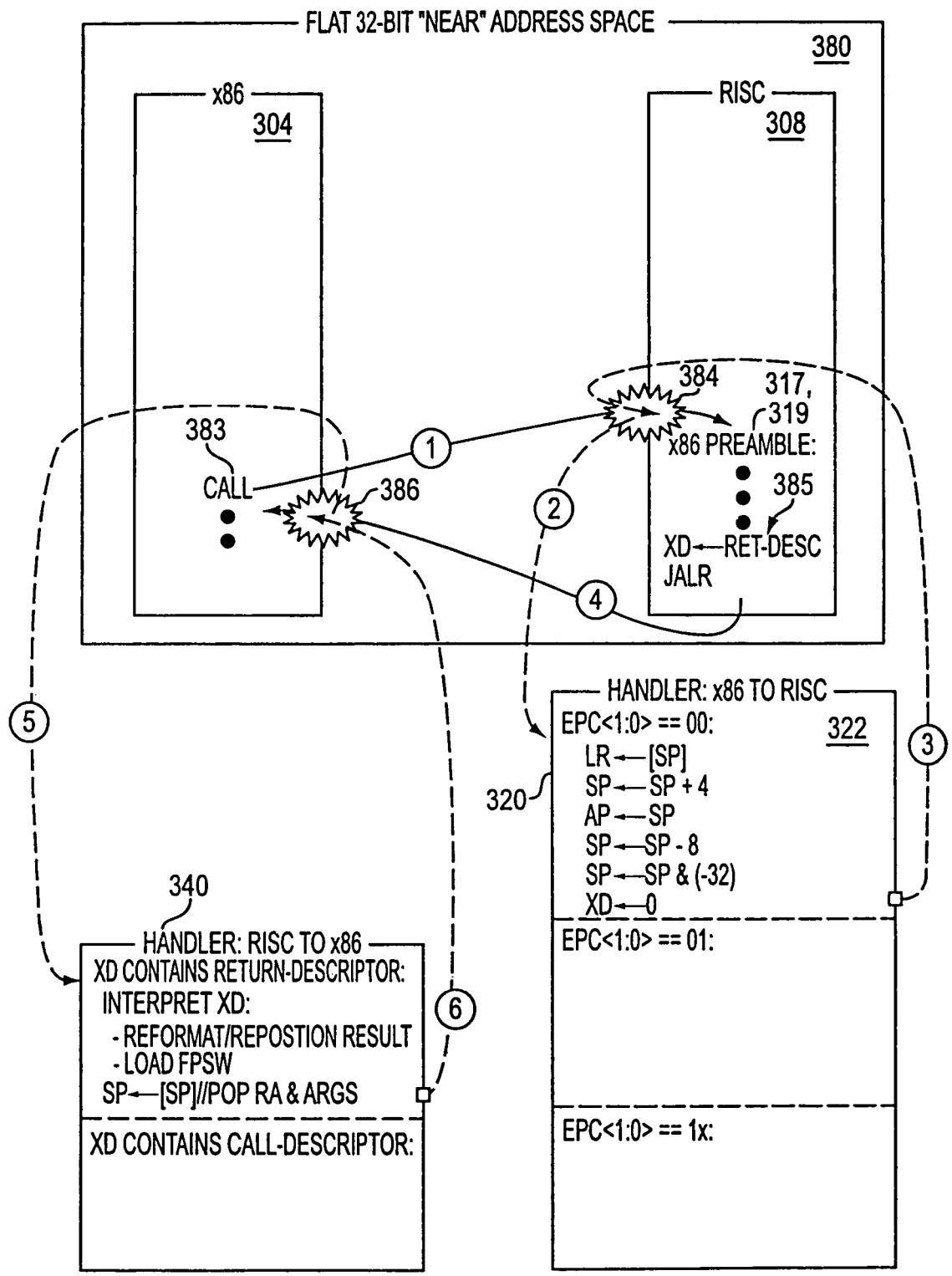
Figure 3N:
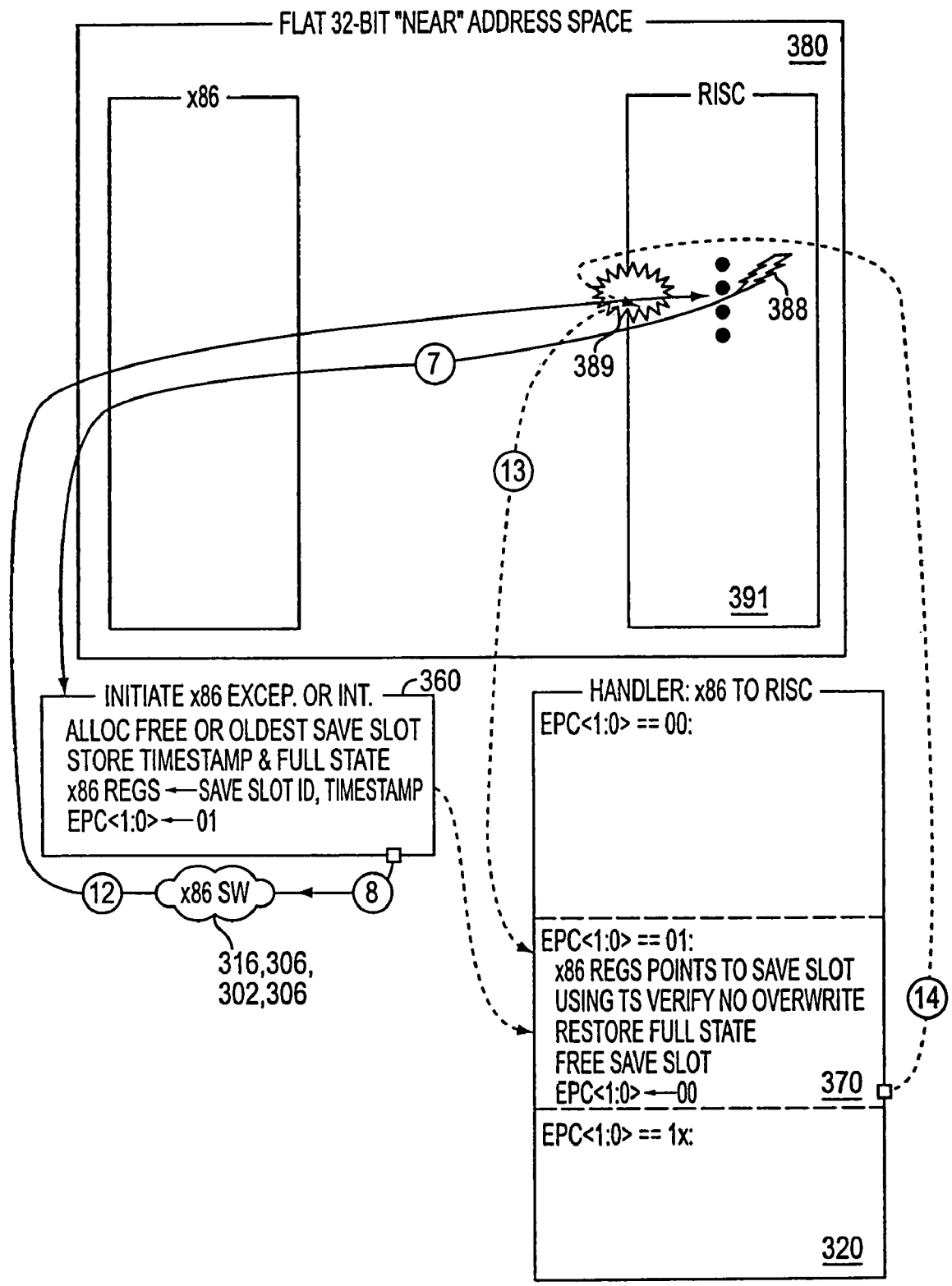
Figure 3O:
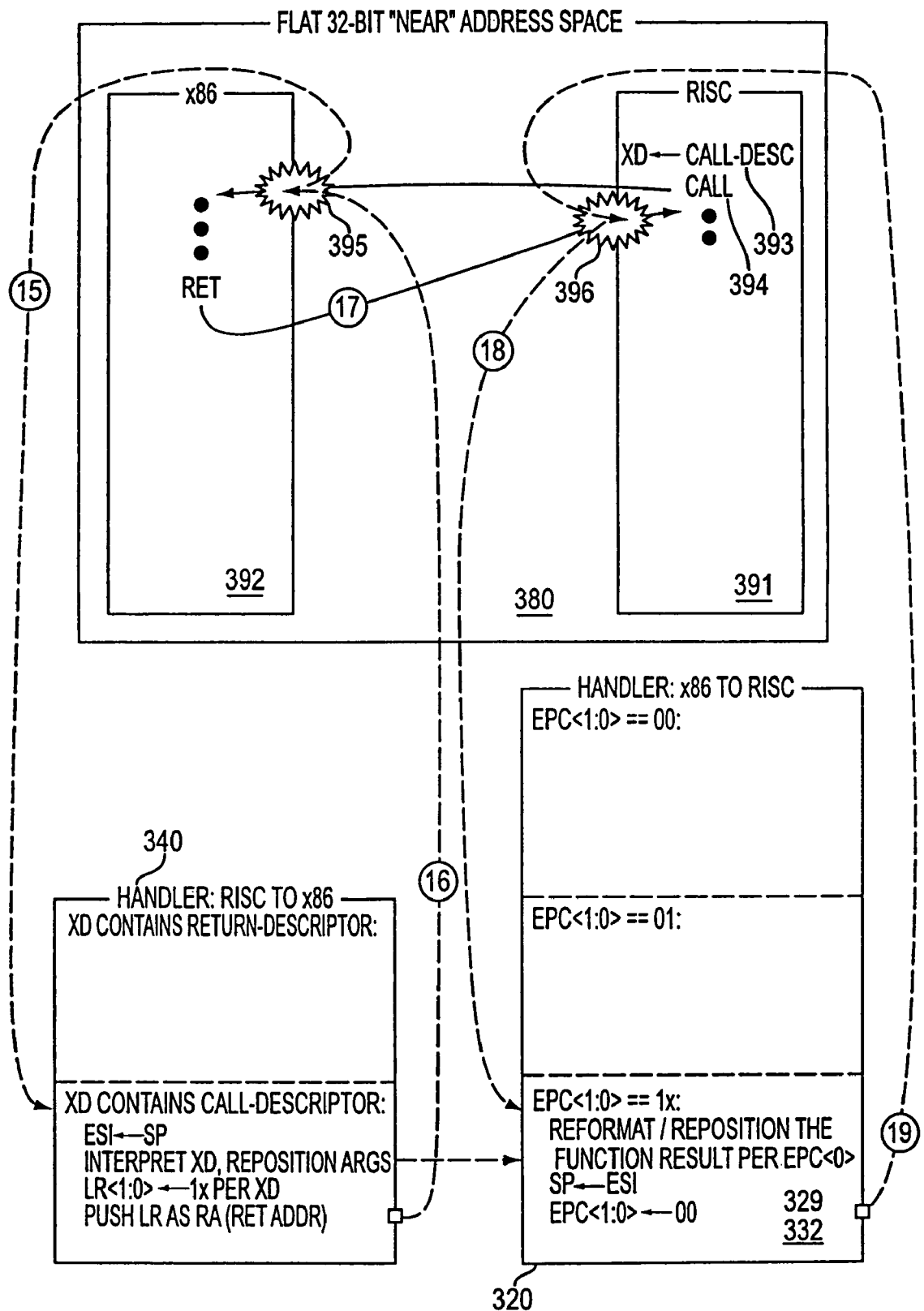

FIGS. 3a-3o describe the mechanism used to save and restore the full context of an X86 thread 304 (that is, a thread that is under management of X86 operating system 306, and thus invisible to Tapestry operating system 312) that is currently using Tapestry extended resources. In overview, this mechanism snapshots the full extended context into a memory location 355 that is architecturally invisible to virtual X86 310. A correspondence between the stored context memory location 355 and its X86 thread 304 is maintained by Tapestry operating system 312 and X86 emulator 316 in a manner that that does not require cooperation of X86 operating system 306, so that the extended context will be restored when X86 operating system 306 resumes X86 thread 304, even if X86 operating system 306 performs several context switches among X86 threads 302 before the interrupted X86 thread 304 resumes. The X86 emulator 316 or Tapestry operating system 312 briefly gains control at each transition from X86 to Tapestry or back, including entries to and returns from X86 operating system 306, to save the extended context and restore it at the appropriate time.

The interaction between hardware converter 136 and software emulator 316 is elaborated in section IX in general, and more particularly in sections IX.A.2 and IX.B.6, infra.

The description of the embodiment of FIGS. 3g-3k, focuses on crossings from one ISA to the other under defined circumstances (subprogram calls and returns and interrupts), rather than the fully general case of allowing transitions on any arbitrary transfer (conditional jumps and the like). Because there is always a Tapestry source or destination at any cross-ISA transfer, and the number of sites at which such a transfer can occur is relatively limited, the Tapestry side of each transition site can be annotated with information that indicates the steps to take to convert the machine state from that established in the source context to that expected in the destination context. In the alternative embodiment of section IV, the hardware supplements this software annotation, to allow the fully general ISA crossing.

The interaction between the native Tapestry and X86 environments is effected by the cooperation of an X86-to-Tapestry transition exception handler (320 of FIG. 3h), a Tapestry-to-X86 transition exception handler (340 of FIG. 3i), interrupt/exception handler (350 of FIG. 3j) of Tapestry operating system 312, and X86 emulator 316 (the software that emulates the portions of the X86 behavior that are not conveniently executed in converter hardware 136).

Because all native Tapestry instructions are naturally aligned to a 0 mod 4 boundary, the two low-order bits <1:0> of a Tapestry instruction address are always known to be Zero. Thus, emulator 316, and exception handlers 320, 340, 350 of Tapestry operating system 312, can pass information to each other in bits <1:0> of a Tapestry instruction address. To consider an example, the return address of a call from native Tapestry code, or the resume address for an interrupt of native code, will necessarily have two Zeros in its least significant bits. The component that gains control (either Tapestry-to-X86 transition handler 340 or Tapestry operating system 312) stores context information in these two low-order bits by setting them as shown in Table 3:

TABLE 3

| | |
|---|---|
| 00 | default case, where X86 caller set no value of these bits - by elimination, this means the case of calling a native Tapestry subprogram |
| 01 | resuming an X86 thread suspended in a native Tapestry subprogram |
| 10 | returning from an X86 callee to a native Tapestry caller, result already in register(s) |
| 11 | returning from an X86 callee to a native Tapestry caller, where the function result is in memory as specified in the X86 calling convention, and is to be copied into registers as specified by the Tapestry calling convention. |

Then, when control is to be returned to a Tapestry caller or to interrupted Tapestry native code, X86-to-Tapestry transition handler 320 uses these two bits to determine the context of the caller that is to be restored, and restores these two bits to Zero to return control to the correct address.

A second information store is the XD register (register R15 of Table 1). The Tapestry calling convention (see section III.B, infra) reserves this register to communicate state information, and to provide a description of a mapping from a machine state under the X86 calling convention to a semantically-equivalent machine context under the Tapestry convention, or vice-versa. The Tapestry cross-ISA calling convention specifies that a caller, when about to call a callee subprogram that may be coded in X86 instructions, sets the XD register to a value that describes the caller's argument list. Similarly, when a Tapestry callee is about to return to what may be an X86 caller, the calling convention requires the callee to set XD to a value that describes the return value returned by the function. From that description, software can determine how that return value should be converted for acceptance by the callee under the X86 calling convention. In each case, the XD value set by the Tapestry code is non-zero. Finally, X86-to-Tapestry transition handler 320 sets XD to zero to indicate to the Tapestry destination that the argument list is passed according to the X86 calling convention. As will be described further infra, each Tapestry subprogram has a prolog that interprets the XD value coming in, to convert an X86 calling convention argument list into a Tapestry calling convention argument list (if the XD value is zero), and Tapestry-to-X86 exception handler 340 is programmed, to interpret the XD value returned from a Tapestry function to convert the function return value into X86 form.

The Tapestry calling convention requires a callee to preserve the caller's stack depth. The X86 convention does not enforce such a requirement. X86-to-Tapestry transition handler 320 and Tapestry-to-X86 transition handler 340 cooperate to enforce this discipline on X86 callees. When Tapestry-to-X86 transition handler 340 detects a call to an X86 callee, transition handler 340 records (343 of FIG. 3*i*) the stack depth in register ESI (R54 of Table 1). ESI is half-preserved by the X86 calling convention and fully preserved by the native convention. On return, X86-to-Tapestry transition handler 320 copies ESI back to SP, thereby restoring the original stack depth. This has the desired side-effect of deallocating any 32 byte hidden temporary created (344 of FIG. 3*i*) on the stack by Tapestry-to-X86 transition handler 340.

B. Subprogram Prologs

A "calling convention" is simply an agreement among software components for how data are to be passed from one component to the next. If all data were stored according to the same conventions in both the native RISC architecture and the emulated CISC architecture, then a transition between two ISA environments would be relatively easy. But they do not. For instance, the X86 calling convention is largely defined by the X86 architecture. Subroutine arguments are passed on a memory stack. A special PUSH instruction pushes arguments onto the stack before a subprogram call, a CALL instruction transfers control and saves the return linkage location on the stack, and a special RET (return) instruction returns control to the caller and pops the callee's data from the stack. Inside the callee program, the arguments are referenced at known offsets off the stack pointer. On the other hand, the Tapestry calling convention, like most RISC calling conventions, is defined by agreement among software producers (compilers and assembly language programmers). For instance, all Tapestry software producers agree that the first subprogram argument will be passed in register 32, the second in register 33, the third in register 34, and so on.

Referring to FIG. 3*g*, any subprogram compiled by the Tapestry compiler that can potentially be called from an X86 caller is provided with both a GENERAL entry point 317 and a specialized NATIVE entry point 318. GENERAL entry point 317 provides for the full generality of being called by either an X86 or a Tapestry caller, and interprets 319 the value in the XD register (R15 of Table 1) to ensure that its parameter list conforms to the Tapestry calling convention before control reaches the body of the subprogram. GENERAL entry point 317 also stores some information in a return transition argument area (RXA, 326 of FIG. 3*h*) of the stack that may be useful during return to an X86 caller, including the current value of the stack pointer, and the address of a hidden memory temp in which large function return values might be stored. NATIVE entry point 318 can only be used by Tapestry callers invoking the subprogram by a direct call (without going through a pointer, virtual function, or the like), and provides for a more-efficient linkage; the only complexities addressed by NATIVE entry point 318 are varargs argument lists, or argument lists that do not fit in the sixteen parameter registers P0-P15 (R32-R47 of Table 1). The value of GENERAL entry point 317 is returned by any operation that takes the address of the subprogram.

C. X86-to-Tapestry Transition Handler

Referring to FIG. 3*h*, X86-to-Tapestry transition handler 320 is entered under three conditions: (1) when code in the X86 ISA calls native Tapestry code, (2) when an X86 callee subprogram returns to a native Tapestry caller, and (3) when X86 operating system 306 resumes a thread 304 that was interrupted by an asynchronous external interrupt while executing native Tapestry code.

X86-to-Tapestry transition handler 320 dispatches 321 on the two-low order bits of the destination address, as obtained in EPC.EIP, to code to handle each of these conditions. Recall that these two bits were set to values reflected in Table 3, supra.

If those two low-order bits EPC<01:00> are "00," case 322, this indicates that this transition is a CALL from an X86 caller to a Tapestry callee (typically a Tapestry native replacement for a library routine that that caller expected to be coded in X86 binary code). Transition handler 320 pops 323 the return address from the memory stack into the linkage register LR (register R6 of Table 1). Pop 323 leaves SP (the stack pointer, register R52 of Table 1) pointing at the first argument of the X86 caller's argument list. This SP value is copied 324 into the AP register (the argument pointer, register R5 of Table 1). SP is decremented 326 by eight, to allocate space for a return transition argument area (the return transition argument area may be used by the GENERAL entry point (317 of FIG. 3*g*) of the callee), and then the SP is rounded down 327 to 32-byte alignment. Finally, XD is set 328 to Zero to inform the callee's GENERAL entry point 317 that this call is arriving with the machine configured according to the X86 calling convention.

If the two low-order bits of the return address EPC<01:00> are "10" or "11," cases 329 and 332, this indicates a return from an X86 callee to a Tapestry caller. These values were previously stored into EPC<01:00> by Tapestry-to-X86 transition handler 340 at the time the X86 callee was called, according to the nature of the function return result expected.

Low-order bits of "11," case 329, indicate that the X86 callee created a large function result (e.g., a 16-byte struct) in memory, as specified by the X86 calling convention. In this case, transition handler 320 loads 330 the function result into registers RV0-RV3 (registers R48-R51 see Table 1) as specified by the Tapestry calling convention. Low-order bits of "10," case 332, indicate that the function result is already in registers (either integer or FP).

In the register-return-value "10" case 332, X86-to-Tapestry transition handler 320 performs two register-based conversions to move the function return value from its X86 home to its Tapestry home. First, transition handler 320 converts the X86's representation of an integer result (least significant 32 bits in EAX, most significant 32 bits in EDX) into the native convention's representation, 64 bits in RV0 (R48 of Table 1). Second, transition handler 320 converts 334 the X86's 80-bit value at the top of the floating-point stack into the native convention's 64-bit representation in RVDP (the register in which double-precision floating-point results are returned, R31 of Table 1).

The conversion for 64-bit to 80-bit floating-point is one example of a change in bit representation (as opposed to a copy from one location to another of an identical bit pattern) that may be used to convert the process context from its source mode to a semantically-equivalent form in its destination mode. For instance, other conversions could involve changing strings from an ASCII representation to EBCDIC or vice-versa, changing floating-point from IBM base 16 format to Digital's proprietary floating-point format or an IEEE format or another floating-point format, from single precision to double, integers from big-endian to little-endian or vice-versa. The type of conversion required will vary depending on the characteristics of the native and non-native architectures implemented.

In the "01" case 370 of resuming an X86 thread suspended during a call out to a native Tapestry subprogram, transition handler 320 locates the relevant saved context, confirms that it has not been corrupted, and restores it (including the true native address in the interrupted native Tapestry subprogram). The operation of case 370 will be described in further detail in sections III.F and III.G, infra.

After the case-by-case processing 322, 329, 332, 370, the two low-order bits of return address in EPC<1:0> (the error PC) are reset 336 to "00" to avoid a native misaligned I-fetch fault. At the end of cases 329 and 332, Register ESI (R54 of Table 1) is copied 337 to SP, in order to return to the stack depth at the time of the original call. An RFE instruction 338 resumes the interrupted program, in this case, at the target of the ISA-crossing control transfer.

D. Tapestry-to-X86 Transition Handler

Referring to FIG. 3i, Tapestry-to-X86 handler 340 is entered under two conditions: (1) a native Tapestry caller calls an X86 callee, or (2) a native Tapestry callee returns to an X86 caller. In either case, the four low-order bits XD<3:0> (the transfer descriptor register, R15 of Table 1) were set by the Tapestry code to indicate 341 the steps to take to convert machine context from the Tapestry calling convention to the X86 convention.

If the four low-order bits XD<03:00> direct 341a return from a Tapestry callee to an X86 caller, the selected logic 342 copies any function return value from its Tapestry home to the location specified by the X86 calling convention. For instance, XD may specify that a 64-bit scalar integer result returned in RV0 is to be returned as a scalar in EAX or in the EDX:EAX register pair, that a double-precision floating-point result is to be copied from RV0 to the top of the X86 floating-point stack as an 80-bit extended precision value, or that a large return value being returned in RV0-RV3 (R48-R51 of Table 1) is to be copied to the memory location specified by original X86 caller and saved in the RXA. The stack depth is restored using the stack cutback value previously saved in the RXA by the GENERAL entry point prolog 317.

If a Tapestry caller expects a result in registers but understands under the X86 calling convention that an X86 function with the same prototype would return the result via the RVA mechanism (returning a return value in a memory location pointed to by a hidden first argument in the argument list), the Tapestry caller sets XD<3:0> to request the following mechanism from handler 340. The caller's stack pointer is copied 343 to the ESI register (R54 of Table 1) to ensure that the stack depth can be restored on return. A naturally-aligned 32-byte temporary is allocated 344 on the stack and the address of that temporary is used as the RVA (R31 of Table 1) value. Bits LR<1:0> are set 345 to "11" to request that X86-to-Tapestry transition handler 320 load 32 bytes from the allocated buffer into RV0-RV3 (R48-R51 of Table 1) when the X86 callee returns to the Tapestry caller.

For calls that will not use the RVA mechanism (for instance, the callee will return a scalar integer or floating-point value, or no value at all), Tapestry-to-X86 transition handler 340 takes the following actions. The caller's stack pointer is copied 343 to the ESI register (R54 of Table 1) to ensure that the stack depth can be restored on return. Bits LR<1:0> are set 346 to "10" as a flag to X86-to-Tapestry transition handler 320, 332 on returning to the native caller. For calls, handler 340 interprets 347 the remainder of XD to copy the argument list from the registers of the Tapestry calling convention to the memory locations of the X86 convention. The return address (LR) is pushed onto the stack.

For returns from Tapestry callees to X86 callers, the X86 floating-point stack and control words are established.

Tapestry-to-X86 transition handler 340 concludes by establishing 348 other aspects of the X86 execution environment, for instance, setting up context for emulator 316 and profiler 400. An RFE instruction 349 returns control to the destination of the transfer in the X86 routine.

E. Handling ISA Crossings on Interrupts or Exceptions in the Tapestry Operating System Referring to FIG. 3j in association with FIGS. 3a and 3l, most interrupts and exceptions pass through a single handler 350 in Tapestry operating system 312. At this point, a number of housekeeping functions are performed to coordinate Tapestry operating system 312, X86 operating system 306, processes and threads 302, 304, 311, 314 managed by the two operating systems 306, 312, and the data configuration of those processes and threads that may need to be altered to pass from one calling convention to the other.

A number of interrupts and exceptions are skimmed off and handled by code not depicted in FIG. 3j. This includes all interrupts directed to something outside virtual X86 310, including all synchronous exceptions raised in other Tapestry processes, the interrupts that drive housekeeping functions of the Tapestry operating system 312 itself (e.g., a timer interrupt), and exceptions raised by a Tapestry native process 314

(a process under the management of Tapestry operating system 312). Process-directed interrupts handled outside FIG. 3*j* include asynchronous interrupts, the interrupts not necessarily raised by the currently-executing process (e.g., cross-processor synchronization interrupts). These interrupts are serviced in the conventional manner in Tapestry operating system 312: the full Tapestry context of the thread is saved, the interrupt is serviced, and Tapestry operating system 312 selects a thread to resume.

Thus, by the time execution reaches the code shown in FIG. 3*j*, the interrupt is guaranteed to be directed to something within virtual X86 310 (for instance, a disk completion interrupt that unblocks an X86 thread 302, 304, or a page fault, floating-point exception, or an INT software interrupt instruction, raised by an X86 thread 302, 304), and that this interrupt must be reflected from the Tapestry handlers to the virtual X86 310, probably for handling by X86 operating system 306.

Once X86 operating system 306 gains control, there is a possibility that X86 operating system 306 will context switch among the X86 processes 302, 304. There are two classes of cases to handle. The first class embraces cases 351, 353, and 354, as discussed further infra. In this class of cases, the interrupted process has only X86 state that is relevant to save. Thus, the task of maintaining the association between context and thread can be handed to the X86 operating system 306: the context switch mechanism of that operating system 306 will perform in the conventional manner, and maintain the association between context and process. On the other hand, if the process has extended context that must be saved and associated with the current machine context (e.g., extended context in a Tapestry library called on behalf of a process managed by X86 OS), then a more complex management mechanism must be employed, as discussed infra in connection with case 360.

If the interrupted thread was executing in converter 136, as indicated by ISA bit 194 of the EPC, then the exception is handled by case 351. Because the interrupted thread is executing X86 code entirely within the virtual X86, the tasks of saving thread context, servicing the interrupt, and selecting and resuming a thread can be left entirely to X86 operating system 306. Thus, Tapestry operating system 306 calls the "deliver interrupt" routine (352 of FIG. 3*a*) in X86 emulator 316 to reflect the interrupt to virtual X86 310. The X86 operating system 306 will receive the interrupt and service it in the conventional manner.

If an interrupt is directed to something within virtual X86 310, while TAXi code (a translated native version of a "hot spot" within an X86 program, see section I.D, supra, as indicated by the TAXi_Active bit 198 of the EPC) was running, then the interrupt is handled by case 353. Execution is rolled back to an X86 instruction boundary. At an X86 instruction boundary, all Tapestry extended context external to the X86 310 is dead, and a relatively simple correspondence between semantically-equivalent Tapestry and X86 machine states can be established. Tapestry execution may be abandoned—after the interrupt is delivered, execution may resume in converter 136. Then, if the interrupt was an asynchronous external interrupt, TAXi will deliver the appropriate X86 interrupt to the virtual X86 supplying the reconstructed X86 machine state, and the interrupt will be handled by X86 operating system 306 in the conventional manner. Else, the rollback was induced by a synchronous event, so TAXi will resume execution in converter 136, and the exception will be re-triggered, with EPC.ISA 194 indicating X86, and the exception will be handled by case 351.

If the interrupted thread was executing in X86 emulator 316, as indicated by the EM86 bit of the EPC, the interrupt is handled by case 354. This might occur, for instance, when a high-priority X86 interrupt interrupts X86 emulator 316 while emulating a complex instruction (e.g. far call through a gate) or servicing a low-priority interrupt. The interrupt is delivered to emulator 316, which handles the interrupt. Emulator 316 is written using re-entrant coding to permit re-entrant self-interruption during long-running routines.

Case 360 covers the case where the interrupt or exception is directed to something within virtual X86 310, and the current thread 304, though an X86 thread managed by X86 operating system 306, is currently executing Tapestry code 308. For instance, an X86 program may be calling a native Tapestry library. Here, the interrupt or exception is to be serviced by X86 operating system 306, but the thread currently depends on Tapestry extended context. In such a case, X86 operating system 306 may perform a context switch of the X86 context, and the full Tapestry context will have to be restored when this thread is eventually resumed. However, X86 operating system 306 has no knowledge of (nor indeed has it addressability to) any Tapestry extended context in order to save it, let alone restore it. Thus, case 360 takes steps to associate the current Tapestry context with the X86 thread 304, so that the full context will be re-associated (by code 370 of FIG. 3*h*) with thread 304 when X86 operating system 306 resumes the thread's execution.

Referring briefly to FIG. 3*k*, during system initialization, the Tapestry system reserves a certain amount of nonpageable storage to use as "save slots" 355 for saving Tapestry extended context to handle case 360. The save slot reserved memory is inaccessible to virtual X86 310. Each save slot 355 has space 356 to hold a full Tapestry context snapshot. Each save slot 355 is assigned a number 357 for identification, and a timestamp 358 indicating the time at which the contents of the save slot were stored. Full/empty flag 359 indicates whether the save slot contents are currently valid or not. In an alternative embodiment, a timestamp 358 of zero indicates that the slot is unused.

Returning to FIG. 3*j*, case 360 is handled as follows. A save slot 355 is allocated 361 from among those currently free, and the slot is marked as in use 359. If no save slot is free, then the save slot with the oldest time stamp 358 is assumed to have been stranded, and is forcibly reclaimed for recycling. Recall that the save slots 355 are allocated from non-paged storage, so that no page fault can result in the following stores to the save slot. The entire Tapestry context, including the X86 context and the extended context, and the EIP (the exception instruction pointer, the address of the interrupted instruction) is saved 362 into the context space 356 of allocated save slot 355. The two low-order bits of the EIP (the address at which the X86 IP was interrupted) are overwritten 363 with the value "01," as a signal to X86-to-Tapestry transition handler 320, 370. The EIP is otherwise left intact, so that execution will resume at the interrupted point. (Recall that case 360 is only entered when the machine was executing native Tapestry code. Thus, the two low-order bits of the EIP will arrive at the beginning of handler 350 with the value "00," and no information is lost by overwriting them). The current 64-bit timestamp is loaded 364 into the EBX:ECX register pair (the low order halves of registers R49 and R51, see Table 1) and redundantly into ESI:EDI (the low order halves of registers R54-R55) and the timestamp member (358 of FIG. 3*k*) of save slot 355. The 32-bit save slot number 357 of the allocated save slot 355 is loaded 365 into the X86 EAX register (the low order half of register R48) and redundantly in EDX (the low order half of register R50). Now that all of the Tapestry extended context is stored in the save slot 355, interrupt handler 350 of Tapestry operating system 312 now transfers control to the "deliver interrupt" entry point 352 of X86 emulator 316. X86 operating system 306 is invoked to handle the interrupt.

Interrupt delivery raises a pending interrupt for the virtual X86 310. The interrupt will be accepted by X86 emulator 316 when the X86 interrupt accept priority is sufficiently high. X86 emulator 316 completes delivery of the interrupt or exception to the X86 by emulating the X86 hardware response to an interrupt or exception: pushing an exception frame on the stack (including the interrupted X86 IP, with bits <1:0> as altered at step 363 stored in EPC), and vectoring control to the appropriate X86 interrupt handler.

Execution now enters the X86 ISR (interrupt service routine), typically in X86 operating system 306 kernel, at the ISR vectored by the exception. The X86 ISR may be an off-the-shelf routine, completely unmodified and conventional. A typical X86 ISR begins by saving the X86 context (the portion not already in the exception frame—typically the process' registers, the thread ID, and the like) on the stack. The ISR typically diagnoses the interrupting condition, services it, and dismisses the interrupt. The ISR has full access to the X86 context. X86 operating system 306 will not examine or rely on the contents of the X86 processor context; the context will be treated as a "black box" to be saved and resumed as a whole. As part of servicing the interrupt, the interrupted thread is either terminated, put to sleep, or chosen to be resumed. In any case, the ISR chooses a thread to resume, and restores the X86 context of that thread. The ISR typically returns control to the selected thread either via an X86 IRET instruction or an X86 JUMP. In either case, the address at which the thread is to be resumed is the address previously pushed in an X86 exception frame when the to-be-resumed thread was interrupted. The thread resumed by X86 operating system 306 may be either interrupted thread 304 or another X86 thread 302.

F. Resuming Tapestry Execution from the X86 Operating System

Referring again to FIG. 3h, X86 operating system 306 eventually resumes interrupted thread 304, after a case 360 interrupt, at the point of interruption. X86 operating system 306 assumes that the thread is coded in X86 instructions. The first instruction fetch will be from a Tapestry page (recall that execution enters case 360 only when interrupted thread 304 was executing Tapestry native code). This will cause an X86-to-Tapestry transition exception, which will vector to X86-to-Tapestry transition handler 320. Because the low-order two bits of the PC were set (step 363 of FIG. 3j) to "01," control dispatches 321 to case "01" 370.

In step 371, the save slot numbers in the X86 EAX and EDX registers are cross-checked (recall that the save slot number was stored in these registers by step 365 of FIG. 3j), and the timestamp stored 362 in EBX:ECX is cross-checked with the timestamp stored in ESI:EDI. If either of these cross-checks 371 fails, indicating that the contents of the registers was corrupted, an error recovery routine is invoked 372. This error routine may simply kill the corrupted thread, or it may bring the whole TAXi system down, at the implementer's option. If the time stamps pass validation, the timestamp from the EBX:ECX register pair is squirreled away 373 in a 64-bit exception handler temporary register that will not be overwritten during restoration of the full native context. The contents of register EAX is used as a save slot number to locate 374 the save slot 355 in which the Tapestry context is stored 362. The entire Tapestry native context is restored 375 from the located save slot 355, including restoration of the values of all X86 registers. Restore 375 also restores the two low-order bits EPC<1:0> to Zero. The save slot's timestamp 358 is cross-checked 376 against the timestamp squirreled away 373 in the temporary register. If a mismatch of the two timestamps indicates that the save slot was corrupted, then an error recovery routine is invoked 377. The save slot is now empty, and is marked 378 as free, either by clearing full/empty flag 359 or by setting its timestamp 358 to zero. Execution is resumed at the EPC.EIP value by RFE instruction 338, in the Tapestry code at the point following the interrupt.

Referring again to FIG. 3k, in an alternative embodiment, save slots 355 are maintained in a variation of a queue: hopefully-empty save slots to be filled are always allocated from the head 379a of the queue, full save slots to be emptied may be unlinked from the middle of the queue, and save slots may be entered into the queue at either the head 379a or tail 379b, as described infra. A double-linked list of queue entries is maintained by links 379c. At step 361, a save slot is allocated from the head 379a of the allocation queue. After step 365, the filled save slot 355 is enqueued at tail 379b of the save slot queue. At step 377, the emptied save slot 355 is queued at the head 379a of the queue.

This alternative head-and-tail queuing protocol 361, 379a, 379b, 379c, 375 for save slots 355 has the following effects. The queue remains sorted into two partitions. The portion toward head 379a accumulates all save slots 355 known to be free. The portion toward the tail 379b holds all slots thought to be busy, in least-recently-used order. Over time, all stale slots (those thought to be busy but whose threads have disappeared) will accumulate at the boundary between the two partitions, because any time a slot with a timestamp older than that of a stale slot is resumed, the emptied slot is removed from the busy tail partition is moved to the free head partition. Normally, allocations will occur by intensively recycling the most recently freed slots at the head of the free partition while truly busy slots will cluster at the tail of the busy partition. When all known-free save slots 355 are exhausted and an apparently-busy save slot 355 is overwritten, the busy save slots 355 will be selected in least recently used to most recently busied.

In an alternative embodiment, a native Tapestry process would be allowed to call into an X86 library 308. Exceptions raised in the X86 code would be serviced by Tapestry operating system 312, filtered out in handler 350 of FIG. 3j before the decision point reaches the beginning of the code shown in FIG. 3j.

G. An Example

Referring to FIG. 3m in conjunction with FIGS. 3a, 3g, 3h, 3i, 3l and 3n, consider an example of a call by an X86 caller thread 304 to a Tapestry callee library 308, an interrupt 388 in the library that is serviced by X86 operating system 306, a context switch to another X86 thread 302 and a resumption of Tapestry callee 308, and a return to the X86 caller 304.

Tapestry library 308 is mapped 382 into a 32-bit flat address space 380. From the point of view of X86 caller thread 304, this is the process' address space. From the point of view of the Tapestry machine and operating system 312, the 32-bit address space is simply an address space that is mapped through page tables (170 of FIGS. 1a and 1d), and whose contents and meaning are left entirely to the management of X86 operating system 306.

Initially, thread 304 is executing on virtual X86 310. Thread 304 executes an X86 CALL instruction 383, seeking a library service. The binary code for thread 304 is conventional X86 code, not specially compiled for use in a Tapestry system. CALL instruction 383 transfers control (arrow ①) to the entry point of library 308. This is the GENERAL entry point (317 of FIG. 3g) for a Tapestry-binary replacement for the library. Fetching the first instruction from the entry preamble 317, 319 for Tapestry native library routine 308, induces a change from X86 ISA to Tapestry ISA. Processor 100 takes a transition exception 384, and vectors (arrow ②) to X86-to-Tapestry transition handler (320 of FIG. 3h). Because all Tapestry instructions are aligned to a 0 mod 4 boundary, the two low-order bits of the interrupt address are "00." Accordingly, transition handler 320 dispatches 321 to the "00" case 322 to establish the preconditions for execution in the Tapestry context (32-byte aligned stack, etc.). At the end of transition handler 320, execution resumes 338 (arrow ③) at GENERAL entry point 317. GENERAL entry point 317 begins by executing the X86 preamble (319 of FIG. 3g), which copies the parameter list into the P0-P15 parameter registers, and execution of the body of Tapestry library routine 308 begins.

Assume that Tapestry library routine 308 runs to completion without an interrupt or call back to X86 code.

When Tapestry library routine 308 completes 385, routine 308 loads a value describing the form of its return value into XD register (R15 of Table 1). This value will indicate a return value in RV0, RVFP, or a memory location, as appropriate. Routine 308 concludes with a Tapestry JALR instruction to return (arrow ④). As the first instruction is fetched from X86 caller thread 304, a transition 386 from Tapestry ISA to X86 ISA is recognized, and control vectors (arrow ⑤) to Tapestry-to-X86 transition handler (340 of FIG. 3i). Transition handler dispatches 341 on the value of XD<03:00> to one of the return cases 342, which copies the return value from its Tapestry home to its home under the X86 calling convention. When transition handler 340 completes, it returns control (RFE instruction 349 of FIG. 3i, arrow ⑥) of FIGS. 3a, 3l and 3m) to the instruction in thread 304 following the initial CALL 383.

Referring now to FIG. 3n in conjunction with FIGS. 3a, 3h, 3j and 3l, assume that an external asynchronous interrupt 388 occurred midway through the execution of Tapestry library routine 308. To establish the example, assume that the interrupt is a disk-completion interrupt that unblocks a second, higher-priority X86 thread 302. The interrupt vectors (arrow ⑦) to the interrupt/exception handler (350 of FIG. 3j) of Tapestry operating system 312. After disqualifying cases 351, 353, 354, interrupt handler 350 selects case 360. The full processor context is saved 362 in a save slot 355, the two low-order bits EIP<01:00> are overwritten 363 with "01," as described in Table 3, and the save slot number and timestamp information are loaded 364, 365 into the X86 registers. The interrupt handler 360 delivers the interrupt (369 of FIG. 3j) to the interrupt entry point 352 of X86 emulator 316 (arrow ⑧). X86 emulator 316 passes control to X86 operating system 306 (arrow ⑨). X86 operating system 306 services the interrupt in the conventional manner. However, the context that X86 operating system 306 saves for thread 304 is the collection of timestamp and save slot number information with the EIP intact except for its two low-order bits, cobbled up by step 363 of Tapestry exception handler 360 to conform to Table 3. As assumed earlier in this paragraph, X86 operating system 306 selects thread 302 to be resumed (arrow ⑩).

After X86 thread 302 has executed for a time, it eventually cedes control (arrow (11)) back to X86 operating system 306, for instance because its time slice expires, it issues a new disk request, or the like. Assume that the X86 operating system's scheduler now selects thread 304 to be resumed. The context restored by X86 operating system 306 is the timestamp and save slot number "context" cobbled up by exception handler 360. The EIP of this restored context points to the instruction following the interrupted 388 instruction, with "01" in the two low-order bits. X86 operating system 306 executes an IRET instruction to resume execution at this restored context (arrow (12)). This instruction fetch will recognize the transition 389 from the X86 ISA of X86 operating system 306 to the Tapestry ISA of Tapestry library 308, and will vector (arrow (13)) to X86-to-Tapestry transition handler 320 (FIG. 3h). Transition handler 320 dispatches 321 on the two low-order bits of the EIP address to case 370. The code of case 370 looks in the X86 registers to find the address of the save slot 355 corresponding to the process to be resumed. The content of the X86 registers and found save slot 355 are validated 371, 374, 376 by comparing the redundantly-stored timestamps and save slot numbers against each other. The content of save slot 355 restores 375 the full Tapestry processor context. Transition handler 320 resumes 378 execution of the Tapestry library routine 308 (arrow (14)) at the point of the original external interrupt 388.

Referring to FIG. 3o in conjunction with FIGS. 3a, 3h, 3j and 3l, consider the case of a call from a Tapestry native caller 391 to an X86 callee 392. (Recall from the discussion of FIG. 3b that neither is specially coded to be tailored to this scenario—the X86 callee was generated by a conventional X86 compiler, and the Tapestry caller 391 is coded to work equally well whether the callee is an X86 callee 392 or a Tapestry callee.) Caller 391 sets 393 the value of the XD register (R15 of Table 1) to a value that describes the layout in the Tapestry registers (R32-R47 of Table 1) of its argument list. Then caller 391 issues a JALR instruction 394 to call to callee 392. On arrival at the first instruction of callee 392, processor 100 recognizes a Tapestry-to-X86 transition 395. Execution vectors (arrow (15)) to Tapestry-to-X86 exception handler (340 of FIG. 3i). The four low-order bits XD<3:0> were set by instruction 393 to contain a basic classification of the XD descriptor, and execution is dispatched 341 according to those four bits, typically to code segment 343-345 or to segment 343, 346, 347. The dispatched-to code segment moves 347 the actual parameters from their Tapestry homes to their X86 homes, as directed by the remainder of the XD register. Handler 340 overwrites 345, 346 the two low-order bits of the return PC, LR<1:0> with either "10" or "11" to indicate the location in which caller 391 expects the return result, as described in Table 3. Handler 340 returns (arrow (16)) to the first instruction of X86 callee 392, which executes in the conventional manner. When callee 392 completes, an X86 RET instruction returns control to caller 391 (arrow (17)). The first instruction fetch from caller 391 will trigger a transition exception 396. The exception vectors (arrow (18)) control to X86-to-Tapestry handler 320. Based on the two low-order bits of LR, handler 320 reformats and/or repositions 330, 333, 334 the function return value. The handler completes 336, 338, and returns control (arrow (19)) to the instruction in caller 391 following the original call 394.

Referring again to FIGS. 3a and 3l, the complexity is confined to cases of cross-ISA calls. Complexity in handling cross-ISA calls is acceptable because transparent cross-ISA calling is not previously known in the art. In a case where caller, callee, and operating system all share a common ISA, no transition exceptions occur. For instance, when a Tapestry process 314 calls (arrow (20)) the same Tapestry library routine 308, routine 308 enters through NATIVE entry point 318, or takes the Tapestry short path through GENERAL entry point 317. (Note that routine 308 will have to be separately mapped 397 into the address space of Tapestry process 314—recall that Tapestry process 314 is under the management of Tapestry OS 312, while the address space 380 of an X86 process is entirely managed by X86 operating system 306, entirely outside the ken of Tapestry operating system 312). If the same external interrupt 388 occurs (arrow (21)), the interrupt can be handled in Tapestry operating system 312 (outside the code of FIG. 3j), and control will directly resume (arrow (22)) at the instruction following the interrupt, without tracing through the succession of handlers. When Tapestry library routine 308 completes, control will return to the caller (arrow (23)) in the conventional manner. The only overhead is a single instruction 393, setting the value of XD in case the callee is in X86 code.

H. Alternative Embodiments

In an alternative embodiment, a "restore target page" of memory is reserved in the operating system region of the X86 address space. In PFAT 172, ISA bit 180 for the restore target page is set to indicate that the instructions on the page are to be interpreted under the Tapestry instruction set. This restore target page is made nonpageable. At step 363 of FIG. 3j, the EIP value is replaced with an X86 address pointing into the restore target page, typically with byte offset bits of this replacement EIP storing the number of the save slot. In an alternative embodiment, the EIP is set to point to the restore target page, and the save slot number is stored in one of the X86 registers, for instance EAX. In either case, when X86 operating system 306 resumes the thread, the first instruction fetch will trigger an X86-to-Tapestry transition exception, before the first actual instruction from the restore target page is actually executed, because the restore target page has the Tapestry ISA bit set in its PFAT and I-TLB entries. X86-to-Tapestry transition handler 320 begins by testing the address of the fetched instruction. An address on the restore target page signals that there is extended context to restore. The save slot number is extracted from the instruction address (recall that the save slot number was coded into the EPC or EAX on exception entry, both of which will have been restored by X86 operating system 306 in the process of resuming the thread). The processor context is restored from the save slot, including the EPC.EIP value at which the thread was originally interrupted. In an alternative embodiment, only the extended context (not including the X86 context) is restored from the save slot, so that any alterations to the X86 context effected by Tapestry operating system 312 are left intact. X86-to-Tapestry transition handler 320 executes an RFE 338 to resume execution in the interrupted Tapestry code.

Note that no instruction from the restore target page is actually executed; the address is simply a flag to X86-to-Tapestry transition handler 320. All that is required is that the address of the restore target page be representable in the X86 address space, so that the address can pass through X86 operating system 306 and its thread scheduler. In alternative embodiments, a fetch from the restore target page could raise another exception—an unaligned instruction fault, or an access protection fault. It is desirable, however, that the fault raised be one not defined in the X86 architecture, so that no user program can register a handler for the fault.

In this alternative embodiment, the "01" case 370 of X86-to-Tapestry transition handler 320 may also save the X86 thread's privilege mode, and reset the privilege level to user, even if the X86 caller was running in privilege ring zero. The privilege mode is changed to protect system integrity, to disallow a Tapestry Trojan horse from subverting X86 security checks.

In an alternative embodiment, the correspondence between save slots and X86 threads is maintained by using thread-ID calls into X86 operating system 306. Each save slot 355 may be associated with a Windows thread number for the duration of that thread. A garbage collector may be used to recognize save slots that were filled a long time ago and are now apparently abandoned. The garbage collector reclaims save slots after a system-tunable time period, or on a least-recently-filled basis, on the assumption that the thread was terminated by X86 operating system 306.

In another alternative embodiment, when Tapestry takes an exception while in X86 converter mode, the extended context is snapshotted as well. If the operating system uses the X86 TSS (Task-State Segment) to implement multi-tasking, then the PSW portion of the extended context (ISA 194, XP/calling convention 196, and semantic class 206, see section IV, infra) can be snapshotted into unused parts of the X86 TSS. Otherwise the amount of data involved, five bits (ISA bit 194, XP/calling convention bit 196, and semantic context 206), is small enough that it can be squirreled away within the ten unused bits at the top of EFLAGS. In some embodiments, it may be possible to push the extended context as an additional word pushed onto the exception stack in X86 space.

In another alternative embodiment, the extended context can be stored in memory in Tapestry space, where it is inaccessible to the X86. A hash table (or an equivalent associative software structure) links a particular X86 exception frame to its associated snapshot of the extended Tapestry context, so that on exception exit or task rescheduling, when the processor reloads a particular X86 context into the EPC (error PC and program status word), in turn to be reloaded into the PSW by an RFE instruction (or when an X86 POPF instruction is emulated), the extended Tapestry context can be located and placed in the EPC as well.

IV. An Alternative Method for Managing Transitions from One ISA to the Other

A. Indicating the Calling Convention (CC) for Program Text

Sections IV.A and IV.B together describe an alternative mechanism used to determine the conventions under which data are passed to or from a subprogram, and thus the locations in which subprogram arguments or a function return value are stored before a control-transfer event, so that an exception handler can move the data to the locations expected by the code to be executed after the control-flow event.

In the alternative Tapestry emulation of the X86 CISC architecture, any particular extent of native code observes one of two different calling conventions (see section III.B, supra): one RISC register-based calling convention for calls from native Tapestry code to native Tapestry code, and another quasi-CISC memory-based convention that parallels the emulated CISC calling convention, for use when it is believed likely that the call will most frequently cross from one ISA to the other. The features described in sections IV.A and IV.B provide sufficient information about the machine context so that a transition from one ISA to the other can be seamlessly effected.

Referring again to FIG. 3a, programs coded in the native Tapestry instruction set, when calling a subprogram, may use either a register-based RISC calling convention, or a memory-based calling convention that parallels the X86 convention. In X86 converter mode, all subprogram calls use the memory-stack-based calling convention. In either mode, control may be transferred by an internal jump in which the data passes from source to destination simply by its location in certain memory or register locations.

Program text regions 176 are annotated with a bit 200 that indicates the calling convention used by the code in the region. When execution flows from a source observing one calling convention to a destination observing another, the difference in calling convention bits 200 will trigger a transition exception. The transition exception handler copies the subprogram arguments from the well-known location established by the source convention to the well-known location expected by the destination. This allows caller and callee subprograms to be compiled with no reliance on the calling convention used by the other, and allows for more seamless system operation in an environment of binaries and libraries of inhomogeneous ISA.

Referring to FIGS. 1*d* and 2*a*, calling convention bit 200 is stored in PFAT entries 174 and I-TLB 116 in a manner analogous to ISA bit 180, 182 with a record of the calling convention of the previous instruction available in PSW 190 calling convention bit 196, as discussed in section II, supra; the alternative embodiments discussed there are equally applicable here. (Because the calling convention property 200 is only meaningful for pages of Tapestry code, and the XP write-protect property 184, 186 (discussed in section I.F, supra) is only used for pages of X86 code, the two properties for a given page can encoded in a single physical bit, overlaying the XP write-protect bits 184, 186—this single bit has different meanings depending on the PSW.ISA bit 194).

Referring to FIGS. 2*b* and 2*c*, when execution crosses (column 204) from a region of one calling convention 200 to a region of another calling convention 200, the machine takes an exception. Based on the direction of the transition (Tapestry-to-X86 or X86-to-Tapestry) and a classification (as shown in Table 4 and discussed in IV.B, infra) of the instruction that provoked the transition, the exception is vectored to an exception handler that corresponds to the direction and classification. The eight calling convention transition exception vectors are shown in the eight rows 242-256 of FIG. 2*c*. (The eight exception vectors for calling convention transitions are distinct from the two exception vectors for ISA transitions discussed in section II, supra.) The exception vectoring is specific enough that arrival at a specific handler largely determines a mapping from the old machine context to a machine context that will satisfy the preconditions for execution in the new environment. The exception handler implements this mapping by copying data from one location to another. The exception handler operates during an exception interposed between the source instruction and the destination instruction, transforming the machine context from that produced by the last instruction of the source (for instance, the argument passing area established before a CALL) to the context expected by the first instruction of the destination (the expectations of the code that will begin to use the arguments).

Further information used to process the transition exception, and the handling of particular exception cases, is described in section IV.B, infra.

B. Recording Transfer of Control Semantics and Reconciling Calling Conventions

Merely knowing the direction of a transition (from X86 calling convention to Tapestry convention or vice versa) is insufficient to determine the actions that must be taken on a transition exception when the data storage conventions disagree. This section describes a further technique used to interpret the machine context, so that the appropriate action can be taken on a transition exception. In overview, as each control-transfer instruction is executed, the intent or semantic class of the instruction is recorded in the SC (semantic class) field 206 (PSW.SC) of PSW (the Program Status Word) 190. On a transition exception, this information is used to vector to an exception handler programmed to copy data from one location to another in order to effect the transition from the old state to the new precondition.

TABLE 4

| ISA of source | semantic class value | representative Meaning | instructions |
| --- | --- | --- | --- |
| Tap | 00 | Call | JAL, JALR |
| Tap | 01 | Jump | conditional jump, J, JALR |
| Tap | 10 | Return with no FP result | JALR |
| Tap | 11 | Return with FP result | JALR |
| X86 | 00 | Call | CALL |
| X86 | 01 | Jump | JMP, Jcc |
| X86 | 10 | Return with no FP result | RET |
| X86 | 11 | Return with (possible) FP result | RET |

Figure 1E:
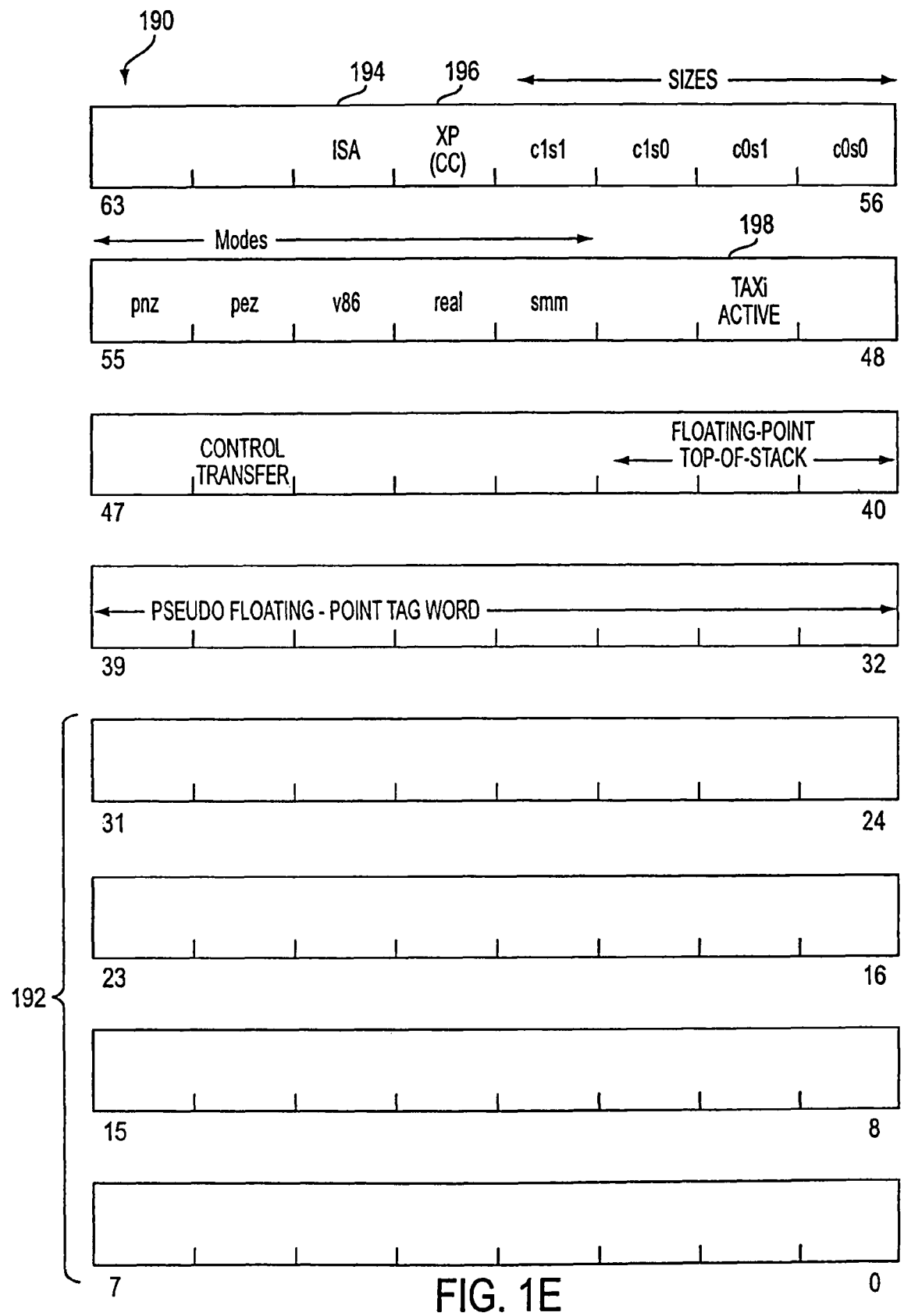
FIG. 1e is a diagram of a PSW (program status word) of a system as shown in FIGS. 1a-1d.

Referring to FIGS. 1*e* and 2*c* and to Table 4, the control-flow instructions of both the Tapestry ISA and the X86 ISA are classified into five semantic classes: JUMP, CALL, RETURN-NO-FP (return from a subprogram that does not return a double-precision floating-point result), RETURN-FP (return from a subprogram that definitely returns a double-precision floating-point result, used only in the context of returning from a Tapestry native callee), and RETURN-MAYBE-FP (return from a subprogram that may return or definitely returns either a 64-bit double-precision or 80-bit extended precision floating-point result, used only in the context of returning from an X86 callee). Because there are four possible transfers for each ISA mode, two bits 206 (combined with PSW.ISA bit 194) are sufficient to identify the five states enumerated.

Most of this semantic classification is static, by instruction opcode. Some instructions, e.g., the X86 Jump and CALL instructions, are semantically unambiguous. For instance, an X86 RET cannot be mistaken for a CALL or an internal control flow JUMP. Thus, even though the Tapestry system never examines the source code for the X86 binary, the X86 instruction contains sufficient information in its opcode to determine the semantic class of the instruction.

Referring to Table 4, some of the semantic classification is encoded into instructions by the compiler. For instance, the Tapestry JALR instruction (jump indirect to the location specified by the instruction's source register, and store the link IP (instruction pointer) in the destination register), may serve any of several roles, for instance as a return from subprogram (the link IP is stored into the read-zero register), a FORTRAN assigned go-to within a single routine, or a subprogram call. To resolve the ambiguity of a JALR instruction, bits that are unused in the execution of the instruction are filled in by the compiler with one of the semantic class codes, and that code is copied as an immediate from the instruction to PSW.SC 206 when the instruction is executed. In the case of Tapestry native binaries compiled from source code, this immediate field of the JALR instruction is filled in with the aid of semantic information gleaned either from the source code of the program being compiled. In the case of a binary translated from X86 to Tapestry, the semantic class of the X86 instruction is used to determine the semantic class of the corresponding Tapestry instruction. Thus, the Tapestry compiler analyzes the program to distinguish a JALR for a branch to a varying address (for instance a FORTRAN assigned or computed go-to, or a CASE branch through a jump table) from a JALR for a function return (further distinguishing the floating-point from no-floating-point case) from a JALR for a subprogram call, and explicitly fills in the two-bit semantic class code in the JALR instruction.

Some of the semantic classification is performed by execution time analysis of the machine context. X86 RET (return from subprogram) instructions are classified into two semantic context classes, RETURN-NO-FP (return from subprogram, definitely not returning a floating-point function result) and RETURN-MAYBE-FP (return, possibly or definitely returning a floating-point function result). The X86 calling convention specifies that a floating-point function result is returned at the top of the floating-point stack, and integer function results are returned in register EAX. The instruction opcode is the same in either case; converter 136 classifies RET instructions on-the-fly based on the X86 floating-point top-of-stack. If the top-of-stack points to a floating-point register marked empty, then the X86 calling convention unambiguously assures that the RET cannot be returning a floating-point value, and the semantic class is set to RETURN-NO-FP. If the top-of-stack register points to a full location, there may nonetheless be an integer return value; the semantic context is set to RETURN-MAYBE-FP to indicate this ambiguity.

On an exception, PSW 190 (including ISA bit 194, calling convention bit 196, and SC field 206) is snapshotted into the exception PSW, a control register of the machine. The PSW bits in the exception PSW are available for examination and modification by the exception handler. When the exception handler completes, the RFE (return from exception) instruction restores the snapshotted exception PSW into the machine PSW 190, and machine execution resumes. Thus, PSW.SC 206 is preserved across exceptions, even though it is updated during execution of the exception handler (unless the exception handler deliberately modifies it by modifying the exception PSW).

FIGS. 2b and 2c show how calling convention transitions are vectored to the exception handlers. On a calling convention transition exception, five data are used to vector to the appropriate handler and determine the action to be taken by the handler: the old ISA 180, 182, the new ISA 180, 182, the old calling convention 196, the new calling convention 196, and PSW.SC 206. In FIG. 2b, the first column 204 shows the nature of the transition based on the first four, the transition of the ISA and CC bits. For instance, the third line 216 discusses a transition from native Tapestry ISA using native Tapestry register-based calling conventions (represented as the value "00" of the ISA and CC bits) to X86 code, which necessarily uses the X86 calling convention (represented as the value "1x," "1" for the X86 ISA, and "x" for "don't care" value of the CC bit). Table 4 shows that several different situations may vector to the same exception handler. Note, for instance, that lines 214 and 216 vector to the same group of four handlers, and lines 218 and 224 vector to the same group of handlers. These correspondences arise because the memory manipulation required to convert from native Tapestry calling convention to X86 calling convention, or vice versa, is largely the same, whether the X86 convention is observed by native Tapestry instructions or X86 instructions.

FIG. 2c shows how the machine vectors to the proper exception handler based on semantic class. For instance, lines 242, 244, 246, and 248 break out the four possible handlers for the 00=>01 and 00=>1x (native Tapestry code using native calling conventions, to X86 code using X86 conventions) ISA and CC transitions, based on the four possible semantic classes of control-flow instruction. Lines 250, 252, 254, and 256 break out the four possible handlers for the 01=>00 and 1x=>00 transitions, based on the four semantic classes of instruction that can cause this transition.

Referring to FIG. 2b, when crossing from one subprogram to another, if the source and destination agree on the convention used for passing arguments, either because they agree on ISA and calling convention (rows 212, 220, 228, 230), or agree on calling convention even though disagreeing on ISA (rows 222, 226), or because the data pass simply by virtue of being stored in the same storage location in the source and destination execution environments (rows 244, 252), then no intervention is required. For instance, when crossing from the X86 ISA using the X86 calling convention to the Tapestry native ISA using the X86 convention, or vice-versa, data passes from one environment to the other, without actually moving from one hardware element to another, using the fixed mapping between X86 virtual resources and Tapestry physical resources using the fixed mapping shown in Table 1 and discussed in section I.B, supra.

For instance, as shown in row 222, if a caller in Tapestry native code, using the memory based quasi-X86 calling convention, calls a routine in X86 code (or vice-versa, row 226), no arguments need be moved; only the instruction decode mode need be changed.

On the other hand, if the calling conventions 200 disagree, and the arguments are being passed under one calling convention and received under another, the calling convention exception handler intervenes to move the argument data from the well-known locations used by the source convention to the well-known locations expected by the destination convention. For instance, a subprogram CALL from an X86 caller to a callee in native Tapestry code that uses the native Tapestry calling convention (rows 224, 250), or equivalently, from Tapestry code using X86 conventions to native Tapestry using the native convention (rows 218, 250), must have its arguments moved from the locations specified by the memory stack-based caller convention to the locations specified by the register-based callee convention.

Rows 214, 242 of FIGS. 2b and 2c show the case of a subprogram call where the caller is in Tapestry native code using the register-based native calling convention, and the callee is in Tapestry native code but uses the quasi-X86 calling convention. (Similarly, as shown in rows 216, if the caller is in Tapestry native code using the register-based native calling convention, and the callee is coded in the X86 ISA, then the same exception handler 242 is invoked, and it does the same work). The exception handler will push the subprogram arguments from their register positions in which arguments are passed under the native convention, into their memory stack positions as expected under the X86 calling convention. If the arguments are of varying size, the X86 stack layout of the argument buffer may be rather complex, and the mapping from the arguments in Tapestry registers to that argument buffer will be correspondingly complex. The argument copying is specified by a descriptor, an argument generated by the compiler for annotation of the caller site. This is particularly important for "varargs" routines. Because the native caller was generated by the Tapestry compiler, the compiler is able to produce a descriptor that fully describes the data copying to be performed by the transition exception. The descriptor is analogous to the argument descriptors generated by compilers for use by debuggers. The data will then be in the locations expected by the callee, and execution can resume in the destination ISA mode.

When an X86 caller (or a Tapestry caller using the quasi-X86 calling convention), the data of the argument block established by the caller are copied into the locations expected by the Tapestry callee. For instance, the linkage return address is copied from the top of stack to r6 (the Tapestry linkage register, given the alias name of LR for this purpose). The next few bytes of the stack are copied into Tapestry registers, for quick access. A call descriptor (a datum that describes the format of the call arguments) is manufactured in register r51 (alias CD), set to indicate that the arguments are passed under the X86 convention. A null return value descriptor is manufactured on the stack; the return descriptor will be modified to specify the format of the return value, once that information is known.

When returning from a callee function, the calling convention 200 of the caller and callee and the semantic class 206 of the return instruction determine the actions needed to put the function return value in the correct location expected by the callee. As shown in Table 1, the X86 calling convention returns double-precision floating-point function return values in the floating-point register indicated by the top-of-floating-point-stack. The X86 calling convention returns other scalars of 32 bits or less in register EAX, results of 33 to 64 bits in the EAX:EDX register pair, and function return values of 65 bits or greater are returned in a memory location pointed to by an argument prepended to the caller's argument list. The native Tapestry calling convention returns double-precision floating-point values in r31 (for this purpose, given the alias name of RVDP), other return values of 256 bits or less in registers r48, r49, r50, and r51 (given the alias names of RV0, RV1, RV2, and RV3), and larger return values in a memory location pointed to by r31 (for this purpose, given the alias name of RVA).

The Tapestry calling convention, and the mapping between Tapestry and X86 resources, are co-designed, at least in part, to maximize common uses, thereby to reduce the amount of data copying required on a calling convention transition. Thus, the two registers used to return scalar function return values—r48 (RV0) in Tapestry, EAX in X86—are mapped to each other.

When returning from a native-convention callee to an X86 or a Tapestry-using-X86-convention caller, the semantic class of the return is unambiguously known (because whether the function returns a floating-point value or not was encoded in the semantic class bits of the JALR instruction by the compiler), and the semantic class distinguishes the two actions to take in the two cases that may arise, as discussed in the next two paragraphs.

When a native-convention function returns a double-precision (64-bit) floating-point value to an X86-convention caller (the RETURN-FP case of row 248), the function return value is inflated from an IEEE-754 64-bit representation in r31 (RVDP, the register in which Tapestry returns double-precision function results) to an 80-bit extended precision representation in the register pair to which the X86 FP top-of-stack currently points (usually r32-r33, the Tapestry register pair mapped to F0 of the X86). The top-of-floating-point stack register is marked full, and all other floating-point registers are marked empty. (Tapestry has a floating-point status register that subsumes the function of the X86 FPCW (floating-point control word), FPSW (floating-point status word), and FPTW (floating-point tag word), and the registers are marked full or empty in the tag bits of this status register).

On a return from a non-floating-point Tapestry native callee function to an X86-convention caller (the RETURN-NO-FP case of row 248) to an X86-convention caller, the function return value is left alone in r48, because this single register is both the register in which the Tapestry function computed its result, and the register to which the X86 register EAX (the function-result return register) is mapped. The entire floating-point stack is marked empty.

If the native callee is returning a value larger than 64 bits to an X86-convention caller, a return descriptor stored on the stack indicates where the return value is stored (typically in registers r48 (RV0), r49 (RV1), r50 (RV2), and r51 (RV3), or in a memory location pointed to by r31 (RVA)); the return value is copied to the location specified under the X86 convention (typically a memory location whose address is stored in the argument block on the stack).

When returning from an X86 callee to a Tapestry-using-X86-convention caller, no action is required, because the register mapping of Table 1 implements the convention transformation.

When returning from an X86 callee to a native Tapestry caller, two cases are distinguished by the two semantic classes RETURN-MAYBE-FP and RETURN-NO-FP. For the RETURN-NO-FP case of rows 224 and 254, no action is required, because the return value was computed into X86 register EAX, which is mapped to r48, the Tapestry scalar return value register. For the RETURN-MAYBE-FP case, the exception handler conservatively ensures that any scalar result is left in r48, and also ensures that the value from the top of the floating-point stack is deflated from an 80-bit extended-precision representation to a 64-bit double-precision representation in r31 (RVDP).

When executing translated native code, Tapestry will not execute a JALR subprogram return unless the destination is also in native code. Because the semantic class codes on the present implementation only ambiguously resolve whether an X86 instruction does or does not return a floating-point result (RETURN-FP vs. RETURN-MAYBE-FP), and the native semantic class codes are unambiguous (RETURN-FP vs. RETURN-NO-FP), binary translator 124 does not translate a final X86 RET unless its destination is also translated.

An alternative embodiment may provide a third calling convention value, a "transition" value. The machine will not take an exception when crossing to or from a transition page—the transition calling convention "matches" both the X86 calling convention and the Tapestry calling convention. Typically, pages of transition calling convention will have a Tapestry ISA value. These transition pages hold "glue" code that explicitly performs the transition work. For instance, an X86 caller that wants to call a Tapestry callee might first call a glue routine on a transition calling convention page. The glue routine copies arguments from their X86 calling convention homes to their Tapestry homes, and may perform other housekeeping. The glue routine then calls the Tapestry callee. The Tapestry callee returns to the glue routine, where the glue routine performs the return value copying and performs other housekeeping, and returns to its caller, the X86 caller.

One of ordinary skill will understand the argument copying that implements each of the cases of transition exception shown in FIGS. 2b and 2c. One embodiment is shown in full detail in the microfiche appendices of U.S. application Ser. No. 09/385,394, 09/322,443, and 09/239,194, which applications are incorporated herein by reference.

In an embodiment alternative to any of the broad designs laid out in sections II, III, or IV, the computer may provide three or more instruction set architectures, and/or three or more calling conventions. Each architecture or convention is assigned a code number, represented in two or more bits. Whenever the architecture crosses from a region or page with one code to a region or page with another, an appropriate adjustment is made to the hardware control, or an appropriate exception handler is invoked, to adjust the data content of the computer, and/or to explicitly control the hardware execution mode.

V. Profiling to Determine Hot Spots for Translation

A. Overview of Profiling

Figure 4A:
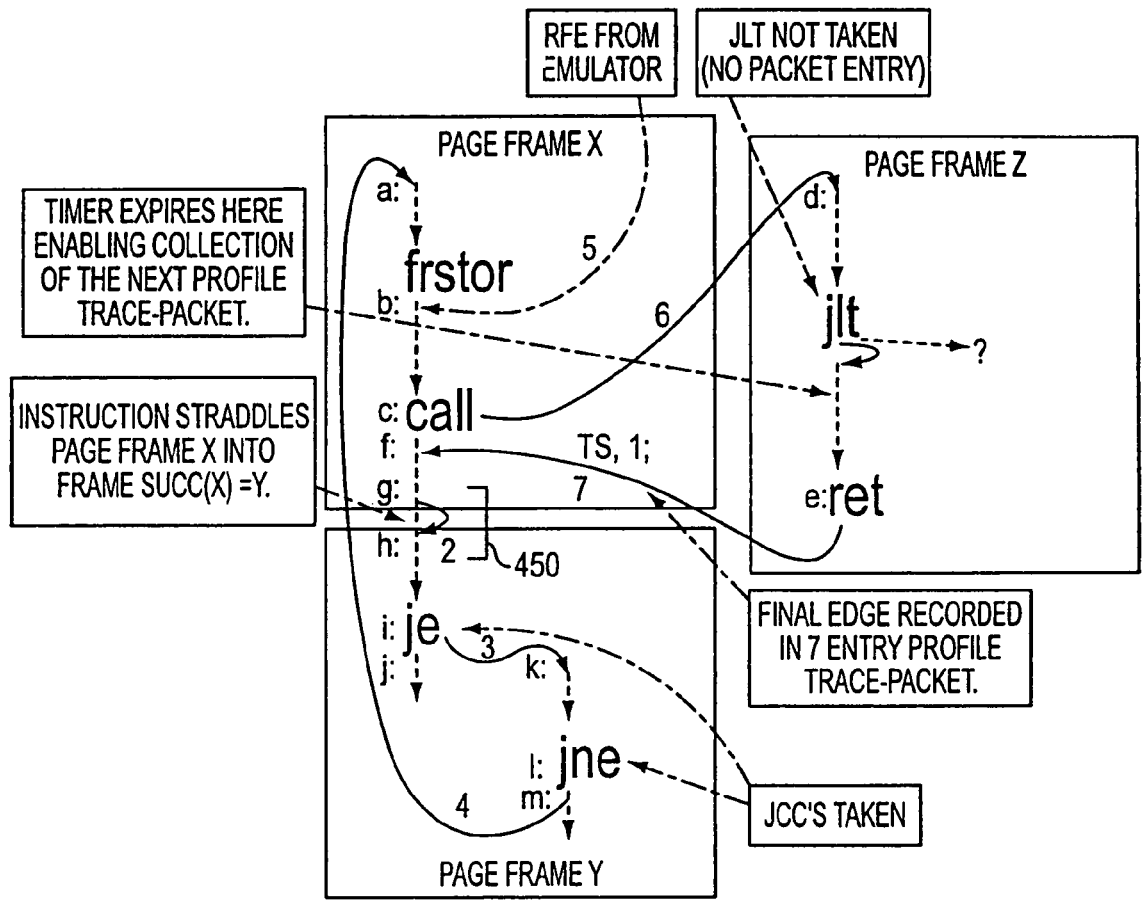
FIGS. 4a, 4e and 4f are block diagrams showing program flow through memory, and profile information describing that program flow.

Referring to FIGS. 1a, 1b and 4a, profiler 400 monitors the execution of programs executing in X86 mode, and stores a stream of data representing the profile of the execution. Because the X86 instruction text is typically an off-the-shelf commercial binary, profiler 400 operates without modifying the X86 binary, or recompiling source code into special-purpose profileable X86 instruction text. The execution rules for profiler 400 are tailored so that the right information will be captured at the right time. Hot spot detector 122 identifies hot spots in the programs based on the profile data. The data collected by profiler 400 are sufficiently descriptive to allow the application of effective heuristics to determine the hot spots from the profile data alone, without further reference to the instruction text. In particular, the profile information indicates every byte of X86 object code that was fetched and executed, without leaving any non-sequential flow to inference. Further, the profile data are detailed enough, in combination with the X86 instruction text, to enable binary translation of any profiled range of X86 instruction text. The profile information annotates the X86 instruction text sufficiently well to resolve all ambiguity in the X86 object text, including ambiguity induced by data- or machine-context dependencies of the X86 instructions. Profiler 400 operates without modifying the X86 binary, or recompiling source code into a special-purpose profileable X86 binary.

In its most-common mode of operation, profiler 400 awaits a two-part trigger signal (516, 522 of FIG. 5a) to start sampling events, and then records every profileable event 416 in a dense sequence, including every profileable event that occurs, until it stops (for instance, on exhaustion of the buffer into which profile information is being collected), as opposed to a conventional profiler that records every $n^{th}$ event, or records a single event every n microseconds. The profile information records both the source and destination addresses of most control flow transfers. Entries describing individual events are collected into the machine's general register file, and then stored in a block as a profile packet. This blocking of events reduces memory access traffic and exception overhead.

Referring again to FIGS. 1a and 1b, profiler 400 tracks events by physical address, rather than by virtual address. Thus, a profileable event 416 may be induced by "straight line" flow in virtual address space, when two successive instructions are separated by a physical page boundary, or when a single instruction straddles a virtual page boundary. (As is known in the art, two pages that are sequential in a virtual address space may be stored far from each other in physical memory). By managing the X86 pages in the physical address space, Tapestry operates at the level of the X86 hardware being emulated. Thus, the interfaces between Tapestry and X86 operating system 306 may be as well-defined and stable as the X86 architecture itself. This obviates any need to emulate or account for any policies or features managed by the operating system 306. For instance, Tapestry can run any X86 operating system (any version of Microsoft Windows, Microsoft NT, or IBM OS/2, or any other operating system) without the need to account for different virtual memory policies, process or thread management, or mappings between logical and physical resources, and without any need to modify operating system 306. Second, if X86 operating system 306 shares the same physical page among multiple X86 processes, even if at different virtual pages, the page will be automatically shared. There will be a single page. Third, this has the advantage that pages freed deleted from an address space, and then remapped before being reclaimed and allocated to another use, Referring to FIG. 4b, events are classified into a fairly fine taxonomy of about thirty classes. Events that may be recorded include jumps, subprogram CALL's and returns, interrupts, exceptions, traps into the kernel, changes to processor state that alters instruction interpretation, and sequential flow that crosses a page boundary. Forward and backward jumps, conditional and unconditional jumps, and near and far jumps are distinguished.

Referring to FIGS. 4g and 4h, profiler 400 has a number of features that allow profiling to be precisely controlled, so that the overhead of profiling can be limited to only those execution modes for which profile analysis is desired.

Figure 5A:
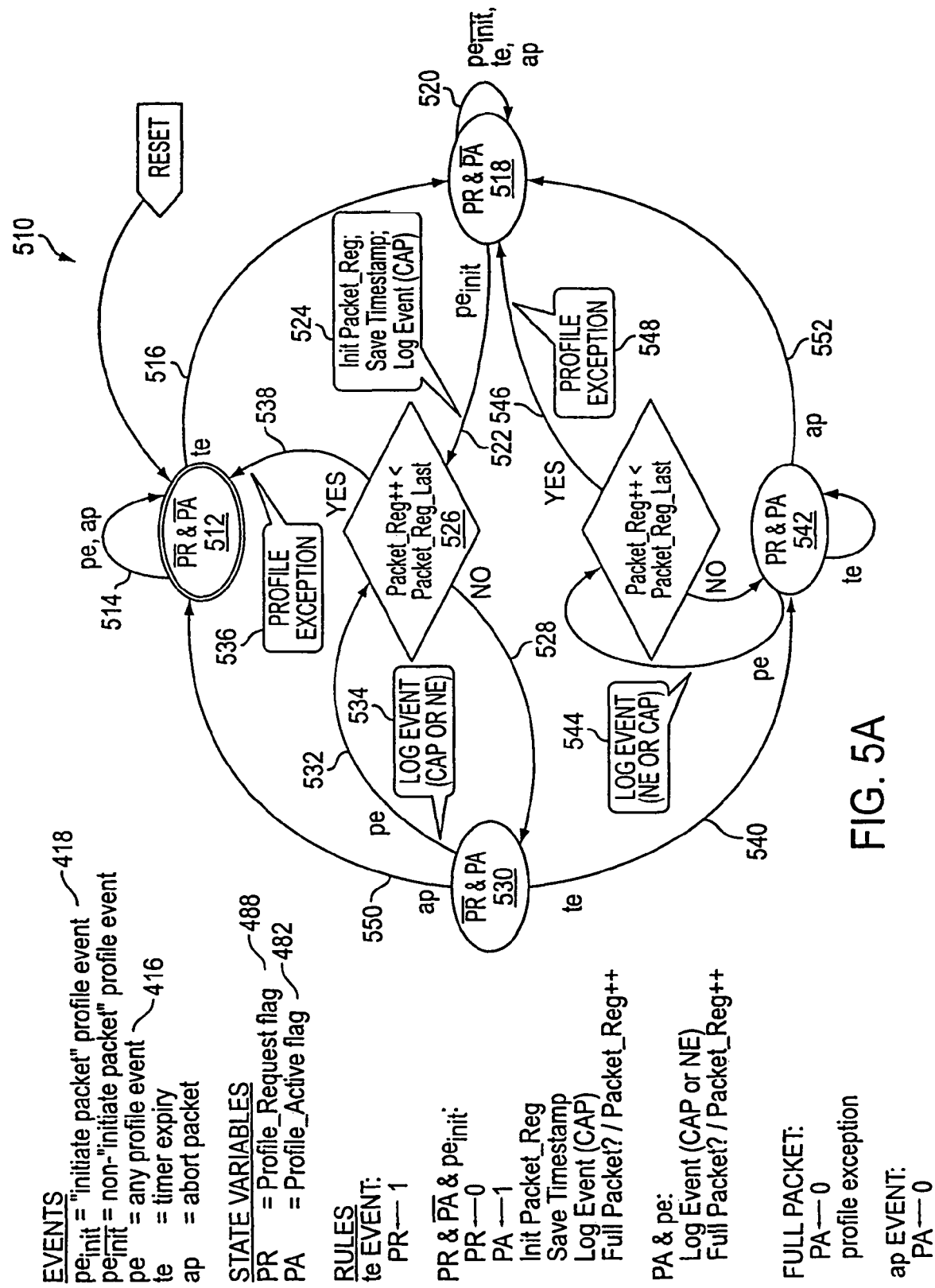
FIG. 5a shows a finite state machine for control of a profiler.
Figure 5B:
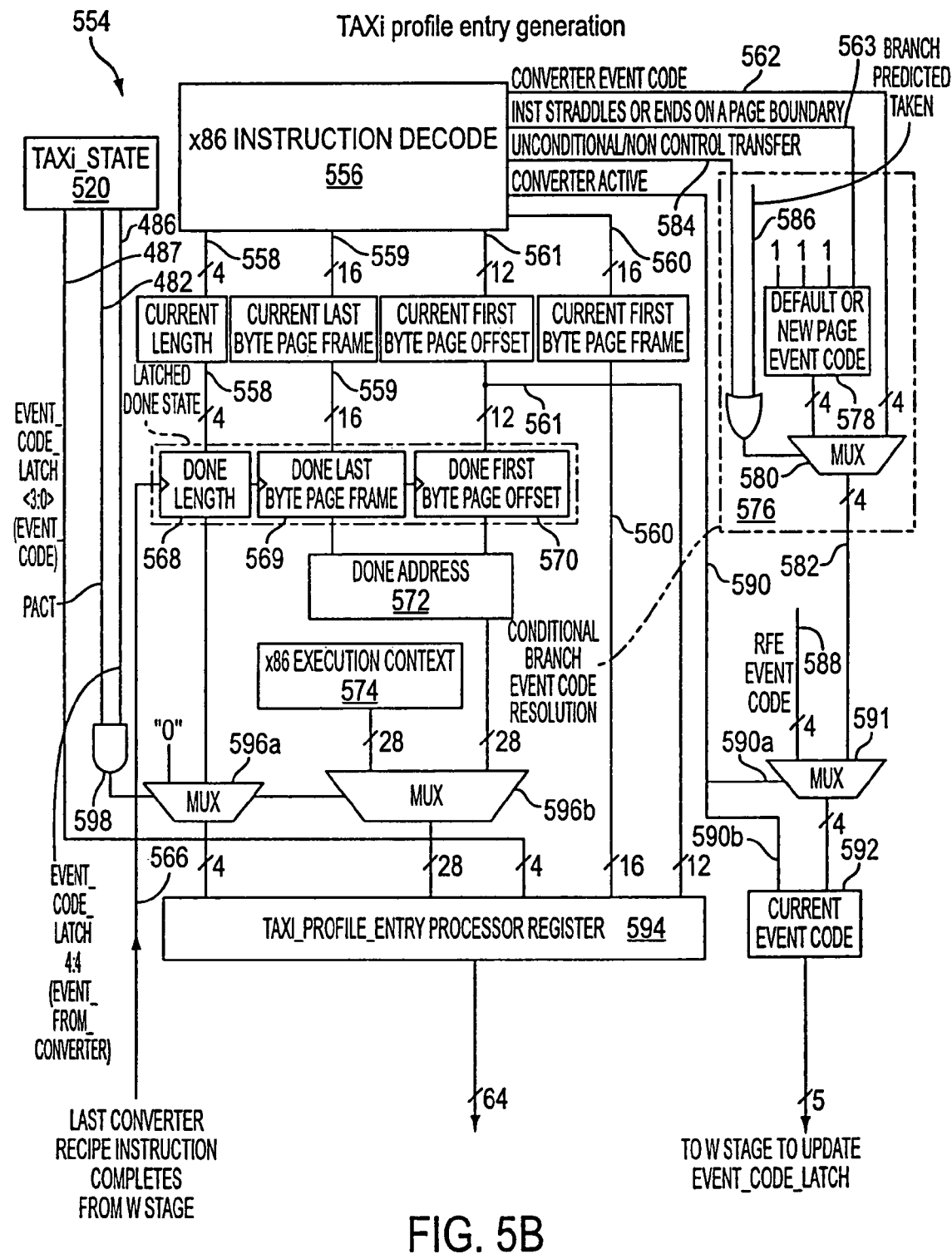

Referring to FIGS. 5a and 5b, as each X86 instruction is decoded by the converter (136 of FIG. 1c), a profile entry is built up in a 64-bit processor register 594. During execution of the instruction, register 594 may be modified and overwritten, particularly if the instruction traps into Tapestry operating system 312. At the completion of the instruction, profiler 400 may choose to capture the contents of the profile entry processor register into a general register.

Hot spot detector 122 recognizes addresses that frequently recur in a set of profile packets. Once a hot spot is recognized, the surrounding entries in the profile may indicate (by physical address) a region of code that is frequently executed in correlation with the recurring address, and the path through the physical pages. Hot spot detector 122 conveys this information to TAXi translator 124, which in turn translates the binary.

B. Profileable Events and Event Codes

Referring to FIG. 4b, profiler 400 recognizes and records about thirty classes of events, listed in the table. Each class of event has a code 402, which is a number between 0 and 31, represented as a five-bit number. The class of events is chosen to provide both the minimum information required to support the design; and additional information that is not strictly necessary but may provide additional hints that allow hot spot detector 122 to achieve better results.

The upper half 410 of the table lists events that are (in one embodiment) raised by software, and lower half 404 contains events raised by hardware. The lower half will be discussed first.

The lower half 404 of the table, the sixteen entries whose high-order bit is One, are events induced by converter 136. As each X86 instruction is decoded and executed, the events enumerated in lower half 404 are recognized. If profiler 400 is active when one of these events 404 occurs, a profile entry is recorded in a general register. The events in the lower half of the table fall into two classes: near transfers of control that are executed in converter 136, and sequential flows of execution across a physical page frame boundary.

Profiler 400 captures transfers of control, including IP-relative transfers, subroutine calls and returns, jumps through pointers, and many interrupt-induced transfers. Even though profiler 400 views the machine in its physical address space, the distinction between forward and backwards jumps can be determined for PC-relative jumps by looking at the sign bit of the PC-relative displacement in the X86 instruction. Once the branch is classified, the classification is encoded in event code 402 stored in the profile entry for the branch. There are event codes 402 to separately classify forward conditional branches, backward conditional branches, three separate classes of conditional jump predicates, etc., as shown by event codes 1.0000, 1.0001, 1.0010, 1.0011, 1.0100, 1.0101, and 1.0111.

Event code 1.1100 is discussed in section VIII.B.

Event code 1.1110 406 indicates a simple sequential instruction with nothing of note. Event code 1.1111 408 denotes an instruction that either ends in the very last byte of a physical page or straddles a page boundary in virtual address space (and is likely separated into two distant portions in the physical address space).

The upper half 410 of the table, the top sixteen entries whose high-order bit is Zero, are events that are handled in software emulator 316, and recorded during execution of a Tapestry RFE (return from exception) instruction at the completion of the emulation handler. RFE is the Tapestry instruction that returns from Tapestry operating system 312 to a user program after a synchronous exception, (for instance a page fault or NaN-producing floating-point exception), an asynchronous external interrupt, or a trap into emulator 316 for simulation of a particularly complex X86 instruction that is not implemented in the hardware converter 136. Generally, the events in the upper half of the table fall into four classes: (1) far control transfer instructions executed in emulator 316, (2) instructions that update the X86 execution context (e.g. FRSTOR) executed in emulator 316, (3) delivery of X86 internal, synchronous interrupts, and (4) delivery of X86 external, asynchronous interrupts. In general the upper-half event codes are known only to software.

Each RFE instruction includes a 4-bit immediate field (588 of FIG. 5b) in which is stored the low-order four bits of the event code 402 associated with the event that invokes the returned-from handler. The fifth bit in an RFE event class is reconstructed (see section V.G, infra) as a Zero, even though the Zero is not explicitly stored. When the RFE is executed, the event code from the RFE is copied into TAXi_State.Event_Code_Latch (486, 487 of FIGS. 4h and 5b) and the temporary processor register (594 of FIG. 5b) that collects profile information (see section V.F, infra), overwriting the event code supplied by converter 136. From register 594, the event code will be copied into a general register if a profile entry is to be collected. This mechanism allows software to signal profiler 400 hardware 510 that a profileable instruction has been executed in emulator 316, or that an otherwise non-profileable instruction executed in emulator 316 caused a page crossing and should be profiled for that reason. (RFE's without X86 significance will set this field to zero, which will prevent the hardware from storing a profile entry—see the discussion of code 0.0000, infra)

The "profileable event" column (416 of FIG. 4b) specifies whether an the event code is to be included in a profile packet. Events that are not profileable simply occur with no action being taken by profiler 400. The "initiate packet" column 418 specifies whether an event of this event code (402 of FIG. 4b) is allowed to initiate collection of a new profile packet, or whether this event class may only be recorded in entries after the first. "Initiate packet" 418 is discussed at length in sections V.F and V.G, infra, in connection with Context_At_Point profile entries, FIG. 4c, and the profiler state machine 510, FIG. 5a. The "probeable event" column 610 and "probe event bit" column 612 will be discussed in connection with Probing, section VI, infra. The "initiate packet" 418, "profileable event" 416, and "probeable event" 610 properties are computed by PLA (programmable logic array) 650, which is discussed in sections VI.C and VI.D, infra.

Discussion of event codes 0.0000, 0.0001, 0.0010 and 0.0011 is deferred for a few paragraphs.

An event code of 0.0100 is simply stored over the current value of TAXi_State.Event_Code_Latch (486, 487 of FIGS. 4h and 5b), without further effect of the current state of the machine. The effect of this overwrite is to clear the previously-stored event code, ensuring that converter 136 can restart without any effects that might be triggered by the current content of TAXi_State.Event_Code_Latch 486, 487. For instance, if converter 136 takes a probe exception (see section VI, infra), and the first instruction of the translated TAXi code generates an exception (e.g., a floating-point overflow) that should be handled by returning control to converter 136 (rather than allowing execution to resume in the translated TAXi code), the exception handler will return with an RFE whose event code immediate field is 0.0100. This ensures that converter 136 will not restart with the event code pending in TAXi_State.Event_Code_Latch 486, 487 that triggered the probe exception in the first place.

Event code 0.0101 indicates an emulator completion of an instruction that changes the execution context, for instance, the full/empty state of the floating-point registers or floating-point top-of-stack. This will force the recording of Context_At_Point profile entry (see 430 of FIG. 4c and section V.C, infra) to capture the state change.

Events of event code 0.0110, 0.0111, 0.1000, 0.1001 are control-transfer instructions that are conveniently implemented in emulation software instead of hardware converter 134, 136 such as far CALL, far jump, far return, and X86 interrupt return. The event code taxonomy for these far transfers does not differentiate forward and backward jumps, in contrast to the taxonomy of IP-relative near jumps (event codes 1.0000-1.0101).

Figure 4C:
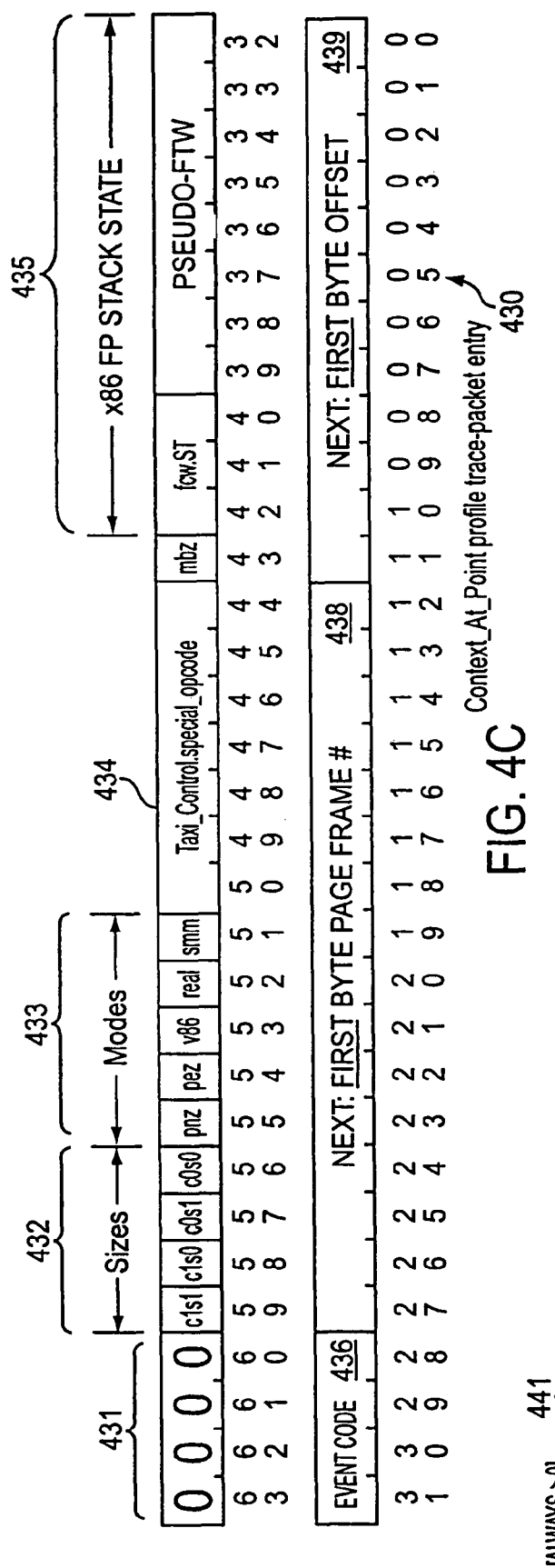

An RFE with an event code of 0.1010 causes TAXi_Control.special_opcode 474 (bits <50:44>) to be captured in the special_opcode 434 field (bits <50:43> of FIG. 4c) of a Context_At_Point profile entry (430 of FIG. 4c). This opens up a new seven-bit space of event codes that can be managed completely by software.

Event code 0.1011 is used to RFE from an exception handler, to force the current profile packet to be aborted. The Tapestry hardware recognizes the event code in the RFE immediate field and aborts the profile packet by clearing TAXi_State.Profile_Active (482 of FIGS. 4h and 5a). For instance, this event code might be used after a successful probe RFE's to TAXi code and aborts any packet in progress. This is because the TAXi code represent a break in the sequential interval of a profile packet, and an attempt to continue the packet would render it ill-formed. Similarly, when X86 single-step mode is enabled, the RFE from emulator 316 uses event code 0.1011 to abort a packet in progress. Profiling will resume at the next profile timer expiry.

Event codes 0.1100, 0.1101, 0.1110, and 0.1111 provide two pairs of RFE event codes associated with delivery of X86 exceptions from X86 emulator 316. This allows software to group exceptions into different categories for TAXi usage. By classifying interrupts into two groups, and further into probeable and non-probeable events (see section VI, infra), these four event codes provide a control framework for software to build upon. This classification exploits the fact that the X86 funnels all exceptions, external interrupts, and traps through a single unified "interrupt" mechanism.

Event codes 0.0000, 0.0001, 0.0010, and 0.0011 412 operate somewhat differently from the other events in upper half 410, as shown by the "reuse event code" column 414. Events of these classes (that is, RFE instructions with these four-bit codes in their event code immediate field) do not update TAXi_State.Event_Code_Latch (486, 487 of FIG. 4h) and related signals; the previously-latched event code is simply allowed to persist for the next X86 instruction. For example, event code 0.0000 is for "transparent" exceptions, exceptions that do not get recorded in the profile. As a specific example, the RFE's at the end of the handlers for TLB miss exceptions, interrupt service routines for purely-Tapestry interrupts, and other exceptions unrelated to the progress of an X86 program have event code 0.0000 (four explicit Zeros in the immediate field, and an assumed high-order Zero), which causes the hardware to resume execution at the interrupted location without storing a profile entry. These events are kept architecturally invisible to the currently-executing process and are not correlated to any hot spot in that process, and thus recording an event would be specious.

Event code 0.0001 is used in the software X86 emulator 316. Very complex X86 CISC instructions that are not implemented in hardware converter 136 are instead implemented as a trap into software, where the instruction is emulated. When X86 emulator 316 completes the instruction, it returns using an RFE with an event code of 0.0001 to indicate that "nothing special happened here," and so no profile entry is collected (unless the emulated instruction straddled a page).

Another use of the "reuse event code" feature of column 414 is illustrated by considering the case of a complex instruction, an instruction that is emulated in software, that does not affect any control flow, for instance a compare string instruction. When such a complex instruction is encountered, converter 136, non-event circuit 578, and MUX 580 of FIG. 5*b* in section V.F, infra, will have made a preliminary decode of the instruction, and supplied a preliminary event code (582, 592 of FIG. 5*b*): either the default event code 1.1110 406 or a new page event code 1.1111 408, depending on whether the instruction straddles a page break. (In some embodiments, converter 136 may in addition supply the event codes for far control transfers, far CALL, code 0.1000; far JMP, code 0.1001; far RET, code 0.0110; IRET, code 0.0111). This preliminary event code 582, 592 is latched into TAXi_State.Event_Code_Latch 486, 487 as part of trapping into X86 emulator 316. When X86 emulator 316 completes the complex instruction and RFE's back to converter 136, the RFE will have as its event code immediate field (588 of FIG. 5*b*) the simple X86 instruction-complete event code 0.0001. Because event code 0.0001 has "reuse event code" property 414, the event code from the RFE immediate field will simply be discarded, leaving intact the preliminary event code 582, 592 in TAXi_State.Event_Code_Latch 486, 487. On return from the exception, an event with the preliminary event code is then added to the profile packet.

Event codes 0.0010 and 0.0011 are used in the RFE from the probe exception handler (see section VI, infra). If a probe fails, that class of probe is disabled. Because probing and profiling are mutually exclusive (see section VI.G, infra), when there is a probe exception, profiling is not active. Thus, these event codes are never stored in a profile packet, but exist to control prober 600, as described in section VI.D, infra.

C. Storage Form for Profiled Events

Figure 4D:
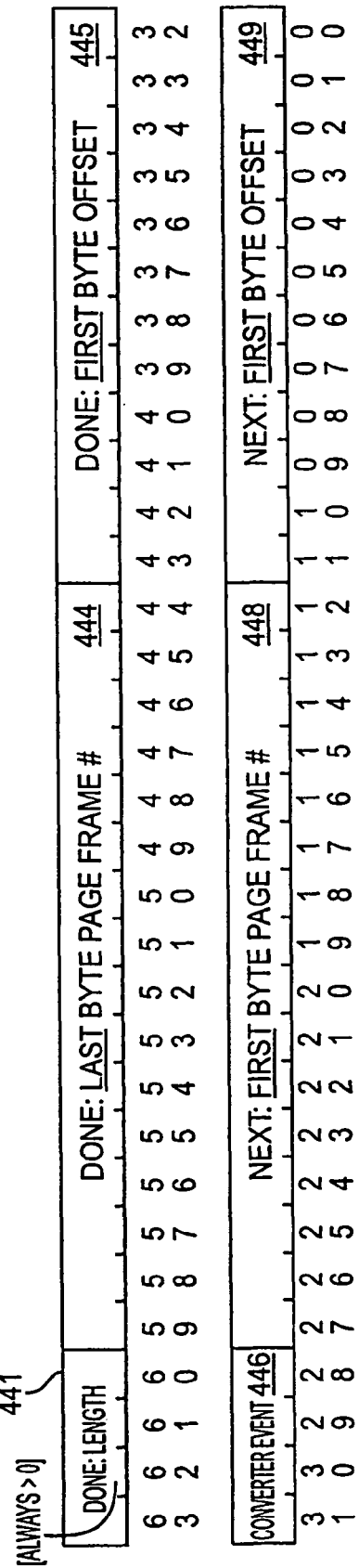

Referring to FIGS. 4*a*, 4*c*, and 4*d*, profile events are collected and stored in groups called packets 420. Each profile packet 420 holds a programmable number of entries, initially collected into registers R16-R31, and then stored to memory. In a typical use, there will be sixteen entries per packet, beginning with a 64-bit time stamp, then fourteen event entries 430, 440, and an ending time stamp. Each event is described as a 64-bit entry, of one of two forms: a Context_At_Point entry 430, or a Near_Edge entry 440. The first entry in the packet is always a Context_At_Point entry 430, which gives a relatively complete snapshot of the processor context at the point that profiling begins, a point conceptually between two X86 instructions. Subsequent entries may be of either Context_At_Point or Near_Edge form. A Near_Edge entry 440 describes an intra-segment (i.e., "near") control transfer, giving the source and destination of the transfer. At a Near_Edge entry 440, the remainder of the X86 processor context can be determined by starting at the most-recent Context_At_Point entry 430 and inferring the processor context by interpreting the instructions that intervened between that Context_At_Point and the Near_Edge transfer. Sufficient information is present in the profile so that the context can be inferred by binary translator 124 by reference only to the opcodes of those intervening instructions, without requiring any knowledge of the actual data consumed or manipulated by those instructions. The rules for emitting a Context_At_Point entry 430 preserve this invariant: processor context is inferable from the combination of the profile and the opcodes of the intervening instructions, without reference to any data consumed or manipulated by the instructions. If execution of an X86 instruction depends on memory data or the processor context bits in a manner not representable in a Near_Edge entry 440, then profiler 400 emits a Context_At_Point entry 430. Thus, Context_At_Point entries ensure that the TAXi binary translator 124 has sufficient information to resolve ambiguity in the X86 instruction stream, in order to generate native Tapestry code.

Referring to FIG. 4*c*, a Context_At_Point entry 430 describes an X86 instruction boundary context snapshot, a context in effect as execution of an X86 instruction is about to begin.

Bits <63:60> 431 of a Context_At_Point entry 430 are all Zero, to distinguish a Context_At_Point entry 430 from a Near_Edge entry 440. (As noted in the discussion of done_length 441, bits <63:60> of FIG. 4*d*, infra, in a Near_Edge 440 the first four bits record the length of an instruction, and there are no zero-length instructions. Thus, a zero value in field 431 unambiguously indicates a Context_At_Point 430).

Bits <59:51> 432, 433 and <42:32> 435 capture the processor mode context of the X86 at the instruction boundary (before the start of the instruction described in next_frame 438 and next_byte 439, bits <27:00>). The bits of an X86 instruction do not completely specify the action of the instruction; the X86 architecture defines a number of state bits that define the processor context and the operation of instructions. These bits determine operand size (whether a given wide form instruction acts on 16 bits or 32), stack size (whether a PUSH or POP instruction updates 16 bits or 32 of the stack pointer), address size (whether addresses are 16 or 32 bits), whether the processor is in V86 mode, whether addressing is physical or virtual, the floating-point stack pointer, and the full/empty state of floating-point registers. The X86 scatters these bits around code and stack segment descriptors, the EFLAGS register, the floating-point status word, the floating-point tag word, and other places. The Tapestry machine stores these bits in analogs of the X86 structures to actually control the machine; when a Context_At_Point entry 430 is captured, a snapshot of these bits are captured into bits <59:51> 432, 433 and <42:32> 435 of the Context_At_Point entry 430.

Bits <59:56> 432 indicate the current state of the operand-size/address-size mode (encoded in the D bit of the X86 code segment descriptor), and the stack address size (encoded in the B bit of the stack segment descriptor). Bit <59>, "c1s1," indicates that the X86 is in 32-bit-code/32-bit-stack mode. Bit <58>, "c1s0," indicates that the X86 is in 32-bit-code/16-bit-stack mode. Bit <57>, "c0s1," indicates that the X86 is in 16-bit-code/32-bit-stack mode. Bit <56>, "c0s0," indicates that the X86 is in 16-bit-code/16-bit-stack mode. (The D and B bits render the X86 instruction set ambiguous. For instance, a given nine-byte sequence of the instruction stream might be interpreted as a single instruction on one execution, and three entirely different instructions on the next, depending on the values of the D and B bits. Very few architectures share this ambiguity). Thus, whether or not to profile any particular combination of the four possible combinations of D and B modes can be individually controlled.

In field 433, bit <55>, "pnz," indicates that the X86 is in non-ring-zero (unprivileged) mode. Bit <54>, "pez," indicates that the X86 is in X86 ring-zero (privileged) mode. Bits <53>, <52>, and <51>, "v86," "real," and "smm," indicate respectively, that the X86 is in virtual-8086, real, and system management execution modes, as indicated by X86 system flag bits.

Bits <50:43>, special_opcode 434, are filled from TAXi_Control.special_opcode 474 whenever a Context_At_Point entry is generated. These bits are especially relevant to event code 0.1010.

In field 435, bits <42:40> are the floating-point top-of-stack pointer. Bits <39:32> are the floating-point register full/empty bits.

Field event_code 436, bits <31:28>, contains an event code 402, the four least significant bits from the most recently executed RFE or converter event code (from FIG. 4*b*). The four bits of the Context_At_Point event_code 436 are the four low order bits of the event code 402 of FIG. 4*b*. The high-order bit is derived from these four by a method that will be described in section V.G, infra. As will be described more fully there, a Context_At_Point entry 430 can describe any of the sixteen events from the upper half 410 of the table, or an event with the "initiate packet" property 418 from anywhere in the table of FIG. 4*b*.

Bits <27:00> describe the next X86 instruction, the instruction about to be executed at the time that the Context_At_Point context was snapshotted. Field next_frame 438, bits <27:12>, give a physical page frame number, and field next_byte 439, bits <11:00>, give a 12-bit offset into the page.

Referring to FIG. 4*d*, a Near_Edge entry 440 describes a completed X86 intra-segment "near" control transfer instruction. Bits <63:60> 441 of a Near_Edge entry 440 describe the length of the transfer instruction. The length 441 value is between one and fifteen (the shortest X86 instruction is one byte, and the longest is fifteen bytes). Because a zero length cannot occur, these four bits 431 distinguish a Near_Edge entry 440 from a Context_At_Point entry 430.

The instruction at the source end of the Near_Edge transfer is described by a page frame number in which the instruction begins, a page frame number in which the instruction ends, a byte offset into the page where the instruction begins, and an instruction length. The page frame number for the beginning of the instruction is not explicitly represented in the Near_Edge entry 440, but rather is inherited as the next_frame value 438, 448 from the immediately-preceding entry in the profile packet (recall that profile packet always start with a Context_At_Point entry 430, and that a Near_Edge entry 440 is never the first entry). The page frame in which the last byte of the instruction lies is represented in field done_frame 444, bits <59:44>. These two page frame numbers will differ if the instruction straddles a page boundary. The byte offset into the page where the instruction begins is represented in field done_byte 445, bits <43:32>. The length is recorded in field done_length 441, bits <63:60>. Thus, the source instruction ends at the byte found by summing (((done_byte 445+done_length 441)−1) mod 4096) (4096 because that is the size of an X86 page).

The destination of the Near_Edge transfer is described by next_frame 448 and next_byte 449 fields in bits <27:00>, in the manner of the next_frame 438 and next_byte 439 fields, bits <27:00>, described supra for a Context_At_Point entry 430.

Field event_code 446, bits <31:28>, contains an event code, parallel to the event code 436 of a Context_At_Point entry 430. The four bits of the Near_Edge event_code 446 are the four low order bits of the bottom half of FIG. 4*b*; a leading One is assumed. (Thus a Near_Edge entry 440 can only describe one of the sixteen events in the lower half 404 of FIG. 4*b*).

Thus, all physical pages are mentioned in successive profile entries in their execution order. When execution crosses from one physical page to another because of an explicit branch, the branch is indicated by a Near_Edge entry 440. When execution crosses from one physical page to another because of sequential execution in virtual address space across a page boundary, a Near_Edge entry 440 will be generated either between the instruction that ended at the end of the page and the instruction that begins the next, or between the instruction that straddles the page break and the first full instruction of the next page. Alternatively, if control enters a page without a Near_Edge event, a Context_At_Point profile entry 430 will describe the arrival at the page. Together, these rules ensure that sufficient information exists in the profile entries that the flow of execution can be retraced, and a hot spot detected, without reference to the binary text. Allowing the hot spot detector to operate without examining the instruction text allows it to run without polluting the cache. Further, the guarantee that all physical pages are mentioned allows for profiling of the program as it exists in the physical memory, even though the X86 executes the instructions from the virtual address space. The guarantee ensures that control flow can be traced through the physical memory, without the need to examine the program text to infer adjacency relationships.

For a Near_Edge entry 440, the X86 processor context on arrival at the destination instruction is inferable from fields 432, 433 (bits <59:51>) and 435 (bits 42:32>) of the nearest-preceding Context_At_Point entry 430, by starting with the context 432, 433, 435 encoded in that Context_At_Point 430, and tracing forward through the opcodes of the intervening instructions to capture any updates.

D. Profile Information Collected for a Specific Example Event—a Page Straddle

Figure 4E:
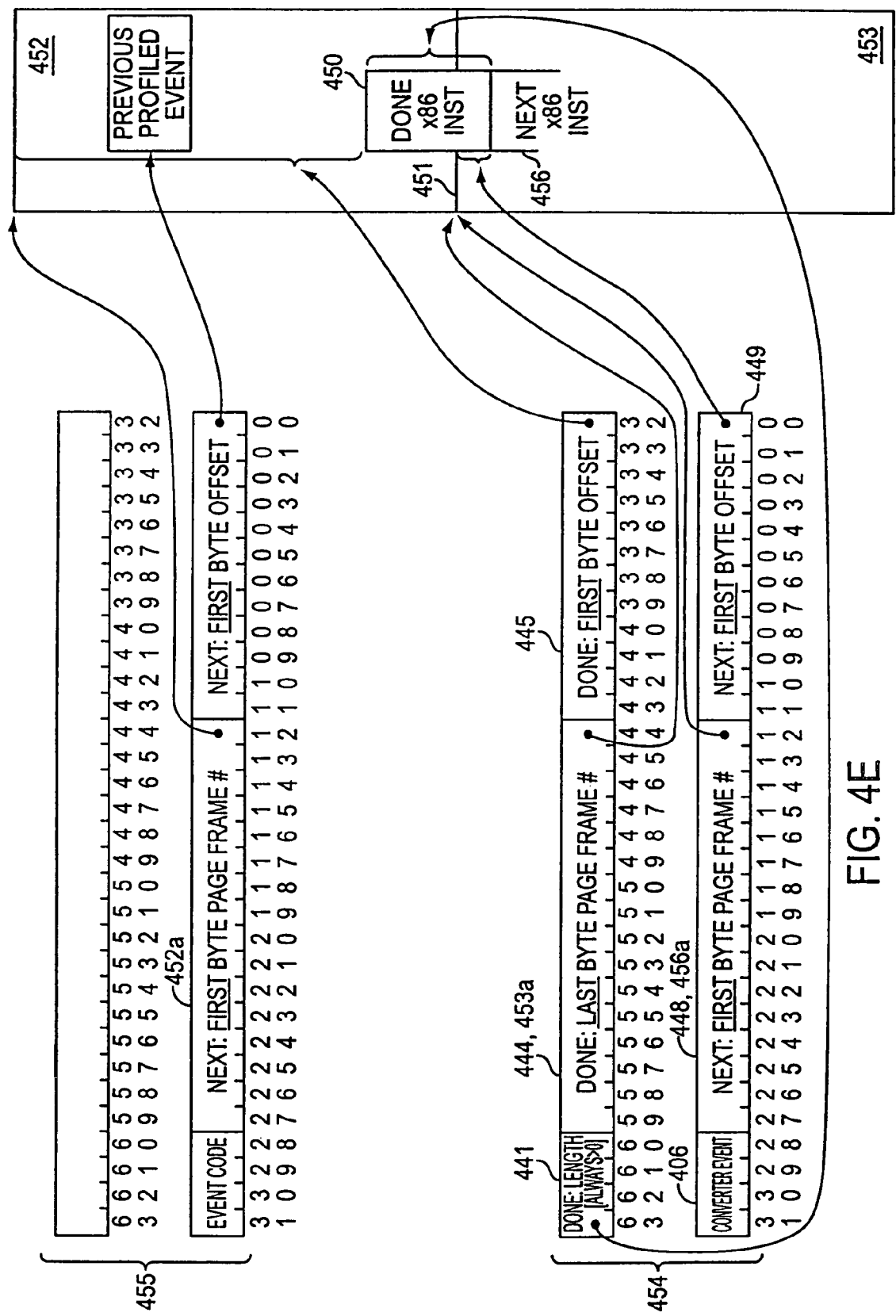
Figure 4F:
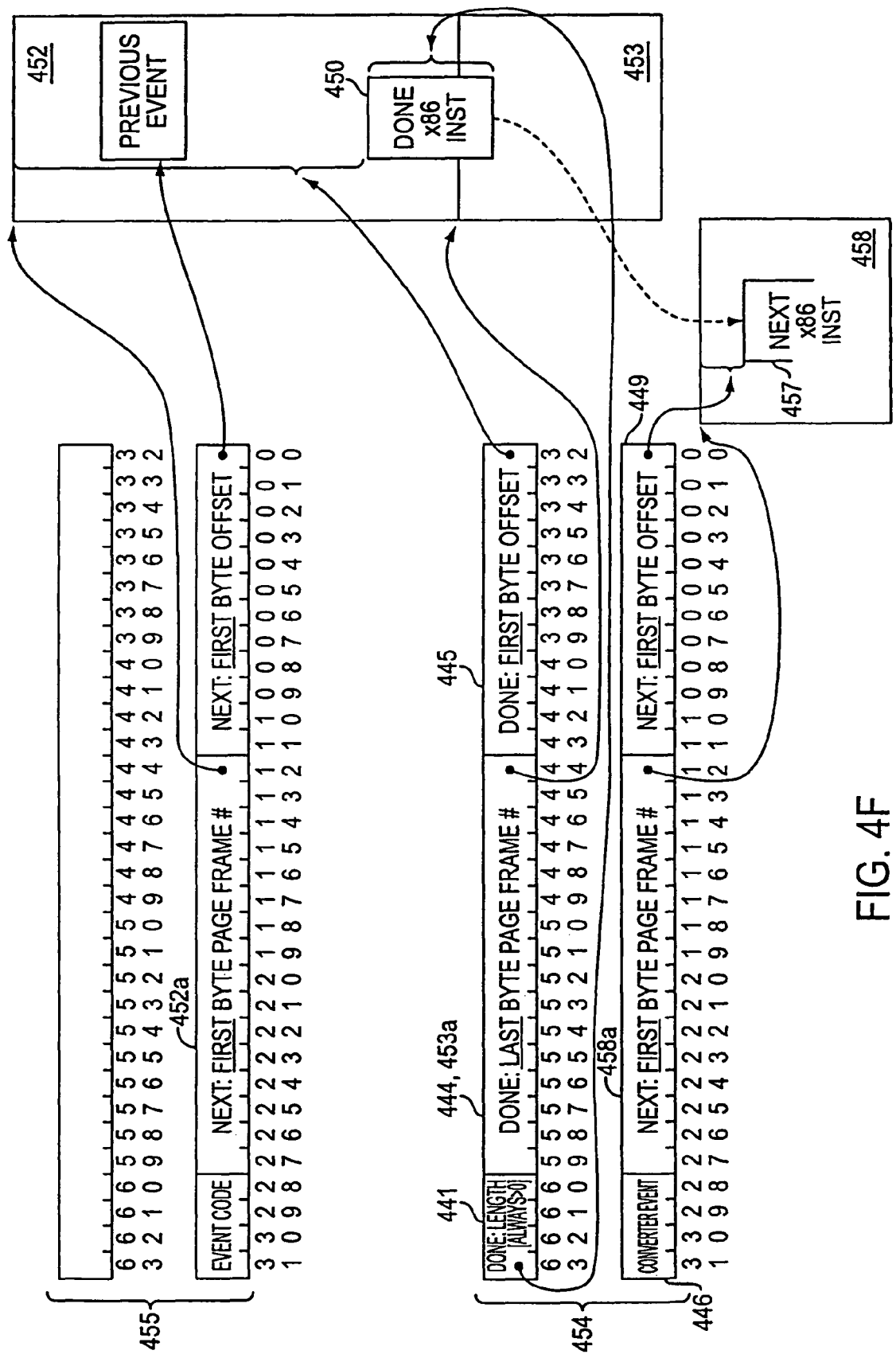

Referring to FIGS. 4*e* and 4*f*, consider two instances of instructions that straddle a page boundary. FIGS. 4*e* and 4*f* are drawn in virtual address space, though profiler 400 operates in physical address space.

In FIG. 4*e*, consider instruction 450 that straddles a page boundary 451 between pages 452 and 453, and is not a transfer-of-control instruction. The page-crossing is described by a Near_Edge entry 440, 454 with a sequential event code, code 1.1110 (406 of FIG. 4*b*). The instruction begins in the page 452 identified in the next_frame bits (bits <27:12>) 438, 448, 452*a* of the immediately previous profile entry 455, whether that previous entry is a Context_At_Point 430 or a Near_Edge 440. The instruction begins at a byte offset indicated by done_byte 445 (bits <43:32>) of current Near_Edge 454. The length of the instruction is indicated in done_length 441 (bits <63:60>) of current Near_Edge 454. The last byte of the instruction is in page 453, indicated by done_frame (bits <27:12>) 444, 453*a* of current Near_Edge 454. The last byte of the instruction will fall at byte (((done_byte 445 (bits <43:32>)+done_length 441 (bits <63:60>)−1) mod 4096)), which will necessarily equal ((next_byte 449 (bits <11:00>)−1) mod 4096. The first byte of the next sequential instruction 456 falls in page 453, as indicated in next_frame 448, 456*a* (bits <27:12>) of current Near_Edge 440, 454, at byte next_byte 449 (bits <11:00>). Because the maximum length 441 of an instruction (fifteen bytes) is less than the length of a page, done_frame 453*a* of previous profile entry 455 will necessarily equal Next_Frame 456*a* of current Near_Edge 454 in the page-straddling-instruction case shown in FIG. 4*e*.

If instruction 450 is entirely within page 452 and ends exactly at the page boundary 451, and is not a control transfer (or is a control transfer that falls through sequentially), then a Near_Edge 440, 454 will be generated whose done_frame 453*a* will point to page 452, and whose next_frame 456*a* will point to the following page.

Referring to FIG. 4*f*, consider another example, a page-straddle control transfer instruction 450 that touches three pages, the two pages 452, 453 on which the source instruction itself is coded, and page 458 on which the destination instruction 457 begins. Event code 446 of current Near_Edge entry 454 records the nature of the control transfer, codes 1.0000 through 1.1100 (FIG. 4*b*). As in the sequential flow case of FIG. 4*e*, transfer instruction 450 begins in page 452, as indicated identified in next_frame field 438, 448, 452*a* of immediately previous profile entry 455, at a byte offset indicated by next_byte 439 (bits <43:32>) of current Near_Edge 455. The length of instruction 450 is indicated in done_length 441 of current Near_Edge 454. Instruction 450 ends in page 453, as indicated by done_frame 444, 453*a* (bits <59:44>) of current Near_Edge 440, 454, at byte ((done_byte 445 (bits <43:32>)+done_length 441 (bits <63:60>)−1) mod 4096), each taken from the current Near_Edge 440, 454. Destination instruction 457 begins in page 458, as indicated by next_frame 448, 458*a* (bits <27:12>) of the current Near_Edge 454, at byte offset next_byte 449 (bits <11:00>). For a page-straddling branch 450, done_frame 444, 453*a* (bits <59:44>) of current Near_Edge 454 now disagrees with the next_frame 438, 448 of the previous entry, because of the page straddle.

If a profile packet is initiated on a control transfer instruction, the first entry will be a Context_At_Point entry 430 pointing to the target of the transfer instruction.

Referring to FIG. 4*a*, the Near_Edge 440 and Context_At_Point 430 entries together provide a compact, efficient description of even the most complex control flow, giving enough information to allow hot spot detector 122 and TAXi binary translator 124 to work, without overwhelming them with an overabundance of information that is not useful for these two tasks. Note that the requirements of hot spot detector 122 and TAXi binary translator 124 are somewhat different, so the information in the profile is designed to superset the requirements of the two.

In some embodiments, it may be desirable to record a range as the first byte of the first instruction to the first byte of the last instruction. Recording ranges in this manner is particularly attractive if the architecture has fixed-length instructions.

E. Control Registers Controlling the Profiler

Referring to FIG. 4*g*, the TAXi hardware system is controlled by a 64-bit register called TAXi_Control 460. TAXi_Control 460 allows fine control over profiling. Because much of the system is driven by the profile, fine control over profiling gives fine control over the entire TAXi system. The various bits allow for enabling and disabling separate pieces of the TAXi mechanism, enabling and disabling profiling for code that meets or does not meet certain criteria, and timer controls that control rates of certain events. In any code region for which profiling is disabled, the TAXi resources will be quiescent, and impose no overhead.

In a typical embodiment, the contents of TAXi_Control register 460 will be written once during system initialization, to values determined by system tuning before shipment. In other embodiments, the values may be manipulated on the fly, to adapt to particular systems' usage patterns. The one exception is the special_opcode field 434, discussed infra.

Bit <63>, probe 676 is use to enable or disable the probe exception, and will be discussed in more detail in connection with probing, section VI, infra. Bit <62>, Profile_Enable 464, "prof," enables and disables profile trace packet collection and delivery of the profile trace-packet complete exception. The probe 676 and Profile_Enable 464 bits will typically be manipulated to disable TAXi operation any time the hardware debugging resources are active.

Bit <61>, tio 820, indirectly controls the TAXi I/O exception, to provide one of the guards that implement the safety net introduced at section I.D, supra, and described in further detail in section VIII.A, infra.

Bit <60>, unpr 468, enables and disables the unprotected exception, discussed in section I.F, supra. Unprotected exceptions are only raised when profiling on unprotected pages.

Field 470, bits <59:56> control the code segment/stack segment size combinations that will be profiled. Bit <59>, "c1s1," enables profiling for portions of the program whose X86 code segment has its 32-bit default operand-size/address-size bit set, and uses a stack in a segment whose 32-bit stack bit is set. Bit <58>, "c1s0," enables profiling for 32-bit operand/address, 16-bit stack segments. Bit <57>, "c0s1," enables profiling for 16-bit operand/address, 32-bit stack segments. Bit <56>, "c0s0," enables profiling for 16-bit operand/address, 16-bit stack segments.

Bit <55>, "pnz," enables profiling for code in privilege rings one, two, and three (Not Equal to Zero).

Bit <54>, "pez," enables profiling for code in privilege ring zero (Equal to Zero).

Bits <53>, <52>, and <51>, "v86," "real," and "smm" (with the size and mode controls of bits <59:54>, collectively known as the Global_TAXi_Enables bits 470, 472), enable and disable profiling for code in the virtual-8086, real, and system management execution modes of the X86 (these execution modes indicated by system flags and the IOPL field in the X86 EFLAGS register). If a given X86 execution mode is not supported by TAXi (in the sense that TAXi will not attempt to produce translated native Tapestry binaries for code of that X86 mode), the system is designed to impose no overhead on code in that mode. Thus, when the Global_TAXi_Enables 470, 472 bit for a mode is Zero and virtual X86 310 is executing in that mode, then execution is not profiled, the profile timer (492 of FIG. 4*i*) does not run, and the profile, unprotected, and probe exceptions are all inhibited.

Bits <50:44>, special_opcode 474 are used to set the contents of Context_At_Point profile entries 430. X86 emulator 316 sets special_opcode 474 to a desired value. When an RFE with event code 0.1010 (FIG. 4*b*) is subsequently executed, the contents of TAXi_Control.special_opcode 474 are copied unmodified into the special_opcode field 434 (bits <50:44>) of a Context_At_Point event 430.

Bits <43:38>, Packet_Reg_First 476, and <37:32>, Packet_Reg_Last 478, specify a range of the general registers to be used to accumulate profile trace packets. The first Context_At_Point entry 430 of a packet will be stored in the register pointed to by Packet_Reg_First 476, then the next entry in register Packet_Reg_First+1, and so on, until the last entry is stored in Packet_Reg_Last 478. Then a "profile full" exception will be raised (536, 548 of FIG. 5*a*), so that the profile registers can be spilled to memory. As shown in Table 1, typically Packet_Reg_First 476 will be set to 17, and Packet_Reg_Last 478 to 31.

Bits <31:16>, Profile_Timer_Reload_Constant 494, and <15:00> Probe_Timer_Reload_Constant 632 (bits <15:00>) are used to control the rate of profile trace-packet collection and probing respectively. This is further discussed in connection with the TAXi_Timers register (490, 630 of FIG. 4*i*; see the discussion of FIG. 4*i* infra, and the discussion of probing in sections VI.C and VI.D, infra).

Referring to FIG. 4*h*, the internal state of the TAXi system is available by looking at a register called TAXi_State 480. In the normal running of the system, the TAXi_State register

480 is read-only, though it is read-write during context switching or design verification.

Bit <15>, "preq" or "Profile_Request" 484, indicates that profile timer 492 has expired and posted the request to collect another packet, but either no event has yet been encountered to initiate the packet, or profile timer 492 expired while a packet was actively being collected.

Bit <31>, "pact" or "Profile_Active" 482, indicates that preq "Profile_Request" 484 was set and that an Initiate Packet event (418 of FIG. 4*b*) was encountered and a profile packet has been initiated and is in progress, but the profile registers are not yet filled.

The unused bits of the register are labeled "mbz" for "must be zero."

The "Decoded_Probe_Event" 680 and "Probe_Mask" 620 fields will be discussed in section VI, infra.

The "Event_Code_Latch" field 486, 487, bits <12:08>, records a 5-bit event code (the event codes of FIG. 4*b*, or the four-bit events of a Context_At_Point entry 430 of FIG. 4*c* or Near_Edge profile entry 440 of FIG. 4*d*), as a retrospective view of the last event that was generated in converter 136 or encoded as the immediate field in an RFE instruction (588 of FIG. 5*b*). Event_Code_Latch 486, 487 serves as an architecturally visible place to log the event code until the next logical cycle of this process. The four low order bits 486 are supplied by the RFE immediate field 588 or four bits from converter 136 (582 of FIG. 5*b*). The high-order bit 487 is supplied by context, either One for events from converter 136, or Zero for events from an RFE.

The "Packet_Reg" field 489, bits <05:00>, gives the number of the register into which the next profile entry will be written, as a post-increment direct address into the register file. When TAXi_State.Packet_Reg 489 exceeds TAXi_Control.Packet_Reg_Last 478, profile collection is terminated, a Profile Packet Complete exception is raised, and the value of TAXi_State.Packet_Reg is reset to TAXi_Control.Packet_Reg_First 476.

Referring to FIG. 4*i*, TAXi_Timers register 490 has two sixteen-bit countdown timers 492, 630.

TAXi_Timers.Profile_Timer 492 (bits <31:16>) counts down at the CPU clock frequency when profile collection is enabled as described in the following paragraph. Profile_Timer 492 is an unsigned value that counts down to zero. On expiry, hardware reloads profile timer 492 with the value TAXi_Control.Profile_Timer_Reload_Constant (494 of FIG. 4*g*). Profile_Timer 492 continually counts down and reloads. The transition to zero is decoded as timer expiration as defined in the profile exception state diagram (FIG. 5*a*).

Profile collection is enabled, and profile timer 492 runs, when these five conditions are met: (1) TAXi_Control.Profile_Enable 464 is One, (2) converter 136 is active (PSW.ISA bit 194 indicates X86, see section II, supra), (3) all bytes of the current instruction have 4K page I-TLB entries, (4) all bytes of the current instruction have I-TLB page attributes in well-behaved memory (Address space zero, with D-TLB.ASI=Zero, is well-behaved, and the other address spaces are assumed to reference non-well-behaved memory) and (5) the machine is currently executing in a mode enabled in the TAXi_Control.Global_TAXi_Enables bits 470, 472 (bits <59:51>). When X86 debugging or single-step operation is requested, software clears TAXi_Control.Profile_Enable 464 to disable profile collection.

TAXi_Timers.Probe_Timer 630 (bits <15:00>) is discussed in sections VI.C and VI.D, infra.

F. The Profiler State Machine and Operation of the Profiler

Referring to FIG. 5*a*, profiler 400 operates according to state machine 510. The four states 512, 518, 530, 542 of state machine 510 are identified by the values of the TAXi_State.Profile_Active 482 and TAXi_State.Profile_Request 484 bits. The transitions of TAXi_State.Profile_Active 482 and TAXi_State.Profile_Request 484 bits, and thus of state machine 510, are triggered by timer expiry, profileable events, and packet aborts. Event "pe" indicates completion of a profileable event in the execution of the X86 program, one of the events enumerated as "profileable" 416 in table of FIG. 4*b*. Timer expiry is the countdown-to-zero-and-reset of timer TAXi_Timers.Profile_Timer 492, as described in connection with FIG. 4*i*, supra. Aborts are described further infra.

State 512 is the initial state, with Profile_Active 482 (PA) and Profile_Request 484 (PR) both equal to Zero. In state 512, profileable events 416 and abort events are ignored, as indicated by the loop transition 514 labeled "pe, ap." When the profile timer 492 expires, TAXi_State.Profile_Request 484 is set to One, which transitions 516 state machine 510 to state 518.

In state 518, Profile_Request 484 is One and Profile_Active 482 is Zero, indicating that the Profile_Timer 492 has expired, priming profiler 400 to begin collecting a profile packet. But that first profileable event 416, 418 has not yet occurred, so profiling is not yet in active progress. In state 518, further timer expirations are ignored (loop transition 520), rather than queued. Aborts are also ignored (loop transition 520), as there is no profile packet content to abort.

The first entry in a profile packet is always an event with the "Initiate Packet" property (418 of FIG. 4*b*). State 518 waits until the first "initiate packet" $pe_{init}$ event 418 occurs, initiating transition 522. Profileable events (416 of FIG. 4*b*) that are not "Initiate Packet" events (418 of FIG. 4*b*) are ignored, indicated by the "$pe_{\overline{init}}$" label on loop transition 520. On transition 522, several actions 524 are initiated. TAXi_State.Packet_Reg 489 is initialized from TAXi_Control.Packet_Reg_First 476. The hardware captures a timestamp from the Global_Timestamp processor register into the Packet_Timestamp control register (or, in an alternative embodiment, into the general register preceding the first profile event capture register). A Context_At_Point profile entry 430 is captured into the general register indicated by TAXi_State.Packet_Reg 489. At decision box 526, TAXi_State.Packet_Reg 489 is incremented, and compared against TAXi_Control.Packet_Reg_Last 478. For the first profile entry, the packet registers will never be full, so control follows path 528. TAXi_State.Profile_Active 482 is set to One, and TAXi_State.Profile_Request 484 is cleared to Zero, putting state machine 510 in state 530.

This first entry in a packet is the only circumstance in which converter 136 can generate a Context_At_Point entry 430. For second-and-following entries in a profile packet, converter 136 only generates Near_Edge entries 440. Any subsequent Context_At_Point entry 430 in the packet is generated by the RFE mechanism.

In state 530, Profile_Request 484 is Zero and Profile_Active 482 is One. At least one profileable event (416 of FIG. 4*b*) has been recognized and recorded, a profile packet 420 is in progress, and profiler 400 is awaiting the next profileable event 416. When the next profileable event 416 occurs 532, the profileable event is recorded 534 in the general register indicated by TAXi_State.Packet_Reg 489. After the event is captured by a TAXi instruction (see discussion of FIG. 5*b*, infra), control reaches decision box 526. If the range of profile registers is not full (TAXi_State.Packet_Reg 489++<TAXi_Control.Packet_Reg_Last 478—the old value of TAXi_State.Packet_Reg 489 is tested and then TAXi_State.Packet_Reg 489 is incremented), then control returns 528 to state 530 to collect more profileable events 416. If the profile registers are full (TAXi_State.Packet_Reg 489 equals TAXi_Control.Packet_Reg_Last 478), then the machine takes a profile exception 536. TAXi_State.Packet_Reg 489 is incremented after the comparison. The profile exception handler stores the collected profile into a ring buffer in memory, along with the timestamp captured by action 524. The ring buffer write pointer, pointing to the next location in the ring buffer, is maintained in R15 ("RingBuf" of Table 1). After the collected profile packet is stored at the location indicated by R15, R15 is postincremented by the size of a profile packet. TAXi_State.Profile_Active 482 and TAXi_State.Profile_Request 484 are both cleared to Zero, and control returns 538 to start state 512.

If TAXi_Timers.Profile_Timer 492 expires while state machine 510 is in state 530, that is, while a profile packet was in progress, state machine 510 sets TAXi_State.Profile_Active 482 and TAXi_State.Profile_Request 484 both to One, and transitions 540 to state 542.

The behavior of state 542 is largely similar to state 530, in that a partially-complete packet is in progress, and new profileable events 416 are logged 544 as they occur. The difference between states 530 and 542 arises when the packet is complete. A profile-registers-full exception 548 from state 542 spills the profile registers to memory, just as profile exception 536, but then as part of transition 546, TAXi_State.Profile_Request 484 is set to One, to transition to state 518, instead of to Zero as in transition 538, which transitions into start state 512 to await the next timer expiry 516. From state 518, collection of the next packet can begin immediately on the next "initiate packet" event 418, rather than awaiting another timer expiry 516. This effects one level of queuing of pending timer expires.

Collection of a profile packet may be aborted 550, 552 mid-packet by a number of events. For instance, an abort packet event code is provided (row 0.1011 of FIG. 4b)—an RFE with this event code clears TAXi_State.Profile_Active 482, which in turn discards the current profile packet and aborts profile collection until at least the next profile timer expiry. If the predicate for enabling profiling (from the discussion of TAXi_Control 460 in section V.E, supra) becomes unsatisfied, then the packet is aborted. For instance, a packet will be aborted if control passes to a page that is not well-behaved memory (for instance, a page on the I/O bus), or a byte of instruction lies on a page that does not have a 4K page I-TLB entry, or the X86 execution mode transitions to a mode for which profiling is not enabled in the TAXi_Control.Global_TAXi_Enables bits 470, 472. This abort protocol 550, 552 assures hot spot detector 122 that each packet describes an actual execution path of the X86 machine, without omission.

A transition from X86 code to Tapestry code (for instance, a successful probe exception, see section VI, infra) may be an abort 550, 552 event. Profiler 400 is configured to allow the choice between entirely discarding the aborted packet or padding out and then spilling the partial packet to the ring buffer before abort 550, 552 occurs. This choice is implemented in the code of the X86-to-Tapestry transition handler 320.

FIG. 5b is a block diagram of a portion of profiler 400, the logic 554 to collect and format a profile entry 430, 440 into a processor register. The inputs to logic 554 include TAXi_State register 480, and a number of lines produced by X86 instruction decode logic 556 within converter 136. The output of logic 554 is a profile entry in register 594. Logic 554 as a whole is analogous to a processor pipeline, with pipeline stages in horizontal bands of FIG. 5b, progressing from the top of the diagram to the bottom. The stages are clocked at X86 instruction boundaries 566. Recall from the discussion of FIG. 1c that Align stage 130 parsed the X86 instruction stream, to identify full X86 instructions, and the spatial boundaries in the stored form. Convert stage 134, 136 further decodes X86 instructions and decomposes the complex X86 CISC instructions into simple RISC instructions for execution by Tapestry pipeline 120. The temporal division between X86 instructions is marked by a tag 566 on the last instruction of the recipe of constituent Tapestry instructions emitted by converter 136. The temporal boundaries between X86 instructions are flagged in a bit of the Tapestry PSW, PSW.X86_Completed 566. The first native instruction in the converter recipe (which may be a TAXi instruction), resets PSW.X86_Completed 566 to Zero. The last native instruction in the converter recipe sets PSW.X86_Completed to One. If a converter recipe contains only one native instruction, then PSW.X86_Completed 566 is set to One. Since an emulator trap is guaranteed to be the last instruction in a converter recipe, upon normal completion of an emulated instruction recipe, PSW.X86_Completed will be One.

The Tapestry processor provides a special instruction for capturing a profile entry from processor register 594 into a general register. This special instruction is called the "TAXi instruction." The TAXi instruction is injected into the Tapestry pipeline when a profile entry is to be captured. Recall from the discussion of FIG. 1C, supra, that converter 136 decomposes each X86 instruction into one or more Tapestry instructions according to a "recipe" for the X86 instruction. The TAXi instruction is simply one more Tapestry instruction injected into the pipeline under the cooperation of profiler 400 and converter 136. Thus, profile generation is an integral part of the basic Tapestry instruction execution cycle. The TAXi instruction is typically injected into the pipeline at the beginning of the recipe for the instruction at the destination of a control transfer. At the choice of the hardware implementer, the TAXi instruction may be either a special move instruction not encodeable in the Tapestry instruction set, or it may be a move from a processor register. Depending on implementation choice, the instruction can take the form of a "move from register 594 to general register TAXi_State.Packet_Reg 489" or converter 136 can extract the contents of register 594 and inject a move-immediate of this 64-bit datum into the profile collection general register specified by TAXi_State.Packet_Reg 489.

Instruction decode logic 556 of the Align and Convert pipeline stages (130, 134, 136 of FIG. 1c) produces signals 558-562 describing the current instruction and certain other profileable properties of each instruction, and this description is latched. The information generated includes the instruction length 558 (which, if the instruction generates a profileable Near_Edge event 416, will end up as done_length 441 (bits <64:61>) of a Near_Edge entry 440), the page frame for the last byte of the instruction 559 (done_byte 445 (bits <59:44>) of a Near_Edge entry 440), and the page frame 560 and byte offset 561 of the first byte of the next instruction (bits <27:00>, the next_frame 438, 448 and next_byte 439, 449 of a Near_Edge 440 or Context_At_Point 430). Also generated by decode logic 556 is a raw event code 562 associated with the X86 instruction when that instruction is executed by converter 136, an indication of whether the instruction ends on or straddles a page boundary 563, whether the instruction is a control transfer (conditional or unconditional) 584, whether a PC-relative branch is forward or backward, and whether converter 136 is currently active (which in turn is copied from the PSW) 590.

At the next X86 instruction boundary 566, the information from the just-completed instruction is clocked from signals 558, 559, 561 to registers 568, 569, 570. Registers 568, 569,

570 are simply a buffer for time-shifting information about an X86 instruction to make it available during the next instruction, in case a profile event is to be captured. Because the native control transfer instruction is always the last instruction of the recipe for an X86 transfer instruction, the virtual-to-physical translation of the address of the destination of the transfer (especially in the case of a TLB miss) is not available until the transfer instruction itself is complete. If an event is to be captured, the TAXi profile capture instruction is injected into the pipeline as the first instruction in the recipe of the destination instruction. Thus, the time shifting defers the capture of the profile event until the address translation of the destination is resolved. Registers 569, 570 together drive a 28-bit bus 572 with the "done" part (bits <59:32>) of a Near_Edge profile entry 430.

Simultaneously, the X86 processor context for the current X86 instruction is made available on a 28-bit bus 574, in a form that parallels bits <59:32> of a Context_At_Point entry 440.

Event codes are generated by circuits 576, 591, and used to control capture of profile entries, as follows.

X86 instruction decode logic 556 generates a new raw event code 562 for each X86 instruction. This event code designates a control transfer instruction (event codes 1.0000-1.1011 of FIG. 4*b*), an instruction that straddles or ends on the last byte of a page frame (code 1.1111, 408 of FIG. 4*b*), or the default converter event code (1.1110, 406 of FIG. 4*b*) for all other cases. (For instructions executed in emulator 316, as converter 136 parses the instruction, logic 576, 578 generates the default event code 1.1110 406 or page-straddle event code 1.1111 408, and then this raw event code 562 is overwritten or selected by the event code immediate field 588 of the RFE instruction at the end of the X86 instruction's emulation routine).

If the instruction is not a control transfer instruction, the two special "non-event" event codes 1.1110 406 and 1.1111 408 (sequential flow or page straddle) are manufactured by circuit 578, using the "straddles a page boundary" signal 563 to set the low-order bit.

MUX 580 generates final converter event code 582, selecting between the raw event code 562 generated by instruction decode logic 556 and the 1.111x non-event event code 406, 408 from circuit 578 by the following mechanism. If the current instruction is a "control transfer" (either an unconditional or a conditional transfer) as indicated by line 584, or the branch predictor predicts 586 that the branch is taken, then MUX 580 selects the raw event code 562 generated by decode logic 556, else MUX 580 selects the non-event event code from 1.111x circuit 578.

When the branch is predicted 586 taken, MUX 580 selects the raw conditional branch event code 562 associated with the instruction. When the branch is predicted 586 not taken, MUX 580 selects the 1.111x non-event event code (either the page boundary event code 1.1111 408 or the default event code 1.1110 406) from circuit 578. Recall that the native control transfer instruction is always the last instruction of the recipe for an X86 transfer instruction, and that the TAXi profile capture instruction is injected into the pipeline as the first instruction in the recipe of the destination instruction of a profileable transfer. Thus, if it turns out that the branch prediction 586 was incorrect, the entire pipeline (120 of FIG. 1*c*) downstream of converter 136 is flushed, including the TAXi instruction that would capture the contents of register 594 into the next general register pointed to by TAXi_State.Packet_Reg 489. (This is because the TAXi instruction is injected into the pipeline following the native branch instruction that ends the X86 recipe). The instruction stream is rerun from the mis-predicted branch. The branch prediction line 586, on rerun, will be asserted to the correct prediction value, and MUX 580 will thus select the correct event code, and the TAXi instruction will correctly be injected or not injected. This event code resolution allows the profile packet to correctly record taken branches or taken conditional branches that straddle (or end on) a page boundary, and to correctly omit capture of not-taken branches that do not cross a page boundary.

For emulated instructions, converter 136 always supplies an event code 582 that is either the default or new page event code 578. Since converter 136 completely decodes all instructions, it could supply the event code corresponding to far control transfer instructions (far CALL, far JMP, far RET or IRET) instead of the default or new page event code 578. This event code is latched as part of the emulator trap recipe. When emulator 316 completes an instruction that straddles a page frame and RFE's back to converter 136 with the simple X86 instruction complete event code 0.0001, the new page event 1.1111 408 in Event_Code_Latch (486, 487, bits <44:40> of FIG. 4*i*) will be used. Since the high-order bit is set, a reuse event code 414 RFE will result in a Near_Edge profile entry being captured; this is correct, because the RFE implies no data-dependent alteration of context that would require a Context_At_Point. If emulator 316 supplies an RFE event code that doesn't reuse 414 the Event_Code_Latch, then the RFE event code 588 will be latched. This convention allows the profile packet to record either interesting emulated instructions or simple emulated instructions that straddle a page frame.

Similarly, if an X86 instruction fails and must be restarted, the profile information 558, 559, 560, 561, 562, 563, 584 for the instruction is regenerated and runs down the profile pipeline 554 in parallel with the instruction. For instance, if an instruction fetch misses in the TLB, the TLB miss routine will run to update the TLB, and the instruction will be restarted with regenerated profile information in the profile pipeline.

When an event code comes from the immediate field 588 of an RFE instruction (410 of FIG. 4*b*), Converter_Active line 590 is used both as the select line 590*a* into MUX 591 to select between the converter event code 582 and the RFE-immediate event code 588 for the four low-order bits, and also supplies the high-order bit 590*b* of the event code 402, to form a five-bit event code 592. This event code 592 is latched into TAXi_State.Event_Code_Latch (486, 487, bits <44:40> of FIG. 4*i*). (The reader may think of TAXi_State.Event_Code_Latch 486, 487 as being part of the pipeline stage defined by registers 568, 569, 570.) Not shown in FIG. 5*b* is the effect of "reuse event code" 414 of FIG. 4*b*: when an RFE instruction completes with a "reuse event code" event code immediate (0.0000 through 0.0011), update of TAXi_State.Event_Code_Latch 486, 487 is suppressed, and the old event code is left intact.

Each X86 instruction materializes either a Context_At_Point entry 430 or a Near_Edge entry 440 into 64-bit register 594. The two possible sets of bits 568, 572, 574 are presented to MUXes 596*a*, 596*b*, and bit TAXi_State.Event_Code_Latch<4> 487 selects between them. Note, for instance, that TAXi_State.Profile_Active 482 must be True (states 530 and 542 of FIG. 5*a*) in order to generate a One from AND gate 598 to generate a Near_Edge entry 440; this enforces the rule that a Near_Edge entry 440 must always be preceded by a Context_At_Point entry 430. Thus, a Context_At_Point entry is always forced out if TAXi_State.Profile_Active 482 is Zero (states 512 and 518 of FIG. 5*a*) when a TAXi instruction is issued.

If profiler 400 decides that the entry in register 594 ought to actually be captured into a profile, converter 136 injects a TAXi profile capture instruction into the Tapestry pipeline 120 at the boundary 566 between the profiled X86 instruction and the next X86 instruction, in order to capture the profile information from register 594.

In some embodiments, it may be desirable to inject multiple TAXi instructions to capture different kinds of profile information. For instance, multiple TAXi instructions could capture a timestamp, a context (analogous to a Context_At_Point entry 430), a control flow event (analogous to a Near_Edge entry 440), or one injected instruction could compute the desired information, and the next instruction store that information to memory. It may be desirable to temporarily collect the profile information into a register that is not addressable in the architecture, to reduce contention for the storage resource. While register conflict scheduling hardware would have to be used to schedule access to this temporary register, the addition of this register would isolate the operation of profiler 400 from other portions of the processor.

The TAXi instruction is injected (and a "pe" event 416 triggers a transition in state machine 510 of FIG. 5*a*) when all of the following conditions are met: (1) the machine is currently executing in a mode enabled in the TAXi_Control bits <53:51> (that is, the AND of the current X86 instruction context and TAXi_Control.Global_TAXi Enables 470, 472 is non-zero), (2) the machine is at an X86 instruction boundary, (3) all bytes of the current instruction have 4K page I-TLB entries, (4) all bytes of the current instruction have well-behaved (address space zero) memory I-TLB entries, and (5) at least one of these is true: (a) profile collection is enabled (TAXi_State.Profile_Active 482 is One) and TAXi_State.Profile_Request 484 is One and TAXi_State.Profile_Active 482 is Zero and the event code currently latched in TAXi_State.Event_Code_Latch 486, 487 has the "initiate packet" property (418 of FIG. 4*b*), or (b) TAXi_State.Profile_Active 482 is One and the event code of TAXi_State.Event_Code_Latch 486, 487 is "profileable" (416 in FIG. 4*b*), or (c) a TAXi probe exception will be generated (this is ancillary to profiling, but rather is a convenient mechanism to control probing, see sections VI.C and VI.D, infra).

During an interrupt of the orderly execution of X86 instructions, for instance during a TLB miss, page fault, disk interrupt, or other asynchronous interrupt, the machine queries X86 converter 136 and switches to native execution. During native execution, X86 instruction-boundary clock 566 is halted. Because X86 clock 566 is halted, the Near_Edge state of the previous X86 instruction is held in registers 568, 569, 570 until X86 execution resumes.

Note that in the embodiment of FIG. 5*b*, profiling is only active during X86 execution. In an alternative embodiment, profiler 400 is active during execution of native Tapestry instructions translated from X86 by TAXi translator 124, so information generated by profiler 400 can be fed back to the next translation to improve optimization the next time the portion is translated. The register usage of the Tapestry program is confined by the compiler, so that the profile entries can be stored in the remaining registers.

TAXi_Control.Profile_Timer_Reload_Constant (494 of FIG. 4*g*) can be tuned by this method. If hot spot detector 122 finds a that the working set of the program is changing slowly (that is, if a high proportion of hot spots detected overlap with previously-detected hot spots), then profiler 400 is running too often. In this case, Profile_Timer_Reload_Constant 494 can be increased, reducing the frequency of profiling. Similarly, if hot spot detector 122 is finding a large change in the working set between hot spot detector runs, then Profile_Timer_Reload_Constant 494 can be reduced.

An alternative tuning method for TAXi_Control.Profile_Timer_Reload_Constant 494 considers buffer overruns. When the range of profile collection registers is full, the profile registers are spilled (536 and 548 of FIG. 5*a*) to a ring buffer in memory. The hot spot detector 122 consumes the profile information from this ring buffer. If profiler 400 overruns hot spot detector 122 and the ring buffer overflows, then the value in TAXi_Control.Profile_Timer_Reload_Constant 494 is increased, to reduce the frequency at which profiling information is collected. Alternatively, on a buffer overrun, the frequency at which hot spot detector 122 runs can be increased.

G. Determining the Five-Bit Event Code from a Four-Bit Stored Form

Referring again to FIGS. 4*b*, 4*c*, and 4*d*, the event code field 436, 446 in a profile entry (either a Context_At_Point entry 430 or a Near_Edge entry 440) is four bits. Because the four bits can only encode sixteen distinct values, and thirty-two classes of events are classified in FIG. 4*b*, the high order bit is recovered as follows.

A Near_Edge entry 440 can never be the first entry in a packet. The elided high-order bit is always a One, and thus a Near_Edge entry 440 always records an event from the lower half 404 of the table of FIG. 4*b*. The event was always generated by converter 136 (or 1.111x non-event circuit 578), and was materialized at line 582 of FIG. 5*b*.

When a Context_At_Point 430 is not the first entry in a packet, the elided high-order bit is always a Zero, reflecting an event from the upper half 410 of the table of FIG. 4*b*. These non-initial Context_At_Point entries 430 were always generated by RFE events.

Every packet begins with a Context_At_Point entry 430, and that Context_At_Point is an event with the "initiate packet" property (418 of FIG. 4*b*). The event codes 402 are carefully assigned so that only one RFE event code (lower half 404 of FIG. 4*b*) and converter event code (upper half 410 of FIG. 4*b*) both share identical low-order four bits and are also have the "initiate packet" property 418. These two are event codes 0.0110 and 1.0110, near RET and far RET. Thus, the high-order fifth bit can be recovered from the four bit event code 436, 446 of the first event in a packet by a lookup:

```
0000 -> 1
0001 -> 1
0010 -> 1
0011 -> 1
0100 -> 1
0101 -> 1
0110 -> *
0111 -> 1
1000 -> 0
1001 -> 0
1010 -> 1
1011 -> 1
1100 -> 0
1101 -> 0
1110 -> 0
1111 -> 0
```

Near and far returns (0.0110 and 1.0110) share the same four low-order bits, and either may appear at the beginning of a packet. An implementation may choose to recover either a 0 or 1. The ambiguity is an acceptable loss of precision.

H. Interaction of the Profiler, Exceptions, and the XP Protected/Unprotected Page Property Exceptions interact with profile collection in several ways.

A first class of exceptions are handled completely by the Tapestry Operating System (312 of FIG. 3*a*). These include TLB, PTE, and PDE exceptions and all native-only exceptions. After handling the exception, sequential execution resumes, with no profile entry collected. The RFE instruction at the end of these exception handlers uses the sequential 0.0000 unchanged event code.

A second class includes TAXi profiling exceptions, including the profile-register-full exception and unprotected exception (see section I.F, supra). Exceptions in this second class have special side effects defined by the TAXi environment. These exceptions resume instruction execution and use special RFE event codes to control the profiling environment.

A third class includes all emulator traps from converter 136 for X86 instruction emulation. Exceptions in the third category provide additional profile information. Emulator 316 always uses a non-zero RFE event code to resume converter operation.

A fourth class includes asynchronous X86 transfers of control from hardware interrupts, page faults, breakpoints, single-step, or any other X86 exception detected in converter 136 or emulator 316 that must be manifest to the X86 virtual machine. Exceptions in the fourth class have special capabilities. When emulator 316 is about to cause a change of control flow through the X86 IDT, it uses one of four software defined event codes in the RFE. These event codes are divided into two categories. One category is used just for profiling and the other is used to allow emulator 316 to force a check for translated code on any X86 code page. Emulator 316 maintains a private data structure to test that a probe check should be generated for a particular ISR address.

The "unprotected" exception (see section I.F, supra) and profiler 400 interact as follows. One of the effects of an unprotected exception is to issue a TAXi instruction to start a new profile packet. Recall that the unprotected exception is triggered when an X86 instruction is fetched from an unprotected, profileable page:

| | |
|---|---|
| TAXi_State.Profile_Active 482 == 1 | // profiling |
| TAXi_Control.unpr 468 == 1 | // exception enabled |
| Page's I-TLB.ISA 182 == 1 and XP 186 == 0 | // unprotected |
| Fetch page is 4KB | // no abort... |
| Fetch page is ASI == 0 | // no abort... |

TAXi_State.Profile_Active 482 is set to prime the collection of a packet in the cycle when an "initiate packet" (418 in FIG. 4*b*) event is recognized. A TAXi instruction is sent flowing down the pipe to update TAXi_State.Profile_Active 482 in the following cycle, after the translated fetch address is known and the next instruction has been successfully fetched. A TAXi instruction is issued when TAXi_State.Profile_Active 482 is clear, TAXi_State.Profile_Request 484 is set and TAXi_State.Event_Code_Latch 486, 487 contains an event_code for which Initiate_Packet 418 is true or the first instruction in a converter recipe is issued and TAXi_State.Profile_Active 482 is set. The unprotected exception handler may choose whether to preserve or discard the current profile packet, keeping in mind that profile collection on any page that is not protected is unsafe, since undetected writes to such a page could lead to an incorrect profile database. When TAXi_Control.unpr 468 is clear, no exception is generated and TAXi software is responsible for validating the profile packet and setting the "Protected" page attribute.

There are two narrow exceptions to the rule that all pages referenced in a profile packet must be protected—the boundary cases at the beginning and end of the packet. If a profile packet (e.g., 420 of FIG. 4*a*) ends with a control transfer instruction, the last byte of the transfer instruction, and thus the source of the transfer (the done_frame member 444), must be on a protected page, but the destination of the transfer (the next_frame member 438, 448 of the entry) need not be. Similarly, if a packet begins with a control transfer instruction (one having the "initiate packet" property, 418 of FIG. 4*b*), the destination of the transfer (next_frame 438, 448) must be on a protected page, but the source need not be. In the latter case, the source will escape mention in the profile packet as a matter of course, because a packet must begin with a Context_At_Point entry (430 of FIG. 4*c*), which does not mention the source of the event.

I. Alternative Embodiments

To provide a good heuristic for when to generate optimistic out-of-order code and when to generate conservative in-order code, profile entries may record references to non-well-behaved I/O space. One mechanism is described in section VIII.B, infra, converter event code 1.1100 that records accesses to I/O space. In an alternative embodiment, a "profile I/O reference" exception traps into Tapestry operating system 312 on a reference to I/O space, when executing from an X86 code page (PSW.ISA 194 equals One, indicating X86 ISA), and TAXi_State.Profile_Active (482 of FIG. 4*h*) is One. At the completion of the exception handler, the RFE immediate field (588 of FIG. 5*b*) will supply a profile event with event code 1.1100 to indicate an I/O space reference.

A profile control register may be used to control profiling at a finer grain level. For instance, a register may have 32 bits, where each bit enables or disables a corresponding one of the event classes of FIG. 4*b*. Another control for profiling is discussed infra, in connection with PLA 650.

VI. Probing to Find a Translation

A. Overview of Probing

Profiler 400 generates a profile of an X86 program. Hot spot detector 122 analyzes the profile to identify often-executed sections of code. TAXi binary translator 124 translates the hot spot from X86 code to TAXi code (the Tapestry native code generated by TAXi binary translator 124, functionally equivalent to the X86 binary). Because the X86 binary is left unaltered, it contains no explicit control flow instruction to transfer control to the TAXi code. "Probing" is the process of recognizing when execution has reached a point in an X86 binary that has a corresponding valid entry point into TAXi code, seizing control away from the X86 binary, and transferring control to the TAXi code.

In one embodiment, each instruction fetch cycle queries of a table. Each entry of the table maps an X86 physical IP value to an address of a TAXi code entry point. For instance, a large associative memory may map X86 physical IP values to entry points into TAXi code segments. The number of segments of TAXi code will typically be, at most, on the order of a few hundred, and execution can only enter a TAXi code segment at the top, never in the middle. Thus, only a few hundred entries in the mapping will be live at any point in time. Such a sparse mapping can be implemented in an associative memory roughly the size of one of the caches. Again, the hit rate in this table will be extremely low. Conceptually, the other embodiments discussed infra seek to emulate such an associative memory, using less chip real estate.

In another embodiment, the mapping from X86 physical IP value to Tapestry entry point is stored in memory in a table, and the most-accessed portions of this mapping table are kept in a cache, analogous to a TLB. Each entry in this mapping table has a valid bit that tells whether the accompanying entry is or is not valid. The cached copy of this table is queried during each instruction fetch cycle. Again, the hit rate in this table will be extremely low.

In another embodiment, a bit vector has a bit corresponding to each byte (or each possible instruction beginning, or each basic block) that indicates whether there is an entry point to TAXi code corresponding to that byte of X86 instruction space. Each entry in a mapping table includes a machine state predicate, indicating the X86 machine state assumptions that are coded into the TAXi code associated with the entry, and the address for the TAXi entry point. In this embodiment, probing is implemented as a three step process: query the bit vector to see if a mapping translation exists, and if so, look in the mapping table, and if that succeeds, verify that the X86 machine state currently satisfies the preconditions listed in the table entry. The bit vector is quite large, potentially taking ⅑ of the entire memory. Further, the bit vector and table queries tend to pollute the cache. In this embodiment, an exception is raised after the bit vector query succeeds, and the table query is performed by the exception handler software; thus, an exception is only raised for addresses that have their corresponding bits in the bit vector set, addresses that have valid TAXi code entry points.

In another embodiment, each bit in the bit vector corresponds to a page of X86 code. If there is an X86 instruction somewhere on the page with a corresponding translation, then the corresponding bit in the bit vector is set. Then, at each event that may be followed by entry to a TAXi code segment, the mapping table is probed to see if such a translation exists. Thus, this implementation takes less memory to hold the bit vector than the embodiment of the previous paragraph, but generates an exception for every instruction fetch from the pages to query the table, not just the instructions that have corresponding TAXi entry points. This embodiment works especially well if translation is confined to a relatively small number of infrequent events, for instance, subroutine entries, or loop tops.

A bit associated with a page can be cached in the TLB, like the other page properties 180, 186.

In the embodiment discussed at length in the following sections, TAXi divides the possible event space by space (pages), time (using the Probe timer), and event code (the same event code 402 used in profiling).

B. Overview of Statistical Probing

TAXi prober 600 uses a set of statistical heuristics to help make a profitable set of choices about when a TAXi translation is highly likely to exist in the TAXi code buffer. Rather than probe for a translation on every occurrence of an event, for instance at every routine call, TAXi prober 600 probes on a larger class of events, including simple control transfers, conditional jumps, near CALL, far CALL and delivery of an X86 interrupt, and uses a statistical mechanism to throttle the number of probes on the expanded number of classes down to a number likely to succeed. The statistical probe mechanism is designed to have a high correlation between probe exceptions and actual opportunities to execute TAXi code.

TAXi divides the space of possible program events spatially, logically, and temporally, and then forms a statistical association between the X86 code space/logic/time that is not always correct, but that is well correlated with the existence of TAXi code. As in the embodiments described in section VI.A, a table maps X86 physical IP values to entry points in TAXi code segments. This table is called the PIPM (Physical IP Map) 602. Each physical page has associated properties. The properties are associated with several logical event classes (a subset 612 of the event classes laid out in FIG. 4*b* and discussed in section V.B, supra). Binary translator 124 maintains five bits 624 of properties per page in PFAT (page frame attribute table) 172—when a binary translation is created, the bit 624 corresponding to the entry event is set in the X86 page's PFAT entry 174 to indicate the existence of the translation, and an entry in PIPM 602 is created that maps the X86 physical IP address to the address of the TAXi code segment. The five PFAT bits are loaded into the TLB 116 with the page translation from the page tables. Enablement of the feature that queries these bits is gated by a time-varying probe mask, whose bits correspond to the five PFAT/TLB bits.

A probe occurs in several stages, as will be described in detail in connection with FIG. 6*c*. When a stage fails, the rest of the probe is abandoned. The first stage is triggered when an X86 instruction is executed, and that instruction generates an event code that is one of the probeable event codes, and the corresponding probe property for the page is enabled, and the corresponding bit in the current probe mask is enabled. The first stage is essentially an implementation of the associative memory search described for the previous embodiments, but on a memory page granularity. This first stage gives a reasonable-but-imperfect evaluation of whether it is likely to be profitable to generate an exception, so that software can actually probe PIPM 602. If this first stage test succeeds, then the processor generates a probe exception. A software exception handler probes PIPM 602 to discover whether there is a current translation of the current IP value, and to find the address of that translation.

This implementation uses no large hardware structures on the Tapestry microprocessor chip; for instance, it avoids a large associative memory. The implementation reduces the overhead associated with unsuccessful probes of PIPM 602, while providing a high likelihood that execution will be transferred to the TAXi code that is translated to replace a hot spot of the X86 program.

Recall also that probing is an optimization, not a condition for minimum correctness. If prober 600 generates too many probe exceptions, the excess probes of PIPM 602 will fail because there is no translation to which to transfer control, and correct execution will resume in converter (136 of FIGS. 1*a* and 1*c*). The cost of an error is one execution of the probe exception handler. If the mechanism generates too few probes, then control will not be transferred to the TAXi code, and execution will simply continue in converter 136. The cost of the error is the opportunity foregone (less the cost of the omitted exception). Because errors do not induce any alteration in the result computed, a heuristic, not-always-correct approach does not violate any architectural correctness criteria. This goal is sought by finding fine-grained ways of slicing up time, space, and classes of events, and associating a well-correlated indicator bit with each slice.

C. Hardware and Software Structures for Statistical Probing

A number of the structures discussed in section V, supra, in connection with profiling are also used in probing.

Referring again to FIG. 4*b*, the event code taxonomy 402 for profiling is also used for probing. Column 610 designates a number of events as "probeable." The events designated probeable 610 are all transfers of control by an X86 instruction or interrupt. The code at the destination of the transfer is a candidate for a probe. Hot spot detector 122 is designed with knowledge of the probeable event classes, and will only translate a detected X86 hot spot when the control transfer that reaches the hot spot is one of the probeable events 610. Thus, when an X86 program executes a transfer of control, and the transfer is one of the probeable 610 transfers, there is at least the theoretical possibility of the existence of TAXi code, and the rest of the probe circuitry is activated.

The probeable events 610 are further classified into six classes, in column 612. The six classes are "far CALL," "emulator probe," "jnz," "conditional jump," "near jump," and "near CALL."

Referring again to FIG. 4h, probe mask 620 is a collection of six bits, one bit corresponding to each of the six probeable classes 612 of FIG. 4b. When a probe mask bit is One, probes for the corresponding class 612 are enabled—when an event of that class occurs (and certain other conditions are satisfied, see the discussion of FIGS. 6a-6c, infra), the hardware will trigger a probe exception and a probe of PIPM 602. When a probe mask 620 bit is Zero, probes for the corresponding class 612 are disabled—even if a translation exists for the destination of the event, the hardware will not initiate a probe of PIPM 602 to find the translation.

Referring again to FIG. 1d, a PFAT entry 174 has five bits 624 of properties for each physical page. These five bits 624 correspond to the "far CALL," "jnz," "conditional jump," "near jump," and "near CALL" probeable properties (612 of FIG. 4b, 620 of FIGS. 4h and 6b, and 660, 661, 662, 663, 664 of FIG. 6b—the "emulator probe" probe is raised by software, rather than being maintained on a per page basis). The corresponding bit of PFAT probe properties 624 is set to One when hot spot detector 122 has detected a hot spot and binary translator 124 has generated a native Tapestry translation, and the profile for the translation indicates the class of events that lead to entry of the X86 hot spot that is detected and translated. The five bits 624 of a given page's PFAT entry are AND'ed together with the five corresponding bits of probe mask 620 to determine whether to probe, as described infra in connection with FIGS. 6b-6c.

Referring again to FIGS. 4g, 4h and 4i, TAXi_Timers.Probe_Timer 630 is an unsigned integer countdown timer that counts down at the CPU clock frequency, used to control the average rate of failed probe exceptions on a per-event-class basis. When Probe_Timer 630 counts down to zero, TAXi_State.Probe_Mask 620 is reset to all One's, and Probe_Timer 630 is reset to the value of TAXi_Control.Probe_Timer_Reload_Constant 632. An RFE with event code 0.0011 forces an early reset of Probe_Timer 630 from Probe_Timer_Reload_Constant 632.

Together, Probe_Mask 620 and Probe_Timer 630 synthesize the following behavior. As long as probes of a class 612 are successful, the machine continues to probe the class. When a probe fails, the class 612 of the failed probe is disabled for all pages, by setting the class' bit in Probe_Mask 620 to Zero. At the next expiry of Probe_Timer 630, all classes are re-enabled.

Recall that TAXi code segments are created asynchronously to the execution of the X86 binary, after a hot spot is detected by hot spot detector 122. Translated code segments are retired when they fall into disuse. On a round-robin basis, TAXi native code segments are marked as being in a transition state, and queued as available for reclamation. The code segment, while in transition state, is removed from all address spaces. If the TAXi code segment is invoked while in transition state, it is dequeued from the transition queue, mapped into the invoking address space, and re-set into active state. If the TAXi code segment is not invoked while in transition state, the storage is reclaimed when the segment reaches the tail of the queue. This reclamation policy is analogous to the page replacement policy used in Digital's VAX/VMS virtual memory system. Thus, because the reclamation policy is somewhat lazy, PFAT 172 may be somewhat out of date.

Figure 6A:
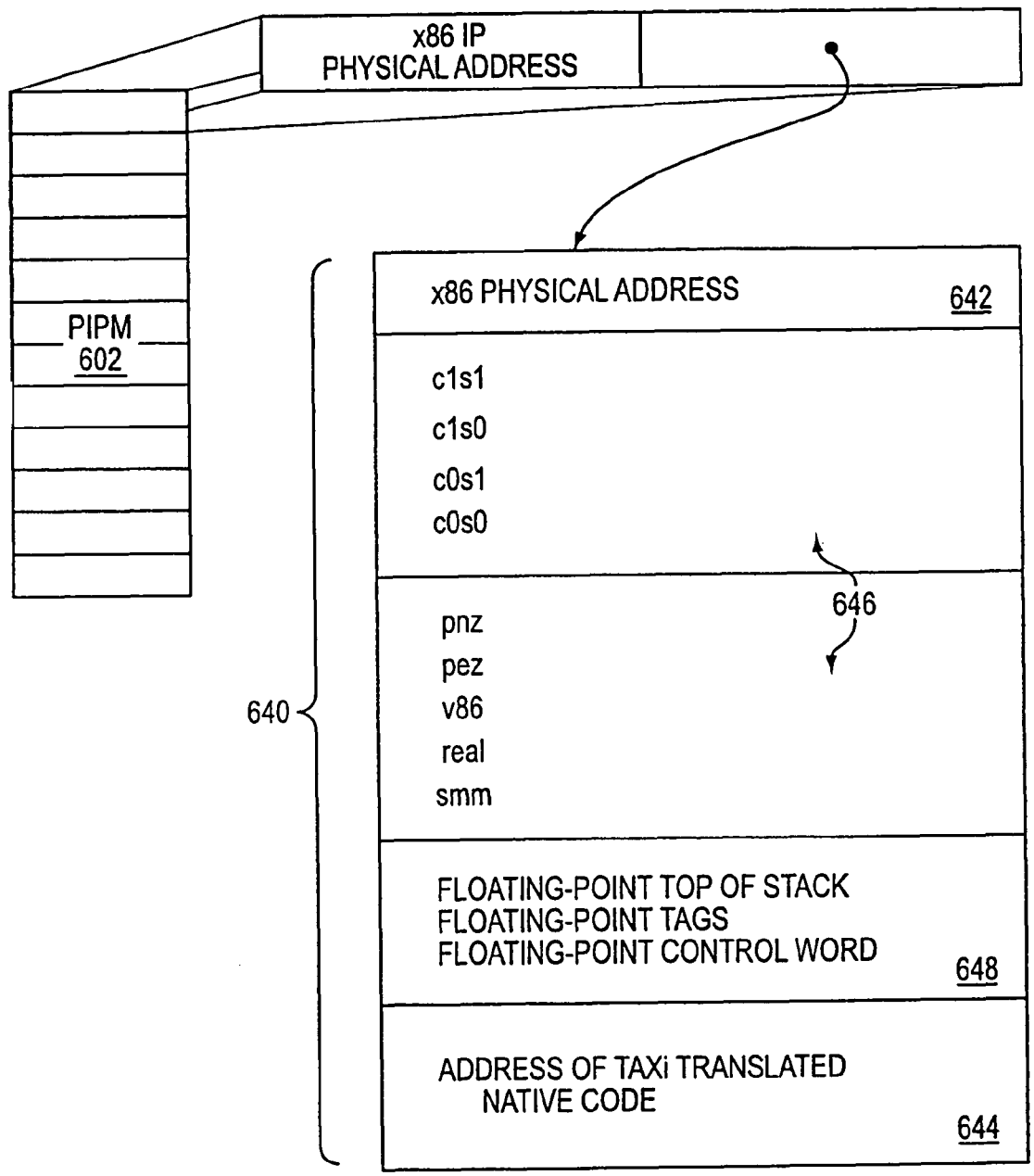
FIG. 6a is a block diagram of PIPM (Physical IP map) and an entry thereof.

Referring to FIG. 6a in conjunction with FIGS. 1c, 1d, 3a and 4b, PIPM 602 is a table of PIPM entries 640. Each PIPM entry 640 has three classes of information: the X86 physical address 642 that serves as an entry point into a translated hot spot, X86 machine context information 646, 648 that was in effect at the time of previous executions and which now serves as a precondition to entry of a translated TAXi code segment, and the address 644 of the translated TAXi code segment. The integer size and mode portion 646 of the context information is stored in a form that parallels the form captured in a Context_At_Point profile entry (430 of FIG. 4c), and the form used to control profiling in the TAXi_Control.Global_TAXi_Enables bits (470, 472 of FIG. 4g). If the current size and mode of virtual X86 310 does not match the state saved in the size and mode portion 646 of PIPM entry 640, the probe fails. The floating-point portion 648 of PIPM entry 640 parallels the floating-point state 435 captured in a Context_At_Point profile entry 430. If, at the conclusion of an otherwise successful probe, the floating-point state of virtual X86 310 does not match the state saved in the floating-point portion 648 of PIPM entry 640, then either the floating-point state is massaged to match the state saved in PIPM entry 640, 648, or the probe fails.

Referring to FIG. 6a in combination with FIG. 1b, PIPM 602 is kept up-to-date, reflecting the current catalog of translations available, and tracking TAXi code translations as they are created, marked for reclamation, and actually reclaimed and invalidated. The probe bits in PFAT 172 may lag slightly, and the probe bits in TLB 116 are allowed to lag slightly further. Further, the probe bits in TLB 116 only convey information to page granularity. Thus, the probe bits in TLB 116 indicate that at some recent time there has been TAXi code with that entry point class on this page. A Zero bit in TLB 116 suggests that there is no such entry point, and that a probe of the PIPM 602 on this event class would very likely fail, and thus should not be attempted. A One suggests a high likelihood of success. The One may be somewhat stale, still indicting the presence of a TAXi code translation that has since been invalidated and reclaimed. After a hit in TLB 116, a probe of PIPM 602 will find that the PIPM entry 640 for the reclaimed TAXi code segment will indicate the invalidity of the TAXi segment, for instance, by a Zero in address 644.

Recall from section V.G, supra, that a fifth high-order bit is needed to disambiguate the four-bit event code stored in TAXi_State.Event_Code_Latch 486, 487 and Context_At_Point profile entries 430. The event codes 402 of FIG. 4b are carefully assigned so that no probeable 610 RFE event code (top half 410) shares four low-order bits with a probeable 610 converter event code (bottom half 404). Probeable 610 RFE events 410, 610 are always even, and probeable 610 converter events 404 are always odd. Thus, the least significant four bits of the current event code uniquely identify the probe event, the probe exception handler can always determine whether the probe event came from a RFE instruction or converter execution. (This non-overlap of probeable events 610 is an additional constraint, on top of the non-overlap of "initiate packet" event codes 418 discussed in section V.G, supra).

Referring again to FIG. 6b, probing is controlled by a PLA (programmable logic array) 650 and several AND gates. PLA 650 generates several logic functions of event code 592 from event code latch 486, 487. PLA 650 computes the "initiate packet" 418, "profileable event" 416, and "probeable event" 610 properties as described in FIG. 4b. In addition, the probeable event codes are decoded into single signals as described in column 612 of FIG. 4b. For instance, "jnz" bit 660, corresponding to bit <0> of the probe properties 624 of FIG. 1d, is asserted for event code 1.0001. "Conditional jump" bit 661, corresponding to bit <1> of probe properties 624, is asserted for event code 1.0011. "Near jump" bit 662, corresponding to bit <2> of probe properties 624, is asserted for event code 1.0101. "Near CALL" bit 663, corresponding to bit <3> of probe properties 624, is asserted for event codes 1.0111 and 1.1011. "Far CALL" bit 664, corresponding to bit <4> of probe properties 624, is asserted for event code 0.1000. "Emulator probe" bit 665 is asserted for event codes 0.1100 and 0.1110.

D. Operation of Statistical Probing

Figure 6B:
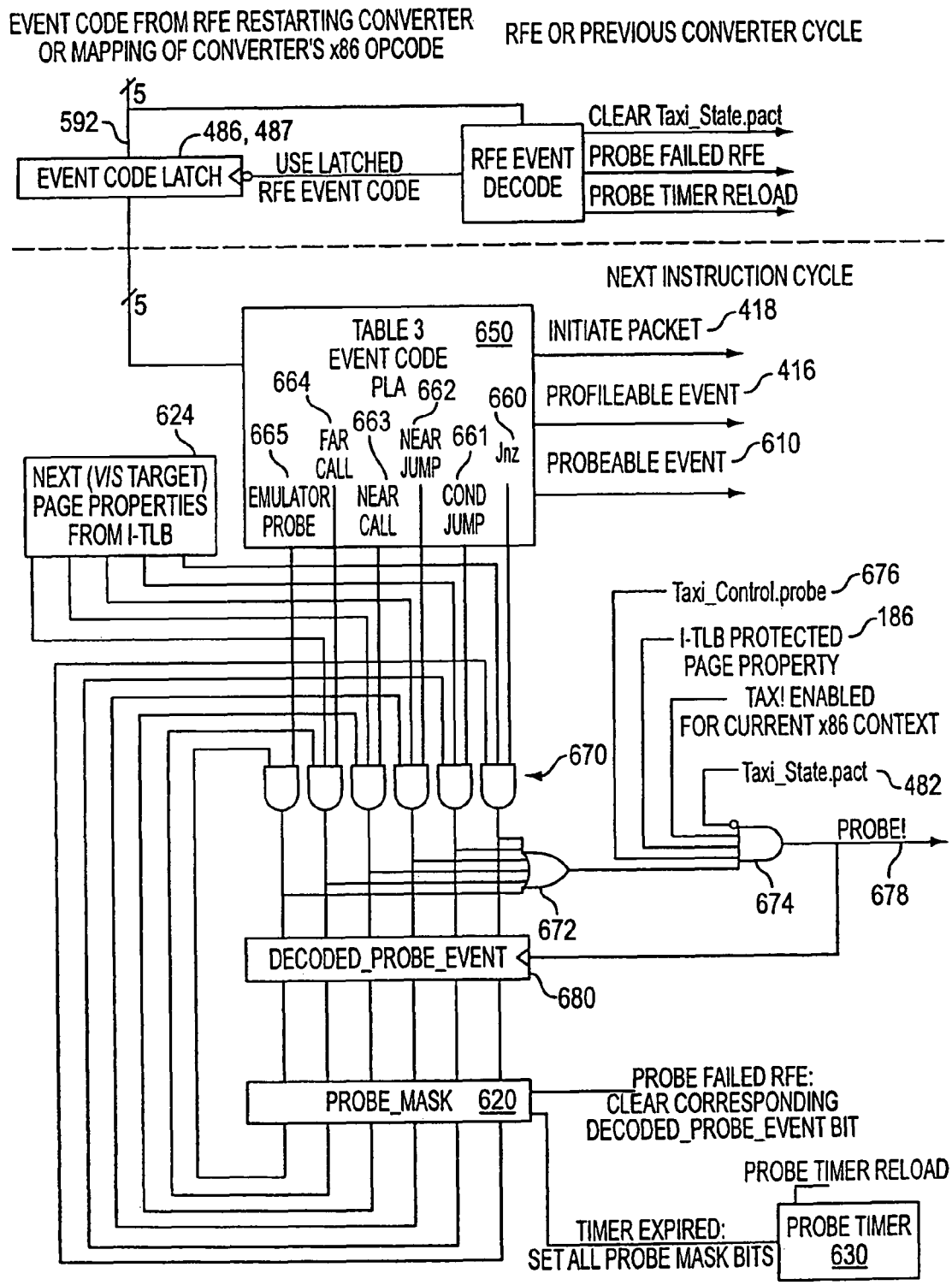
Figure 6C:
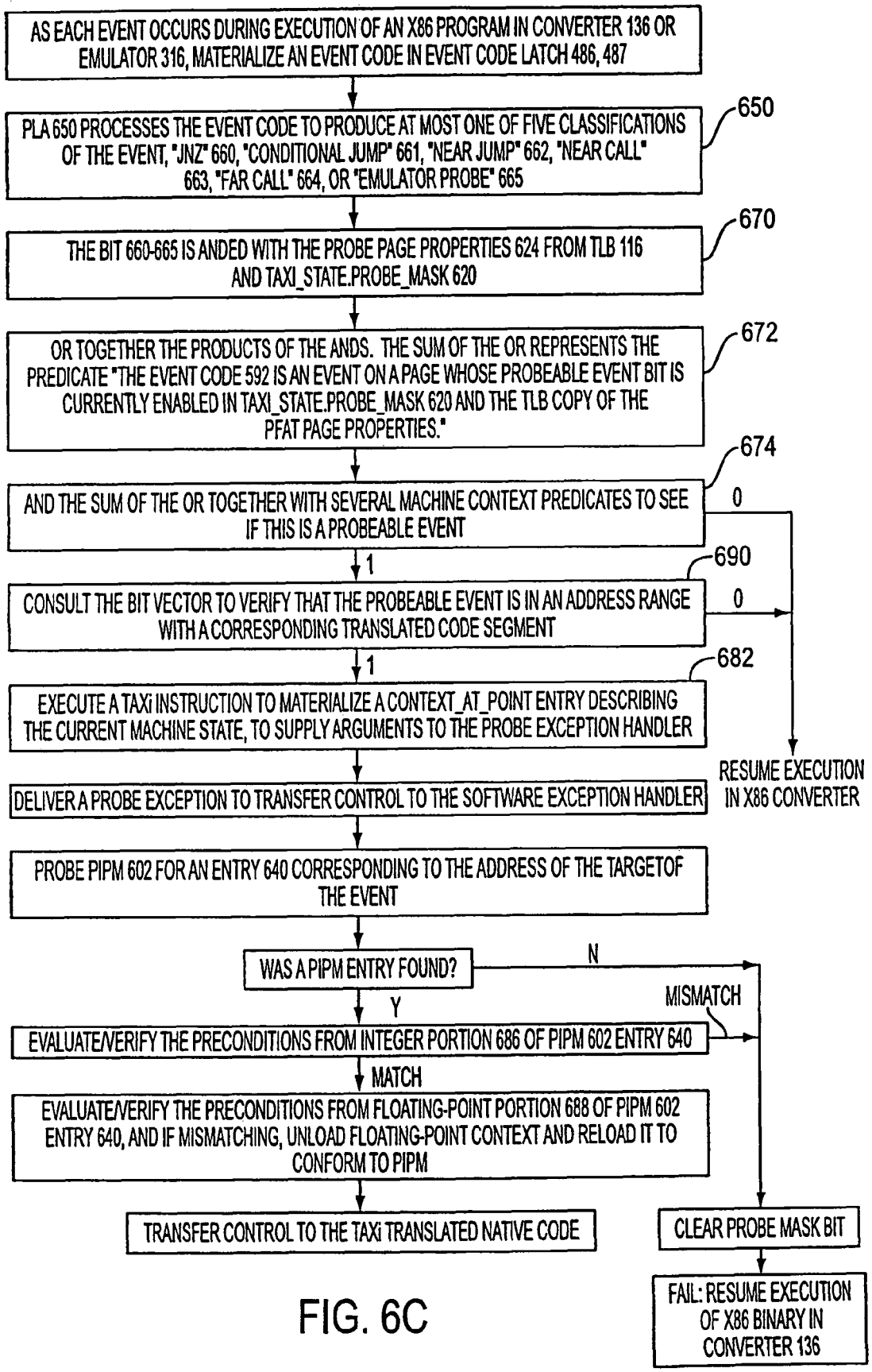

Referring to FIGS. 6*b* and 6*c*, for an X86 transfer of control instruction (either a simple instruction executed in converter 136 or a complex instruction executed in emulator 316), the instruction fetch of the transfer target ensures that TLB 116 is updated from PFAT 172 with the current probe page properties 624 for the page of the target instruction—either the information was already current in TLB 116, or it is refilled as part of the I-TLB miss induced by the instruction fetch. Thus, as part of the instruction fetch, the TLB provides both an address translation and the probe page properties 624 for the target instruction (though, as discussed in section VI.C, supra, the probe properties in TLB 116 may be slightly stale).

Further, these control transfer instructions generate an event code 402, as described in section V.F, supra. At the conclusion of the instruction, either converter 136 or an RFE instruction generates a 5-bit event code 592. The event code is stored in latch 486, 487. As the target instruction is fetched or begins execution, event code latch 486, 487 is fed to PLA 650.

Six 3-input AND gates 670 AND together the probeable event signals 660, 661, 662, 663, 664, 665 with the corresponding page properties from the TLB (624 of FIG. 1*d*) and the current value of Probe_Mask 620. The six AND terms are OR'ed together in OR gate 672. Thus, the output of OR gate 672 is One if and only if the current instruction generated an event 592 whose current Probe_Mask 620 is One and whose probe property bit 624 for the current page is One. The "emulator probe" signal 665 is generated by PLA 650 when RFE event code equals 0.1100 or 0.1110, as indicated by "Emulator Probe" in column 612 of FIG. 4*b*. This class of probe is raised when emulator 316 believes that probe success is likely and the Emulator Probe bit (bit <5>) of Probe Mask 620 is One.

The sum of OR gate 672 is AND'ed 674 with several more terms. Probing as a whole is controlled by TAXi_Control. probe 676 (see also FIG. 4*g*); if this bit is Zero, probing is disabled. To ensure that control is only transferred to TAXi code whose underlying X86 code is unmodified since the translation was generated, probing is only allowed on protected pages of X86 instruction text, as controlled by XP bit 184, 186 for the page (see also FIG. 1*d*, and sections I.F, supra, and section VIII, infra); if XP bit 184, 186 is Zero, no probes are taken on the page. Probing is controlled for X86 contexts by TAXI Control.Global_TAXi_Enables.sizes 470 and .modes 472 bits, which are set by TAXi system control software. Probing is only enabled for current X86 modes whose TAXi_Control.Global_TAXi_Enables 470, 472 are set to One. Probing and profiling are mutually exclusive (see section VI.G, infra); thus probing is disabled when TAXi_State.Profile_Active (482 of FIG. 4*h*, states 530 and 542 of FIG. 5*a*, see section V.E and V.F, supra) is One. If the output 678 of AND gate 674 is One, then the processor continues to the next step of determining whether to probe PIPM 602, as discussed further infra.

TAXi_Control.probe 676 was Zeroed by software when the X86 processor entered a mode that TAXi is not prepared to handle, e.g., X86 debugging, single-step or floating-point error conditions. When operating in "page property processing disabled" mode (with PROC_CTRL.PP_Enable deasserted, see section I.A, supra), TAXi_Control.probe 676 is deasserted.

The output 678 of AND gate 674 latches the single bit of the probe event class into Decoded_Probe_Event latch 680.

An intermediate step 690 to be performed in hardware, discussed in detail in section VI.E, infra, may optionally be performed here.

If all of the hardware checks described supra pass, then the processor takes a probe exception before completing execution of the instruction at the target of the control transfer. The probe exception transfers control to software that continues to further test whether control should be transferred to the TAXi code.

As part of generating a probe exception, converter 136 writes (step 682) a Context_At_Point profile entry (430 of FIG. 4*c*) to the register indicated by TAXi_Control.Packet_Reg_First (476 of FIG. 4*g*) defined for profile collection. (as will be explained further in section VI.G, infra, profiling and probing are mutually exclusive, and the X86 does not use the profile collection registers, so the three uses cannot conflict). The event code (436 of FIG. 4*c*) of the profile entry 430 is set to the least significant 4 bits of the current event code (592 of FIG. 5*b*).

On entry to the probe exception handler the following information is available from the converter:

A Context_At_Point profile entry 430, containing the X86 physical IP (page frame number and page offset) in low half 438, 439

X86 execution context, from high half 432, 433, 435 of Context_At_Point 430 probe event code in the event code field 436 of Context_At_Point 430

X86 virtual IP (offset into the CS segment) from EPC.EIP

The exception handler consults PIPM 602. PIPM 602 is a table that maps X86 instruction addresses (their physical addresses, after address translation) to addresses of TAXi code segments. The table entry in the PIPM is indexed by X86 physical address, typically using a conventional hashing technique or other table lookup technique. The probe exception handler looks up the physical address of the target instruction in the Physical IP to TAXi code entry point Map (PIPM) 602.

If no PIPM entry 640 with a matching X86 address is found, then the probe has failed, with consequences discussed infra.

Once a table entry with an address match is located, the translation must be further qualified by the current X86 mode. Recall that the full execution semantics of an X86 instruction is not fully specified by the bits of the instruction itself; execution semantics depend on whether the processor is in V86 mode, whether addressing is physical or virtual, the floating-point stack pointer, and the full/empty state of floating-point registers, and operand sizes are encoded in segment descriptors, the EFLAGS register, the floating-point status word, the floating-point tag word, etc. The translation into Tapestry native code embeds assumptions about these state bits. These state bits were initially captured in bits <59:51> of a Context_At_Point profile entry 430 (see section V.C, supra) and then hot spot detector 122 and binary translator 124 generated the translation based on the profiled values of the mode bits. The corresponding PIPM entry 640 for the translation records the mode bit assumptions under which the TAXi code segment was created. Thus, once PIPM entry 640 is found, the current X86 mode is compared against the X86 mode stored in PIPM entry 640.

The exception handler makes three general classes of checks of the mode information in PIPM 602.

First, the current execution mode and the value of the CS.D (code and operand size) and SS.D (stack segment size) bits assumed by TAXi translator 124 must be compatible. This is determined by comparing the decoded "sizes" information 432 from the Context_At_Point argument with the mask of acceptable contexts provided in PIPM entry 640, 646.

If the current floating-point state does not match the floating-point state 648 in PIPM entry 640, then the probe fails. In some cases, disagreements can be resolved: the floating-point unit can be unloaded and reloaded to conform to the floating-point state in PIPM entry 640, for instance, to get the floating-point registers into the canonical locations specified by the current X86 floating-point map. If the height of the floating-point register stack mismatches the stack height in PIPM entry 640, or the pseudo floating-point tag words mismatch, or the floating-point control words (precision and rounding modes) mismatch, then the probe fails. If the only mismatch is the mapping of the floating-point tag map (the map from the X86 stack-based register model to the register address Tapestry model), then software can reconfigure the floating-point state to allow the probe to succeed.

Execution control is tendered to the TAXi code. If the modes mismatch, the probe fails.

Second, the current virtual IP value must be such that (a conservative approximation of) the transitive closure of the TAXi code points reachable by invoking this TAXi fragment would not trigger a CS limit exception. This is determined from the virtual IP at the time of the exception and normalized CS limit, and comparing them to values stored in PIPM entry 640.

Third, because the TLB copy of the XP bit 186 may be slightly stale relative to the PFAT copy 184, the master copy of the XP bit 184 in PFAT 172 is checked to ensure that all cached information (the profile and TAXi code) associated with the X86 page is still valid.

Fourth, DMU 700 (see section VII, infra) may be queried to ensure that the X86 page has not been invalidated by a DMA write.

If the current X86 mode satisfies the mode checks, then the probe has succeeded. PIPM entry 640 contains the address of the TAXi code corresponding to the address of X86 code at which the probe exception occurred. If the modes mismatch, the probe fails.

When a probe exception succeeds, the handler modifies the EPC by setting EPC.TAXi_Active, Zeroing EPC.ISA (native Tapestry mode), setting EPC.EIP to the address of the TAXi code, and setting EPC.ESEG to the special TAXi code segment. The RFE instruction completes the transfer of execution to the TAXi code by loading the EPC into the actual processor PSW. A successful probe leaves the Probe_Mask 620 unaltered. Thus, classes of probeable events remain enabled as long as each probe in the class is successful.

By resetting the EPC.EIP to point to TAXi translated code, the RFE instruction at the end of the probe exception handler effects a transition to the TAXi code. Because the TAXi code was transliterated from X86 code, it follows the X86 convention, and thus the argument copying that would have been performed by the transition exception handler (see sections II, III, and IV, supra) is not required. Further, because both the probe exception handler and the TAXi code are in Tapestry ISA, no probe exception occurs on this final transition.

When a probe exception is triggered, and the software probe fails to find a translation, several steps are taken. The bit in Probe_Mask 620 that corresponds to the event that triggered the probe is cleared to Zero, to disable probes on this class of event until the next expiry of Probe_Timer 630. This is accomplished by the Probe_Failed RFE signal and the remembered Decoded_Probe_Event latch 680. The interrupt service routine returns using an RFE with one of two special "probe failed" event codes of FIG. 4b. Event code 0.0011 forces a reload of TAXi_Timers.Probe_Timer 630 with the Probe_Timer_Reload_Constant 632. Event code 0.0010 has no side-effect on Probe_Timer 630. It is anticipated that when a probe on a backwards branch fails, Probe_Timer 630 should be reset, by returning from the probe exception with an RFE of event code 0.0011, in order to allow the loop to execute for the full timer value, with no further probe exceptions. On the other hand, it is anticipated that when a probe on a "near CALL" fails, testing other near calls from the same page should be allowed as soon as Probe_Timer 630 expires, and thus this probe exception will return with an event code of 0.0010. The RFE returns to the point of the probe exception, and execution resumes in converter 136.

If an RFE instruction that modifies Probe_Mask 620 is executed at the same time that the probe timer expiry attempts to reset Probe_Mask 620, then the RFE action has higher priority and the reset request is discarded.

E. Additional Features of Probing

In the intermediate step 690 mentioned briefly supra, a bit vector of bits indicates whether a translation exists for code ranges somewhat finer than the page level encoded in the PFAT probe bits. After a probeable event occurs, and the class of that event is screened against the PFAT probe bits and the probe mask, the hardware tests the bit vector (in an operation somewhat reminiscent of a page translation table walk) before actually raising the probe exception and transferring control to the software interrupt handler.

Only the slices of the bit vector that correspond to pages with non-zero PFAT probe bits are actually instantiated by software, again similar to the way only the relevant portions of a full page table tree are instantiated by a virtual memory system. The bit vector itself is hidden from the X86 address space, in an address space reserved for the probe bit vector and other structures for managing the X86 virtual machine. The bit vector may be cached in the d-cache—because of the filtering provided by the earlier steps, the number of unsuccessful queries of the probe bit vector will be relatively small.

The density of the bit vector can be tailored to the operation of the system. In some embodiments, there may be a bit for every byte in the physical memory system. In other embodiments, the effectiveness of the bit vector would most likely be only marginally reduced by having one bit for a small power of two bits, for instance, one bit for every 2, 4, 8, 16, or 32 bytes of physical memory. The block size guarded by each bit of the bit vector may be software configurable.

Thus, where the probe properties 624 in PFAT 172 give a fine-grained filter by event code (the five probeable event classes), but are spatially coarse (on a page basis), the bit vector gives a coarse map on event code (all events grouped in a single bit), but is finely grained (a few bytes) by space.

A One bit in the bit vector is not a guarantee that translated code exists and should be activated. As with the PFAT probe bits, the bit vector is somewhat over-optimistically heuristic, and may on occasion lag the actual population of translated code segments. Even after testing the bit vector, the mode predicates in PIPM 602 are still to be verified.

The quasi-microcoded hardware used for table walking is readily modified to issue the loads to memory to fetch the appropriate slices of the bit vector.

The logic of PLA 650 is programmable, at least during initial manufacture. Reprogramming would alter the contents of columns 414, 416, 418, 610, 612 of table at FIG. 4b. Though the five-bit event codes generated by converter 136 are relatively fixed, the interpretation given to those bits, and whether to profile or probe on those events, is reconfigurable within PLA 650. In alternative embodiments, PLA 650 may be made programmable at run time, to control operation of profiling and probing by altering the contents of the columns of FIG. 4b. The five bits of input (event code latch 486, 487) to PLA 650 give $2^5$=32 possible inputs. There are nine bits of output (probeable event signals 660, 661, 662, 663, 664, 665, profileable event 416, initiate packet 418, and probeable event 610). Thus, PLA 650 could be replaced by a 32%9 RAM, and the outputs of PLA 650 would then be completely software configurable. With that programmability, both profiling (section V, above) and probing (this section VI) become completely configurable. In a programmable embodiment, the overhead of profiling and probing can be controlled, and strategies can be adapted to experience.

Most of the attributes required for a probe are associated with pages (stored in the PFAT and TLB), or with individual translated code segments (stored in PIPM 602), a structure queried by converter 136 as simple X86 instructions are executed in hardware. For complex instructions that are executed in the emulator (316 of FIG. 3a) the decision to probe or not to probe is made in software. A side table annotates the X86 IVT (interrupt vector table) with probe attributes, much as the PFAT is a side annotation table to the address translation page tables. After emulating an X86 instruction, emulator 316 queries the IVT side table, and analyzes these bits in conjunction with the machine state determined during the course of the emulation. On the basis of this query, emulator 316 decides whether to return to converter 136 using an RFE with an event code that induces a probe, or an RFE with an event code that does not. Event codes 0.1100 and 0.1110 induce a probe (see column 610 of FIG. 4b), and event codes 0.1101 and 0.1111 do not.

F. Completing Execution of Taxi Code and Returning to the X86 Code

Once a probe exception activates some translated TAXi code within an X86 process, there are only three ways to leave that TAXi code, either a normal exit at the bottom of the translated segment, a transfer of control out of the code segment, or an asynchronous exit via an exception.

The fall-out-the-bottom case is handled by epilog code generated by the TAXi translator 124. The TAXi code will home all X86 machine state and return control to the converter by issuing a trap instruction. A trap instruction transfers control to an exception handler for a TAXi_EXIT exception. The trap handler for exiting TAXi code sets the ISA to X86 and returns control to the point in the X86 code following the translated hot spot. In the alternative embodiment of section IV, epilog code returns data to their X86 homes, and sets the IP to point to the point following the end of the portion of the X86 code that was translated.

The transfer of control case may be handled by the state saving mechanism described in section III, supra, or may be handled by code essentially similar to the epilog code discussed supra. In any case, the Tapestry system takes explicit actions to reconstruct the X86 machine state.

Asynchronous exits are handled by exception handlers, using the safety net mechanism introduced in section I.D, supra, and discussed in more detail in section VIII, infra. When an exception occurs in TAXi code and the exception handler determines that it must materialize the exception in the X86 virtual machine, it jumps to a common entry in emulator 316 that is responsible for setting the X86 state— establishing the interrupt stack frame, accessing the IDT and performing the control transfer. When this function is invoked, it must first determine if TAXi code was being executed by examining PSW.TAXi_Active 198, and if so, jump to a TAXi function that reconstructs the X86 machine state and then re-executes the X86 instruction in the converter to provoke the same exception again. Re-executing the X86 instruction is required to establish the correct X86 exception state. Anytime the converter is started to re-execute an X86 instruction, the exception handler uses the RFE with probe failed, reload probe timer event code to prevent a recursive probe exception from occurring.

The only exceptions that may not be materialized in the X86 world are those that can be completely executed by native Tapestry code, e.g. TLB miss that is satisfied without a page fault, FP incomplete with no unmasked X86 floating-point exceptions, etc.

G. The Interaction of Probing and Profiling

Probing and profiling are mutually exclusive. Probing only occurs when there is a probeable event (column 610 of FIG. 4b) while TAXi_State.Profile_Active (482 of FIGS. 4h and 5a) is Zero. These constraints are enforced by AND gate 674 of FIG. 6b. On the other hand, profiling is only enabled while TAXi_State.Profile_Active 482 is One. Thus, when the processor takes a probe exception, the mutual exclusion guarantees that the resources used by profiling are quiescent. In particular, the general registers in which profile packets accumulate are guaranteed to be available for use to service the exception.

Every probeable event 610 is also an "initiate packet" event 418. This reflects a practical design consideration: the class of probeable events 610 are the most important events in the flow of a program, and "initiate packet" events 418 are a somewhat broader set of important events. If a probeable event 610 occurs in a class for which probing is enabled, and TAXi_State.Profile_Active (482 of FIGS. 4h and 5a) is Zero, then the event is also an "initiate packet" event 418. If, further, TAXi_State.Profile_Request 484 is One, then profiler 400 would naturally trigger a transition of TAXi_State.Profile_Active (482 of FIGS. 4h and 5a) and TAXi_State.Profile_Request 484, transition 522 of FIG. 5a. This would violate mutual exclusion. However, the probe exception is higher priority than any activity of profiler 400. Thus, on a successful probe, control is transferred to the TAXi code, and any profiler action is suppressed. If the probe fails, the probe class is disabled, and profiler 400 is allowed to take its normal course, as described in FIGS. 5a and 5b and section V.F, supra.

The content of a profile packet, and in particular, a Context_At_Point profile entry (430 of FIG. 4c), is tailored to efficiently represent the information required by hot spot detector 122 (to precisely identify the ranges of addresses at which frequently-executed instructions are stored), and efficiently tailored for the binary translator 124 (to capture the X86 semantic mode information that is not represented in the code text itself), and efficiently tailored for prober 600 (the information required to qualify a probe, to ensure that the semantic mode assumptions under which the binary was translated are met by the current X86 semantic mode, before transferring control to the TAXi code). Though the representation is not optimal for any one of the three, it is very good for all three. In other embodiments, the representation may be tailored to promote efficiency of one of the three over the others, or solely for the benefit of one.

The fact that probeable events 610 are a subset of "initiate packet" events 418 has a further desirable side effect: the hardware to capture information for the first profile entry 430 in a packet can be reused to capture the information needed by the probe exception handler. When a decision is made in hardware to deliver a probe exception, the exception handler is provided with information about the physical address to which control was being passed and the context of the machine. The information for a probe exception is gathered in register 594 of FIG. 5b, in a form that mirrors the form captured in a Context_At_Point profile entry 430. In the process of either generating a probe exception in hardware, or servicing it in software, the content of register 594 is captured into a general register. This capture (when supplemented with the CS limit (code segment length), as stored in an X86 segment descriptor register) supplies the information needed by the probe exception handler: the physical address of the next instruction, used to index PIPM 602 and find a possible candidate entry, and the X86 mode information needed to qualify that entry. The address captured in the Context_At_Point 430 has the physical page number, ready for use to index into PIPM 602. Since all probeable events are "initiate packet" events, the mode information is readily available in the Context_At_Point profile entry 430 that initiates the packet identifying the hot spot. The various snapshots can be compared to each other for compatibility by AND'ing the appropriate bits together.

Unlike profile collection, which operates by periodic sampling, probing is always enabled when the converter is active, the TAXi_Control.probe flag is One, and the probe mask has at least one surviving One bit.

H. Alternative Uses of Adaptive Opportunistic Statistical Techniques

The adaptive opportunistic execution policy described in section VI.A through VI.E can be used in a number of settings in a CPU design.

In one example embodiment, a CPU might have a fast path and a slow path through the floating-point unit, where the fast path omits full implementation of the IEEE-754 floating-point infinities, denormalized numbers ("denorms") and NaNs, and the slow path provides a full hardware implementation. Because infinities, denorms and NaNs tend to arise infrequently, but once generated tend to propagate through more and more of the computation, it is advantageous to start with the optimistic assumption that no denorms or NaNs will arise, and to configure the CPU to use the fast path. Once an infinity, denorm or NaN is detected, then the CPU may revert to the slow path. A timer may be set to run, and when the timer expires, the CPU will resume attempting the fast path.

In another example embodiment, a cache system might use an analogous adaptive opportunistic technique. For instance, a multi-processor cache might switch between a write-through policy when inter-processor bus snooping indicates that many data in the cache are shared, write-in when it is noted that shared data are being used intensively as a message board, and write-back when the bus snooping indicates that few data are shared. A cache line flush or invalidate is the "failure" that signals that execution must revert to a higher-cost policy, while a successful write in a lower-cost policy is a "success" that allows continued use of the lower-cost policy. The adaptation might be managed on the basis of address ranges, with a record of success and failure maintained for the distinct address ranges. The switch between mode can be managed by a number of techniques. For instance, a counter might count the number of successive memory accesses that would have been more-efficiently handled if the cache were in another mode. When that counter reaches a threshold value, the cache would be switched into the other mode. Or, a timer might set the cache into a more-optimistic mode, and an access that violates the assumption of optimism would set the cache into a less-optimistic mode.

The opportunistic policy might be used in branch prediction, cache prefetch or cache enabling. For instance, cache prefetching might be operative for as long as prefetching is successful. Or, a particular LOAD instruction in a loop may be identified as a candidate for cache prefetching, for as long as the prefetch continues successfully. When the prefetch fails, prefetching is disabled.

A multiprocessor cache might cache certain data, on optimistic assumptions, and then mark the data non-cacheable when inter-processor cache trashing shows that caching of these data is unprofitable.

Opportunistic policies might be useful in memory disambiguation in object-oriented memory systems. For instance, a compiler might generate two alternate codings for a source construct, one assuming that two objects are disjoint, one assuming overlap. The optimistic disjoint code would be used for as long as the optimistic assumption held, then control would revert to the pessimistic code.

VII. Validating and Invalidating Translated Instructions

The TAXi system is analogous to a complex cache—the profile data and TAXi code are kept current with the pages of X86 instruction text, and must be invalidated when the X86 instruction text is modified. There are two possible sources for modifications to the X86 instruction text: memory writes by the CPU, and writes from DMA devices. Writes from the CPU are protected by the XP protected bit 184, 186, discussed at section I.F, supra, and validity checks in PIPM 602, as discussed in sections VI.C and VI.D, supra. This section VII discusses protection of the cached information against modification of the X86 instruction text by DMA writes.

Figure 7A:
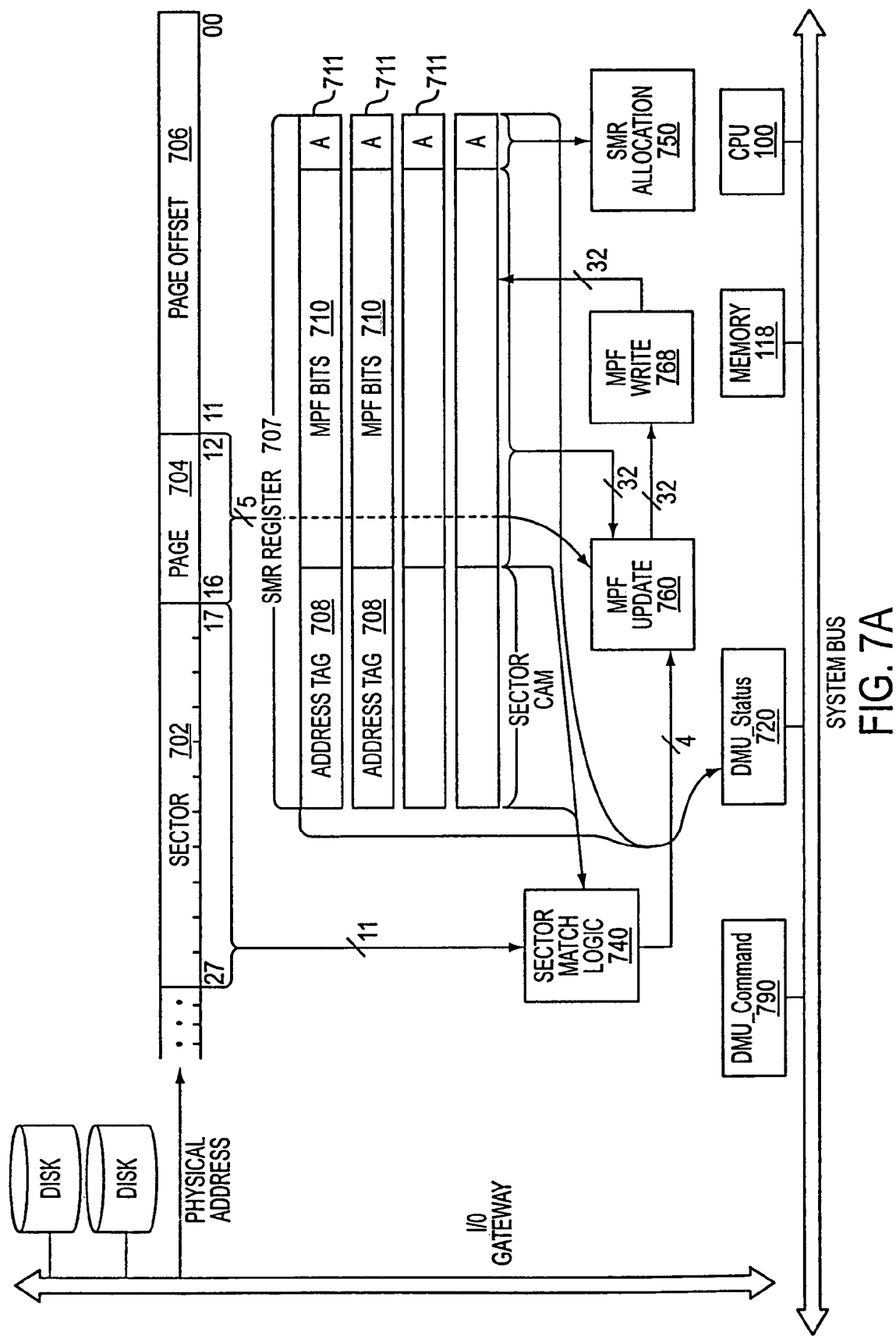

Referring to FIG. 7*a*, DMU 700 (the DMA Monitoring Unit) monitors DMA writes to ASI Zero (address space zero, "well-behaved" non-I/O space) in order to provide a condensed trace of modification of page frames. DMU 700 performs this monitoring without imposing excessive overhead. DMU 700 is implemented as an I/O device in the I/O gateway, instead of directly on the main processor bus (the G-bus). This gives DMU 700 visibility to detect all non-processor updates of X86 code pages in physical memory (except for those initiated by the processor itself, which are masked by the behavior of a write-back cache).

A. A Simplified DMU Model

A simple DMU provides modified page frame (MPF) bit for each physical page frame in the system. An MPF bit of Zero indicates that no modification has occurred, and if a DMA transfer were to write into the corresponding page frame then a modification event would need to be reported against that page frame. An MPF bit of One indicates that DMA writes to the corresponding page frame should pass unreported.

This simple DMU is initialized by Zeroing all MPF bits. Then, for every DMA write, the relevant MPF bit is checked. If that MPF bit was already One, no further processing occurs. If the MPF bit is still Zero, then it is set to One, and the identity of the modified page frame is reported, for instance by creating an entry in a FIFO. Once a page frame's MPF bit becomes One, and the modification is reported, no amount of additional DMA writing to that page frame will produce another modification report.

This simple DMU provides tremendous condensation in the reporting of page modifications; in fact, it generates a provably minimal number of modification reports. The proof follows from the fact that DMU 700 itself never Zeros any MPF bits—it only sets them to One. The number of modification reports possible is bounded by the number of MPF bits, or equivalently, the number of page frames. Because most DMA writes are to the buffer pages for "data" I/O, and the important writes to be monitored are to pages of X86 instruction text, which are written less often, this behavior reduces overhead while preserving correct behavior.

So long as a page frame's MPF bit remains Zero, the TAXi system is assured that no DMA modification has occurred since that MPF bit was last cleared to Zero. Thus, whenever profiler 400 is about to profile an X86 page, generate a TAXi translation, execute a TAXi translation (the operations that cache information about the page or use cached information), that page's MPF bit is Zeroed, and any queues or FIFO's that might contain pending modification reports are flushed. Now profile or translation information from the page may be encached. Whenever a modification of the page frame is reported, any encached information about the page discarded. Once the cached information is purged, then the MPF bit for the page can be reset Zero, and information about the page may again be cached.

B. Overview of a Design that Uses Less Memory

While the simple design described in section VII.A, supra, would execute correctly and would impose little interrupt overhead, it might consume too much memory. On a system with 28 bits of physical address space and 4 KB page frames there are 65K page frames. This translates into 8 KB (or 256 256-bit cache lines) worth of storage just to hold the MPF bits. Those bits could be stored in memory but then, since a DMA read of such a memory based structure in response to every DMA write cycle would be unacceptable, DMU 700 would have to include some kind of caching mechanism.

The design described in this section is very similar to the simple model of section VII.A. In the embodiment discussed infra, small, regular, naturally-aligned slices of the full MPF array are instantiated as needed, to monitor corresponding ranges of the physical address space. This design monitors only a subset of the entire physical address space at any given moment. When idle monitoring resources are reclaimed to monitor different physical addresses, this design for DMU 700 makes the conservative assumption that no page frame within the range that is about to be monitored has had a modification reported against it. This conservative assumption induces redundant reports of modification to page frames for which modifications had already been reported at some point in the past.

C. Sector Monitoring Registers

Referring to FIG. 7a, DMU 700 has several Sector Monitoring Registers (SMR) 707, typically four to eight. In the example embodiment discussed here, it is assumed that there are four SMR's 707 in the SMR file. Each SMR 707 monitors a sector, a naturally-aligned region of a power of 2 number of page frames. In the embodiment of FIG. 7a, a sector is a naturally-aligned 128 KB range of the G-bus physical memory address space, or equivalently, a naturally-aligned group of thirty-two 4 KB page frames. Each SMR 707 consists of a content addressable sector CAM (content-addressable memory, analogous to a TLB address tag) 708, an array of MPF (Modified Page Frame) bits 710, an Active bit 711, and a small amount of logic. Sector CAM address tag 708 is eleven bits for a 28-bit physical address space (28, less 12 bits of byte addresses within a page, less 5 bits for the 32 pages per sector—see FIG. 7a). MPF array 710 has 32 bits, one bit for each page frame in the sector. Each MPF array is essentially a 32-bit slice of the large MPF bit array described in section VII.A. (In order to maximize the opportunity to use large DMA transfers, modern operating systems tend to keep sequential virtual pages in sequential clusters in physical memory, so clustering of pages in an MPF array 710 offers much of the advantage of distinct MPF bits at lower address-tag matching overhead.) SMR.Active bit 711 is set to One if there was at least one Zero-to-One transition of an MPF bit 710 since the last time the SMR 707 was read. Thus, an SMR 707 is Active 711 when it contains at least one MPF bit 710 that has transitioned from Zero to One since the last time the SMR 707 was read out via DMU_Status register 720 (see section VII.G, infra.) DMU 700 will never reassign an active SMR 707 to monitor a different sector.

A DMU interrupt is asserted when one or more page frames have been modified, that is, when an MPF bit transitions from a Zero to a One. The handler for the DMU interrupt identifies the modified page frame(s). If the modified page is X86 text, then any translated TAXi code, and any profile information describing the page, are purged, and the corresponding PIPM entry 640 is released.

Referring to FIG. 7a, the physical address space is divided into 4K pages in the conventional manner. The pages are grouped into contiguous blocks called sectors. In the embodiment of FIG. 7a, thirty-two contiguous, naturally-aligned pages form one sector. In this embodiment, which allows for a maximum of 256 MB of physical memory, bits <27:17> 702 designate the sector. In other embodiments, more physical memory can be accommodated by extending the number of bits 702 to designate a sector. Bits <16:12> 704 designate the page number within a sector 702. Bits <11:00> designate a byte within a page.

D. Interface and Status Register

Figure 7B:
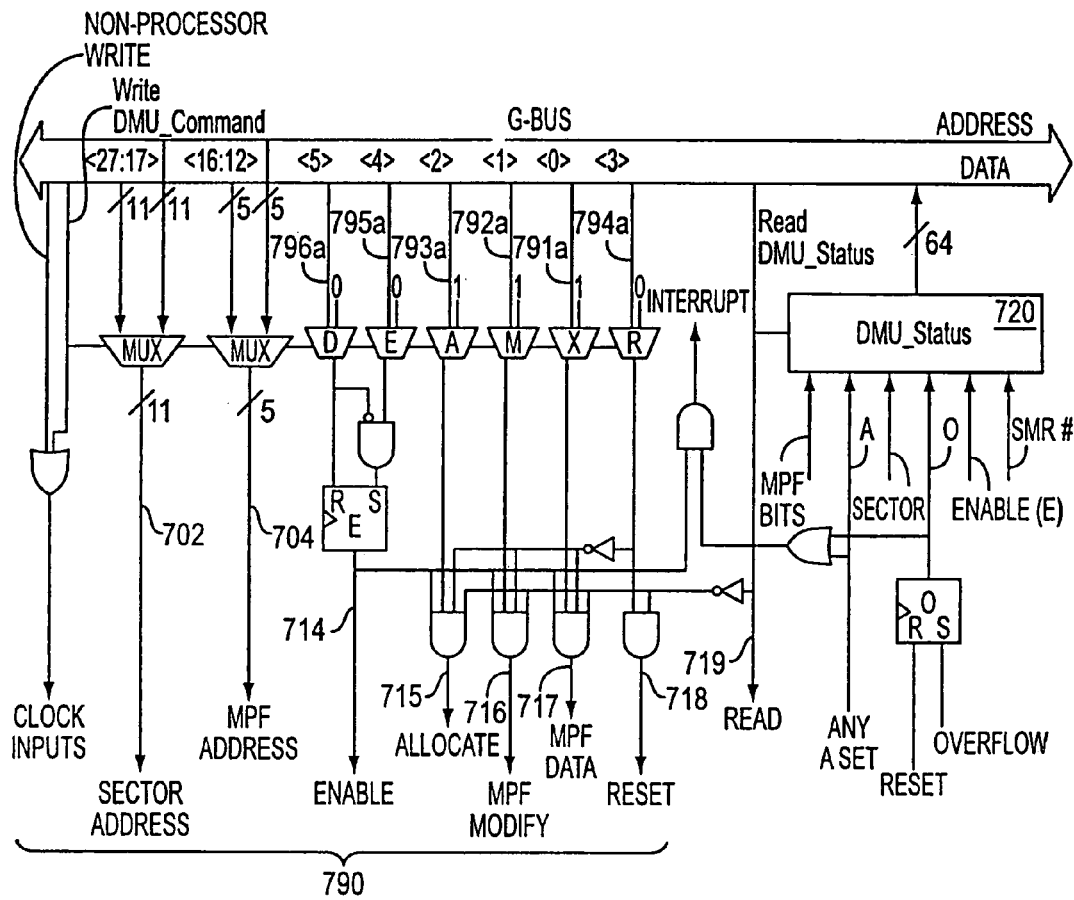

FIG. 7b illustrates the DMU interface. Writing to DMU_Command register 790 provides the sector address 702 and page address 704 (which in turn, is the bit address for the page's MPF bit within the SMR 707) and a DMU 700 command from the G-bus data. The low six bits of a datum are written to DMU_Command register 790 designates the command. The six bits of the command portion are designated D, E, R, A, M and X 791a-796a. (The meaning of these bits is discussed in detail in section VII.H, infra). When a DMA device issues a write to memory, the command value is D, E, R equal to Zero and A, M, X equal to One. From the D, E, A, M, X and R signals, several predicates are derived. Enable signal 714 means that the DMU is currently enabled. Allocate signal 715 is asserted on a bus transaction in which memory is written from a DMA device, and thus an SMR register must match, or be newly allocated to track the write. MPF modify signal 716 is asserted when the setting of the command bits specifies that the contents of an MPF bit 710 is to be written. MPF data signal 717 carries a datum to be written to an MPF bit 710 when MPF modify 716 is asserted. Reset signal 718 is asserted when the R reset command 794a is asserted on the bus. Read signal 719 is asserted as a distinct line of the G-bus FIG. 7b also shows the Enable and Overrun flip-flops and the interrupt generation logic. The meanings of the six command bits 791a-796a are discussed in more detail infra, in connection with FIGS. 7i and 7j.

When DMU 700 is enabled 714, DMU 700 requests an interrupt anytime there is at least one SMR 707 whose SMR.Active bit 711 is One or whenever the DMU Overrun flag 728 is set. The value of the active 711 SMR 707 is exposed in DMU_Status register 720.

Figure 7C:
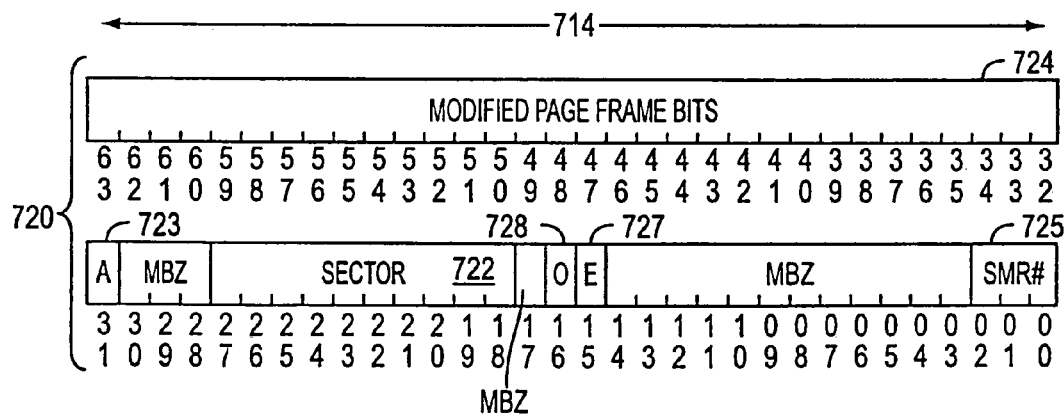

Referring to FIG. 7c, DMU_Status register 720 is 64 bits wide. The sector bits are located at their natural position, bits <30:17>, within a physical address, allowing for implementations with up to 2 GB of physical memory. The DMU_Status.Active bit 723 (bit <31>) is One when an active 711 SMR 707 is selected and Zero when all SMR's 707 are inactive. The least significant Modified Page Frame bit (SMR<32>) 724 corresponds to the page frame at the lowest address within a sector. Successive MPF bits 710 correspond to successively higher page frames. When DMU_Status.Active bit 723 is One, then the value of SMR# field 725 (SMR<02:00>) identifies the SMR 707 being returned. When DMU_Status.Active bit 723 is Zero, the Modified Page Frame bits 710, Sector bits 722 and SMR# 725 are all Zero.

The Enable bit 727 and Overrun bit 728 are not actually part of any specific SMR 707. Rather they summarize the overall state of DMU 700 and all SMR's 707. Monitoring of DMA activity occurs only when DMU Enable 714 is set (DMU_Status.Enable 727 reflects the value of DMU Enable 714, which in turn is set by writing to DMU_Command.Enable 795, see FIGS. 7*i* and 7*j*). Overrun bit 728 is provided at the time that an SMR 707 is read out, to allow recognition of cases when DMU 700 has shut down in response to a catastrophic overrun condition. The position of Overrun bit 728 as bit <15> (the sign bit of a 16-bit segment of DMU_Status register 720) simplifies testing it.

DMU_Status register 720 is described further in section VII.G in connection with FIG. 7*h*.

E. Operation

Figure 7D:
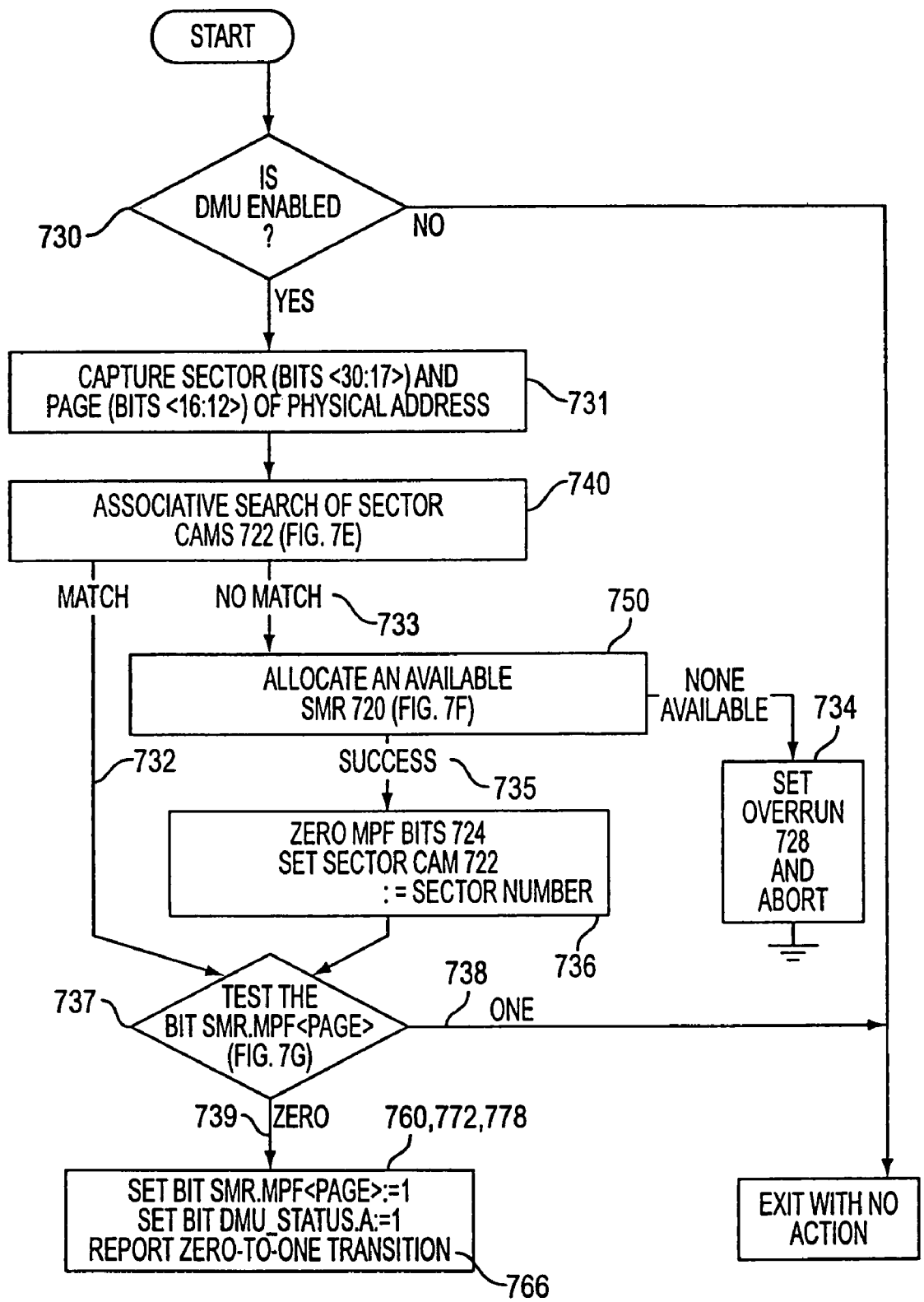

Referring to FIG. 7*d*, the following steps occur on each DMA write transaction. In step 730, DMU Enable 714, 727 is tested. If the DMU is disabled, no further processing occurs. In step 731, the target physical address of the DMA bus transaction is captured into DMU_Command register 790. Bits <27:17> 702 of the target address are captured as the sector number, and bits <17:12> 704 are captured as the page number index into an SMR of 32 MPF bits 710, as shown in FIG. 7*a*. In step 740, SMR sector CAM address tags 708 are searched associatively using the sector number. (This search will be elaborated further in the discussion of FIG. 7*e* in section VII.F). If the search succeeds (arrow 732), control skips forward to step 737. If there is no match with any sector CAM address tag 708 (arrow 733), in step 750, an inactive SMR 707 (one whose SMR.Active bit 711 is Zero) is allocated. (Allocation is discussed further in connection with FIG. 7*f*). If no inactive SMR 707 is available, then a catastrophic overflow has occurred, and in step 734, DMU Overrun 728 is set. On an overrun 728, TAXi processing is aborted, and all translated code segments are purged (it is known that the DMA write that caused the overrun 728 may have overwritten a page of X86 code that had corresponding TAXi code, but the identity of that page cannot be identified, so all pages of TAXi code are considered suspect). Once the TAXi "cache" is purged, TAXi operation can resume. If an inactive SMR 707 can be located (arrow 735), then in step 736 within the allocated SMR 707, all MPF bits 710 are Zeroed. Sector CAM address tag 708 of the allocated SMR 707 is loaded with the search key, sector number 702. With SMR 707 thus allocated and set, it now satisfies the associative search criteria, so control flows to step 737 as though the search of step 740 had succeeded.

In step 737, within matching SMR 707, the MPF bit 710 corresponding to the modified page frame is tested. If the MPF bit 710 is already set to One (arrow 738), then no further processing is necessary. Otherwise (arrow 739), in step 760, 778, the appropriate MPF bit 710 and the SMR.Active bit 711 are set to One (Active bit 711 may already be set).

F. Circuitry

Figure 7E:
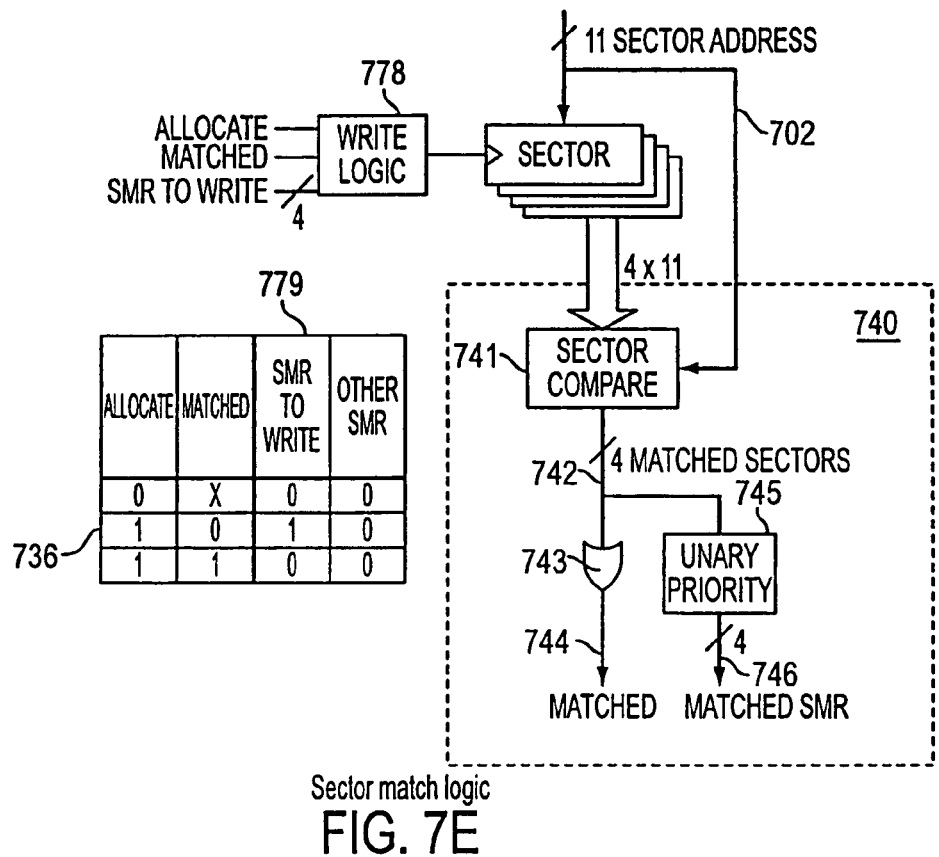

Referring to FIG. 7*e*, sector match hardware 740 performs the associative search of the sector CAM address tags 708 to determine whether the sector 702 of the current DMA write transaction already has an SMR 707 associated. Sector compare circuit 741 simultaneously compares the sector address 702 from DMU_Command register 790 with each of the four CAM address tag values 708 of the four SMR's 707 in the SMR file. Sector compare circuit 741 puts the result of this comparison on four bit bus 742: each line of bus 742 is set to One if the corresponding SMR address tag 708 matches the bus sector address 702. If any one of the four lines of bus 742 is One, then there was a match; OR gate 743 OR's together the four lines to determine whether a match occurred. Since the sector value in an inactive SMR 707 is undefined, more than one SMR 707 could match the incoming sector address 702. Unary priority function 745 resolves this ambiguity by deterministically selecting at most one of the four asserted lines from bus 742. Thus, the "matched SMR" 4-bit bus 746 will always have at most one line set to One.

Figure 7F:
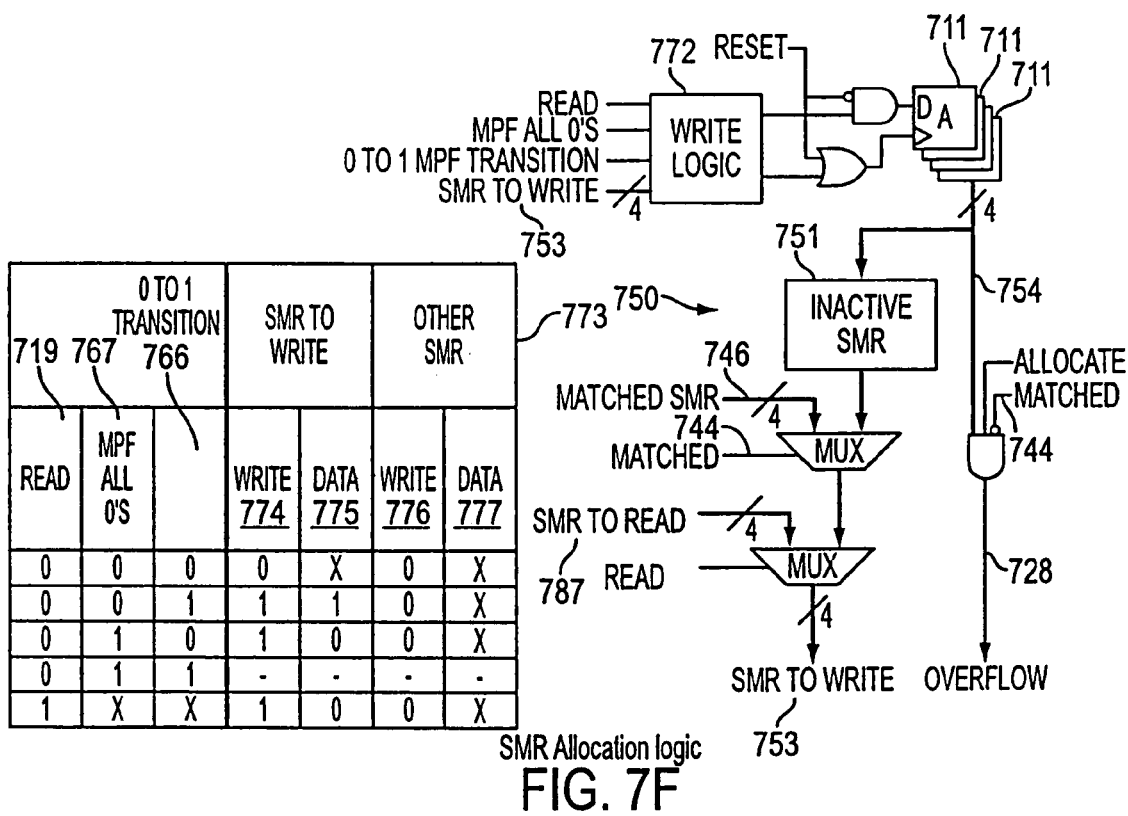

Referring to FIG. 7*f*, SMR allocation hardware 750 allocates one of the inactive SMR's 707 out of the pool for writing into when none of the current SMRs' address tags 708 match sector address 702. Inactive SMR function 751 selects one of the inactive SMR's 707 (those whose SMR.Active bits 711 are Zero) if one is available. If the current bus transaction writes into a memory sector 702 that has no SMR 707 with a corresponding address tag 708 (indicated by matched 744 being Zero), and no SMR 707 is inactive 711 to accept the write (indicated by Allocate 715 being One), then the Overrun 728 condition has occurred. Otherwise, the SMR-to-write mask 753 (a four bit bus, with the one line asserted corresponding to the SMR register to be written) is generated from the SMR-to-read mask 787 (a four bit bus, with the one line asserted corresponding to the SMR register to be read), the matched SMR mask 746 (a four bit bus, with the one line asserted corresponding to the SMR register whose CAM sector address tag matches the bus address sector 702) and the inactive SMR mask 754 (the complement of the four SMR.Active bits 711 of the four SMR registers 707).

After sector match circuitry 740 or allocation circuitry 750 has selected an SMR 707, MPF update logic 760, 772, 778 updates the appropriate MPF bits 710 and SMR.Allocate bits 711 in the selected SMR 707. (Part of MPF update logic 760, the portions 772, 778 that update the SMR address tags 708 and SMR.Active bits 711, are shown in FIGS. 7*e* and 7*f* and omitted from FIG. 7*g*). The MPF bits 710 to modify are selected by MUX 761, whose select is the SMR-to-write mask 753. If the sector address 702 matched 744 none of the address tags 708 of any SMR 707, then this is a newly-allocated, empty SMR 707; AND gate 762 generates all Zeros so that all MPF bits 710 of the new SMR 707 will be Zeroed. MPF bit update function 763 generates a new 32-bit value 764 for the MPF portion 710 of the selected SMR 707. The inputs to MPF bit update function 763 are the 5-bit page address 704 within the sector 702 (these five bits select one of the $32=2^5$ bits of MPF), the old contents of the MPF 710, and the MPF modify signal 716. The outputs 764, 766 of MPF bit update function 763 are chosen according to table 765. If the old MPF bit 710 value was Zero and the new bit 710 value is One, then a Zero-to-One MPF transition 766 signal is asserted. The 32 bits of new MPF value 764 are OR'ed together to generate MPF-all-Zeros signal 767. Write logic 768 determines which MPF bit 710 to update, using as inputs the Reset 718, Allocate 715, matched 744, MPF modify 716, and SMR-to-write 753 signals. The outputs 770, 771 of write logic 768 are chosen according to table 769. If column 770 is a One, then the MPF bits 710 of the SMR 707 selected by SMR-to-write mask 753 are written with 32-bit value 764. If column 771 is a One, then the other SMR's 707 are written as well. Thus, the last line of table 769 indicates that a Reset 718 writes the all-Zeros value generated by AND gate 762 to all MPF registers 710.

Referring again to FIG. 7*f*, write logic 772 determines a new SMR.Active bit 711 value to write according to table 773. The inputs to write logic 772 are Read 719, MPF all Zero's signal 767 and Zero-to-One MPF transition signal 766. Column 774 tells whether to write the SMR.Active bit 711 of the SMR 707 selected be SMR-to-write 753 when the data inputs to write logic 772 match columns 719, 767, 766. If column 774 is One, then column 775 tells the data value to write into that SMR.Active bit 711. Similarly, column 776 tells whether or not to write the SMR.Active bits 711 of the unselected SMR registers, and column 777 tells the datum value to write.

Referring again to FIG. 7e, the sector tag 708 of a newly-allocated 750 SMR 707 is written as determined by write logic 778 (write logic 778 is intertwined with write logic 768, 772, and is presented here simply for expository reasons). Write logic 778 accepts as input Allocate signal 715 and matched signal 744, and computes its outputs according to table 779. As indicated by the center row of the table, when an empty SMR is allocated by allocate logic 750 (the new allocation is indicated by Allocate 715 being One and the emptiness is indicated by matched 744 being Zero), then the sector address tag 708 of SMR indicated by SMR-to-write mask 753 is written. Else, as indicated by the top and bottom rows of table 779, no SMR 707 is written.

FIGS. 7d-7g are merely representative of one embodiment. Known techniques for associative cache or TLB address tag matching, cache line placement policies, and inter-processor modified and dirty bits are generally applicable to managing SMR's 707. (One difference should be noted. In a software-managed TLB, on a TLB miss, the PTE in memory is updated, and then the PTE is copied into the TLB. Thus, there is always a reliable backing copy of the TLB. In the DMU design presented here, there is no backing memory for the SMR registers 707).

In an alternative embodiment, in FIG. 7d, an additional step is performed in parallel with step 740: TLB 116 is consulted to determine the ISA bit 182 and XP bit 184, 186 for the page being written. Unless the ISA bit 182 and XP bit 184, 186 are both One (indicating a page of protected X86 code), the entire rest of the DMU can be bypassed. The DMU exists only to track the validity of the TAXi code "cache" over the original X86 code, and if no such TAXi code can exist, then the remaining functions can be omitted.

Whenever an MPF bit undergoes a Zero-to-One transition, that is, when one or more page frames have been modified, a DMU interrupt is raised. The handler for the DMU interrupt identifies the modified page frame(s) by retrieving the state of all the active 711 SMR's 707. The search for an active SMR 707 is performed in hardware, as described next.

G. DMU_Status Register

Referring to FIG. 7h in conjunction with FIG. 7c, DMU_Status register 720 is a 64-bit register on the G-bus. It is the only source of DMU information used in normal TAXi operation. If DMU Enable 714 (reflected in DMU_Status.Enable 727, bit <14> of DMU_Status register 720) is Zero, then all reads of DMU_Status register 720 will return a result that is entirely Zero. Such a read does not re-enable DMU 700; DMU re-enablement is only accomplished by reinitialization. If DMU Enable 714 is One and no SMR's 707 are active 711, then all reads of DMU_Status 720 will return a result that is entirely Zero except for a One in DMU_Status.Enable bit 727. If DMU Enable 714 is One and there is at least one SMR 707 whose SMR.Active bit 711 is One, then reading DMU_Status 720 will return a snapshot of one of the active 711 SMR's 707. This snapshot will have at least one MPF bit 710 set, DMU_Status.Active bit 723 set (reflecting SMR.Active bit 711 of the SMR 707) and DMU_Status.Enable bit 727 set. Reading the DMU_Status register 720 has the side effect of Zeroing SMR.Active bit 711 of the SMR 707 currently reflected in the DMU_Status register 720, leaving the SMR 707 ready for reallocation 750, but the address tag 708 and MPF bits 710 are left intact. Thus, further DMA writes into the same page will not induce a new Zero-to-One transition reducing the interrupt overhead induced by intensive I/O to I/O buffers. That SMR 707 will become active 711 again only if it gets reallocated 750 or if a DMA write occurs within the sector 702 that it monitors to a page frame whose MPF bit 710 is Zero. Similarly, a DMU interrupt will only be raised for that page if the MPF bit for the page is explicitly cleared (using a command where the M command bit is One, and all other command bits are Zero, see the commands discussed in section VII.H).

DMU_Status register 720 is driven by inputs from the file of SMR's 707. The SMR select function 782 chooses an SMR 707 whose SMR.Active bit 711 is One. The selection 783 of the active SMR is used to select 784 the corresponding sector tag 708 and MPF bit 710 portions of the selected SMR 707. When there is no active 711 SMR 707 (computed by OR gate 785), or the DMU is disabled 714, then AND gates 786 ensure that all outputs are Zero. The selection 783 is gated by an AND gate to generate SMR-to-read signal 787, which is used in FIG. 7f to select one SMR register to be read.

Returning to the operation of the interrupt handler software, the act of reading DMU_Status register 720 is taken by DMU 700 as an implicit acknowledgment of the notification and hence a sign that the SMR(s) 707 involved can be reassigned. The DMU interrupt handler checks ISA bit 180, 182 and XP bit 184, 186 for the page to see whether the page written by the DMA write is a protected X86 page (this can be done in hardware before raising the interrupt, or in software). If the page is a protected X86 page, then the interrupt handler consults PIPM 602 to see whether any translated TAXi code exists corresponding to the modified page, and whether any profile information 430, 440 exists describing the modified page. If TAXi code is found, then it is released, and PIPM 602 is updated to reflect the release. If profile information is found, then it is released.

The DMU interrupt has higher priority than the probe exception, so that a probe will not transfer control to a page that has recently been invalidated.

H. DMU_Command Register

Referring to FIGS. 7i, 7j and Table 5 in conjunction with FIG. 7b, software controls DMU 700 through the DMU_Command register 790. Bits <05:00> 791-796 control initializing DMU 700, response after an overrun, re-enabling reporting of modifications to a page frame for which a modification might already have been reported, and simulating DMA traffic. The functions of the bits 791 are summarized in the following Table 5.

TABLE 5

| command bit | bit position | Meaning |
| --- | --- | --- |
| D | 5 | Disable monitoring of DMA writes by Zeroing the DMU enable flag |
| E | 4 | Enable monitoring of DMA writes by setting the DMU Enable flag to One |
| R | 3 | Reset all SMR's: Zero all A and MPF bits and Zero the DMU overrun flag |
| A | 2 | Allocate an inactive SMR on a failed search |
| M | 1 | Allow MPF modifications |
| X | 0 | New MPF bit value to record on successful search or allocation |

D command bit 796a, 796b, 796c Zeros DMU Enable 714, 727, thereby disabling any further changes to the SMR's 707 due to DMA traffic. If DMU Enable 714, 727 is already Zero, D bit 796 has no effect.

E enable command bit 795a, 795b, 795c sets DMU Enable 714, 727 to One, thereby enabling monitoring of future DMA traffic and DMA interrupts. If DMU Enable 714, 727 is already set, E bit 795 has no effect.

R command bit 794a, 794b, 794c resets DMU 700. It does this by Zeroing the SMR.Active bit 711 and all MPF bits 710 in every SMR 707 and also Zeroing DMU Overrun flag 728.

The R command bit 794 has no effect on the values in the sector address CAM address tags 708. The R command 794 takes precedence over the A, M and X commands 793, 792, 791, and resets DMU 700 whether or not DMU 700 is enabled.

The high order bits (bits <27:12>) 797 of DMU_Command register 790 identify a page frame. Whenever a write occurs to DMU_Command register 790, the page frame address 797 is presented to the SMR sector CAM address tags 708. The A, M and X command bits 793, 792, 791 control what happens under various conditions:

1. If the sector match hardware (740 of FIG. 7e) fails to find a match 744, and A command bit 793 is Zero, then do nothing. If there is no match 744, and A command bit 793 is One, then normal allocation 750 is performed, as described in connection with FIGS. 7d and 7f. (Recall that normal allocation 750 can lead to an overrun condition 728 and hence to a DMU interrupt).
2. If either sector matching 740 or sector allocation 750 succeeds, then the M and X command bits 792, 791 define three possible actions according to Table 6:

TABLE 6

| M | X | Action |
|---|---|---|
| 0 | — | Inhibit modification of the MPF bit |
| 1 | 0 | Zero the corresponding MPF bit |
| 1 | 1 | set the corresponding MPF bit to One |

Writing a page frame address 702, 704, 797 to DMU_Command register 790 with the M command bit 792 set to One and the rest of the command bits 791, 793-796 to Zero searches 740 the sector CAM address tags 708 for a match. If a match 744 is found, the corresponding MPF bit 710 is Zeroed (because M bit 792 is One and X bit 791 is Zero, matching the second line of Table 6). This is how TAXi enables monitoring of a page that is about to be turned from a page whose ISA bit 180, 182 is One and XP bit 184, 186 is Zero (unprotected X86 code) into a page whose XP bit 184, 186 is One (protected X86 code). If the MPF bit 710 that is cleared by such a command was the only MPF bit 710 set in the SMR 707, then the SMR 707 reverts to inactive 711 and can be reallocated 750 to monitor a different sector. SMR.Active bit 711 is only affected by an MPF transition from Zero to One, or a transition of the last MPF bit from One to Zero. Otherwise, SMR.Active bit 711 is unaffected by changes to the MPF bits 710.

It is software's responsibility never to enable DMU 700 until the sector CAM address tags 708 contain mutually distinct values. Once an overrun 728 occurs this condition is no longer assured. Hence the safest response to an overrun is reinitialization:

```
DMU_Command = D+R      // Disable DMU, reset SMR's 707
for (i = 0, i < #SMRs, i++) {     // Initialize all SMR's 707
    // Initialize each SMR 707 to a distinct address, by
    // allocating a new SMR (A + M command bits) with
    // sector "j" (j<<17) and page zero (1<<12) within the sector
    DMU_Command = (i<<17) + (1<<12) + A + M
}
DMU_Command = E+R      // Enable DMU, free all SMR's
```

If not properly initialized the behavior of DMU 700 is undefined, guaranteed only not to harm the chip nor to introduce any security holes.

In an alternative embodiment, DMU 700 is more closely integrated with TLB 116. In these embodiments, DMU 700 has access to ISA bit 182 and XP bit 186 (see section I.F, supra), and only raises an interrupt when a protected X86 page is written, or if the written page has no entry in TLB 116.

VIII. Managing Out-of-Order Effects

Requiring all memory references (memory loads, memory stores, and instruction fetches) to be in-order and unoptimized limits the speed-up achievable by TAXi. Often the only barrier to optimization is knowing whether or not a load references well-behaved memory or some un-memory-like object. Recovering the original order of side effects, and preserving perfect X86 behavior, in spite of reordering and optimization by the TAXi translator, is discussed in section VIII.

A. Ensuring in-Order Handling of Events Reordered by Optimized Translation

Binary translator 124 is allowed to use code optimization techniques that reorder memory read instructions, floating-point instructions, integer divides, and other instructions that may generate exceptions or other side effects, in spite of the fact that the TAXi execution model of perfect emulation of the X86 maintains the order of side-effects. ("Side-effects" are permanent state changes, such as memory writes, exceptions that the X86/Windows architecture exposes to the application program, etc. Thus, a memory write and a divide-by-zero are each side-effects whose order is preserved relative to other side effects). For instance, all memory references (memory reads, memory writes, and instruction fetches) are assumed to be "well-behaved," free of both exceptions and hidden side-effects. All side-effects are kept ordered relative to each other. Correct execution is then ensured by catching any violations of these optimistic assumptions before any side-effect is irreversibly committed.

When profile information (see section V) tells TAXi translator 124 that a memory read can have a side-effect, for instance a read to I/O space (see section VIII.B, infra), then the X86 code is translated using more conservative assumptions, assumptions that disallow memory references from being optimized to eliminate redundant loads, or to be reordered. This conservative code is annotated as having been generated under conservative assumptions. When conservative code accesses I/O space, the memory reference is allowed to complete, because the annotation assures the run-time environment that the code was generated with no optimistic assumptions. References to well-behaved memory from conservative code complete normally, simply at the cost of the foregone optimization.

Conversely, if no I/O space reference appears in the profile, then the TAXi code will be optimized under the optimistic assumption that all references are to well-behaved (that is, ASI Zero) memory—memory reads may be reordered or eliminated. The code is annotated to record the optimistic assumptions. All references to well-behaved memory complete normally, regardless of the value of the annotation. When optimistic TAXi code is running, and a memory reference violates the optimistic assumption by referencing I/O space (ASI not Zero) from optimistic code, then the reference is aborted by a TAXi I/O exception. In TAXi code references to I/O space are allowed to complete only if the code is annotated as following conservative assumptions. When a TAXi I/O exception occurs, the exception handler will force execution to resume in the converter.

When TAXi translator 124 generates native code, it may make the optimistic assumption that all memory references are to safe, well-behaved (ASI Zero) memory and can be optimized: e.g., that loads can be moved ahead of stores, if it can be proved that the memory locations don't overlap with each other, that memory reads can be reordered with respect to each other and with respect to instructions that do have side-effects, and that redundant loads from the same location, with no intervening store, can be merged together (CSE'd—common sub-expression). TAXi translator 124 preserves all memory writes—memory writes are neither removed by optimization nor reordered relative to each other. However, references to I/O space, even mere reads, may have unknown side-effects (e.g., successive reads may return distinct values, and/or trigger separate side effects in an I/O device—recall, for instance from section VII.G, that a read of the DMU_Status register 720 invokes a state change in DMU 700, so the next read of DMU_Status 720 will give a different result).

TAXi translator 124 relies on the safety net to protect references to non-well-behaved I/O space, that is, to intervene when the well-behaved translate-time optimistic assumption is violated at run time. The TAXi system records a static property of each memory reference, annotating whether that memory reference (specifically, a load) is somehow optimized.

TAXi translator 124 conveys to the hardware whether a memory reference involves optimistic assumptions or not. Those references that involve no optimistic assumptions are always allowed to complete. Those that do involve the optimistic assumption that the target is well-behaved memory will have this assumption verified on every execution and are aborted if the assumption cannot be guaranteed correct.

In one embodiment, one bit of each load or store instruction (or one bit of each memory operand descriptor in an instruction, if a single instruction makes multiple loads or stores) is reserved to annotate whether or not that particular load or store is optimized.

The following embodiment eliminates the need to dedicate one instruction opcode bit for this purpose.

The optimistic/conservative annotation is recorded in the "TAXi Optimized Load" bit 810 of a segment descriptor.

Because every X86 load is based off a segment register (the reference to a segment register may be explicitly encoded in the load operation, or it may be implicit in the instruction definition), and every segment has a segment descriptor, the segment register is a useful place to annotate the optimized property, and to monitor memory references. As each X86 load operation is decoded into micro-ops to send down the Tapestry pipeline, the segment register is explicitly materialized into the micro-op.

When TAXi code is running (that is, when PSW.TAXi_Active 198 is asserted), and in TAXi translated code a load occurs in-order with respect to other memory references, then the effect will be identical to the original X86 instruction stream irrespective of the nature of memory referenced by that load. When memory references are not reordered, it is preferable that a TAXi Optimized Load 810 Zero segment be used, so that no exceptions will be raised.

Referring to FIG. 8a, a Tapestry segment register 800 encodes a superset of the functions encoded in an X86 segment descriptor, and adds a few bits of additional functionality. Bit <61> of Tapestry segment register 800 is the "TAXi Optimized Load bit" 810. (The segment descriptor TAXi Optimized Load bit 810 is distinct from the TAXi_Control.tio bit 820). When the segment descriptor TAXi Optimized Load bit 810 is One, all memory references off of this segment register are viewed as having been optimized under the optimistic assumptions. If a memory reference goes through a segment descriptor whose TAXi Optimized Load bit 810 is One, and the reference resolves to non-well-behaved memory (D-TLB.ASI, address space ID, not equal to Zero), and PSW.TAXi_Active 198 is true, then a TAXi I/O exception is raised. The handler for the TAXi I/O exception rolls the execution context back to the last safety net checkpoint and restarts execution in converter 136, where the original unoptimized X86 instructions will be executed to perform the memory references in their original form and order.

The X86 has six architecturally-accessible segment descriptors; Tapestry models these six for the use of converter 136, and provides an additional ten segment descriptors 800 accessible to native Tapestry code and TAXi code. The six X86-visible registers are managed by exception handlers in emulator 316—when X86 code reads or writes one of the segment descriptors 800, the exception handler intervenes to perform both the X86-architecturally-defined management and the management of the Tapestry extended functions. Converter 136 and emulator 316 ignore the value of the segment descriptor TAXi Optimized Load bits 810; during execution of X86 code in converter 136, the value of bits 810 could be random. Nonetheless, converter 136 maintains bits 820 for the benefit of TAXi—in these six segment descriptors, the value of the segment descriptor TAXi Optimized Load bit 810 always matches Taxi_Control.tio (820 of FIG. 4g).

The hardware format of a Tapestry segment register 800 differs from the architecturally-specified format of an X86 segment descriptor. Special X86-to-Tapestry hardware is provided to translate from one form to the other. When X86 code writes a segment descriptor value into a segment register, emulator 316 takes the segment descriptor value and writes it into a special X86-to-Tapestry conversion register. Hardware behind the special conversion register performs shifting and masking to convert from the X86 form to Tapestry form, copying the X86 segment descriptor bits into different bit positions, and gathering the Tapestry extended bits from elsewhere in the machine. In particular, the cloned segment descriptor's TAXi Optimized Load bit 810 is copied from TAXi_Control.tio 820. Emulator 316 then reads the special conversion register, and that value is written into one of the Tapestry segment registers 800.

At any particular software release, the value of TAXi_Control.tio 820 will always be set to the same value, and the TAXi translator 124 will rely on that value in translating X86 code.

Figure 8C:
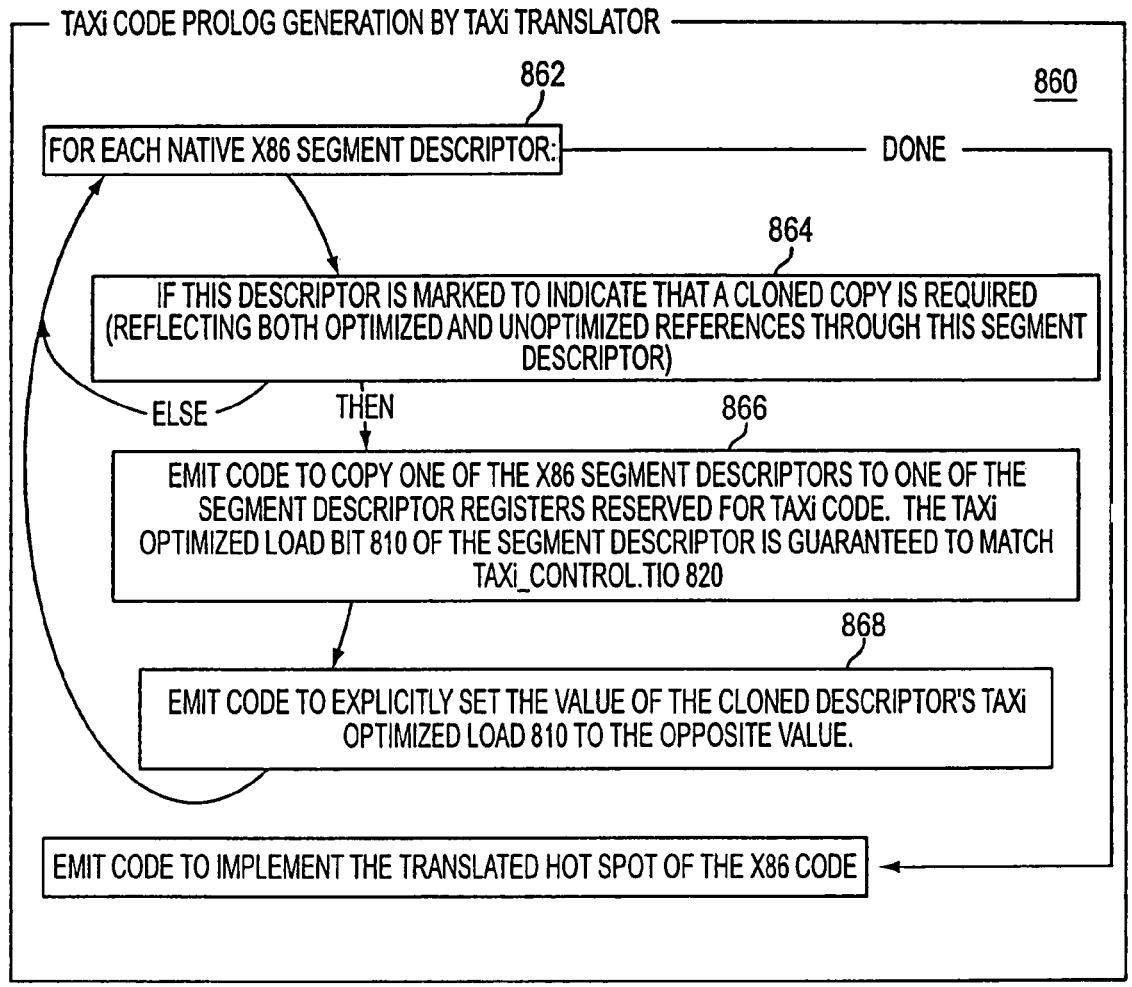

Referring to FIGS. 8b and 8c, the segment descriptor TAXi Optimized Load bit 810 is managed by the TAXi translator 124, as follows.

For the six segment registers visible to the X86, the default value of TAXi Optimized Load 810 is programmable at the discretion of the implementer. Recall that TAXi Optimized Load 810 is ignored by converter 136. Hence, each time the converter 136 loads a segment descriptor register (a complex operation that in reality is performed in emulator 316), TAXi Optimized Load can be set arbitrarily. The conversion of X86 format segment descriptor values into Tapestry internal segment descriptor format is performed by hardware. This hardware must provide some value to TAXi Optimized Load. Rather than hardwire the value, the Tapestry system makes the value of the TAXi Optimized Load bit 810 programmable via TAXi_Control.tio 820.

At system boot TAXi_Control.tio 820 is initialized to reflect the form of loads most likely to be emitted by the current TAXi translator. If translator 124 is not especially mature and rarely or never optimizes loads, then TAXi_Control.tio 820 is initialized to Zero. This means that the segment descriptors mapped to the six architecturally visible X86 segment registers will always have TAXi Optimized Load 810 Zero. Then code to clone the descriptor and set TAXi Optimized Load need only be generated in the prolog when a optimized load is actually generated.

The default registers will all be in one state, chosen to be the more common case so that those registers can be the defaults for use by TAXi. When TAXi wants the other semantics, the descriptor cloning at the beginning of the TAXi segment will copy the descriptor used by converter 136, using a copy of TAXI Control.tio 820 into the new segment descriptor's TAXi Optimized Load bit 810. The opposite sense for bit 810 will be explicitly set by software. For instance, if the default sense of the segment descriptor is TAXi Optimized Load of Zero (the more optimistic assumption that allows optimization), then all optimized memory references must go through a segment descriptor that has TAXi Optimized Load bit 810 set to One, a new descriptor cloned by the TAXi code. This cloned descriptor will give us all the other descriptor exceptions, the segment limits, all the other effects will be exactly the same, with the additional function of safety-net checking for loads.

Referring to FIG. 8b, as the TAXi optimizer 124 translates the binary, it keeps track of which memory load operations are optimized, and which segment descriptors are referenced through loads that counter the default optimization assumption. FIG. 8b shows the actions taken in a near-to-last pass of translator 124, after all optimization has been completed, but before final emission of the new Tapestry binary. The upper half 840 of FIG. 8b covers the case of relatively early releases of TAXi optimizer 124, when optimization that reorders the side-effects is the exception rather than the rule. Lower half 850 reflects the later case, when optimization is more common, in which case the value of a segment's TAXi Optimized Load 810 would default to One, which in turn is controlled by setting TAXi_Control.tio 820 to One. For memory references that are reordered, commoned, or otherwise optimized on the optimistic assumption that only well-behaved, side-effect-free memory will be addressed (steps 841, 851), TAXi translator 124 forces the memory references to go through a segment descriptor whose TAXi Optimized Load 810 value is One (steps 843, 852). If the assumption is violated, that is, if at run time the memory reference through a TAXi Optimized Load 810 One segment is found to access I/O space, then that memory reference will raise a TAXi I/O exception, and execution of the translated code will be aborted into the safety net of converter 136. If the TAXi translator 124 is willing to adopt conservative assumptions and not forgo opportunities to optimize this memory reference (for instance, if the profile indicates that this load referenced I/O space, as discussed in section VIII.B) (steps 844, 853), then the memory reference can go through a segment descriptor whose TAXi Optimized Load 810 bit is Zero (step 845, 855), thus guaranteeing that this memory reference will complete and never generate a TAXi I/O exception, even if to non-well-behaved memory.

In steps 842 and 854, TAXi translator records which segment descriptors are used in a non-default manner. The overhead of a cloning a descriptor, and setting a non-default value of TAXi Optimized Load 810, is only borne when required.

Referring to FIG. 8c, at the beginning of each translated hot spot, TAXi translator 124 inserts code that creates a cloned copy of any of the segment descriptors that were marked by steps 842, 854, as being used in a non-default way, into one of the ten extra segment descriptors (step 866). This cloned descriptor will be used for some of the memory references made by the translated code, those that match the assumption embedded in the current release's value of TAXi_Control.tio 820. The prolog code copies (step 866) the segment descriptor, and sets (step 868) the TAXi Optimized Load bit 810 to the sense opposite to the value of TAXi_Control.tio 820, for use by memory references that assume opposite to the assumption embedded in the current release's value of TAXi_Control.tio 820.

TAXi Optimized Load bit 810 has the following run-time behavior.

When converter 136 is running (that is, when PSW.TAXi_Active bit 198 is Zero), the TAXi optimized load bit 810 has no effect. Therefore converter 136 can issue loads through a segment irrespective of the value of the TAXi Optimized Load bit 810. Whatever the value of TAXi Optimized Load bit 810, the converter will be allowed to perform arbitrary memory references to arbitrary forms of memory and no TAXi optimized load exception will be induced.

When PSW.TAXi_Active 198 is One, the TAXi Optimized Load bit 810 determines whether a load from a non-zero ASI (i.e. memory not known to be well-behaved) should be allowed to complete (TAXi Optimized Load is Zero) or be aborted (TAXi Optimized Load is One). A TAXi I/O exception is raised when all three of the following are true:
1. PSW.TAXi_Active 198 is One
2. a memory reference goes through a segment whose TAXi optimized Load bit 810 is One
3. the memory reference touches I/O space, that is, the ASI is not Zero Given a mention of an X86 segment in some X86 code, the TAXi translator will sometimes want to use a descriptor with TAXi Optimized Load of One and sometimes with TAXi Optimized Load 810 Zero. Given an ability to read and write the descriptor register file, and one or more spare segment descriptor locations, a properly configured descriptor can be constructed by reading the original X86 descriptor location and setting or clearing TAXi Optimized Load 810 as appropriate.

Consider an example, where the TAXi translator uses optimistic assumptions and CSE's two loads together, so that only one load instruction actually exists in the TAXi instruction stream. The load that is actually optimized is the later load—but it no longer exists in the optimized instruction stream. Therefore, the remaining load is annotated, even if that load was not itself reordered relative to other side effects. When a load actually occurs to I/O space, off a TAXi Optimized Load 810 segment, then execution is rolled back to an instruction boundary, where all extended Tapestry state is dead. The TAXi code is abandoned, and the original X86 code is executed in converter 136. Converter 136 will execute the X86 instructions exactly as it sees them and it will execute every one of the loads (the X86 instruction stream will still be in its original unoptimized form, even if the TAXi instruction stream was optimized) so that there will be no loads dropped from the stream as emitted by converter 136.

The TAXi I/O fault is recognized before any side effects of the instruction are committed.

All TAXi code is kept in wired memory. Thus, no page fault can occur in fetching an instruction of TAXi code, and any page fault must necessarily involve a data reference.

As the TAXi code executes, as it crosses from a region translated from one page of X86 text to another page, it "touches" (a load without use of the result) the corresponding pages of X86 instruction text. (The page boundary crossings of the original X86 instruction text, were noted in the profile using the mechanism discussed in connection with FIGS. 4e and 4f in section V.D.) This induces page faults in the original X86 code, to provide faithful emulation of the execution of the original X86 code.

After servicing a TAXi I/O exception in the Tapestry operating system 312 and emulator 316, execution is restarted. In a simple embodiment, the X86 is restored to a previous X86 instruction boundary, and the restart is always at an X86 instruction boundary. Thus, if a single X86 instruction has two loads, then translator 124 must take one of two strategies, either (1) neither load can be optimized, or (2) both have to be annotated as optimized. This avoids a situation in which the first load is to non-well-behaved memory and is then re-executed if the second load raises a TAXi I/O exception.

B. Profiling References to Non-Well-Behaved Memory

Referring again to FIG. 4*b*, memory loads that are directed to anything other than address space ID (ASI) zero are recorded in the execution profile (see section V, supra) with a profile entry whose event code is 1.1100. ASI-non-zero references are typically (and conservatively assumed to be) directed to I/O space, that is, memory that is not well-behaved, as discussed in section I.D, supra. This indication provides a good heuristic for the TAXi translator 124 to choose between generating aggressive, optimized code and generating conservative, in-order code.

The initial assumption is that all memory reads are directed to well-behaved (address space zero) memory. When converter 136 is running (PSW.ISA indicates X86 mode), and profiler 400 is active (TAXi_State.Profile_Active 482 is One, see section V.E and V.F, infra), load instructions to I/O space (D-TLB.ASI not equal Zero) that complete cause a "I/O space load" profile entry to be stored in a register. The TAXi translator will interpret this profile entry to indicate that the optimistic assumption does not hold, and that at least this load must be treated under pessimistic assumptions by translator 124, and can be marked with the "safe" setting of the segment descriptor "TAXi optimized load" bit discussed in section VIII.A, supra.

The implementation of this feature somewhat parallels the mechanism used for branch prediction. Recall that converter 134, 136 decomposes each X86 instruction into a plurality of native Tapestry RISC instructions for execution by Tapestry pipeline 120. When a single X86 instruction has several memory references, each memory reference is isolated into a discrete Tapestry instruction. Even though the Zero/non-Zero ASI value is recorded in the D-TLB, and thus can be determined without actually initiating a bus cycle, the address space resolution occurs relatively late in the pipeline. Thus, when a reference to a non-zero ASI is detected, the Tapestry instructions following the load in the pipeline are flushed. TAXi_State.Event_Code_Latch 486, 487 (see section V.E, infra) is updated with the special I/O load converter event code 1.1100 of FIG. 4*b*. A TAXi instruction to record the I/O space profile entry is injected, and the normal profile collection hardware then records an "I/O space load" profile entry, in the manner discussed in connection with FIGS. 5*a* and 5*b* in section V.F, supra. Note that this TAXi instruction may be injected in the middle of the recipe for a single X86 instruction, where the other TAXi instructions discussed in section V.F are injected at X86 instruction boundaries. Normal X86 instruction execution resumes in converter 136, and the remainder of the instructions in the converter recipe are reinitiated.

Alternative embodiments might select other classes of instructions for profiling, typically those instructions that have a high likelihood of raising a synchronous exception, or that have some other property of interest to hot spot detector 122 or TAXi translator 124. The number of such profiled instructions is kept relatively small, so as not to substantially reduce the density of the information made available to hot spot detector 122 or TAXi translator 124.

C. Reconstructing Canonical Machine State to Arrive at a Precise Boundary

The code generated by TAXi translator 124 is annotated with information that allows the recovery of X86 instruction boundaries. If a single X86 instruction is decomposed into many Tapestry instructions, and those Tapestry instructions are reordered by the TAXi optimizer, then the annotation allows the end of particular X86 instructions to be identified. The information stored is similar to that emitted by optimizing compilers for use by debuggers. There, the instructions of a single source statement are annotated so that source statements can be recovered. In TAXi, the annotation allows the recovery of X86 instruction boundaries from a tangled web of Tapestry instructions. Thus, when a synchronous exception is to be exposed to the virtual X86, the TAXi run time system establishes a system state equivalent to that which would prevail at an X86 instruction boundary. Once state is restored to a precise instruction boundary, execution can be tendered to converter 136, which in turn can resume execution from that instruction boundary.

In some instances, this annotation mechanism may roll back execution by a considerable number of instructions, in order to establish a "safe" state, where all X86 instructions can either be assumed to have not started, or completed completely. The rollback mechanism avoids resuming execution from a state where a single side-effect may be applied twice.

The code may "checkpoint" itself, capturing a self-consistent state snapshot somewhat in the manner of a database system. Then, in the event of a fault in the TAXi code, execution can be rolled back to the checkpoint, and resumed in converter 136.

D. Safety Net Execution

Referring again to FIG. 3*j*, in one alternative embodiment, if this is an asynchronous interrupt, case 351 or 354 can allow X86 emulator 316 or converter 136, respectively, to progress forward to the next X86 instruction boundary, before delivering the interrupt. In another alternative embodiment, case 354 can roll back X86 emulator 316 to the previous X86 instruction boundary. After state is secured to an X86 boundary, execution proceeds through X86 operating system 306 as in case 351. In other alternative embodiments, in the case of asynchronous interrupts in cases 351, 353, and 354, the code can be allowed to progress forward to the next safety net checkpoint before delivering the exception. Each of these are conceptually similar, in that the virtual X86 310 is "brought to rest" at a stable point at which all Tapestry extended context is dead and discardable, and only events whose order is not guaranteed by the X86 architecture are allowed to be reordered with respect to each other.

When an exception occurs in TAXi code and the exception handler determines that it must materialize the exception in the X86 virtual machine, it jumps to a common entry in emulator 316 that is responsible for setting the X86 state—establishing the interrupt stack frame, accessing the IDT and performing the control transfer. When this function is invoked, it must first determine if TAXi code was being executed by examining PSW.TAXi_Active and if so jump to a TAXi function that reconstructs the X86 machine state and then re-executes the X86 instruction in the converter to provoke the same exception again. Re-executing the X86 instruction establishes the correct X86 exception state. Anytime the converter is started to re-execute an X86 instruction, the exception handler uses the RFE with probe failed, reload probe timer event code to prevent a recursive probe exception from occurring.

The only exceptions that may not be exposed to the X86 are those that can be completely executed by native Tapestry code, e.g., a TLB miss that is satisfied without a page fault, FP incomplete with no unmasked X86 floating-point exceptions, etc.

IX. The Converter

Where sections I through VIII focused largely on the TAXi binary translation mode of execution, this section IX will focus on a number of techniques used in one embodiment to improve the implementation of hardware converter 136, during the execution mode in which the instructions are translated by hardware converter 136. The techniques of section IX are useful when used individually or together. Converter 136, emulator 316, and execution pipeline 120 may be used without the techniques of sections I through VIII to implement a CISC processor, even without a binary translator 124. The techniques are useful in a dual-instruction-set computer, or in a RISC execution engine for emulating a CISC instruction set, or for a RISC target for a binary translator from a CISC instruction set, or in a microengine or other implementation of a CISC instruction set.

A. Overview

1. Pipeline Structure, and Translation Recipes

FIG. 9a presents a hardware-centric view of the X86 branch of the pipeline, in contrast to the more software-centric view of both the X86 and Tapestry branches presented in FIG. 1c. Referring to FIG. 9a, in connection with FIG. 1c, the converter and Tapestry pipeline falls into two parts. F-stage (fetch) 110, L-stage (aLign) 130, C-stage (converter) 902, and T-stage 903 (collectively 134) form an upper part 134 of the pipeline, shown in the left portion of FIG. 1c and the upper portion of FIG. 9a. D-stage (decode) 140 through W-stage 150 form a lower part 120 of the pipeline.

Lower part 120 includes four relatively conventional RISC pipelines 156, 158, 160, 162, with some additional functionality and control that will be elaborated throughout this section IX. Lower part 120 of the pipeline executes instructions in order. Dependencies are managed by stalls; instructions are not allowed to progress beyond the stage where they consume their source operands, unless and until those source operands are available.

In upper part 134 of the pipeline, instructions are fetched.

If PSW.ISA 194 (see section II, supra) currently specifies native Tapestry mode, the fetched instructions are sent directly to lower part 120 (path 138 of FIG. 1c).

FIG. 9a is largely directed to the case where PSW.ISA 194 currently specifies X86 mode, in which each fetched X86 instruction is translated into a sequence of one to nine native instructions (path 136 of FIG. 1c, stages 110, 902, 903 of FIG. 9a). X86 instruction bytes are fetched and aligned in F-stage 110 and L-stage 130. The conversion process is done in two stages, C-stage (convert) 902 and T-stage 903. C-stage 902 partially decodes each X86 instruction and ascertains useful attributes about it. C-stage 902 decides on one of three strategies to handle the current set of X86 instruction bytes: (a) if converter 134, 136, 902 knows how to execute the current X86 instruction, and the current instruction is not disabled (see the discussion of EMU_INST in section IX.A.2, infra), then converter 134, 136, 902 generates Tapestry native instructions to implement the X86 instruction; (b) if converter 134, 136, 902 cannot itself execute the instruction, it may generate a few native Tapestry instructions to collect some information before transferring control to emulator 316; or (c) converter 134, 136, 902 may immediately transfer control to emulator 316.

The translation itself occurs in T-stage 903, in two identical copies of Tapestry Instructions Generators TIG i1 905 and TIG i2 906. TIG's i1 905 and i2 906 decode the opcode and address mode bits of each X86 instruction, and based on that decoding, select a "recipe" for instructions to be generated. The recipe can be one to nine instructions long. Each of the two TIG's 905, 906 can generate two instructions in each cycle. Thus, in each cycle, four instructions of a recipe can be generated. For example, if an X86 instruction generates six native instructions, TIG i0 905 will generate the first two in the first cycle, TIG i1 906 will generate the second two in the first cycle, and TIG i0 905 will generate the final two in the second cycle. Instruction generators TIG i1 905 and TIG i2 906 produce instructions without regard to inter-instruction dependencies. These dependencies are managed by issue buffer 907 and D-stage 140. Instructions are held in issue buffer 907 until all dependencies are resolved.

Upper part 134 performs the following parts of the instruction decode and processing. Branches are predicted. The X86 IP (instruction pointer or program counter) is associated with each generated native instruction. The native instructions are given several tags, which will be discussed in section IX.A.3, infra. In some timing-critical instances, native instructions are partially decoded.

D-stage (decode) 140 manages issue buffer 907, and determines when instructions have satisfied interlock considerations and can be released from issue buffer 907. D-stage 140 analyzes which instructions are data-independent and can paired in the same machine cycle. D-stage 140 ensures that all instructions of a straight-line control flow segment are issued to lower pipeline 120 in a continuous sequential stream, and that the branch that breaks the straight-line flow segment enters the pipeline as the last instruction of the stream.

R-stage 142 reads register operands from the register file.

A-stage (address generation) 144 performs a number of functions. In the case of memory reference native instructions, the address is calculated and the cache access is begun. Simple arithmetic logical instructions like "adds" and "ors" are executed in the first and second ALU's. A third ALU operates in A-stage 144. Integer multiplies, and floating-point adds and multiplies begin execution in A-stage 144, and will continue through E-stage 148.

In M-stage 146, the cache access is completed and the output of the cache is aligned. The shifter begins its decoding work. Some simple shifts are completed in M-stage 146.

In E-stage (execute) 148, the result of a memory load is available for bypassing to other units. Shifts are completed. A fourth ALU operates in E-stage 148. Multiplies are completed. Any accumulate associated with a multiply is performed in E-stage 148. Some simple arithmetic and logical instructions are performed in E-stage 148, if the instruction does not call for a multiply.

W-stage (write back) 150 writes results, recognizes exceptions, and collects frac information (930, discussed in section IX.A.3), as will be discussed in sections IX.A.5 and IX.C.2, infra. All architecturally-visible side-effects, including exceptions, are deferred until W-stage. Any bus transaction, for instance an access to memory attendant to a cache miss, is deferred until W-stage 150. Exceptions that arise earlier in the pipeline (divide by zero, raised in E-stage 148, or a page fault, raised in A-stage 144, etc.) are not raised as recognized; rather, the instruction is tagged (using the side-band information 920 discussed in section IX.A.3, infra) as having raised an exception. The instruction is allowed to progress down the pipeline to W-stage 150. When the excepted instruction reaches W-stage 150, the exception is may be collected up over all instructions of a recipe, or raised immediately. Exceptions on native instructions are recognized and acted upon immediately. These may manifest as X86 exceptions, either immediately (faults or traps on the last native instruction of a recipe) or delayed until the end of the recipe (traps on non-last steps of a recipe), as discussed in section IX.A.4, infra.

Pipe control 910 performs several major functions. Pipe control 910 stalls a pipeline stage when its source operands are not ready, and allows the stage to proceed when the operands come ready. Pipe control 910 controls bypass multiplexers that determines where in the bypass tree the source operands are available. Pipe control 910 gathers information about exceptions from the various execution stages, and coordinates response to those exceptions. This includes, for example, detecting mis-predicted branches, and flushing the appropriate stages of the pipeline when a mis-prediction is detected. Exceptions are discussed further in section IX.A.4, infra.

2. The Emulator, and the Interface Between the Emulator and Converter

Figure 9B:
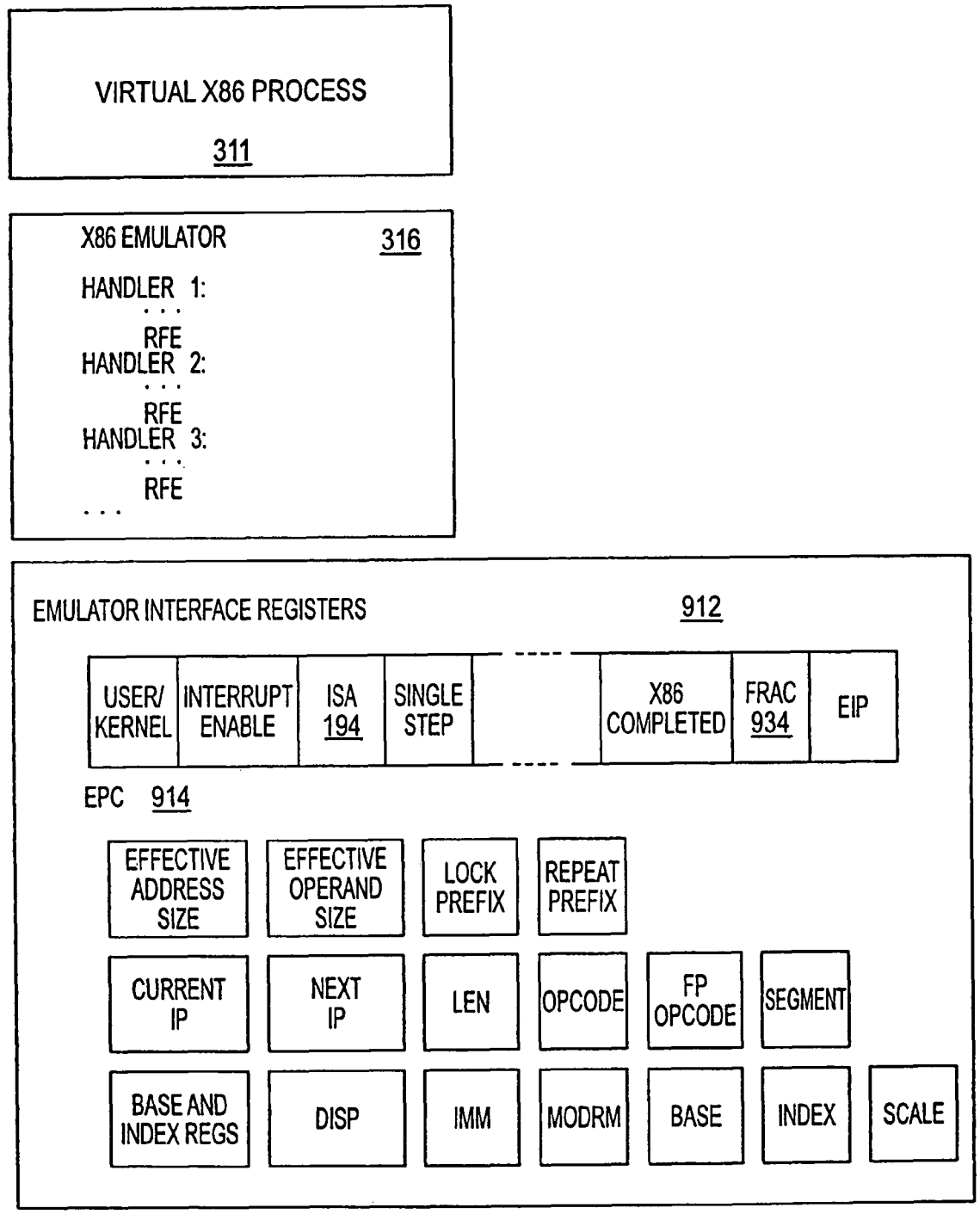

Referring to FIG. 9b with FIGS. 9a and 3a, hardware converter 136 and software emulator 316 together, in combination yield a full and faithful implementation of the X86 architecture. Converter 136 handles simple instructions. When converter 136 encounters an X86 instruction that is too complex, or that presents complex interactions between instructions, or between events and the instruction, or for which hardware conversion has been disabled (see EMU_INST, infra), then converter 136 saves some state and passes control to emulator 316 via an exception.

When a conventional processor takes an exception, the processor state is saved to the memory stack, and execution vectors to an exception handler. When execution is returned to the excepted process, processor state is reloaded from the memory stack.

However, in Tapestry emulation of the X86, the stack is not available for Tapestry internal housekeeping, because Tapestry internal mechanisms are not allowed to use storage that is visible to the X86 architecture. Because exceptions are detected by the beginning of W-stage 150, and raised during W-stage 150, but no architecturally-visible side effects are committed until the end of W-stage 150, the amount of intermediate pipeline state that must be saved and restored on an exception is limited. This information is saved and restored in a collection of special-purpose processor registers, called emulator interface registers 912. Emulator interface registers 912 contain enough information about the X86 instruction that emulator 316 can, if needed, refetch the X86 instruction, and decode it itself. Emulator interface registers 912 are loaded when invoking emulation of a complex instruction, and are generally not meaningful for other exceptions.

Information is stored in emulator interface registers 912 on several classes of events. Hardware converter 136 may pass control to emulator 316, either because the instruction is not implemented in the converter hardware 136, or because the instruction has been disabled in EMU_INST, or for other reasons. The information stored in interface registers 912 is generally dependent on the instruction being emulated, and is generally directed to providing information to improve the efficiency of emulator 316, or handing off information from converter 136 to emulator 316. Some emulator interface registers 912 may not contain useful information in some cases.

When an instruction is not handled completely by converter 136, converter 136 avoids updating any X86 architectural state before passing control to emulator 316.

The transfer to emulator 316 is effected in C-stage 902, so the fetch of the first instruction from emulator 316 occurs while the emulated X86 instruction is in D-stage 140.

In addition to emulator interface registers 912, EPC register 914 contains an image of the machine program status word (PSW) and the X86 program counter (IP). EPC register 914 contains the following bit flags, among other information:

TABLE 7

| EPC register | |
|---|---|
| UK | select between user and kernel mode |
| IE | global interrupt enable for maskable processor and software interrupts |
| ISA | bit 194 - enable the X86 converter/ISA page property bit, set to the ISA bit of the target page by a control transfer instruction |
| XP | EPC image of XP bits 184, 186, as discussed in section I.F |
| STEP | single-step mode |
| EM86 | X86 emulator context is currently active |
| AC | allow alignment checks, analogous to the AC bit in the X86 EFLAGS |
| V86MODE | virtual X86 mode, analogous to the V86 bit in the X86 EFLAGS |
| RF | resume flag, inhibit breakpoints - analogous to the AC bit in the X86 EFLAGS |
| TAXi_Active | TAXi_Active flag 198, as discussed in sections I.E, V, and VI |
| PROBE_ENABLED | see section VI |
| X86_COMPLETED | image of the end-of-recipe marker 926, indicating that the processor is at an X86 instruction boundary, discussed at sections IX.A.3 |
| CONTROL_TRANSFER | The CONTROL_TRANSFER bit is modified by every instruction execution, set to One if and only if the previous instruction was a taken control transfer instruction. |
| P_TRACEPOINT | software controlled read/write bit; used to record a pending tracepoint trap |
| P_STEP | software controlled read/write bit;. used to record a pending X86 single-step trap |
| FRAC (4 bits) | image of the frac bits 930, discussed at sections IX.A.3 and IX.A.5, infra |
| EIP (32 bits) | the offset into the code segment for the current X86 instruction (in the case of a fault) or the next instruction (in the case of a trap) |

The PCW (Processor Configuration Word) stores a collection of processor state that does not change across exceptions. This state includes processor and software interrupt enable modes, software interrupt request modes, code and data segments to use during exceptions, exception execution enable modes, X86 modes for defaults code/data/stack size, protected mode, X86 running mode, alignment checks, kernel write protect mode, and memory proxy. The bits in the PCW are managed by emulator 316 and Tapestry operating system 312. Among the bits in the PCW are the following:

TABLE 8

| PCW register | |
|---|---|
| HWIE | several bits enabling hardware interrupts |
| SWIE | several bits enabling software interrupts |
| SWI | several bits indicating pending software interrupts |
| EX_ESEG | 4 bits, holds the value loaded into PC.ESEGP, indicating |

TABLE 8-continued

| PCW register | |
|---|---|
| | the exception execution (code) segment descriptor pointer, when an exception occurs |
| EX_DSEG | 4 bits, holds the value loaded into PC.DSEGP, indicating the exception data segment descriptor pointer, when an exception occurs |

The Tapestry architecture provides additional emulator interface registers 912 as follows. These registers are set when converter 136 traps to emulator 316.

TABLE 9

| Emulator interface registers | | |
|---|---|---|
| EMU_ASIZE | read/write 1 bit | specifies the effective address size, taking into account the validity of the D and B bits, and any override prefixes. Zero indicates a 16 bit effective address, One indicates a 32-bit effective address. |
| EMU_BASE | read/write 11 bits | specifies a base register and an index register, and a shift count derived from the modrm and SIB bytes for how to generate a memory address of the instruction. Both register values are optional - one bit fields determine whether the register specifiers are valid or not. |
| EMU_CIP | read/write 32 bits | the instruction pointer of the current X86 instruction, as an offset into the x86 code segment. |
| EMU_NIP | read/write 32 bits | the instruction pointer of the next X86 instruction, as an offset into the x86 code segment. |
| EMU_DISP | read/write 32 bits | the displacement for a memory reference, sign-extended to 32 bits. If the instruction contains no displacement, then EMU_DISP contains Zero. |
| EMU_IMM | read/write 32 bits | the instruction's immediate value, sign-extended to 32 bits. If the instruction contains no immediate, then EMU_IMM contains Zero. |
| EMU_INST | read/write 64 bits | EMU_INST bits, when set, specify which X86 instruction classes should not be converted by converter 136. When an EMU_INST bit is set, instructions of a corresponding class are executed in emulator 316 instead. If the processor attempts to decode an X86 instruction in a class whose corresponding EMU_INST bit is set, the processor faults to VECT_RESERVED_X86. EMU_INST is examined only when converter 136 is active; emulated instructions are not affected by the setting of EMU_INST. Instructions are divided into twelve classes by opcode, thirty-three classes by operand class (MMX instructions with and without an immediate, MMX instructions with an immediate, integer read-execute-write instructions with and without an immediate, integer read-execute instructions with and without an immediate, integer non-memory ALU instructions with an immediate, instructions that write segment registers, conditional branches, etc.), and nineteen groups according to compatibility and prefixes (floating-point, floating-point stack-modifying instruction, integer hidden opcodes, XCHG instructions with implicit lock behavior, etc.). Many X86 instructions are covered by bits in more than one of these groups; an instruction is executed in converter 136 only if all of the EMU_INST bits affecting it are deasserted. |
| EMU_LENGTH | read/write 4 bits | X86 instruction length, including prefixes, as a byte count. |
| EMU_LOCK | read/write 1 bit | set if the instruction had a lock prefix associated with it |
| EMU_OPC | read/write 8 bits | contains the first meaningful X86 instruction opcode byte. This is usually the first byte following the last prefix byte. If this first byte is $0F_{16}$, then EMU_OPC contains the second byte following the last prefix. |
| EMU_OPC_0F | read/write 1 bit | set if the fist byte of the instruction opcode was $0F_{16}$ |
| EMU_OSIZE | read/write 1 bit | specifies the effective operand size, taking into account the D bit, and any override prefixes. Zero indicates a 16 bit operand, One indicates a 32-bit operand. |
| EMU_REP | read/write 2 bits | species what type of repeat prefix was used for the current instruction: none, REP/REPE/REPZ or REPNE/REPNZ |
| EMU_RM_20 | read/write 3 bits | a copy of bits <2:0> of the instruction's modrm byte |
| EMU_RM_53 | read/write 3 bits | a copy of bits <5:3> of the instruction's modrm byte |

TABLE 9-continued

| | | Emulator interface registers |
|---|---|---|
| EMU_RM_76 | read/write 2 bits | a copy of bits <7:6> of the instruction's modrm byte |
| EMU_RM_RR | read/write 1 bit | a single bit that specifies whether the two most-significant bits of the instruction's modrm byte are both One |
| EMU_SEG | read/write 3 bits | identifies the effective segment (GS, FS, DS, SS, CS, or ES) used for a data reference after taking into account the default segment and segment override prefixes |
| EMU_SIB_BASE | read/write 3 bits | a copy of bits <2:0> of the instruction's SIB byte |
| EMU_SIB_INDEX | read/write 3 bits | a copy of bits <5:3> of the instruction's SIB byte |
| EMU_SIB_SCALE | read/write 2 bits | a copy of bits <7:6> of the instruction's SIB byte |
| EMU_REG1, EMU_REG2 | 32 bits | The following information is stored only for some of the instructions that are always emulated. If an instruction is usually not emulated, but converter 136 have been asked to emulate it for some reason, then this information is not generated for these instructions. Any instruction that cannot be completely handled by hardware converter 136 will not modify any X86 architectural state before transferring control to emulator 316. EMU_REG1 and EMU_REG2 capture the results of partial execution in converter 136 before execution is transferred to emulator 316. If the emulated instruction has to do both a load and a store, or if the emulated instruction only has to do a store, or if memory load cannot be performed in converter 136 because the load would affect architectural state, then the EMU_REG1 and EMU_REG2 registers contain the memory address offset and the segment base for the memory operand. SEG_CONVS (another processor register) conveys the segment used by the memory reference. If converter 136 is providing the operands, either form memory or from registers, then EMU_REG1 and EMU_REG2 will contain the first and second operands of the instruction. Converter 136 will generate instructions to load either operand from memory. It will also move a register or immediate operand in EMU_REG1 or EMU_REG2 as appropriate. If converter 136 causes an exception in the process of performing the preliminary execution of an instruction to be completed in emulator 316, then control will be passed to the appropriate exception handler and not to the emulator entry point. |

Other processor registers 914 capture the X86 interrupt flags, and the X86 EFLAGS and condition codes.

Together, these emulator interface registers 912 and EPC 914 provide one instruction's worth of historical context. This corresponds to a one deep exception stack implemented with a processor register. As shown in Table 7 and discussed in sections IX.A.3 and IX.A.5, infra, the intra-instruction PC ("frac bits" 930) is also captured in EPC register 914. Even if the interrupt occurs within an X86 instruction, the exception occurs at a precise boundary between two Tapestry instructions. On an exception, the information that would conventionally be spilled to the memory stack in an exception frame is architecturally committed in emulator interface registers 912 and EPC 914, the Tapestry general purpose registers, plus the FP-IP/OP/DP registers (discussed in section IX.C.2). Thus, a software exception handler has access to the full intermediate state of any partially-executed X86 instruction, and can restart the instruction for the point of the interrupt, all without recourse to a memory exception frame. By examining the frac bits 930 intra-instruction PC, emulator 316 can determine exactly where the X86 instruction was interrupted, and therefore associate Tapestry registers to corresponding X86 operands, etc. Though the emulator/converter interface is designed (with few exceptions) so that emulator 316 does not need to know where in the recipe an exception is signaled, the FRAC bits make this information available.

Emulator 316 can return to converter 136 in three places. First, when emulation of an emulated instruction has completed, control will be passed back to the next X86 instruction by setting the instruction pointer to the value in EMU_NIP (next IP, Table 9). Second, when emulating a control transfer instruction, emulator 316 sets the instruction pointer appropriately to the target destination of the control transfer instruction. Third, after an exception, emulator 316 may either go back to the instruction that raised the exception, or to the next instruction, or to an X86 exception target, depending on the exception.

Complex CISC instructions are handled by basically the same pipeline and architectural infrastructure already extant to handle exceptions. When converter 136 encounters a complex instruction to be handled by emulator 316, converter 136 saves information in emulator interface registers 912 and EPC 914. Converter 136 then issues an "effective" TRAP instruction to pipeline 120. The TRAP instruction has an argument, a trap vector number (e.g., one of the emulator trap vectors) that selects a handler to be executed; the argument may depend upon a particular instruction or major machine mode. The TRAP instruction transfers execution to emulator 316. The TRAP argument is used to select a routine in emulator 316. The selected routine performs the work of the complex instruction, on behalf of converter hardware 136.

The selected emulation routine is controlled by the contents of the emulator interface registers 912 and EPC 914. Some handlers in emulator 316 use emulator interface registers 912 and EPC 914 as read-only information to decide what to do. Some handlers write results into emulator interface registers 912 and EPC 914. At the end of the emulation routine, an RFE instruction returns execution to the converter 136. Machine state is reestablished based on the information in emulator interface registers 912 and EPC 914, either the information that was put there at the time of the exception, or the information as altered by the handler.

It is desirable that native Tapestry instructions in the pipeline be context insensitive, with respect to whether they were from a native Tapestry binary, or generated by converter 136, with respect to the X86 instruction from which they were generated, and with respect to the location within an X86 recipe. In order to promote that context independence in the face of certain X86 complexities, for instance debugging, emulator 316 is occasionally triggered during the middle of a recipe in order to convey machine state from one Tapestry instruction to the next, or to collect all of the results of a single X86 instruction.

Consider the case of an X86 MOV instruction, from memory to a general purpose register. The recipe for this X86 instruction is a single native instruction, a load. The memory load operation must only be issued as a bus transaction only once, because the memory load may be directed to I/O space, and will change processor state if retried. The memory load goes through the segmentation and paging translation hardware. If, for instance, there is a TLB miss on the memory load, then execution of the load is prevented; the X86 EIP information and frac bits 930 are stored to preserve the context in which the instruction will be restarted. (Frac bits 930 and restart from the middle of an X86 instruction are discussed in more detail in section IX.A.3 and IX.A.5, infra). Execution vectors to the TLB miss handler. Eventually, execution is resumed in the converter. Because the recipe is a single instruction, the recipe is resumed from the beginning. The load never progressed beyond the TLB, but now it can be issued as a bus transaction.

The hardware exception vectoring mechanism in the pipeline control for traps and faults is relatively uniform, whether the exception is to be handled by emulator 316, by the Tapestry operating system (312 of FIG. 3a), or by the X86 operating system 306. Thus, the hardware has little knowledge of emulator 316 or its function; to the hardware, emulator 316 is just another exception handler. The differences are confined to the software itself. For instance, on entry to emulator 316, a special handshake in hardware preserves emulator interface registers 912 and EPC 914 to capture the state of X86 converter 136, and turns off converter 136 and enters native mode. From the hardware's point of view, there is little difference between invoking emulator 316 to handle a complex instruction, or invoking emulator 316 or another exception handler to handle an exception in an instruction that was initially processed by converter 136.

Emulator interface registers 912, 914 are collected at the boundary between C-stage 902 and T-stage 903. In one embodiment, emulator interface registers 912, 914 are pipelined, and the information stages down the pipe with the corresponding native instruction.

In another embodiment, even though the machine is pipelined and speculative, the following protocol allows emulator interface registers 912, 914 to store the required information in only one set of registers. Emulator interface registers 912, 914 may be in one of two states: a load state and a protected state. Registers 912, 914 transition from the load state to the protected state when a pseudo TRAP instruction is received from X86 instruction decoder 929, and transitions from the protected state to the load state on a pipeline flush. (Pipeline flushes are invoked when a branch mis-predict is detected for either address or direction, on any far transfer, including an RFE, TRAP or an exception vector, and on writes to certain processor resources, etc.) Even if the pipeline flush occurs during execution of emulator 316, the emulator interface registers 912, 914 will remain frozen, because emulator 316 itself is in Tapestry native code—X86 decoder 929 will remain quiescent and cannot drive emulator interface registers 912, 914. In the load state, the X86 instruction decoder 929 drives emulator interface registers 912, 914 with new values as each X86 instruction is decoded. In the protected state, emulator interface registers 912, 914 do not automatically update, but are only loaded by an explicit write into the processor register. As long as the processor is executing a sequence of converted instructions, emulator 316 will not be invoked to read emulator interface registers 912, 914, so the values need not be staged down pipeline 120. When emulator 316 is to be invoked, the condition is detected early enough so that emulator interface registers 912, 914 can be preserved until they will be required.

An example of this operation follows.

X86 decoder 929 is able to determine, by the end of C-stage 902 and the beginning of T-stage 903, whether the instruction will trigger an entry to emulator 316—in fact, decoder 929 will emit a pseudo TRAP instruction. The contents of emulator interface registers 912, 914 are protected during execution of emulator 316, so that emulator 316 can read emulator interface registers 912, 914 as it does its work. When decoder 929 encounters an instruction that will be emulated, the processor immediately freezes further writing of emulator interface registers 912, 914 by X86 decoder 929, so that the value of emulator interface registers 912, 914 will be protected until emulator 316 is entered. In one implementation, the pseudo TRAP instruction is recognized at entry into T-stage 903, and this triggers feedback into C-stage 902 to freeze emulator interface registers 912, 914 in protected state. Emulator interface registers 912, 914 remain protected while the pseudo TRAP flows down pipeline 120, while emulator 316 executes. During execution of emulator 316, X86 decoder 929 is turned off so there is no new information to load in emulator interface registers 912, 914. When emulator 316 completes, emulator 316 exits with an RFE (return from exception) instruction; the definition of the RFE instruction calls for a pipeline flush. That flush causes emulator interface registers 912, 914 to transition back to the load state. If the target of the RFE is an X86 instruction, whether converted or emulated, emulator interface registers 912, 914 will be loaded on each subsequent instruction decode.

This protocol works even if emulator 316 is invoked on an exception that will be reflected by entry into the X86 operating system 306 before execution returns to the interrupted code. In this embodiment, emulator interface registers 912, 914 only carry information relevant to the internal operation of an X86 instruction boundary—no information need be carried across an X86 instruction boundary. At entry to X86 operating system 306, the processor is necessarily at an X86 instruction boundary, so the information in emulator interface registers 912, 914 is dead. Once within X86 operating system 306, the instructions are, by definition, coded in the X86 instruction set, and these instructions are either converted or emulated. If these instructions are converted, then emulator interface registers 912, 914 are overwritten on every X86 instruction, and the values are correct. If an instruction of X86 operating system 306 is emulated, including one that may ultimately may resolve in running some entirely different piece of code, the emulation will always end with an RFE instruction; if that RFE returns to X86 code, that instruction will either be converted or emulated, and thus emulator interface registers 912, 914 will be handled correctly on exit from X86 operating system 306.

The combination of techniques described in this section IX (including the instruction pointer and frac bits 930 of section IX.A.3, emulator interface registers 912 and EPC 914 of section IX.A.2, and the temporary registers discussed in section IX.B.1) ensures that the context that needs to be captured on an exception is in fact available for inspection by Tapestry system software 312, 316, even without a dump of pipeline state onto the stack. X86 intermediate information that would snapshotted to the stack in a conventional processor is instead exposed in Tapestry architectural state 912, 914. Native Tapestry execution in emulator 316 or Tapestry operating system 312 does not update emulator interface registers 912, and thus this context information can be captured by emulator 316. Because EPC 914 is shared between all exceptions (TLB miss, for example), emulator 316 preserves EPC 914 by writing it to memory when there is the possibility of another exception being signaled. The temporary registers and X86 emulator interface registers 912, 914 are part of the extended context (native Tapestry context that is outside the view of the X86) that is managed among X86 processes using the context management techniques described in section III, supra. Any additional information required to restart an X86 instruction can be derived from the saved instruction pointer and frac bits 930.

Execution of the TLB miss handler may evict the excepted X86 instruction from I-cache 112; on resumption, the instruction fetch may miss in I-cache 112. For instructions stored in cacheable memory, there is no unintended side-effect. For instructions stored in non-cacheable memory, an additional memory reference may occur.

3. Side-Band Information: Frac Bits, Instruction Boundaries, Interruptible Points, Etc.

Figure 9C:
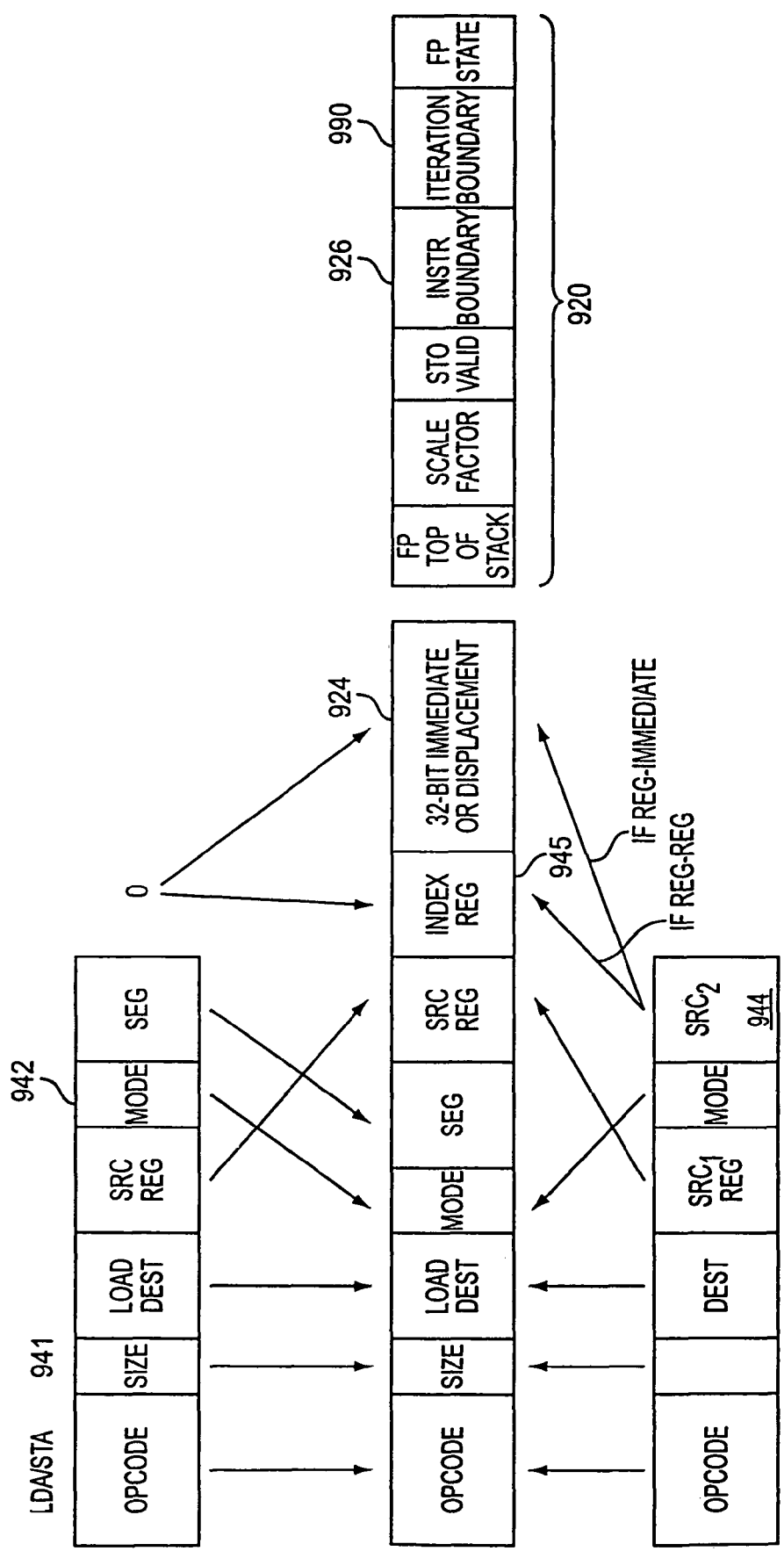
FIG. 9c is a data structure diagram showing instructions of the computer.

Referring to FIGS. 9c and 9d in conjunction with FIG. 9a, as each instruction is staged down the pipe, it may be accompanied by several bits 920 of annotation and status information developed during the conversion to native instructions. These additional bits 920 are called "side-band" information. Side-band information 920 is developed in upper portion 134 for X86 instructions, indicated by arrow 922 feeding from TIG's 905, 906 into pipe control 910 and arrows 923 from pipe control 910 to the execution units of the pipelines. During native mode execution, side-band information 920 is also developed as 32-bit instructions are decoded in native-mode decoder (132, 138 of FIG. 1c). The full instruction, with its side-band complement 920, is called a "formatted instruction."

The native instruction format architecturally exposed (e.g., to assembly language programmers) has a 6-bit field for load/store displacements, arithmetic/logical immediates, and PC-relative branch displacements. The X86 provides for eight-bit, sixteen-bit, and thirty-two-bit immediates and displacements. TIG's 905, 906 and the native Tapestry instruction decoder 132, 138 expand these displacements and immediates to thirty-two bits 924. In some embodiments, the internal Tapestry instruction has both a thirty-two bit immediate field and a thirty-two bit displacement field. This expanded displacement and/or immediate 924 stages down the pipeline as side-band information to the native instruction. The instructions in lower part 120 of the pipeline are otherwise the same as the architecturally-exposed native Tapestry instructions.

The multiple instruction generators 905, 906, operate on a single X86 instruction at a time, and together can generate up to four native Tapestry instructions from that X86 instruction. Each native instruction is tagged with a marker indicating the IP value for the X86 instruction from which it originated. In one simple embodiment, each instruction carries the thirty-two bit value of its IP plus four frac bits 930 (frac bits 930 will be explained later in this section IX.A.3). In another embodiment, a set of thirty-two IP value registers are provided (for the eight pipeline stages, times four pipelines), each holding an X86 IP value. Each native instruction of a recipe carries a pointer to the IP value register holding the IP value of the X86 instruction from which the native instruction was translated. As the last instruction of a recipe is retired, the IP value register for the X86 instruction is freed. As an X86 instruction enters the converter, one of the free IP value registers is allocated, and stamped with the current X86 IP value.

In another embodiment, the instruction pointer marker is optimized to recognize certain constraints on the order in which instructions are generated by converter 136. As instructions flow down the pipeline, the instructions are maintained in bottom-to-top, left-to-right order. Branches are all in the right-most pipeline. Thus, in each horizontal slice of the pipeline, all instructions are in order, reflecting part of a sequential flow. A branch instruction is always the youngest instruction in a pipeline stage. Thus, the IP for every instruction in a given stage will be equal to the IP value of the instruction in the left-most pipeline, plus at most forty-five (three additional sequential X86 instructions, each at most fifteen bytes long). In this embodiment, each stage 140-150 carries the IP value of the leftmost instruction (the PC column 925), and the instructions in the other three pipes each carry an accumulated instruction length value. The sum of the PC 925 for the stage plus the accumulated instruction length gives the IP value for the corresponding instruction.

In another embodiment, each instruction carries a length. Reading across, the IP value is incremented by the length count after each instruction that is marked with an end-of-recipe marker (discussed next). Each instruction in the sequential group (i0-i3) traveling down the four pipelines 156-162 together has an instruction length of zero to fifteen. In the top of the pipe 134, the length of the X86 instruction is tagged onto the last instruction of each X86 recipe, and the non-final/926 native instructions have their length tags set to zero.

The native instructions in the D- through W-stages 140-150 of the pipeline carry markers 926 to indicate the last instruction in a recipe for each X86 instruction. The end-of-recipe marker on each instruction is called X86_COMPLETED 926. This indication is used to denote instruction boundaries, which in turn is used to control single-stepping, to designate points at which execution can be interrupted, etc., as will be discussed in sections IX.C to IX.E.

The X86 is also interruptible at certain points during the partial execution of certain long-running instructions. For instance, X86 string instructions can be interrupted at certain iteration boundaries, with architecturally-visible state that changes once per operand of the string, such as the address of the current byte of a string move or compare. The X86 allows such instructions to be interrupted, or to be single-stepped within the partially-executed instruction, and then resumed using the normally visible X86 state. The native instructions in D- through W-stages 140-150 of the pipeline carry markers 990 indicating these interruptible points. These end-of-recipe markers 926 and interruptible iteration boundary markers 990 are used in W-stage 150 to raise interrupts at appropriate times, as discussed infra in section IX.C.

Each Tapestry instruction carries an exception tag 927. If the instruction has raised an exception, tag 927 carries the value of the highest priority exception vector. Each execution pipeline, and each stage within each pipeline, has an exception tag 927. The particular format is unique to each pipeline, since each pipeline may detect different exceptions. Most pipelines simply store a unique identifier similar to the vector number. This exception information flows down the pipelines with the instructions. In E-stage 148 the last exception information is obtained. The E-stage information for all pipelines is prioritized by age, selecting the oldest instruction with any actionable exceptions. The exceptions for this single instruction are again prioritized by architectural priority. The highest priority exception is raised, and the remainder are queued.

The APC column 928 for the stage indicates the "alternate PC," the instruction pointer for the alternate path associated with the at most one branch in the group in this stage. In the case where a branch is predicted taken, the alternate PC is the sequential PC, the instruction following the branch. In the case of a branch that is predicted not taken, the APC is the target of the branch. (Recall that there can only be one branch in any pipeline stage, so a single APC suffices to cover the four instructions of the stage). If at any time a branch is determined to be mis-predicted, the pipelines are flushed of all younger instructions, and execution resumes at the instruction designated by APC 928.

The side-band 920 also contains information related to X86 instruction control information, for instance, indicating whether a particular native instruction in the recipe has a hardware interrupt, or a single-step exception associated with it. The side-band 920 is also used to control a number of features of the X86 floating-point implementation, for instance the floating-point stack tag map, floating-point data and instruction pointers, and floating-point opcode information. Side-band information 920 includes state from the converter for managing the mapping between the X86 floating-point stack and the native Tapestry flat register file. For example, when an instruction pushes or pops information on or off the X86 floating-point stack, the converter manages the changes to that map within upper part 134 of the pipeline using side-band information 920. On a context switch or during an emulated instruction where the map needs to be completely changed, the new map information is communicated between the execution units and converter 134 using side-band information 920.

As each native Tapestry instruction is generated by instruction generators 905, 906 in T-stage 903 into issue buffer 907 for execution down pipeline 120, the instruction is tagged with a four-bit sequence number, from zero to fifteen, denoting the sequential position of that native instruction in the recipe for the X86 instruction from which it originated. This four-bit sequence number is called the "frac bits" 930. Frac bits 930 are used to restart a partially-completed X86 instruction after an exception, as described in further detail in section IX.A.5, infra. Frac register 931 is a counter that counts up from Zero as each native instruction is generated, and reset to Zero at the completion of X86 instruction, to generate frac bits 930 for the corresponding native instruction. Frac control logic 932 increments frac register 931, to count off native instructions, and feeds the count to the instruction generators 905, 906. Instruction generators 905, 906, in turn, tag the instructions with the frac values 930 as the instructions are fed to issue buffer 907.

There are two classes of upward-flowing side-band information, data and control flow. Control flow side-band information indicates that "the lower part of the pipeline is being flushed," or "the entire pipeline is being flushed, including upper part 134," and the new program counter at which to resume execution. Specific instances of this upward-flowing control flow will be discussed in sections IX.B.6 and IX.B.7, infra.

Additional side-band information is shown in FIG. 9d. Two specific elements of side-band 920 are discussed in sections IX.A.6 (relating to load and store instructions) and IX.C.2 (relating to floating-point information), infra.

4. Interrupts, Traps, and Exceptions

X86 exceptions are reported at the granularity of X86 instructions 926 or interruptible points 990. Native exceptions (hardware interrupts, execution faults and traps) may be signaled on any native instruction boundary, even when this native instruction is part of an X86 recipe. X86 exceptions, however, appear to the X86 programmer as occurring on X86 boundaries 926. This does not require the complete execution of all the native instructions in the recipe. Instead, X86 faults are surfaced as soon as the corresponding native fault is recognized, without completing later instructions in the recipe. X86 traps, however, are postponed (by emulator 316) until completion of all the native instructions in the recipe. This section IX.A.4 is addressed primarily to X86 exceptions.

There are two kinds of exceptions: faults and traps. Faults unwind the X86 instruction's execution, except for side-effects particular to the exception. Traps are deferred until the X86 instruction completes. Faults and traps can be signaled on individual native instructions of a recipe.

In overview, an exception is recognized and processed in the following steps:

1. Save information (primarily relating to cause of the exception and context at the time of the exception) in emulator interface registers 914, 916 so that emulator 316 and any other exception handler 306 can determine the cause of the exception.
2. Save the current state in the EPC register. This includes:
    EIP of the current instruction (fault or interrupt) or the next instruction (trap)
    PSW register contents (after possible side effects and modifications for transition exceptions)
    frac bits (see section IX.A.3), the data segment pointer and the code segment pointer
3. Compute the exception context, as shown in the following pseudocode (see Table 7). In the process of entering the exception context, the machine is placed in a more privileged state and protected from further exceptions. Exceptions are handled in Tapestry native mode with kernel access enabled.
    Alignment checks, interrupts, the resume flag, binary translation, and the Instruction Converter Unit are disabled.

```
PC.ESEGP := PCW.EX_ESEGP
PC.DSEGP := PCW.EX_DSEGP
PC.FRAC := zero
EPC := {
    UK     := kernel
    IE     := disabled
    ISA    := native
    XP     := native
    STEP := STEP or ERROR exception
    EM86 asserted if emulator exception
    AC     := disabled
    RF     := disabled
    TAXI_ACTIVE := inactive
    X86_COMPLETED := not last
```

-continued

```
        CONTROL_TRANSFER := not a taken
}
PC.EIP := vector for the exception ID
```

4. Release any active memory locks (deassert LOCK_ADDR_*).
5. Signal a single-step exception, if required.
6. Fetch the next instruction An exception may arise during execution of a native thread that is to be surfaced to X86 operating system 306. In some instances, Tapestry operating system 312 may signal the X86 operating system 306 to start up a thread, so that the X86 thread can receive the interrupt.

To return from exception, the privileged RFE (Return From Exception) instruction is executed. The processor is instructed by RFE to copy the contents of the EPC to the PC and PSW registers. The steps involved in the return are described below:

1. Restore previous context:
PC.ESEGP:=EPC.ESEGP
PC.DSEGP:=EPC.DSEGP
PC.FRAC:=EPC.FRAC
PC.PSW:=EPC.PSW_image
PC.EIP:=EPC.EIP
2. If the appropriate bit in the RFE is asserted, signal any pending traps
3. Fetch next instruction.

Specific applications of this general approach are discussed below.

For some fault classes (for instance, the LOOP instruction discussed in section IX.B.6, below, and condition code restoration for page faults), emulator 316 unwinds the entire X86 instruction, and surfaces the fault to the X86. For other fault classes, for instance a TLB miss, emulator 316 services the fault, and then continues on in the recipe, retrying the faulted native instruction, using frac bits 930 to determine the native instruction at which to resume. When the fault is to be surfaced to X86 operating system 306, emulator 316 builds an X86 compatible stack frame, including (in some situations) an error code.

A trap in a non-final native instruction/926 corresponds conceptually to an exception in the middle of the X86 instruction. Because exceptions are only surfaced to the X86 environment at an X86 instruction boundary 926 (or interruptible point 990), the remaining instructions of the recipe are completed (possibly invoking a handler in emulator 316) before the exception is surfaced to the X86 environment. For instance, an address comparison in the debug hardware generates an immediate trap into emulator 316, where the trap handler collects information to be reported. Then execution of the recipe resumes, and at the end of the X86 instruction, the trap is usually surfaced to the X86 environment. A trap on a final native instruction 926 of a recipe is typically surfaced to the X86 environment. For instance, an X86 single-step exception is typically raised on the final native instruction 926 of a recipe.

When an excepted instruction, with its exception tag 927, reaches W-stage 150, "frac update" control logic 933 responds. If the exception requires an immediate response on the Tapestry instruction that raised the exception 926 (any exception on the final instruction of a recipe, or a fault), then the exception is raised immediately, and execution vectors into emulator 316 for intra-instruction repair of the fault, as discussed in section IX.A.2, supra. If the exception is a trap on a non-final instruction/926 of a recipe, the native machine responds immediately to the exception, on a native instruction boundary, but emulator 316 defers response to the next X86 instruction boundary 926 or next interruptible point of the X86 instruction. If an X86 exception (trap) must be delayed across multiple native instructions to reach the end of the X86 instruction, then in one embodiment, emulator 316 uses the X86 single-step facility to effect the delay, in the manner discussed in section IX.C, infra. In another embodiment, the exception is held pending in frac update logic 933, and execution is allowed to progress forward to the end of the current instruction's recipe, or to the next interruptible point. In either embodiment, if this forward progress reaches the end 926 of the current X86 instruction, the IP value is incremented to point to the next instruction, and frac register 931 is cleared to zero to indicate the beginning of the next instruction, thereby emulating the IP value exposed by the X86. The collected exceptions are raised, and execution traps into emulator 316. If the exceptions can be handled by emulator 316, execution continues. If emulator 316 cannot correct the exception, emulator 316 builds an X86 exception frame on the stack, and vectors control to X86 operating system 306.

Some single-step exceptions are introduced by emulator 316 to gain control at the next X86 instruction boundary 926 to trigger further work in emulator 316. There are situations where emulator 316 (either through direct entry via an instruction not processed by the converter, for example, the STI instruction, as discussed in section IX.E.2, or on behalf of an exception, or debug address match, as discussed in section IX.C.1) must delay processing the exception, or intervene with additional processing at the next X86 instruction boundary. The single-step mechanism is used to move forward to this boundary. When the exception is initially raised Converter 136 vectors into emulator 316, and emulator 316 in turn enables the X86 single-step exception so that emulator 316 will regain control at the next X86 instruction boundary. When the next X86 instruction boundary 926 is reached, an X86 single-step exception vectors into emulator 316, which in turn performs the processing requested by the earlier exception, or handles the condition that was raised in the middle of the X86 instruction. Specific examples of this mechanism will be discussed in sections IX.C.1 and IX.E.2, infra.

Emulator 316 is invoked by exception in other instances, as well. For instance, when an X86 instruction calls for writing the X86 interrupt flags, converter 136 generates a single-step trap into emulator 316. Emulator 316 writes the interrupt flag value into an emulator interface register 912. That value is loaded from the interrupt flag emulator interface register 912 into the actual processor registers when emulator 316 RFE's back to the converter. As another example, modifications to the X86 interrupt flag (the IE bit of Table 7) are always emulated—the IE bit is only written by emulator 316, never by converter 136. Emulator 316 activates single-step mode to gain control at the next X86 instruction boundary, specifically to inhibit the reporting of certain exceptions. Other examples of emulator functions invoked by exception will be discussed throughout this section IX.

When converter 136 encounters a complex X86 instruction, it inserts an explicit TRAP instruction into the pipeline to force entry into emulator 316, as discussed in section IX.A.2, supra. For all other exceptions, no explicit TRAP instruction is emitted by converter 136; rather, the hardware forces initiation of exception vectoring.

The native hardware is designed so that some hardware interrupts will be delivered to the X86 environment, and others will be handled entirely within the native environment and never surfaced to the X86 environment. The infrastructure allows all native interrupts, whether they ultimately go to the X86 environment or are absorbed in the native environment, to be recognized in any execution mode, whether the processor is currently converting X86 instructions, emulating the X86, executing within the emulation routines themselves, or executing native instructions unrelated to the X86. Soft interrupt bits are used to transport the X86-surfaced hardware interrupts from the native environment to the X86 environment at an X86 instruction boundary. Several instances of this will be discussed in sections IX.C.1, IX.C.2, IX.E.1, and IX.E.2.

5. The Frac Bits, and Continuing a Recipe

Referring again to FIGS. 9a and 9b, as discussed in more detail in section IX.A.3, supra, the individual Tapestry instructions of a recipe are tagged with frac bits 930 to indicate the sequence number of the native instruction within the X86 recipe. Thus, even though the hardware operation of instructions is context-independent, frac bits 930 serve as a context stamp to identify where in the recipe the instruction originated, to assist in establishing X86 context of a Tapestry native instruction.

When an instruction raises an exception, typically in A-stage 144 through W-stage 150, exception tag 927 of the instruction is set to reflect the nature of the exception, and exception tag 927 is recognized in W-stage 150. As part of initiating the exception, frac bits 930 for the excepting instruction are recorded into EPC.frac 934, along with the rest of the PSW/PC information that is recorded into EPC 914 (see Table 7 for a sample of error program counter and program status word information captured into this emulator interface register). Control is vectored to an exception handler; if the machine is executing in converter 136, most exceptions will be handled in emulator 316. (Exceptions to be surfaced to the X86 are initially handled by emulator 316, as discussed in section IX.A.2, supra). The exception handler completes by issuing an RFE (return from exception) instruction.

To resume X86 execution, the RFE instruction reloads EPC processor register 914 into the operating IP, PSW and other state control logic of the machine. When the exception occurred during conversion of an X86 program, the EPC.ISA bit 194 will indicate the X86 ISA, as discussed in section II, supra. The EPC.EIP and EPC.frac 934 bits identify the X86 instruction (by X86 instruction pointer) and the native instruction within the recipe, at which the exception was raised. The EPC.frac 934 value is restored into the T-stage frac register 931. The pipeline is flushed. The excepted X86 instruction is refetched by C-stage 902. T-stage 903 retranslates the X86 instruction, but the recipe is not reissued to issue buffer 907 from its beginning. Rather, the recipe is reissued starting from the native instruction within the recipe indicated by the EPC.frac 934 value. Thus, neither the X86 instruction bytes, nor the intermediate pipeline state, need be saved in the hardware between the time emulator 316 is invoked and the return from emulation.

6. Expansion from External Form to Internal Formatted Form

Referring to FIGS. 9c and 9d, the expansion from the Tapestry native instruction form externally exposed, for instance to assembly language programmers, into an internal formatted form is a relatively trivial process of copying the explicit bits of the external native instruction (with some occasional modifications) into analogous fields of the internal formatted instructions, and supplying defaults for those fields that have no analog in the external native form. Some of side-band information 940 is specific to load and store instructions, and is developed by converter 136 during the conversion 136 from X86 form to native formatted form.

In the X86, memory addresses are not merely numbers between 0 and $2^{32}-1$; rather, the X86 uses "segment based addressing," in which addresses are of the form (segment, offset). Every memory reference, whether a load, a store, or an instruction fetch, uses such segment-based addressing. There are up to eight segments active at any point in time, including a code segment from which instructions are fetched, between one and six data segments from which memory operands are loaded and into which they are stored, and a stack segment into which PUSH instructions write their data, and from which POP instructions read their data. Thus, any instruction that explicitly specifies a segment contains a 3-bit immediate to specify one of the eight segment descriptors. The "offset" part of a memory reference is a number between 0 and $2^{32}-1$. Each segment has a maximum size; offsets into the segment that exceed the segment's limit are invalid. Further, each segment has a collection of permissions, controlling whether a program is allowed to read, write, or execute from the segment. Further, the segment has a D bit and a B bit that control the default size of memory references, and may have an "expand up" or "expand down" attribute. The attributes of each segment are cached in a segment descriptor. This is described in the INTEL ARCHITECTURE SOFTWARE DEVELOPER'S MANUAL, VOL. 3, chapter 3, Intel Corp. (1997).

In some X86 instructions, a designator for the segment descriptor off which a memory reference is based is explicitly coded as an immediate in the instruction. In other instructions, the segment reference is implicit in the opcode, rather than explicitly coded into the instruction. For instructions with an implicit segment reference, converter 136 develops an internal formatted load or store instruction with an explicit segment descriptor.

For instance, some external native Tapestry load/store instructions specify a segment reference, addressing mode, and auto-increment, but no explicit displacement. For these instructions, the Tapestry native instruction decoder 132, 138 creates a formatted instruction by passing through the explicitly stated parts of the external instruction, and creating default values for the parts of the formatted instruction that have no analog in the external form. An example is the LDA/STA (load or store with auto-increment/decrement) external instruction 941 shown at the top of FIG. 9c. The fields of this instruction 941 are an opcode, a two-bit operand size, a six-bit specifier for a destination register (for LDA; for STA, the analogous field is the source register), a four-bit segment specifier and a six-bit specifier for an offset register, which together specify a segment and offset for the memory reference, three bits to specify a pre- or post-increment or -decrement or no-modify mode, and four bits 942 to specify the address size and memory protection checks. The sixteen addressing modes generated by the four bits of address size/protection for LDA 941 are described in Table 10:

TABLE 10

Addressing Modes for native Tapestry LDA instruction

| high three bits of mode value | Description | |
|---|---|---|
| | low order bit = Zero | low-order bit = One |
| 000 | Load, 16-bit address<br>Exception behavior:<br>ReadFaults[1,2], ReadTraps[3,4] | Load check, 16-bit address<br>Exception behavior:<br>ReadFaults, STEP[6] |
| 001 | Load with write intent, 16-bit address<br>Exception behavior:<br>ReadFaults, WriteFaults[5], ReadTraps | Load with write intent check, 16-bit address<br>Exception behavior:<br>ReadFaults, WriteFaults, STEP |
| 010 | Load, 16/32 bit address based on SEG__CODE.B<br>Exception behavior:<br>ReadFaults, ReadTraps | Load check, 16/32 bit address based on SEG__CODE.B<br>Exception behavior:<br>ReadFaults, STEP |
| 011 | Load and lock with write intent, 16-bit read/write-locked address<br>Exception behavior:<br>ReadFaults, WriteFaults, ReadTraps | Segment execute check, 16-bit addressing<br>Exception behavior:<br>VECT__SEG__ERROR.limit, STEP |
| 100 | Load, 32-bit address<br>Exception behavior:<br>ReadFaults, ReadTraps | Load check, 32-bit address<br>Exception behavior:<br>ReadFaults, STEP |
| 101 | Load with write intent, 32-bit address<br>Exception behavior:<br>ReadFaults, WriteFaults, ReadTraps | Load with write intent check, 32-bit address<br>Exception behavior:<br>ReadFaults, WriteFaults, STEP |
| 110 | Load with write intent, 16/32 bit address based on SEG__CODE.B<br>Exception behavior:<br>ReadFaults, WriteFaults, ReadTraps | Load with write intent check, 16/32 bit address based on SEG__CODE.B<br>Exception behavior:<br>ReadFaults, WriteFaults, STEP |
| 111 | Load and lock with write intent, 32-bit read/write-locked address<br>Exception behavior:<br>ReadFaults, WriteFaults, ReadTraps | Segment execute check, 32-bit addressing<br>Exception behavior:<br>VECT__SEG__ERROR.limit, STEP |

[1]ReadFaults = Read WriteFaults + segment error on read, Taxi I/O (section VIII.A)
[2]Read WriteFaults = segment error (user or limit error), alignment fault, TLB multiple hit, TLB miss, TLB protection
[3]ReadTraps = Read WriteTraps + VGA read
[4]Read WriteTraps = APIC, Tracepoint, Single-Step
[5]WriteFaults = Read WriteFaults, segment error on write, TLB dirty, TAXi protected (section I.F)
[6]STEP = native single-step exception In expanding an LDA/STA instruction 941 from the externally-exposed form to formatted form, Tapestry native instruction decoder (132, 138 of FIG. 1c) performs a very simple process of copying analogous fields, and filling in defaults for fields of the internal formatted form that are not explicitly set out in the external native instruction. For instance, because no load/store displacement is present in the external form 941 of the instruction, decoder 132, 138 supplies thirty-two explicit bits of Zero addressing displacement 924. The index register field is set to Zero to point to R0. The remainder of side-band information 920 is gathered from various places in the machine.

As a second example, the LDB/STB instruction has an opcode field, a two-bit operand size, a six-bit specifier for a destination register (for LDB; for STB, the analogous field is the source register), a four-bit segment specifier and a six-bit specifier for an offset register, and a six-bit displacement, which together specify a segment and offset for the memory reference, and two bits to specify the address size and memory protection checks. The portions of the instruction that are specified explicitly are passed through, more or less unchanged. The six-bit displacement is sign-extended to thirty-two bits to create a displacement 924.

Conversely, other instructions specify a memory offset, but no explicit segment descriptor. For these instructions, the Tapestry native instruction decoder 132, 138 creates a formatted instruction by, again, passing through the explicitly stated parts of the external instruction, and creating default values for other parts of the internal formatted instruction. For instance, the LDC/STC instruction has an opcode field, a two-bit operand-size field, a six-bit specifier for a destination register (for LDC; for STC, the analogous field is the source register), no segment specifier, and a six-bit specifier for an offset register, and a twelve-bit displacement, which together specify a segment and offset for the memory reference, and two bits to specify the address size and memory protection checks. The portions of the instruction that are specified explicitly are passed through, more or less unchanged. The six-bit displacement is sign-extended to thirty-two bits. Address size and memory protection check fields are generated automatically to reflect ordinary defaults.

A fourth native Tapestry format, typically used for ADD and similar arithmetic instructions, is exemplified by instruction 943, at the bottom of FIG. 9c. Here, the right-most operand 944 of the instruction may either be a six-bit register specifier or a six-bit immediate. If the opcode specifies that field 944 is to be interpreted as an immediate, the six-bit value 944 is sign-extended to thirty-two bits into immediate field 924 of the formatted instruction. If the opcode specifies that field 944 is to be interpreted as a register specifier, then the register value 944 is copied to the second register source field 945 of the formatted instruction.

In some embodiments, the four bit mode specifier 942 of an LDA/STA instruction, the two-bit address size and memory protection check field of an LDB/STB, and the two-bit address size and memory protection check field of an LDC/STC are each converted to a common form of at least four bits in the formatted instruction, so that all cases can be handled identically by the remainder 120 of the pipeline. In other embodiments, the instructions are passed through unmodified, and lower pipeline 120 uses the instruction opcode to decode the remainder of the instruction.

The operation of the side-band information 920, 940 need not be entirely orthogonal to the native instruction opcode. For instance, in some instructions in some embodiments, the immediate field 924 of the side-band may be treated as an arithmetic immediate value, in others as a load or store displacement, in others, a segment-relative absolute branch displacement or PC-relative branch displacement, and in others (for instance, some addressing modes of load/store), the thirty-two bits of immediate in the formatted instruction are ignored. In some instructions, only eight or sixteen bits of one of the immediate or displacement field 924 are used, and the high-order bits and the bits of the other field are ignored.

Converter 136 converts X86 instructions into Tapestry instructions in formatted internal form. For the most part, the formatted instructions emitted by converter 136 are identical to formatted instructions generated from external Tapestry instructions by Tapestry instruction decoder 132, 138. The few exceptions include values for immediates and displacements that can be coded in the large immediate fields of the X86 instruction but cannot be coded in the smaller immediate fields of Tapestry external form, certain processor register accesses (e.g., for profile collection, as discussed in Section V.F), and certain other examples mentioned elsewhere in this disclosure.

B. Individual Retirement of Instructions

A number of different techniques are used to render instructions independent of each other. As a result, when a native instruction faults, either the fault can be serviced and the X86 instruction can be restarted from the faulting native instruction, or execution can be terminated. All side-effects will either be committed to X86 architected state co-atomically, or none will be committed. Little special-purpose hardware is required to capture intermediate results of an X86 instruction and preserve those results for restart. Unwinding of partially-committed X86 instructions is seldom required. Converter 136 tenders execution to the X86 environment in an architecturally-consistent state, at an instruction or interrupt boundary.

1. Recipe Use of Temporary Registers

Recall from Table 1 that some of the registers of the Tapestry native machine are mapped to specific resources of the X86 (e.g., R32-R47 to the floating-point registers, R48-R55 to the integer registers), some are assigned to Tapestry-specific uses while converter 136 is active (R0 is read-only always zero, R1-R3 reserved for exception handlers, R4 is an assembler temporary for use as the assembler sees fit, R15-R31 assigned to use by profiler 400), and some are unassigned (e.g., R56-R63).

Among the registers assigned to specific purposes are R5-R14, designated in Table 1 as "CT1" through "CT10," for "converter temporary." These registers hold the intermediate results of X86 instructions (for instance, addresses formed from complex addressing modes, or memory operands) and carry these intermediate results from one native Tapestry instruction to another. The converter uses these registers only to carry values within an X86 instruction, not from one X86 instruction to the next. Thus, on a trap or other context switch that occurs on an X86 instruction boundary, it is known that all of the valid X86 state is in registers R32-55, and state in registers R5-14 and R56-63 can be abandoned. Also, it is known that the temporary values in R5-R14 will not collide with any other use. But because this machine state is in ordinary registers, ordinary state saving techniques serve to save these intermediate results. This contrasts, for instance, with the special mechanisms that the X86 itself must use to save intermediate instruction results on the memory stack, because the intermediate results are not stored in the architecturally defined machine resources of the X86.

Referring to FIG. 9e, temporary registers are used in recipes where the X86 architectural definition calls for state that changes progressively through a single instruction. One example of the use of a temporary register is the recipe for the X86 PUSHAD instruction (push all general-purpose registers to the stack). The left portion 950 of the figure shows the operation of the instruction, as shown in the INTEL ARCHITECTURE SOFTWARE DEVELOPER'S MANUAL, VOL. 2, page 3-388. The right portion of the figure shows the native Tapestry recipe that implements those operations.

The STOREDEC instruction 951 is a particular variant of the Tapestry STA (store with auto-increment/decrement) instruction (see discussion of STA in section IX.A.6). The ".X" opcode extension can be 16 bits or 32 bits, to indicate the size of the second operand. The first operand 952, interpreted according to the opcode extension, is stored to memory, at the address indicated by the second and third operand. The second operand is a segment descriptor. The third operand 953 is a register containing the offset into the segment. The third operand's register is pre-decremented by the size of opcode extension, before the first operand 952 is actually stored.

The first MOVE instruction 954 of native recipe 950 copies the X86 stack pointer ESP into a temporary register tmp_d, which is one of the CT1-CT10 registers, R5-R14 of Table 1. The eight STOREDEC instructions 951 push the eight general purpose registers EAX, ECX, EDX, EBX, ESP, EBP, ESI and ECI onto the stack. During these pushes, the actual X86 stack pointer in register ESP remains unaltered; the decrementing is performed on register tmp_d. Finally, in the final instruction 955 of the recipe, register tmp_d is copied to the X86 stack pointer ESP.

Recall from sections IX.A.2 and IX.A.4 that, unlike a conventional machine, exceptions during X86 conversion or emulation do not build stack frames in memory (unless emulator 316 determines to surface the exception to X86 operating system 306); rather, the requisite machine state is exposed in emulator interface registers 912 and EPC 914. The execution of converter 136 and emulator 316, including entry to and exit from emulator 316, have no side-effects on any X86 architecturally-visible state, except the state change defined by the X86 architecture. Thus, any asynchronous interrupts that occur during the PUSHA converter recipe are handled in Tapestry operating system 312 or in emulator 316, with no side-effects made visible to the X86. Note that "handling" an interrupt in emulator 316 may consist of recording that it is pending, returning to converter 136 to complete the current X86 recipe, and then accepting the interrupt and surfacing it to the X86 when the X86 instruction is complete 926—note that the interrupt only is visible to the X86 at an instruction boundary (other examples of this behavior are discussed in section IX.E.2).

Synchronous exceptions during instruction execution are sometimes signaled in the middle of a recipe. In the case of PUSHA, on a mid-instruction synchronous exception, the X86 architecture defines that memory is partially modified, but the stack pointer is unmodified. Recipe 950 achieves this behavior—on a synchronous exception during recipe 950, the stack pointer register, which is architecturally visible to the X86, remains unchanged until the final MOV instruction 955. The register that carries the intermediate decrementing of the stack pointer, tmp_d, is invisible in the X86.

Because no state visible to the X86 is altered until the final MOVE instruction 955, if recipe 950 is interrupted at any point, the recipe can be restarted from the point of the exception. The X86 environment will only see the state at precise instruction boundaries.

FIG. 9f gives a representative catalog of the recipes that use temporary registers. As a general rule, temporaries are used in recipes where there is more than one change to X86 architected state, for instance, for instance, where there are multiple changes to a single register (the implicit stack pointer in the PUSHA example of FIG. 9e), or changes to more than one register.

In one example, the X86 definition requires that the destination register of a floating-point operation be left unmodified in certain cases of IEEE-754 non-numeric data (IEEE-754 NaN's, infinities, etc.). Because Tapestry implements the Intel 80-bit floating-point registers in two pieces (a 16 bit sign and exponent, registers R33, R35, R37 . . . R47 (see Table 1) and a 64-bit significand in registers R32, R34, R36 . . . R46), some loads and stores are decomposed into two operations, and IEEE-754 checks cannot be performed until all bits are collected. The two portions of the floating-point value are loaded into a pair of temporary registers. The IEEE-754 checks can be performed in the temporaries. Once the two parts of the datum have been validated, the floating-point value is copied into the final destination registers that are part of the X86 state.

In another example, the integer condition codes during repeated string instructions are saved in a temporary register to preserve them across a page fault, and reloaded from that register when execution is resumed from a page fault.

In each case, the intermediate results are held in temporary registers until all possibilities for exceptions have been evaluated. The data are committed to X86-visible resources only when all operations can be guaranteed to complete. This allows recipes to be continued from the point of any exception, without having to record state from younger instructions that have already been retired.

2. Memory Reference Instructions that Trigger Protection Checks Suited for a Different Reference Class Referring to FIG. 9g, the X86 instruction set allows a single instruction 960 to both read and write the same memory location, for instance "ADD memory, register" (the two addends are a memory location and a register; the sum is stored back into the memory location). Such instructions are called "read-modify-write" instructions. The X86 architecture definition requires that the read of the read-modify-write will only issue off chip from the X86 CPU to the system bus and the memory system if the write will also be successful. This constraint reflects the possibility that the memory location is in I/O space, where the read may change the state of a device, and must not be issued more than once.

Referring to FIGS. 9c and 9g and Table 10 of section IX.A.6, the Tapestry instruction set includes an instruction that accomplishes three results: (a) performs memory checks to ensure that a read from the effective address will complete, (b) performs memory protection checks to ensure that a write to the same address will complete, and (c) loads an operand from memory to a register. Such a load is called a "write intent" load. The load fails if either the load checks fail or the store checks fail. Note in Table 10 that addressing modes 942 0010, 0011, 0110, 1010, 1011, 1100, 1101, and 1110 of LDA indicate loads with write intent. Addressing modes 0111 and 1111 indicate loads with execute intent.

The opcode and addressing mode 942 of the instruction specify a memory protection predicate to be evaluated by the instruction. For instance, the memory protection predicate for a "write intent" load embodies a query whether the segment of the effective address may be read as data and written as data, and that the effective address is within the segment limit. Other predicates for other loads may embody a query whether the segment of the effective address may be read as data and read for an instruction fetch (with a segment limit check), or that omits the load operation and only performs the memory protection and segment limit checks (as will be further discussed in section IX.B.3.b), etc.

The memory protection predicate is evaluated over the protection bits of the TLB entry for the effective address (in base and offset form) of the load or store (the segment protection bits are cached from the segment descriptor and address translation page tables into the TLB).

Thus, the first instruction in recipe 961 for an X86 read-modify-write ADD 960 is a Tapestry LDA instruction 962. As discussed in section IX.A.6 in connection with FIG. 9c, the LDA instruction 941 has explicit specifiers for an addressing mode 942, the segment, and an offset register. As LDA instruction 962 is generated by TIG's i0 905 and i1 906, addressing mode bits 942 are set to indicate that LDA 962 is a write intent load. The second instruction in recipe 961 is an ADD instruction 963, which performs the addition itself. The third instruction in the recipe is an STA (a store to an X86 address) 964, storing to the same address as the address referenced by the LDA 962. The STA 964 repeats the address calculation that was already performed by LDA 962, and also repeats the same store permission checks. The permission checks are guaranteed to succeed without an exception because the same checks were already specified by mode bits 942 of LDA 962. Thus, in recipe 961, only LDA 962 can raise an exception—ADD 963 and STA 964 are guaranteed to complete.

3. Target Limit Check Instruction

When the X86 architectural definition requires simultaneous modifications/side-effects, the Tapestry implementation checks the validity of the modifications/side-effects, and uses temps to hold intermediate results, to ensure complete execution before any architected state is modified.

Recall from the brief overview of the X86 segmentation scheme, introduced in section IX.A.6, that each X86 segment has a maximum size; offsets into the segment that exceed the segment's limit are invalid. Thus, on each load, store, or instruction fetch memory reference, the offset of the reference is compared to the limit for the appropriate segment.

Limit checking is context dependent. The following subsections discuss a representative sample of limit checks that are performed for loads, stores, instruction fetches, and control flow transfers.

a. LOAD/STORE and Branch Limit Checks

Referring again to FIG. 9a, limit checks are performed at two points in the hardware. For sequential instruction flow and some control transfer instructions, the limit check for the transfer destination is performed in upper portion 134 of the pipeline. For other memory references, the limit check is performed in M-stage 146 where the memory reference itself is performed.

The upper limit check is performed for those control transfers for which the destination address can be computed based entirely on information available during instruction decode, after the X86 instruction boundaries have been identified. This class includes straight sequential flow and IP-relative branches. The three pieces of information required for the limit check include the IP of the current instruction, the length of the current instruction, and the branch displacement of the instruction. These three are available in T-stage 903, and before issue buffer 907. Once this information is known, the three components of the branch destination can be summed, and compared to the segment limit in the segment descriptor for the X86 code segment.

The lower limit check is in M-stage 146. Much of address formation may have been performed by distinct single-operation RISC instructions earlier in the recipe. The final load, store or jump will form a target address by summing a segment base from a segment descriptor, and an offset, which may itself be formed as the sum of an immediate displacement and one or two registers. The address is formed in the ALU of A-stage 144, the ALU used in ordinary addition instructions. After address formation, and in parallel with the cache access in M-stage 146, the offset is compared to the segment limit for the segment designated by the Tapestry instruction.

The X86 defines the following behavior for limit check exceptions. In a load/store reference, the entire reference must fit within the segment limit, and thus both the address of the lowest byte and the address of the highest byte of the reference play a part in the limit check. In a control transfer, only the first byte of the destination need be within the code segment, so only a single address of destination address is tested against the limit. For instance, if the first instruction of a branch target is two bytes long and only the lower byte is within the limit, then the control transfer itself completes normally, and an exception will be delivered on the instruction fetch at the target, not at the control transfer itself. If the first byte of the target is not within the limit, then the control transfer faults, and the instruction does not execute at all. For instance, for a CALL instruction to a target whose first byte is outside the limit, the return address is not written to memory, the stack pointer is not modified, and the exception IP points to the CALL instruction, not to the target. On the other hand, if the first byte is within the limit but the second is not, then the return address is pushed to memory, and the destination instruction takes a page fault or segment fault.

Limit checks in T-stage 903 and M-stage 146 differ for loads/stores and control transfers, to implement the behavior defined in the X86 architecture. Several examples follow.

b. Target Limit Check for Near Register-Relative Call

Referring to FIG. 9h, because much of the semantics of load and store instructions are explicitly exposed in the native and formatted instruction encoding, rather than being inferred from the opcode, a load can be defined that performs a segment limit check only, with no check for execute mode access and no actual load of the datum. This load operation is useful as a segment check for a near transfer—because a near transfer is within the same segment containing the current instruction, it is known that the segment is executable and thus this check can be omitted). Such a load instruction can be used to implement the limit check on a near branch destination (that is, a branch destination in the same segment) of a register-indirect form of the X86 CALL instruction. This implementation reports a segment limit fault early enough to prevent modification of any architecturally-visible state, thus reducing the amount of work that must be performed to back out a partially-completed X86 CALL instruction.

The left portion 967 of FIG. 9h shows an excerpt from the operation description of the CALL instruction shown in the INTEL ARCHITECTURE SOFTWARE DEVELOPER'S MANUAL, VOL. 2, page 3-41, commencing at a point after the target address has been formed. The X86 CALL instruction first checks 968 whether the first byte of the branch target is within the code segment limit, and if not, signals a general protection fault. The CALL instruction then checks 969 whether the memory stack has room to accept a push of the return address. Even though the stack check is also a limit check, failure is indicated by a stack fault, not a general protection fault. Only if both checks succeed, then the current offset into the code segment (EIP) is pushed onto the stack, and then control is transferred to the destination.

The right side 970 of FIG. 9h shows the portion of the converter's recipe corresponding to the segment in the left portion. Excerpt 970 assumes that the target address is already in register reg_d, either because the X86 CALL is to a register address, or because an earlier address formation excerpt of recipe 970 has formed the target offset into temporary register reg_d. Instruction 971

LOAD.limit_check r0, CS:reg_d performs the first limit check 968 of the left side, comparing the target address against the code segment limit. The destination of load 971 is R0, the always-zero register; thus only the protection checks are performed and the actual memory load is simply omitted; this prevents spurious interlocks. The ".limit_check" specifies that the memory management hardware is to be queried for both data load and instruction fetch protection checks (or, in another embodiment, instruction fetch instead of data load checks), as specified by addressing mode bits 942 of an LDA instruction, as discussed in section IX.B.2, supra. The address to check is in the code segment, at offset in reg_d. If LOAD.limit_check 971 fails, then the remainder of recipe 970 is suppressed, and the CALL return address will not be stored by STOREDEC 972. The second instruction 972, STOREDEC, is a pre-decrementing store that pushes the IP value onto the stack segment (SS) at the offset specified by the stack pointer ESP. As the memory write of STOREDEC 972 begins, it is known that both segment checks (check 968 of the branch destination against the code segment limit and check 969 of the stack segment) will succeed—the branch destination was tested by the LOAD.limit_check instruction 971, and the stack segment is tested by the STOREDEC 972 itself. Thus, at the conclusion of STOREDEC 972, it is known that all three side-effects (the memory write, the change to the stack pointer, and the change to the IP) will succeed, and the architecturally-visible side-effect of storing the CALL return address can be committed to memory. The JR instruction 973 jumps to the address specified by reg_d. Because, in the general case, the destination register of a JR could be computed by the immediately-preceding instruction, the contents of a jump destination register (reg_d in this case) cannot be limit checked in the limit check hardware of T-stage 903. Thus, a JR instruction is one of the jump instructions that performs its segment limit check in M-stage 146. However, because recipe 970 has already performed a LOAD.limit_check 971 on this destination, JR 973 is guaranteed to succeed.

4. Special Grouping of Instructions to Ensure Co-Atomic Execution.

The X86 IP-relative near CALL 976 is described in the left hand side of FIG. 9i. The call target offset is computed as the sum of the instruction location itself, the instruction length, and the displacement immediate in the instruction. The address of the following instruction is pushed on the stack, and control is transferred to the call target. The Tapestry implementation ensures that either both parts of the instruction complete, or neither.

In one embodiment, the X86 IP-relative near CALL 976 is handled analogously to the recipe 970 described in section IX.B.3.b, supra. A LOAD.limit_check instruction (analogous to instruction 971) limit checks the call target—the current IP is added to the length and displacement of the instruction, and this sum is compared against the code segment limit. Failure of this LOAD.limit_check aborts the remainder of the recipe.

Then (on success), a STOREDEC instruction (analogous to instruction to 972) pushes the return address. A jump instruction jumps to the target.

Referring to FIG. 9*i*, in another embodiment, the recipe for an X86 IP-relative near CALL 976 includes a STOREDEC (a pre-decrementing STORE of the IP value) 977 and a jump instruction 978. The hardware monitors these two distinct instructions 977, 978 to ensure that they complete together. Because all of the information needed to compute the call target offset (the instruction location itself, the instruction length, and the displacement immediate in the instruction) is available in upper part 134 of the pipeline, it is possible to do the target limit check in the T-stage 903 limit check circuitry. This limit check can be performed without stalling, concurrently with the instruction generation, because all of the information required to form the target address is available as the instruction is decoded. Branch target hardware is provided in upper portion 134 of the pipeline so that most IP-relative branches can compute their branch targets and limit check them early in the pipeline, and this circuitry is readily available for use in IP-relative CALL 976 instructions to compute the call target and to compare that call target to the code segment limit. This allows the IP-relative near CALL 976 to be coded in two Tapestry instructions 977, 978, instead of the three instructions generated for the register-destination CALL discussed in section IX.B.3.b. STOREDEC 977 and jump 978 are held in the issue mechanism until the call target limit check is completed. If the call target limit check fails, then STOREDEC 977 and jump 978 are both nullified, preventing the modification to memory. If the CALL target limit check succeeds, then both instructions are released. If STOREDEC 977 fails, the entire X86 instruction will be aborted. Once STOREDEC 977 completes, jump 978 is guaranteed to succeed because of the limit check performed in T-stage 903.

The feature is implemented as follows.

The upper portion stages 134 guarantee that the segment limit of the target of jump 978 is checked before STOREDEC 977 is issued. After STOREDEC 977 clears C-stage 902, C-stage 902 uses the displacement of jump 978 to compute the target address. T-stage 903 performs the limit check for the target. The success or failure of the limit check is tagged onto STOREDEC 977 which is just ahead in upper pipeline 134. This tag is staged down the pipeline with STOREDEC 977 as it moves into D-stage 140 and lower pipeline 120. If the jump target limit check fails, STOREDEC 977 is marked with a fault before it is issued into the execution pipeline 120.

In another embodiment, as instructions are decoded, an IP-relative near CALL is caught as a special case. The TIG's 905, 906 mark STOREDEC 977 with a special marker. An instruction with that marker is not allowed to move from the upper portion 134 into execution pipes 120 (or in another embodiment, is held in issue buffer 907) until the target formation and limit check is completed for jump 978. The pipeline is arranged so that this check is performed early enough so that STOREDEC 977 is usually released from issue buffer 907 without a bubble. The marker is somewhat analogous to the side-band information 920 that propagates through lower pipeline 120, except that it is only used within the upper stages 134.

In another embodiment of IP-relative or register CALL instructions 967, 976, T-stage 903 or M-stage 146 checks for a limit error on the target of the jump instruction 973, 978. If there is a limit error, a limit exception is tagged onto STOREDEC 972, 977. The exception on STOREDEC 972, 977 is recognized in due course in W-stage 150, and STOREDEC 972, 977 never commits to memory. The abort of STOREDEC 972, 977 aborts jump 973, 978 in turn. The limit check on jump 973, 978 completes and is available in time to reach forward in pipeline 120 to tag an exception onto STOREDEC 972, 977 before STOREDEC 972, 977 commits in W-stage 150, either because the two stages are far enough apart, or because STOREDEC 972, 977 is delayed in committing (as an exception to the general design goal of independent retirement of instructions) until the limit check succeeds.

5. Far Calls

Tapestry implements far calls in emulator 316. The limit check for the target address is performed using a load-with-execute-intent instruction analogous to the load-with-write-intent instruction discussed in section IX.B.2, supra. This single instruction accomplishes work that would otherwise require extracting the target segment limit from a segment descriptor and comparing that segment limit against the target offset.

6. Unwind in the Emulator of LOOP Instruction

Referring to FIG. 9*j*, the X86 architecture defines a complex LOOP instruction. The left half 980 of FIG. 9*j* shows the operations for one of the simpler variants. Before entering a loop, the program establishes a loop count in the ECX register. The LOOP instruction is used at the end of the loop body. The LOOP instruction decrements the ECX register on each iteration of the loop. As long as the ECX register is non-zero, the LOOP instruction transfers control back to the instruction at the top of the loop, to initiate the next iteration of the loop.

The native Tapestry recipe 981 for this variant of the LOOP instruction generates two instructions, a DEC decrement instruction 982 and a CJNE 983 (conditional jump if not equal to zero) based on the result of the DEC 982. DEC instruction 982 may have an operand that is eight, sixteen, or thirty-two bits wide, indicated by the ".X" opcode extension. CJNE instruction 983 compares the ECX register to r0 (the always-zero register, see Table 1), and branches if they are not equal. The "imm8" argument to the LOOP 980 or CJNE instruction 983 is a displacement, which may be eight, sixteen, or thirty-two bits in the X86 LOOP instruction, widened to 32 bits in the formatted CJNE native instruction 983 emitted by converter 136.

Like any other control transfer target, the target of a LOOP instruction 980 must be limit checked against the code segment limit. In the X86, the limit check is performed, then ECX is modified, and then the branch occurs. If the limit check fails, then the modification of ECX is not committed. However, in recipe 981, DEC instruction 982 comes before the branch 983, and because of the frequency of LOOP instructions, it is desirable to keep the recipe 981 at two instructions instead of adding a third simply to do the limit check.

In one embodiment, the CJNE instruction 983 is marked with the limit check failure, and is also side-band marked as an instruction in a LOOP recipe. When CJNE 983 reaches W-stage 150, the hardware recognizes the segment limit error and stores the LOOP side-band info into the memory fault code. The segment limit error handler, in turn, examines the memory fault code. If X86 LOOP bit (bit 25 of the "memory fault code" processor register) is set then ECX (or CX) is unwound one step In another embodiment, the X86 LOOP instruction is one of the few instances in which a later instruction (CJNE 983) is allowed to influence the execution of an earlier instruction (DEC 982). The CJNE instruction 983 is limit-checked in T-stage 903. The result of this limit check is tagged onto the CJNE instruction in side-band information 920 as a one-bit tag named "X86 LOOP." The X86 LOOP tag is staged down the pipe with the other side-band information 920 for CJNE instruction 983. When. W-stage 150 detects an instruction with an X86 LOOP tag indicating that the limit check failed, the processor traps into emulator 316, and emulator 316 increments register ECX (or register CX, for word width) by one, to unwind the decrement by the last DEC 982.

7. Repeated String Instructions

Referring to FIG. 9k, the X86 architecture defines a REP prefix byte to certain instructions t6 derive a set of "REP" repeat instructions, for instance "REPE CMPS" (repeat the "compare byte" instruction to derive "compare string"), "REP MOVS" (repeat the "move byte" instruction to derive "move string"), and "REP SCA" (scan string). In each of these repeated string instructions, the X86 repeats a more-basic operation for a number of repetitions. The repetition count is specified in one of the general purpose registers, register ECX (32-bit mode) or CX (16-bit mode). In the example 986 shown in FIG. 9k, "REPNZ MOVS," the X86 uses register ECX as a count register, and moves bytes from a source memory operand to a destination memory operand. At each repetition, the X86 accepts any pending interrupts, then decrements ECX and performs the associated MOVS instruction. The repeat instruction is not itself a branch instruction; rather it is a one-byte prefix on another instruction that instructs the X86 to repeat execution of that instruction until an exit condition is met, and then fall through to the next sequential instruction.

When X86 instruction decoder 136, 929 encounters a repeated string instruction, decoder 136, 929 may not yet know what the repeat count value is—the value may not yet be computed, or may still be flowing down the pipeline and not yet committed to register ECX/CX. T-stage 903 issues an apparently-infinite sequence of instructions to process each iteration of the string and those iteration values are marked off by a branch instruction 989. The inter-iteration branch instruction 989 is a regular branch instruction that's accessible to the native programmer, rather than a special purpose branch instruction just for the string instruction.

T-stage 903 renders a REP instruction as an infinitely-unrolled loop of straight-line instructions 987, instructions 988 that encode each iteration of the string operation, separated by inter-iteration branch instructions 989. Near the beginning of the recipe (before the excerpt shown in FIG. 9k) is a branch instruction that branches to the next X86 instruction if the repeat count in ECX is Zero. Then follows the native instructions for the first iteration 988 of the loop. In the case of REPNZ MOVS, the body 988 of the loop is a load, a store, and a JNZ instruction that is predicted not taken. This portion 988 will vary to reflect the X86 instruction that is being repeated.

At the end of the each iteration 988, T-stage 903 emits a jump instruction 989, predicted not taken, to the following X86 instruction. These inter-iteration branch instructions 989 are each marked with the "interruptible iteration boundary" side-band marker (990 of FIG. 9c). Paralleling the behavior of the X86, the inter-iteration branch instruction 989 tests temporary flags that reflect the countdown of ECX. These temporary flags are parallel to but distinct from the X86 EFLAGS, so that the EFLAGS themselves are not modified.

When inter-iteration branch 989 reaches R-stage 142 and A-stage 144 (where branches are actually executed), if the ECX count is not exhausted, branch 989 is not taken, in accord with its prediction. The recipe for the repeated string instruction continues with the next iteration body 991. On the other hand, if the repeat count is exhausted, then the branch condition is satisfied, and the branch mis-predict circuitry is activated to flush pipeline 120. Top portion 134 stops generating iterations of the repeated instruction. In one embodiment, the completion of the instruction is based on the exhaustion of the repeat count. In another embodiment, completion is based on the recognition of the mis-prediction. The recognition of the mis-predict, taken together with the fact that T-stage 903 is decoding a string instruction, causes the pipeline to flush the unused instructions for excess iterations that were generated by T-stage 903, and to move X86 instruction decoder 136, 929 forward to the next instruction. Execution resumes with the following X86 instruction.

Each inter-iteration branch 989 is marked with end-of-recipe marker X86_COMPLETED 926, so that when the instruction finally does terminate, all the proper state will be updated—for instance, the IP will be incremented, etc. However, the iteration boundary marker 990, which is also asserted on the same branch instruction 989, partially overrides the end-of-recipe marker 926, signaling to the W-stage hardware that the end-of-recipe mark 926 is conditional, that the end-of-recipe processing should only be performed when the iteration count is exhausted.

In X86 single-step mode, each iteration of a repeated instruction triggers an X86 single-step exception. When both X86 single-step and Tapestry native single-step mode are enabled, the interaction between the two is resolved in emulator 316.

C. Collecting Results of Multiple Native Instructions to Emulate Multiple Side-Effects of a Single X86 Instruction 1. Load/Store Address Debug Comparison Result Gathering and Filtering The X86 architecture defines a debug feature. There are four debug registers, each of which can hold a linear address. Each register specifies a length of one, two, or four bytes; the address must be naturally-aligned to the length. Each register can also be tagged with a class of memory reference: read, write, or execute. On each memory reference, the address of the reference is compared against the addresses and modes in the four debug registers. When a memory reference falls within the range between the debug address and (address+length), and the reference mode matches the class tag of the register, a trap is raised at the end of the X86 instruction, and the address of the reference is made available to debugger software. Since an X86 instruction may have multiple memory references, it is possible to have several matches in a single X86 instruction.

Tapestry provides an analogous feature, "tracepoint" registers. Each Tapestry tracepoint register holds an address to be monitored. The tracepoint address matching granularity is somewhat coarse, to the granularity of a 16-byte cache line, rather than to a single byte, two bytes or four bytes as in the X86 debug hardware. The Tapestry processor takes a native exception at the end of each memory reference that hits in a cache line whose address is in a tracepoint register. The Tapestry tracepoint registers do not perform the match against memory read/write reference class. Rather, the finer granularity address matching and reference class matching are performed in emulator 316. When a memory reference is detected whose address falls within the cache line of one of the tracepoint registers, the processor traps into emulator 316. Emulator 316 gathers more information from emulator interface processor registers 912, to determine whether the address matched to the granularity required by the X86 architecture definition (to the nearest one, two or four bytes, depending on the operand width), and to determine whether the class of the actual memory reference matches the software-managed record of the class to monitor. If emulator 316 discovers that the address of the memory reference does not overlap the address range specified to be monitored (between the X86 debug register address and that address plus the length), then emulator 316 takes no action and immediately returns to converter 136. Emulator 316 also determines whether the matching reference was a load or store, and compares that determination to the class of memory references that are to be monitored for the address in this register. If there is no match, emulator 316 returns to converter 136. If the address match survives the granularity and memory-reference-class filtering, emulator 316 marks a bit in a bit vector, where the bit vector has a bit corresponding to each X86 debug register, and turns on X86 single-step mode. (The X86 architecture defines a single-step mode in which execution is trapped at the end of each instruction, so that a debugger can be invoked. This is implemented in Tapestry as a trap that is raised as each instruction with an X86_COMPLETED end-of-recipe tag 926 is executed while the processor is in single-step mode. The use of single-stepping here is analogous to that discussed in sections IX.C.2, IX.B.6, and IX.B.7.) The handler then RFE's back to converter 136 to continue the recipe. At the end of the X86 instruction, a single-step trap will be raised by converter 136, and control will vector into emulator 316. If emulator 316 discovers that the bit vector has any bits set, indicating that there were one or multiple tracepoint register matches raised in the single instruction, emulator 316 surfaces the X86 breakpoints to the X86 environment as appropriate. At the conclusion of emulator 316, single-stepping is turned off (unless single-stepping was turned on in the virtual X86, rather than by emulator 316 for a single instruction).

Consider the example of the PUSHA instruction, that pushes all six general registers onto the stack. If several of the X86's four debug registers all point to nearly-adjacent locations in the stack, a single PUSHA instruction could trigger multiple matches of debug registers. Each match raises a Tapestry tracepoint exception, and the tracepoint handler marks a bit in the bit vector to indicate which tracepoint register matched. At end 926 of the PUSHA instruction, an X86 single-step exception transfers control to the single-step handler, which detects the bits set by the tracepoint handler. Instead of RFE'ing back to the next instruction in converter 136, the single-step handler vectors to the X86 operating system entry point for debug exceptions.

Thus, load and store debug addresses are collected on the basis of individual Tapestry instructions, and surfaced to the X86 on the basis of complete X86 instructions.

2. FP-DP/IP/OP Postponement

Referring again to FIG. 9*a*, FP DP/IP/OP circuitry 993 stages the floating-point data pointer, instruction pointer, and opcode information down the pipeline.

The X86 floating-point unit (FPU) stores pointers to the instruction and data operand for the last non-control floating-point (FP) instruction ("control instruction" is a defined term in the Intel X86 architecture) in two 48-bit registers, the FPU instruction pointer (FP-IP) and FPU operand (data) pointer (FP-DP) registers. (The X86 architecture defines FP-DP information only for single-memory-operand instructions; memory-to-memory operations are non-control instructions, so there is no need for multiple DP pointers). The X86 FPU also stores the opcode of the last non-control instruction in an eleven-bit FPU opcode register (FP-OP). This information is saved to provide state information for exception handlers. The instruction and data pointers and the opcode information are accessed by executing the X86 instructions FNSTENV and/or FNSAVE, which store the information to memory in a format dependent on the current X86 mode.

Tapestry models this aspect of the X86.

As an X86 floating-point instruction is converted to native instructions in T-stage 903, FP side-band information is generated and staged down the pipeline. This FP side-band information indicates that this is a floating-point instruction, and includes a snapshot of the IP value (FP-IP) and opcode value (FP-OP). The FP-IP and FP-OP values are passed from the converter to pipe control 910, which in turn stages the information from D-stage to W-stage 150. The data pointer FP-DP, the memory reference address, is developed in A-stage 144. The FP-IP, FP-OP and FP-DP information, and exception information, stages down through pipe control 910 to FP-IP/OP/DP logic 993 in W-stage 150. This side-band information is staged down pipeline 120 in a mode-independent canonical format for formatted instructions, as shown in FIG. 9*c*.

FP-IP/OP/DP logic 993 includes "sticky" registers 994 that accumulate information over the native instructions relating to a single X86 instruction. For instance, if the memory reference of the computation is in the first instruction in recipe, and the arithmetic operation is the last native Tapestry instruction of the recipe, then the memory reference information that will ultimately be saved in FP-DP flows down the pipeline control logic with the memory reference Tapestry instruction. The FP-IP/OP/DP side-band information from all instructions of a single X86 instruction's recipe is accumulated in the FP-IP/OP/DP sticky registers 994.

The FP-IP/OP/DP information is maintained in an internal format that is somewhat different than the X86 format. The information may be generated by two or more different instructions in the recipe. The Tapestry internal format is retained during native instruction processing.

The FNSTENV and FNSAVE instructions are executed in emulator 316 rather than hardware converter 136.

In some embodiments, when an X86 instruction requests access to the FP-IP/OP/DP information (e.g., FNSTENV, FNSAVE, Entry to SMM), emulator 316 may translate the canonical form of the pointers as stored by the Tapestry hardware (a 16-bit segment selector and a 32-bit offset) into the specific format required by the current operating mode when FNSTENV and FNSAVE are executed. This simultaneity and context-dependent conversion is one way to provide a precise model the behavior of the X86 while preserving the information in a form more convenient for the native Tapestry machine as well.

Whether the instruction is converted or emulated, at the end of the instruction (an end-of-recipe marker 926 reaches W-stage 150, or near the end of the emulation routine), the information is converted from the Tapestry internal format to the X86-defined format. In the converter case, FP-IP/OP/DP logic 993 responds to the end-of-recipe 926 by examining the exception state accumulated over all native instructions of the recipe. The data from sticky registers 994 are written to the X86 architected FP-IP, FP-OP and FP-DP registers, under the X86 mode in effect at the time of the instruction. Because the X86 definition of the FP-IP, FP-OP and FP-DP information is somewhat context-dependent, the Tapestry conversion from internal form to X86 form is context-dependent as well. All of the architecturally-visible side-effects from the X86 FP instruction are committed simultaneously, including FP-IP, FP-OP, and possibly FP-DP. Sticky registers 994 are then cleared. If no exception was raised, then the data result is written to the appropriate result register(s) (one or two of registers R32-R47, see Table 1).

There is a shadow state for FP-IP/OP/DP that is left undisturbed during handling of native exceptions within a sequence, if the sequence will complete normally and will require committing new FP-IP/OP/DP state. In practice this is not difficult since the X86 process is virtualized only at instruction boundaries. FP-IP/OP/DP are preserved as long as the converter is off. In one embodiment, shadow registers 994 are not architecturally addressable in the X86. In this embodiment, it is desirable that the X86 process not be context-switched until an X86 instruction boundary, so that the information in the shadow registers 994 is not lost. In another embodiment, shadow registers 994 are addressable, so that they can be saved and restored on a context switch.

3. STIS (Store into Instruction Stream) Flush Boundary to Next Instruction

The X86 allows "self-modifying code," also known as "store into instruction stream" (STIS), the case where an instruction stores a value in a location in memory that is later executed. In particular, the X86 allows an instruction (referred to instruction i) to modify the immediately-next-following instruction in memory (referred to instruction i+1). The X86 architecture requires that the fetch and execution of the memory copy of instruction i+1 reflect the modification induced by instruction i, even if the old contents of the memory location for instruction i+1 have already flowed most of the way down pipeline 120. Instruction i may be a simple store instruction, or a complex instruction. A complex instruction i may perform further work after the modification itself occurs. Thus, on each store to memory, the pipeline is examined for an STIS condition. The examination extends from the end of the current instruction back to the top of the pipeline, and continues back to I-cache 112, far enough to ensure that the write to memory has propagated throughout the memory system. When an STIS condition is detected, the pipeline and the appropriate portion of I-cache 112 are flushed.

Referring again to FIG. 9*a*, STIS detector 995 in E-stage 148, receives as its input the memory-address of any store operation. STIS detector 995 compares the store address to all of the PC values 925 in pipeline 120, 134 for all younger instructions, that is, any younger instructions in E-stage 148, and all instructions in M-stage 146, A-stage 144, fetch stage 110, and I-cache 112. When a STIS condition is detected, the current X86 instruction is allowed to complete. Once the current instruction is complete, pipeline 120 is flushed from the next instruction back to fetch stage 110 at the beginning of the pipeline. In another embodiment, the flush only takes place from the matching instruction back—if there are instructions intervening between the instruction that generates the store and the modified instruction, those intervening instructions are allowed to complete. Note that the STIS detection and pipeline flushing is performed on the basis of X86 instructions.

Data stores affect the data cache in the conventional manner, and also may invalidate I-cache 112. When the instruction fetch is restarted, I-cache 112 will miss, and the instruction fetch will reach all the way back to main memory. In one embodiment, a common I-cache 112 caches both X86 instructions and the Tapestry native instructions, so that a single cache invalidation policy is effective to handle STIS conditions. In another embodiment, there is a separate D-cache, X86 I-cache, and Tapestry I-cache, and a store into the D-cache forces an invalidate of any copy in both of the I-caches.

Note that the store operation may be in one instruction set, and the destination may be an instruction coded in the other instruction set. STIS detector 995 is cognizant of the unified memory address space for instructions of both instruction sets (see, for instance, the discussion of section VIII). There's a point of the pipeline at which it's guaranteed that the store will be present in I-cache 112 early enough that the fetch will get the modified data, so no further consistency checks are required. If the store happens in between the time that instruction i+1 is fetched and the modification actually appears in I-cache 112, then STIS detector 995 flushes the pipeline, refetches the modified instruction out of I-cache 112 or wherever it resides in the memory system, and execution of the modified instruction begins anew. The unified address space for both instruction sets allows STIS detector 995 to compare the addresses without regard for the instruction set currently being executed, without special modification to support cross-instruction-set stores.

D. An Externally-Exposed RISC ISA as Microinstruction Set—Implementing a Second Instruction Set Conversion and Implementation with a User-Accessible First Instruction Set 1. External Microcode It should be noted that a handful of features are only available though conversion of X86 code, and are not available to native assembly language programmers.

Much of the side-band 920 is only meaningful in X86 mode. For instance, the concepts of X86 instruction boundary information 926 and "interruptible point" information 990 are not meaningful in native execution mode.

The immediate field in native external instructions is either six or twelve bits wide. Thirty-two bit immediates and branch displacements in internal formatted instructions are only available through X86 converter 136.

A single X86 instruction may specify four components of a memory reference—a segment base, an offset of up to thirty-two bits coded as an immediate, a base register, and an index register (which may be scaled by two, four, or eight). A native Tapestry instruction can specify three components—either a segment base plus two registers, or a segment base plus a register plus a six-bit immediate. Converter 136 can generate a four-component address during X86 mode.

2. Miscellaneous Features

There are a number of features of the external Tapestry native instruction set, as exposed to assembly-language programmers, that exist primarily to support an X86 microengine.

Referring again to FIG. 9*c*, the native Tapestry LDA and STA instructions offer segmentation features that are a superset of X86 segmentation. Tapestry page tables and paging behavior is a superset of the paging features offered by the X86. Thus, these native Tapestry memory reference instructions perform all of the individual pieces of an X86 memory reference.

The LDA and STA instructions offer a proxy mechanism: a reference can either obey X86 instruction semantics, or may obey less-restrictive native semantics. This feature is controlled by Tapestry extension bits in the segment descriptors.

Tapestry includes integer and floating-point flags (condition codes) that mirror the behavior of the X86 EFLAGS.

Some Tapestry arithmetic instructions have a bit that determines whether or not the integer flags are modified. Thus, in a multi-instruction recipe, the one Tapestry instruction that computes the individual result on which the X86 flags are based will set the integer flags, and the other instructions in the recipe will leave the flags unmodified.

Tapestry offers several instructions that are not commonly found in RISC architectures, in order to provide efficient implementation of the equivalent X86 instruction. These include byte swap instructions, certain shift and rotate instructions, etc.

E. Restartable Complex Instructions

1. Atomic MOV/POP Stack Segment Pair Via Native Single-Step

Recall from the brief overview of the X86 segmentation scheme, introduced in section IX.A.6, that in the X86, all memory references are based off a segment descriptor and an offset into the segment. Thus, when an X86 program changes its stack, both the stack segment descriptor (SS) and the offset may need to be changed. If an interrupt arose at the boundary between the instruction that modifies SS and the instruction that loads the stack offset into the stack pointer register, the exception frame could not be pushed onto the memory stack, because of the inconstancy between the two portions of machine state that together define the top of stack. In order to prevent an interrupt from corrupting the stack at such a boundary, the X86 architecture defines that exceptions are inhibited in the boundary between a move or pop into SS and the following instruction.

In the Tapestry implementation, a move or pop into SS is executed in emulator 316. Emulator 316 records in memory (a) the fact that single-step mode has been entered because of a modification of SS, (b) the interrupt flag that was in effect before the move or pop instruction, and (c) the current state of X86 single-stepping. Emulator 316 then writes the new value into SS. At the end of emulating the move or pop instruction, hardware interrupts are disabled as specified by the X86 architecture definition, and the processor is put into single-step mode. Hardware interrupts and instruction breakpoints are inhibited. Any X86 single-step exception that would otherwise have been signaled between the two instructions is suppressed, as well as an instruction breakpoint on the following instruction. Thus, interrupts or exceptions are suppressed in the boundary between the modification of SS and the following instruction. An RFE instruction returns execution to the converter. The converter executes the next instruction, which will usually be the instruction that sets the stack pointer register. At the end of the next instruction, a single-step exception vectors control into emulator 316. The single-step handler observes that the exception was raised because of a modification to SS and in response, the single-step handler restores hardware interrupts and the prior state of single-step mode. Execution is resumed in the converter, in the execution mode that prevailed before the initial modification to SS.

2. IF Bit Change Inhibition Via Native Single-Step

The X86 architecture defines an interrupt flag. When it is asserted, maskable interrupts are allowed to intervene between instructions, generating an asynchronous exception. When the interrupt flag is deasserted, then maskable hardware interrupts are ignored. The X86 STI instruction sets the interrupt flag; the CLI instruction clears the interrupt flag, inhibiting interrupts. A POP into the EFLAGS register also changes the interrupt flag, because the interrupt flag is one of the EFLAGS bits.

The X86 architecture defines the STI instruction as maintaining interrupts disabled in the immediately following instruction boundary, and as enabling interrupts following the completion of execution of the next instruction following. This definition is typically exploited at the end of a routine: the routine ends with an STI instruction and then a RET instruction, so that interrupts will remain disabled until the completion of the return instruction. Interrupts are only re-enabled after execution resumes in the calling context.

In the Tapestry implementation, the STI and CLI instructions are executed in emulator 316. At the end of the emulation routine for STI, hardware interrupts are disabled, any instruction breakpoint for the following instruction is inhibited, the current state of X86 single-step mode is saved, X86 single-step mode is enabled, and a record is set in the emulator's private memory to indicate that the next X86 single-step exception is to be handled in a special handler. Emulator 316 RFE's back to the converter. The next X86 instruction is executed. At the end of the next X86 instruction, the end-of-recipe X86_COMPLETED side-band bit 926 triggers a single-step exception. The single-step handler examines the record in private memory, and finds that the single-step exception was caused by an STI instruction. The handler enables hardware interrupts (unless the next instruction was a CLI), and restores X86 single-step to its previous state. Emulator 316 RFE's back to the converter, and execution resumes.

In the case of an STI followed immediately by a second STI instruction, the special behavior is only applied to the first STI. An interrupt would be allowed to intervene after the second STI instruction, in agreement with the X86 architectural definition.

F. The FWAIT Instruction

The Tapestry FWAIT instruction comes in two forms. One form follows the X86 WAIT instruction, simply allowing the floating-point pipeline to drain.

The second form, FWAIT.cc, performs the drain, and also enables the setting of arbitrary state in four X86 floating-point status word bits. The Tapestry FWAIT instruction has two four-bit immediate operands. If bit i of the first immediate operand is One, then bit i of the floating-point condition code is set to bit i of the second immediate operand, for i between 0 and 3. Thus, of any bit i that is Zero in the first immediate operand, the floating-point condition code is unchanged.

FWAIT.sync operates as follows. If one or more of the accrued exception flags in the floating-point status word are One and if the corresponding mask bits in the floating-point control word are Zero, the instruction faults and invokes VECT_FP_EXCEPTION. Thus, a floating-point exception is raised if any accrued exception flag in the floating-point status word is not masked by the floating-point control word.

Thus, the Tapestry FWAIT instruction is defined to allow separate control of a number of functions that are inseparably bundled in the X86 FWAIT instructions.

The FWAIT.cc instruction is useful in the context of certain X86 floating-point load or store operations that set the floating-point control word. In the Tapestry machine, the floating-point control word is in the floating-point unit, and the memory unit is relatively distinct. The converter issues a load or store instruction to the memory unit, and issues an FWAIT.cc to the floating-point unit. This implements both side-effects of the X86 instruction, even though those side effects are in different functional units.

The FWAIT.cc instruction may be used to implement the X86 FXAM instruction. As part of decoding the FXAM instruction, converter 136 determines whether the floating-point top of stack is empty (recall that the mapping from the X86 floating-point stack to the real Tapestry registers is performed in the converter 136). If the top of stack is empty, then converter 136 generates an FWAIT.cc to write a fixed bit pattern, defined by the X86 architecture, into the floating-point condition codes.

X. Interrupt Priority

The TAXi system uses five exceptions, and one software trap. DMU 700 introduces one new interrupt sub-case. These interrupts are summarized in the following Table 11. The fourth column of Table 11 gives the relative interrupt priority. The fifth column indicates the section of this specification in which the respective interrupts are discussed.

TABLE 11

| name | description | type | priority | discussion |
|---|---|---|---|---|
| VECT_TAXi_UNPROTECTED | starting profile on a TAXi unprotected page | note 1 | 4.0 | I.F |
| VECT_TAXi_PROBE | probe for translated code exception | note 2 | 4.1 | VI |
| VECT_TAXi_PROFILE | profile packet complete exception | note 2 | 4.2 | V |
| VECT_TAXi_PROTECTED | writing to a TAXi protected page | fault | 5.4 | I.F |
| VECT_TAXi_IO | read from (ASI ≠ 0) in translated code | fault | 5.5 | VIII.A |
| VECT_TAXi_EXIT | restart converter on TAXi code completion | software trap | 2.4 | VI.F |
| DMU_INVALIDATE | DMU invalidation event | interrupt | 2.0 | VII | note 1.
This fault is raised on the first native instruction in an X86 converter recipe.
note 2.
This fault is raised as a trap on the TAXi instruction, i.e. the TAXi instruction completes writing its data to the GPR.

To achieve performance, TAXi code does not keep X86 state in the canonical locations assumed by converter 136 and emulator 316. Therefore, when TAXi code is interrupted, the converter is not allowed to resume without first recovering the canonical picture of the X86 machine's state.

The exception strategy described supra is intended to achieve correctness through simplicity, to have a single common strategy for processing all exceptions, to ensure that exceptions raised in TAXi code are processed by exactly the same code as exceptions raised by the converter, to maximize performance, to delay abandoning TAXi code until it is known that an exception must be surfaced to the X86, and to allow TAXi code to forego maintaining the X86 FP exception state.

For the convenience of the reader, this description has focused on a representative sample of all possible embodiments, a sample that teaches the principles of the invention and conveys the best mode contemplated for carrying it out. The description has not attempted to exhaustively enumerate all possible variations. Further undescribed alternative embodiments are possible. It will be appreciated that many of those undescribed embodiments are within the literal scope of the following claims, and others are equivalent.

The following volumes are incorporated by reference. INTEL ARCHITECTURE SOFTWARE DEVELOPER'S MANUAL, VOL. 1-3, Intel Corp. (1997); GERRY KANE, PA-RISC 2.0 ARCHITECTURE, Hewlett-Packard Professional Books, Prentice-Hall (1996); RICHARD L. SITES AND RICHARD T. WITEK, THE ALPHA AXP ARCHITECTURE REFERENCE MANUAL, 2d ed., Digital Press, Boston (1995); DAVID A. PATTERSON AND JOHN L. HENNESSEY, COMPUTER ARCHITECTURE: A QUANTITATIVE APPROACH, Morgan Kaufman Publ., San Mateo, Calif. (1990); TIMOTHY LEONARD, ED., VAX ARCHITECTURE REFERENCE MANUAL, Digital Equipment Corp. (1987); PETER M. KOGGE, THE ARCHITECTURE OF PIPELINED COMPUTERS, Hemisphere Publ., McGraw Hill (1981); JOHN MICK AND JAMES BRICK, BIT-SLICE MICROPROCESSOR DESIGN, McGraw-Hill (1980).

REFERENCE TO MICROFICHE APPENDIX

An appendix of 28 frames recorded on microfiche, which can be found in the file of U.S. application Ser. No. 09/239,194, filed Jan. 28, 1999, is incorporated herein by reference.

A portion of the disclosure of this patent document contains material that is protected by copyright. The copyright owner has no objection to the facsimile reproduction of the patent document or the patent disclosure as it appears in the Patent and Trademark Office file or records, but otherwise reserves all copyright rights whatsoever.

We claim:

1. A method, comprising:
   decoding a macroinstruction of a computer, the decoding generating a plurality of iterations of a sequence of one or more microinstructions, including:
   a pattern of microinstructions implementing a basic operation, and
   a branch instruction predicted not taken;
   on detecting that an iteration completes operation of the macroinstruction, adding a marker indicating an end of the macroinstruction to a microinstruction in a pipeline downstream of an instruction decoder;
   after reaching a termination condition of the macroinstruction, partially executing an iteration beyond the termination, the partial execution committing at least one side-effect to an architecturally-visible resource of the computer, and raising an exception to transfer control to a second microinstruction stream; and
   in the second microinstruction stream, unwinding the side-effects committed by the post-termination iteration.

2. A method, comprising:
   decoding a macroinstruction of a computer, the decoding generating a plurality of iterations of:
   a pattern of microinstructions implementing a basic operation, wherein the microinstruction set is architecturally exposed to programs fetched from an architecturally-visible memory of the computer, and
   a branch instruction predicted not taken.

3. The method of claim 2, further comprising:
   on detecting that an iteration completes operation of the macroinstruction, adding a marker indicating an end of the macroinstruction to a microinstruction in a pipeline downstream of an instruction decoder.

4. The method of claim 2, further comprising:
   partially executing an iteration beyond a termination condition of a loop of a decoded microinstruction stream, the partial execution committing at least one side-effect to an architecturally-visible resource of the computer;
   raising an exception to transfer control to a second microinstruction stream; and
   in the second microinstruction stream, unwinding the side-effects committed by the post-termination iteration.

5. The method of claim 2, wherein instructions of the microinstruction set are managed by a memory management unit between a main memory of the computer and one or more cache levels.

6. The method of claim 2, wherein the branch microinstruction is generated including a marker indicating that the branch microinstruction defines a boundary between two successive iterations.

7. A computer, comprising:
an instruction decoder designed to decode macroinstructions into microinstructions for execution in an instruction pipeline on a computer, and for at least one macroinstruction that includes internal iterations, the decoding of the internal-iteration macroinstruction designed to generate a plurality of iterations of:
a pattern of microinstructions for implementing a basic operation of an internal iteration of the internal-iteration macroinstruction, and
a branch microinstruction predicted not taken, wherein the branch microinstruction is generated including a marker indicating that the branch microinstruction defines a boundary between two successive iterations of the internal-iteration macroinstruction;
the instruction decoder being further designed to cease generating iterations on detection of a branch mispredict.

8. The computer of claim 7, further comprising:
instruction fetch and execution circuitry designed to fetch and execute instructions in both the macroinstruction set and the microinstruction set, each of the instruction sets including store instructions to write data to a memory of the computer;
store monitoring circuitry designed to monitor the store instructions and to invalidate any copies of a datum in memory overwritten by the store instructions, including copies of instructions in any instruction cache in the instruction set other than the instruction set of the current store instruction.

9. The computer of claim 7, further comprising:
execution circuitry designed to execute an instruction calling for waiting to allow a pipeline to drain and to set bits of a floating-point control word to values denoted in an explicit immediate field of the instruction.

10. The computer of claim 7, wherein the branch microinstruction is a branch instruction available to a program to be fetched from a memory of the computer.

11. A method, comprising:
decoding a macroinstruction on a computer, the macroinstruction calling for a plurality of iterations of a sequence of one or more microinstructions; and
on detecting that an iteration completes operation of the macroinstruction, adding a marker indicating an end of the macroinstruction to a microinstruction in a pipeline downstream of an instruction decoder.

12. The method of claim 11, further comprising:
after reaching a termination condition of the iterations, partially executing an iteration beyond the termination, the partial execution committing at least one side-effect to an architecturally-visible resource of the computer, and raising an exception to transfer control to a second microinstruction stream;
in the second microinstruction stream, unwinding the side-effects committed by the post-termination iteration.

13. The method of claim 11, further comprising:
executing a microinstruction on the computer, the microinstruction storing into a memory location a value of a second instruction coded in the macroinstruction set;
in response to the storing, clearing a memory system, including an instruction cache, and execution pipeline of the computer of the former content of the memory location;
executing the second instruction in the execution pipeline.

14. The method of claim 11, wherein the detecting includes detecting a branch mispredict.

15. The method of claim 14, wherein the mispredict is detected on a branch microinstruction architecturally available to a program fetched from a memory of the computer.

16. The method of claim 11, wherein the branch microinstruction is generated including a marker indicating that the branch microinstruction defines a boundary between two successive iterations.

17. A computer, comprising:
an instruction decoder designed to decode a macroinstruction set that includes a macroinstruction calling for a plurality of iterations of a sequence of one or more microinstructions;
a pipeline stage downstream of the instruction decoder designed to detect that operation of the macroinstruction is complete, and in response, to add a marker to a microinstruction indicating an end of the macroinstruction.

18. The computer of claim 17:
wherein the decoder, when decoding the macroinstruction, is designed to generate a plurality of iterations of:
a pattern of microinstructions implementing a basic operation, and
a branch microinstruction predicted not taken.

19. The computer of claim 17, further comprising
circuitry designed to execute an instruction calling for waiting to allow a pipeline to drain and to set bits of a floating-point control word to values denoted in an explicit immediate field of the instruction.

20. A method, comprising:
after reaching a termination condition of a loop of a first microinstruction stream executing in a computer, the microinstruction stream being generated by decoding a macroinstruction, partially executing a loop iteration beyond the termination, the partial execution committing at least one side-effect to an architecturally-visible resource of the computer, and raising an exception to transfer control to a second microinstruction stream;
in the second microinstruction stream, unwinding the side-effects committed by the post-termination iteration.

21. The method of claim 20, further comprising:
executing a microinstruction of a computer, the microinstruction storing into a memory location a value of a second instruction coded in a second instruction set;
in response to the storing, clearing an instruction cache and execution pipeline of the computer of the former content of the memory location;
executing the second instruction in the execution pipeline.

22. The method of claim 20, further comprising:
executing an instruction that calls for waiting to allow a pipeline to drain and setting bits of a floating-point control word to values denoted in an explicit immediate field of the instruction.

23. The method of claim 20, further comprising:
ceasing to generate iterations when a termination condition of the macroinstruction is detected in an execution stage of an instruction pipeline of the computer.

24. The method of claim 23, wherein the detection of the termination condition includes detecting a branch mispredict.

25. The method of claim 20, wherein each iteration completes with a branch microinstruction architecturally available to a program fetched from a memory of the computer.

26. The method of claim 25, wherein the branch microinstruction is generated including a marker indicating that the branch microinstruction defines a boundary between two successive iterations.

27. A computer, comprising:
- circuitry designed to partially execute a post-termination iteration of a loop of a first microinstruction stream executing in the computer, the partial execution designed to commit at least one side-effect to an architecturally-visible resource of the computer, and to raise an exception to transfer control to a second microinstruction stream;
- software of the second microinstruction stream, programmed to unwind side-effects committed by the post-termination iteration.

28. The computer of claim 27, further comprising:
- an instruction decoder designed to decode macroinstructions into microinstructions for execution in an instruction pipeline on the computer, and for at least one macroinstruction, the decoding generating a plurality of iterations of:
  - a pattern of microinstructions implementing a basic operation, and
  - a branch microinstruction predicted not taken.

29. The computer of claim 27, further comprising:
- a pipeline stage downstream of an issue buffer of the computer, designed to detect the termination condition of the loop, and in response, to add a marker to a microinstruction indicating an end of the macroinstruction.

30. The computer of claim 27, wherein the loop of the first microinstruction stream includes instructions generated by decoding a single macroinstruction fetched from memory of the computer.

31. The computer of claim 27, wherein an instruction generator of the computer joins iterations of the loop by branches predicted not taken.

32. A method comprising:
- in a computer having instruction fetch circuitry for fetching instructions in first and second instruction sets from a memory of the computer and executing the instructions, executing a first instruction coded in the first instruction set, the first instruction storing into a memory location a value of a second instruction coded in the second instruction set,
- in response to the storing, clearing an instruction cache and execution pipeline of the computer of the former content of the memory location;
- executing the second instruction in the execution pipeline.

33. The method of claim 32, further comprising:
- decoding an instruction of the second instruction set, the decoding generating a plurality of iterations of:
  - a pattern of instructions of the first instruction set implementing a basic operation, and
  - a branch instruction of the first instruction predicted not taken.

34. The method of claim 32, further comprising:
- executing an instruction calling for waiting to allow a floating-point pipeline of the computer to drain and to set bits of a floating-point control word to values denoted in an explicit immediate field of the instruction.

35. The method of claim 32, wherein an instruction decoder for the second instruction set designed to generate instructions in the first instruction set for execution in the execution pipeline.

36. The method of claim 32, wherein the instructions in the execution pipeline are not tagged with an indication of an instruction set of origin.

37. The method of claim 32, wherein the monitoring is based on comparing addresses in a physical address space.

38. A computer, comprising:
- instruction fetch and execution circuitry designed to fetch and execute instructions in two different instruction sets, each instruction set including store instructions to write data to a memory of the computer;
- store monitoring circuitry designed to monitor the store instructions and to invalidate any copies of a datum overwritten by the store instructions, including copies of instructions in any instruction cache, in the instruction set other than the instruction set of the current store instruction.

39. The computer of claim 38, further comprising:
- an instruction decoder designed to decode an instruction in a first of the instruction sets, and in response, to generate a plurality of iterations of a sequence of one or more instructions in a second one of the instruction sets;
- a pipeline stage downstream of the instruction decoder designed to detect that operation of the decoded instruction is complete, and in response, to add a marker to one of the generated instructions indicating an end of the macroinstruction.

40. The computer of claim 38:
- wherein the instruction fetch and execute circuitry is further designed to partially execute a post-termination iteration of a loop within a first instruction in a first one of the instruction sets, the partial execution to commit at least one side-effect to an architecturally-visible resource of the computer, and to raise an exception to transfer control to a second instruction stream in a second one of the instruction sets, programmed to unwind side-effects committed by the post-termination iteration.

41. A method, comprising:
- decoding and executing an instruction on a computer, execution of the instruction including waiting to allow a pipeline to drain, and setting bits of a floating-point control word to values denoted in an explicit immediate field of the instruction.

42. The method of claim 41, wherein instruction fetch and execution circuitry of the computer are designed to fetch and execute a macroinstruction set and a microinstruction set from memory.

43. The method of claim 42, further comprising:
- decoding a macroinstruction of the computer, the decoding generating a plurality of iterations of:
  - a pattern of microinstructions implementing a basic operation, and
  - a branch instruction predicted not taken.

44. The method of claim 42, further comprising:
- decoding a macroinstruction on the computer, the macroinstruction calling for a plurality of iterations of a sequence of one or more microinstructions; and
- on detecting that an iteration completes operation of the macroinstruction, adding a marker indicating an end of the macroinstruction to a microinstruction in the pipeline downstream of the instruction decoder.

45. The method of claim 42, further comprising:
- emitting the instruction as a microinstruction in response to a macroinstruction whose execution is dependent on a full/empty state of a floating-point top-of-stack.

46. A computer, comprising:
- execution circuitry designed to execute an instruction calling for waiting to allow a pipeline to drain and to set bits of a floating-point control word to values denoted in an explicit immediate field of the instruction.

47. The computer of claim 46, further comprising:
instruction fetch and execution circuitry of the computer are designed to fetch and execute instructions in two different instruction sets.

48. The computer of claim 46, further comprising:
each instruction set including instructions defined to write data to a memory of the computer;
store monitoring circuitry designed to monitor the data write instructions and to invalidate any copies of a datum in memory overwritten by the data write instructions, including copies of instructions in the instruction set other than the instruction set of the current data write instruction.

49. The computer of claim 46, wherein the instruction specifying individual bits of the floating-point control word to be written, in addition to values to be written to those bits.

50. The computer of claim 46, wherein
the execution circuitry is further designed to execute an instruction calling for waiting to allow a pipeline to drain and to raise an exception based on a test of bits of a floating-point control word.

51. A computer, comprising:
an instruction decoder designed to decode macroinstructions into microinstructions for execution in an instruction pipeline on the computer, and for at least one macroinstruction, the decoder designed to generate a plurality of iterations of a pattern of microinstructions implementing a basic operation of the macroinstruction, a microinstruction of each of the plurality of iterations including a marker indicating that the marked microinstruction defines a boundary between two successive iterations, the microinstruction set being architecturally exposed for execution from an architecturally-exposed memory; and
operand commit circuitry designed to detect the marker, and in response, to commit results of an iteration to architectural state of the computer.

52. The computer of claim 51, further comprising:
a pipeline stage downstream of the instruction decoder designed to detect that operation of the macroinstruction is complete, and in response, to add a marker to a microinstruction indicating an end of the macroinstruction.

53. The computer of claim 51, wherein:
the microinstruction to be generated including the iteration boundary marker is a branch microinstruction predicted not taken.

54. The computer of claim 51, further comprising:
circuitry designed to partially execute a post-termination iteration of a loop of a first microinstruction stream executing in the computer, the partial execution to commit at least one side-effect to an architecturally-visible resource of the computer, and to raise an exception to transfer control to a second microinstruction stream;
software of the second microinstruction stream, programmed to unwind side-effects committed by the post-termination iteration.

* * * * *

UNITED STATES PATENT AND TRADEMARK OFFICE
CERTIFICATE OF CORRECTION

PATENT NO.        : 7,941,647 B2
APPLICATION NO.   : 11/982419
DATED             : May 10, 2011
INVENTOR(S)       : Yates, Jr. et al.

It is certified that error appears in the above-identified patent and that said Letters Patent is hereby corrected as shown below:

On the title page, in the Inventors section, "T.R. Ramesh" should be changed to --Tiruvur R. Ramesh--.

Column 147, line 64, claim 13, before "execution" insert --an--.

Column 149, line 44, claim 32, before "execution" insert --an--.

Signed and Sealed this
Fifth Day of July, 2011

David J. Kappos
*Director of the United States Patent and Trademark Office*